United States Patent
Jain et al.

(10) Patent No.: US 12,166,688 B2
(45) Date of Patent: Dec. 10, 2024

(54) METHODS, SYSTEMS, ARTICLES OF MANUFACTURE AND APPARATUS TO OPTIMIZE RESOURCES IN EDGE NETWORKS

(71) Applicant: Intel Corporation, Santa Clara, CA (US)

(72) Inventors: Nilesh Jain, Portland, OR (US); Rajesh Poornachandran, Portland, OR (US); Eriko Nurvitadhi, Hillsboro, OR (US); Anahita Bhiwandiwalla, San Jose, CA (US); Juan Pablo Munoz, Folsom, CA (US); Ravishankar Iyer, Portland, OR (US); Chaunte W. Lacewell, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/039,166

(22) PCT Filed: Jun. 25, 2021

(86) PCT No.: PCT/US2021/039222
§ 371 (c)(1),
(2) Date: May 26, 2023

(87) PCT Pub. No.: WO2022/139879
PCT Pub. Date: Jun. 30, 2022

(65) Prior Publication Data
US 2024/0007414 A1  Jan. 4, 2024

Related U.S. Application Data

(60) Provisional application No. 63/130,508, filed on Dec. 24, 2020.

(51) Int. Cl.
*H04L 47/726* (2022.01)
*H04L 47/2425* (2022.01)
*H04L 47/765* (2022.01)

(52) U.S. Cl.
CPC ........ *H04L 47/726* (2013.01); *H04L 47/2425* (2013.01); *H04L 47/765* (2013.01)

(58) Field of Classification Search
None
See application file for complete search history.

(56) References Cited

U.S. PATENT DOCUMENTS 11,032,164 B1 * 6/2021 Rothschild ............. H04L 41/40
11,797,876 B1 * 10/2023 Wang .................... G06N 3/045
(Continued)

FOREIGN PATENT DOCUMENTS

| WO | 2020106414 | 5/2020 |
| WO | 2020221799 | 11/2020 |
| WO | 2020226979 | 11/2020 |

OTHER PUBLICATIONS

Zamora-Esquivel et al., "Adaptive Convolutional Kernels," In: 2019 IEEE/CVF International Conference on Computer Vision Workshop (ICCVW), DOI: 10.1109/ICCVW.2019.00249, Oct. 27-28, 2019, 8 pages, Seoul, Korea.
(Continued)

*Primary Examiner* — Mohamed Ibrahim
(74) *Attorney, Agent, or Firm* — Hanley, Flight & Zimmerman, LLC

(57) ABSTRACT

Methods, apparatus, systems, and articles of manufacture are disclosed to optimize resources in edge networks. An example apparatus includes agent managing circuitry to invoke an exploration agent to identify platform resource devices, select a first one of the identified platform resource devices, and generate first optimization metrics for the workload corresponding to the first one of the identified
(Continued)

platform resource devices, the first optimization metrics corresponding to a first path. The example agent is to further select a second one of the identified platform resource devices, generate second optimization metrics for the workload corresponding to the second one of the identified platform resource devices, the second optimization metrics corresponding to a second path. The example apparatus also includes benchmark managing circuitry to embed second semantic information to the workload, the second semantic information including optimized graph information and platform structure information corresponding to the second one of the identified platform resource devices, and reconfiguration managing circuitry to select the first path or the second path during runtime based on (a) service level agreement (SLA) information and (b) utilization information corresponding to the first and second identified platform resource devices.

17 Claims, 79 Drawing Sheets

(56) References Cited

U.S. PATENT DOCUMENTS

| | | | |
|---|---|---|---|
| 2013/0198050 A1 | 8/2013 | Shroff et al. | |
| 2017/0024649 A1 | 1/2017 | Yan et al. | |
| 2018/0152390 A1 | 5/2018 | Loomba et al. | |
| 2019/0266387 A1 | 8/2019 | Sun et al. | |
| 2019/0394096 A1 | 12/2019 | Bernat et al. | |
| 2020/0007460 A1* | 1/2020 | Guim Bernat | G06F 9/5077 |
| 2020/0082244 A1 | 3/2020 | Cho et al. | |
| 2020/0104184 A1 | 4/2020 | Subramanian et al. | |
| 2020/0136906 A1 | 4/2020 | Guim Bernat et al. | |
| 2020/0145337 A1* | 5/2020 | Keating | H04L 47/2425 |
| 2020/0159505 A1 | 5/2020 | Narayanan et al. | |
| 2020/0193266 A1 | 6/2020 | Scheidegger et al. | |
| 2020/0241921 A1 | 7/2020 | Calmon et al. | |
| 2020/0364538 A1 | 11/2020 | Lee | |
| 2022/0206863 A1 | 6/2022 | Frohwitter et al. | |
| 2023/0217256 A1* | 7/2023 | Garcia-Saavedra | H04W 72/51 370/329 |

OTHER PUBLICATIONS

International Bureau, "International Preliminary Report on Patentability," issued in connection with International Patent Application No. PCT/US2021/039222, dated Jul. 6, 2023, 10 pages.
Netherlands Patent Office, "Certificate of Grant," issued in connection with Dutch Patent Application No. 2030226, dated Aug. 9, 2023, 4 Pages. [Machine English Translation Included].
International Searching Authority, "Written Opinion of the International Searching Authority," issued in connection with International Patent Application No. PCT/US2021/039222, dated Mar. 4, 2022, 8 pages.
International Searching Authority, "International Search Report," issued in connection with International Patent Application No. PCT/US2021/039222, dated Mar. 4, 2022, 7 pages.
Netherlands Patent Office, "Search Report," issued in connection with Application No. 2030226, mailed on May 10, 2023, 30 Pages [Machine English Translation Included].
International Searching Authority, "International Search Report and Written Opinion," issued in connection with International Application No. PCT/US2021/039222, dated Mar. 4, 2022, 15 pages.
Julio Zamora-Esquivel et al., "Adaptive Convolutional Kernels," In: 2019 IEEE/CVF International Conference on Computer Vision Workshop (ICCVW), Seoul, Korea, retrieved from https://openaccess.thecvf.com/, published Oct. 2019, 8 pages.
Aakash Kaushik, "Understanding ResNet50 Architecture," OpenGenus IQ: Learn Computer Science, retrieved from https://iq.opengenus.org/resnet50-architecture/, 8 pages.
European Patent Office, "Extended European Search Report," issued in connection with European patent application No. 21911773.6, Search completed on May 31, 2024, 13 pages.

* cited by examiner

3202 — CUSTOMER A
WORKLOAD: OBJECT DETECTION
TARGET HW: VPU (INT8/4/2/1)
GOAL: 2X LATENCY IMPROVEMENT WITH ± 1% ACCURACY

3204 — CUSTOMER B
WORKLOAD: TEXT-TO-SPEECH SYNTHESIS
TARGET HW: FPGA
GOAL: 50% OF ORIGINAL MODEL SIZE, ± 3% ACCURACY IMPACT

3206 — CUSTOMER C
WORKLOAD: RECOMMENDATION SYSTEM
TARGET HW: CPU+GPU
GOAL: 30% SPARCE INT8 EMBEDDING, ± 1% ACCURACY IMPACT

FIG. 32

SAMPLE ACTION SPACE

| ACTION ID | QUANTIZATION TYPE |
|---|---|
| 0 | DO NOT QUANTIZE |
| 1 | INT8 |
| 2 | BF16 |
| 3 | FP16 |

FIG. 40

METHODS, SYSTEMS, ARTICLES OF MANUFACTURE AND APPARATUS TO OPTIMIZE RESOURCES IN EDGE NETWORKS

RELATED APPLICATION

This patent arises from the national stage of International Application No. PCT/US2021/039222, which was filed on Jun. 25, 2021. International Application No. PCT/US2021/039222 claims the benefit of U.S. Provisional Patent Application Ser. No. 63/130,508, which was filed on Dec. 24, 2020. Priority to International Application No. PCT/US2021/039222 and U.S. Patent Application Ser. No. 63/130,508 is hereby claimed.

FIELD OF THE DISCLOSURE

This disclosure relates generally to Edge networking and, more particularly, to methods, systems, articles of manufacture and apparatus to optimize resources in edge networks.

BACKGROUND

In recent years, entities that service workload requests are chartered with the responsibility of distributing those workloads in a manner that satisfies client demands. In some environments, the underlying platform resources are known ahead of time. Edge computing resources are being utilized to a greater extent and the target computational devices are heterogeneous. Target computational devices may include CPUs, GPUs, FPGAs and/or other types of accelerators.

26A is an example framework to optimize a workload.

26B is an example graph semantic embedding for a candidate graph of interest.

26C is an example optimizer to optimize workloads in a heterogenous environment.

Figure 26A:
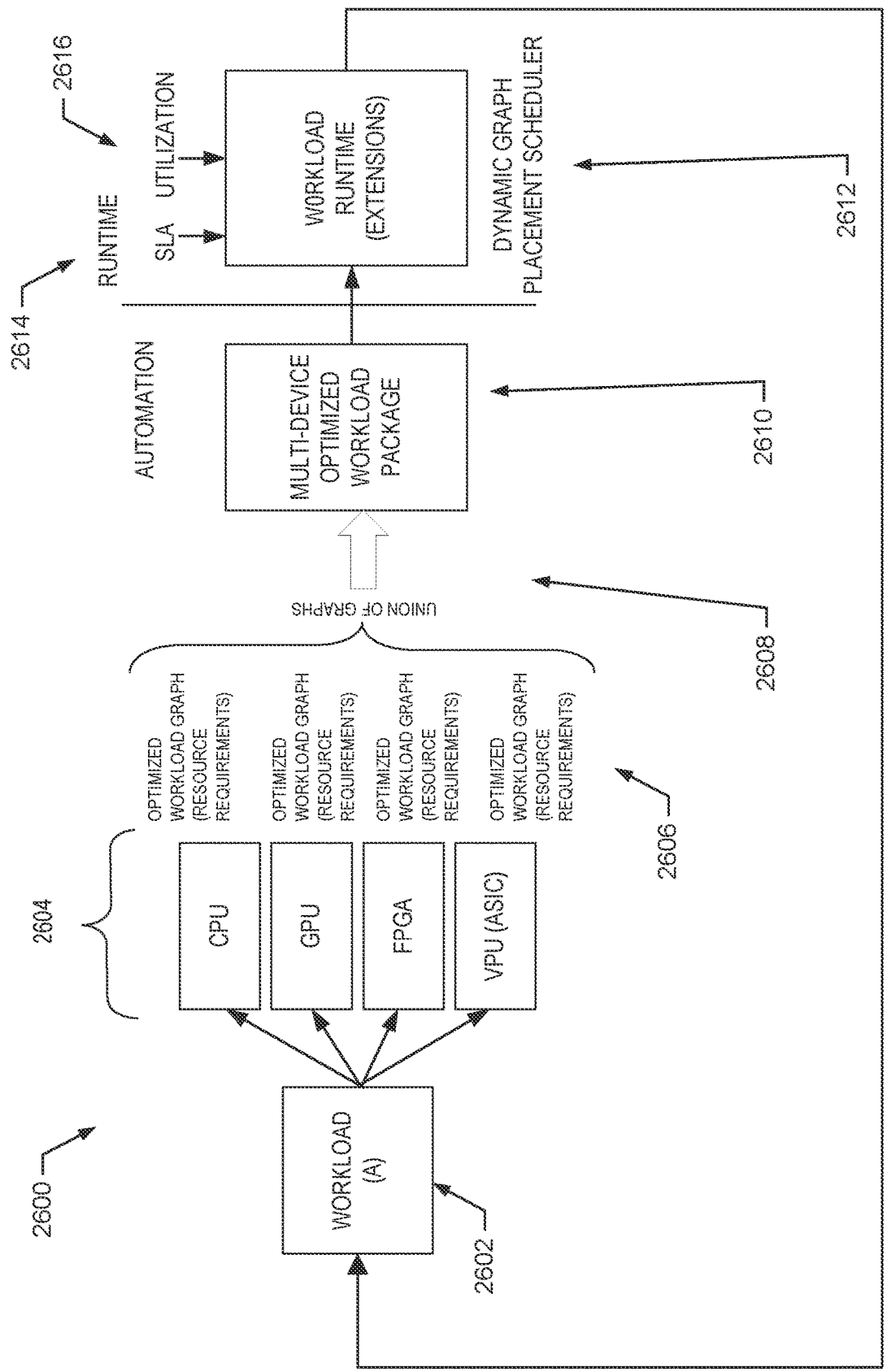
Figure 26B:
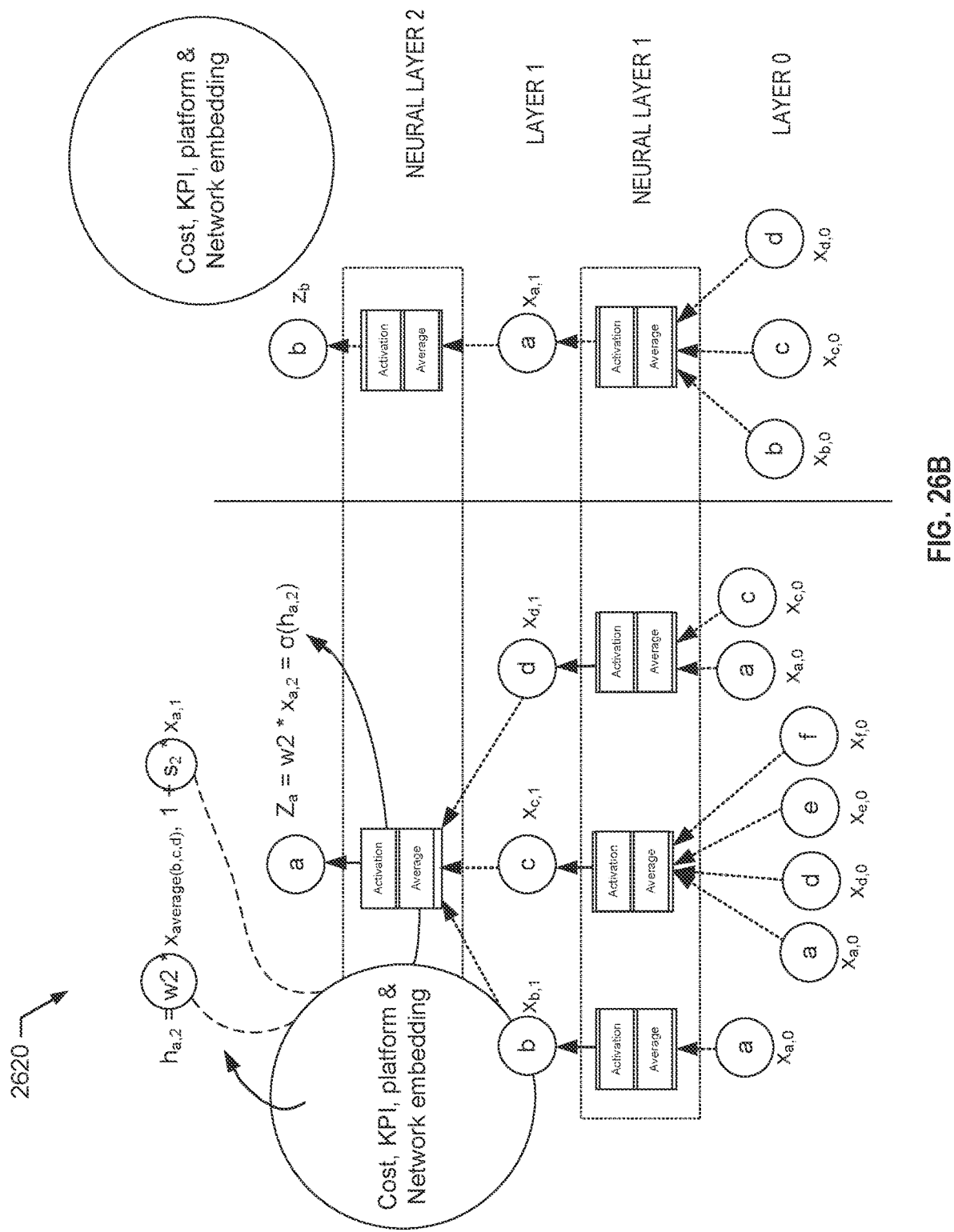
Figure 26C:
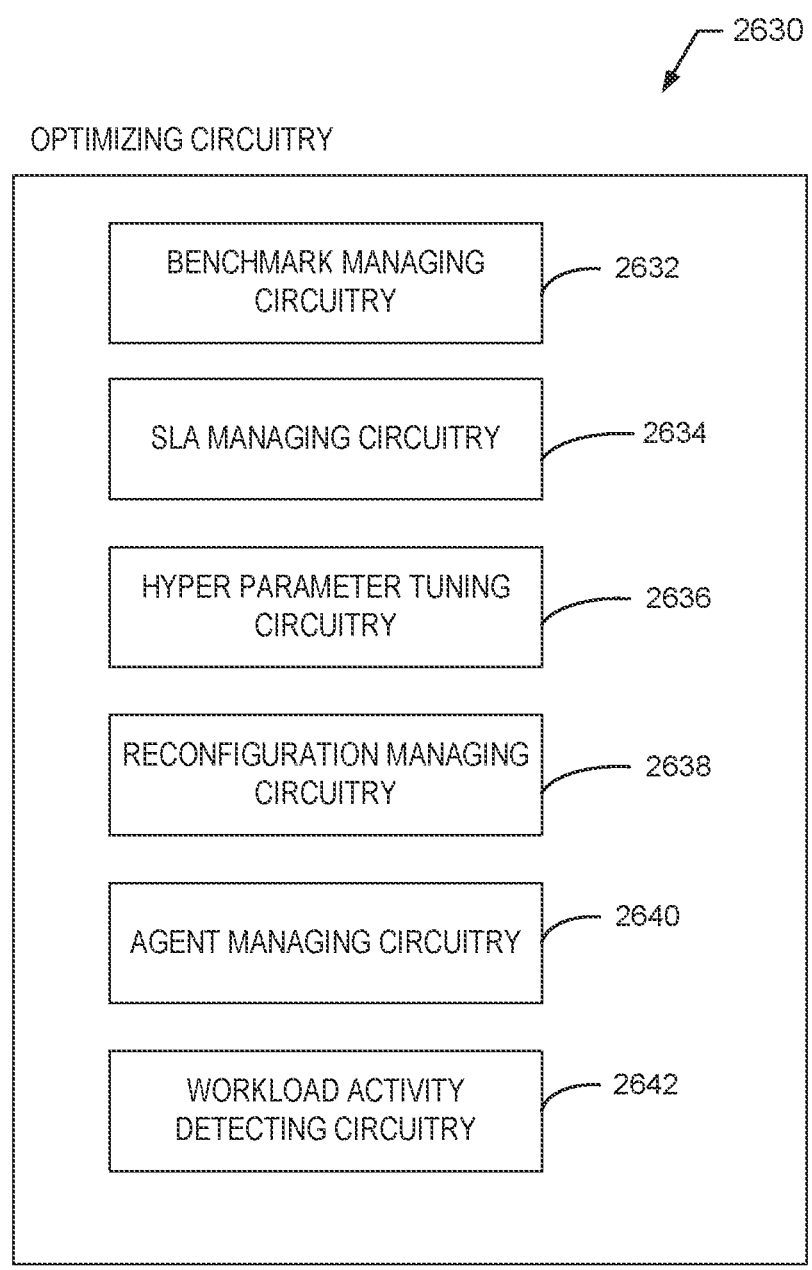

27 through 29 are flowcharts representative of machine-readable instructions which may be executed to implement all or part of the example optimizer of FIG. 26C.

Figure 30A:
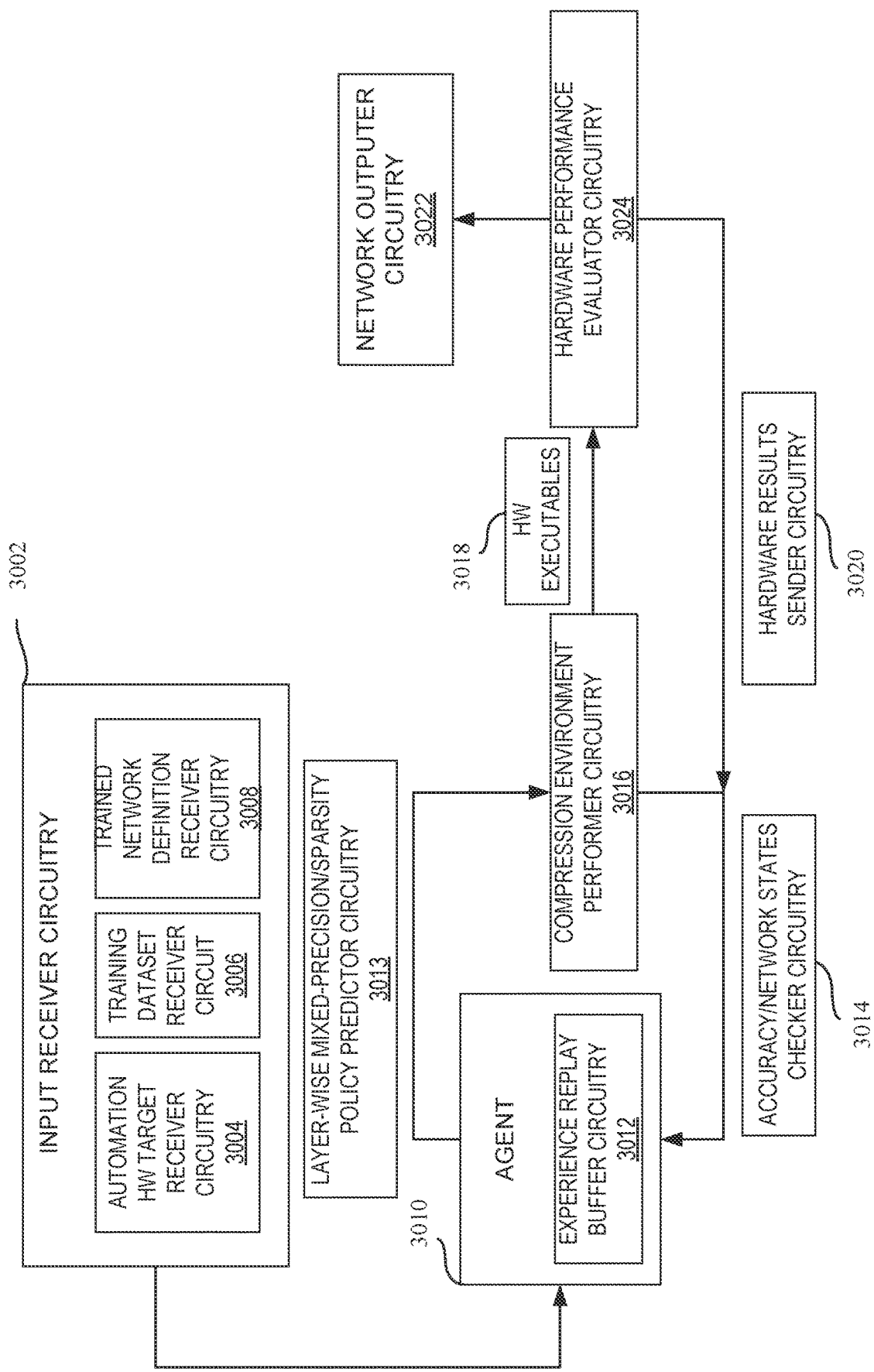

FIG. 30A is an example framework of structure and machine-readable instructions which may be executed to implement a search flow for a model compression method.

Figure 30B:
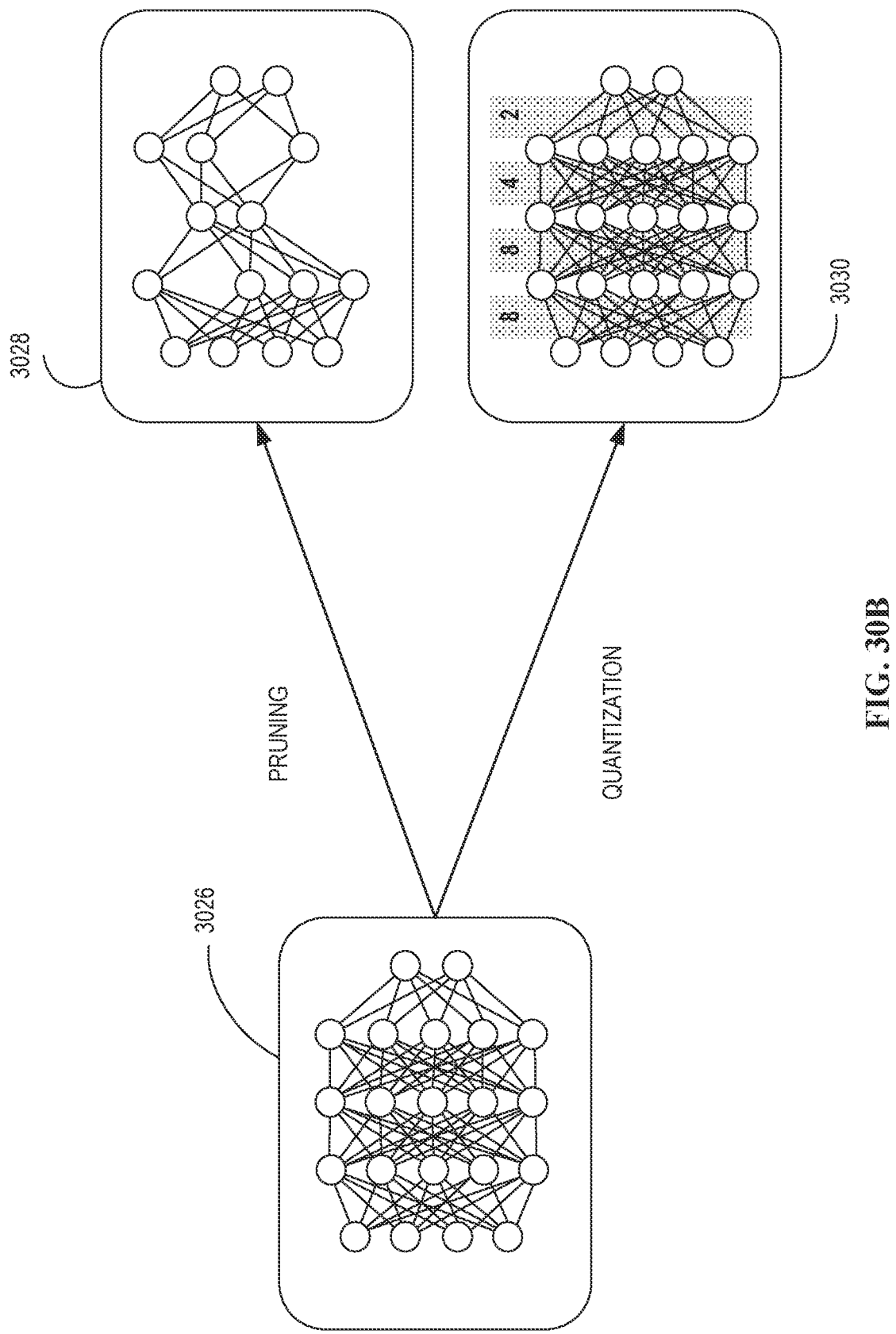

FIG. 30B illustrates example compression techniques.

Figure 30C:
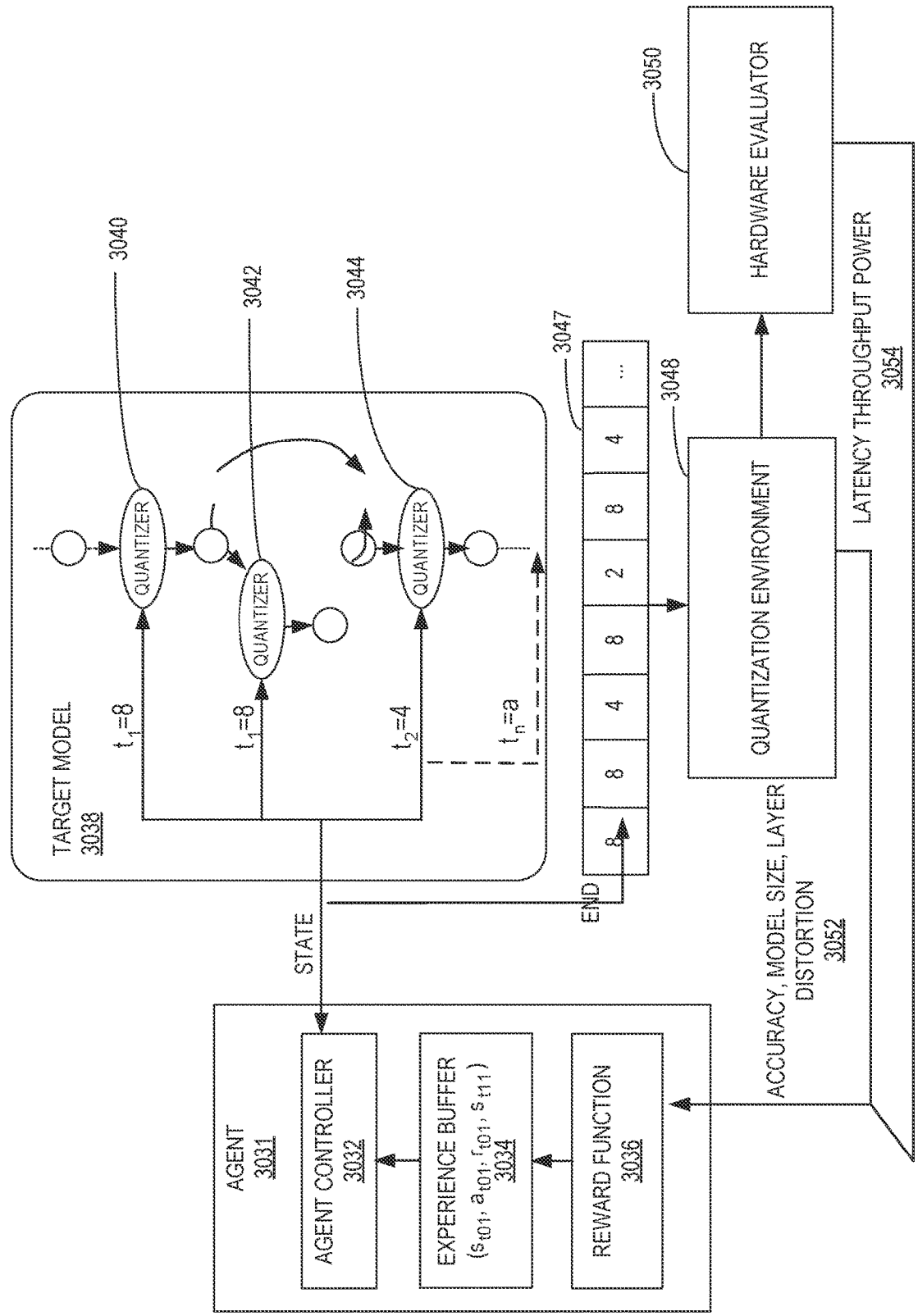

FIG. 30C is a block diagram of an example compression framework.

Figure 31:
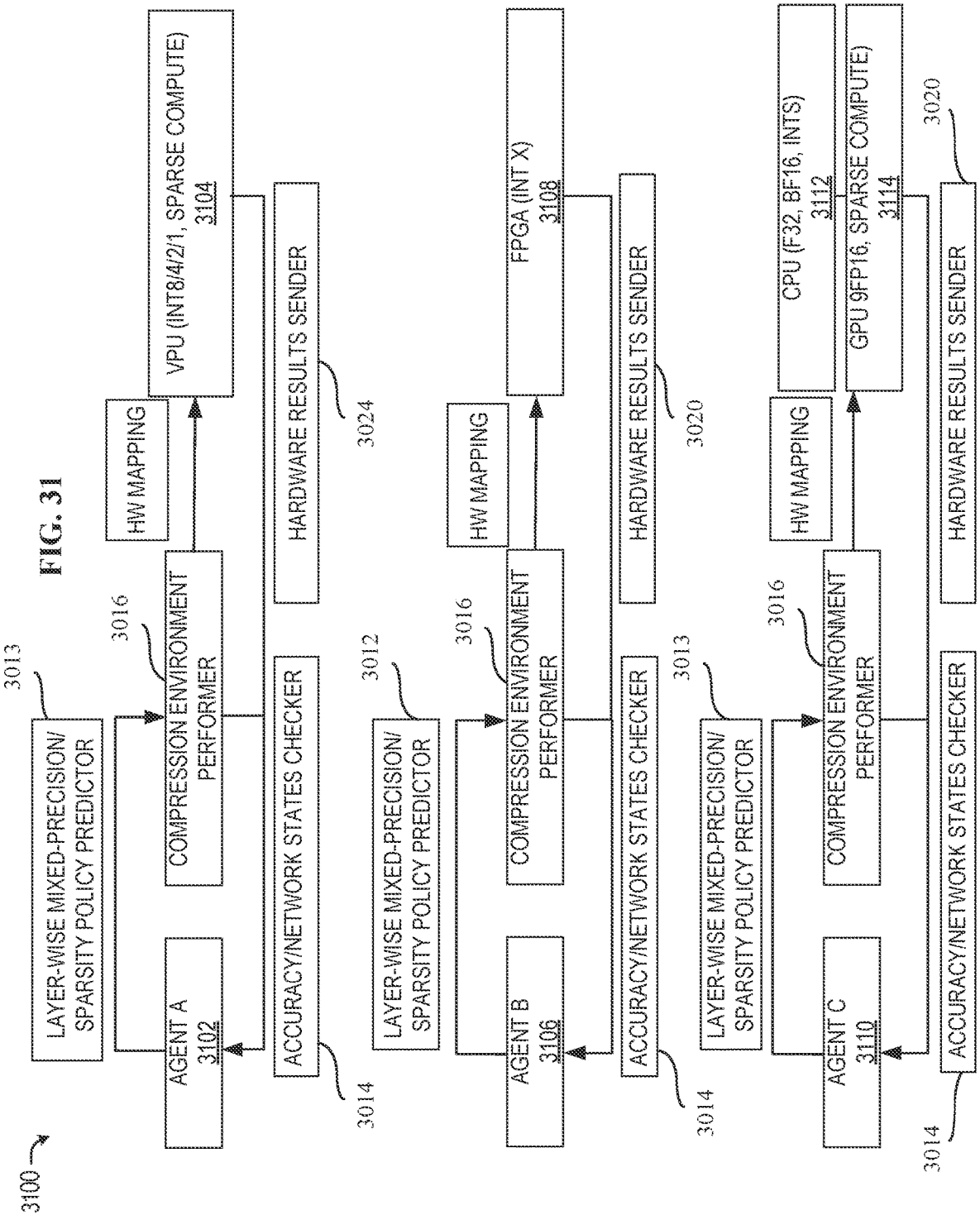

FIG. 31 is block diagram of an example framework of structure and machine-readable instructions which may be executed to implement a search flow for a model compression method for three customers with different requirements.

FIG. 32 is an example of three customers with different requirements.

Figure 33:
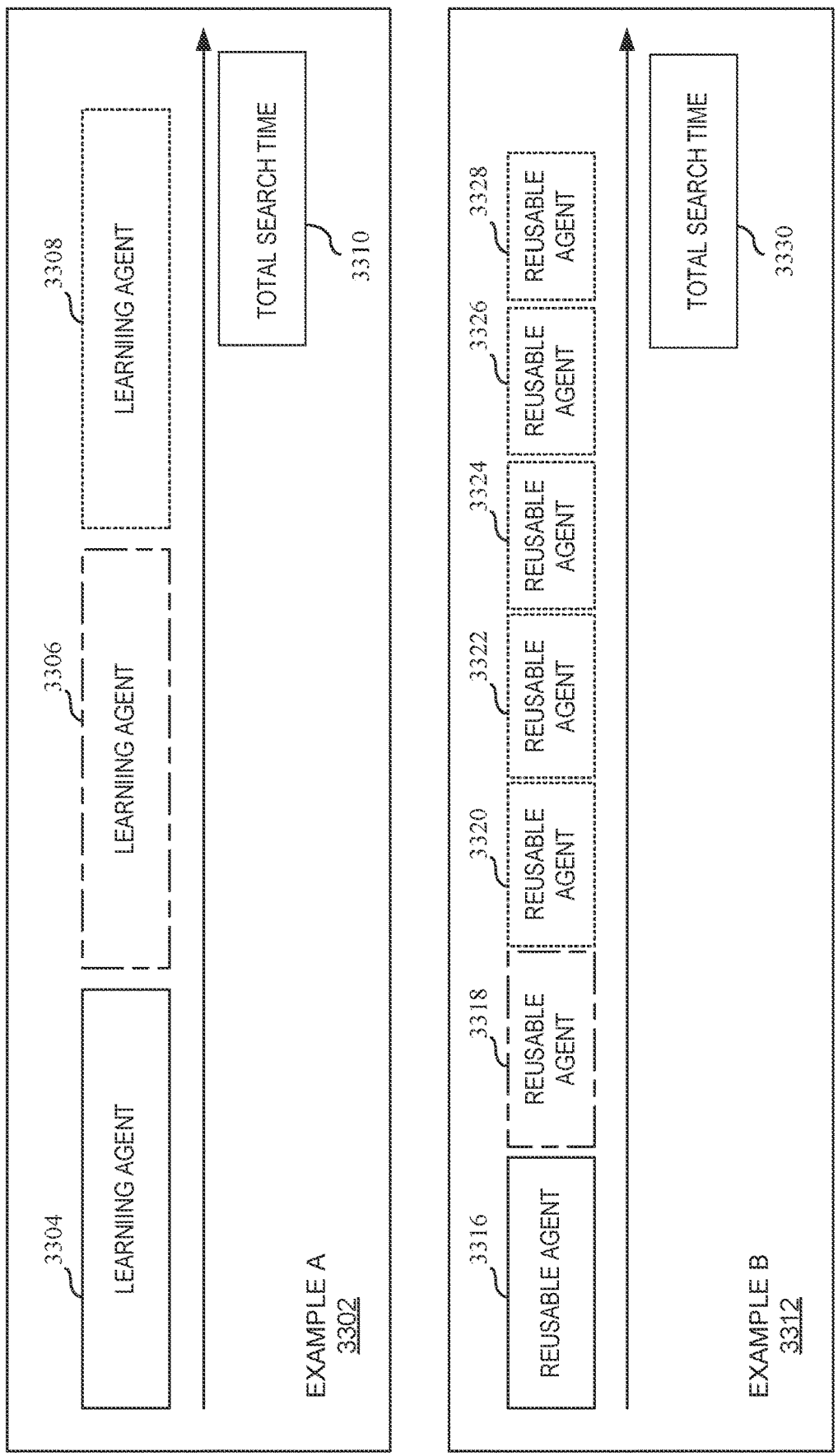

FIG. 33 illustrates example productivity improvements resulting from examples disclosed herein.

Figure 34:
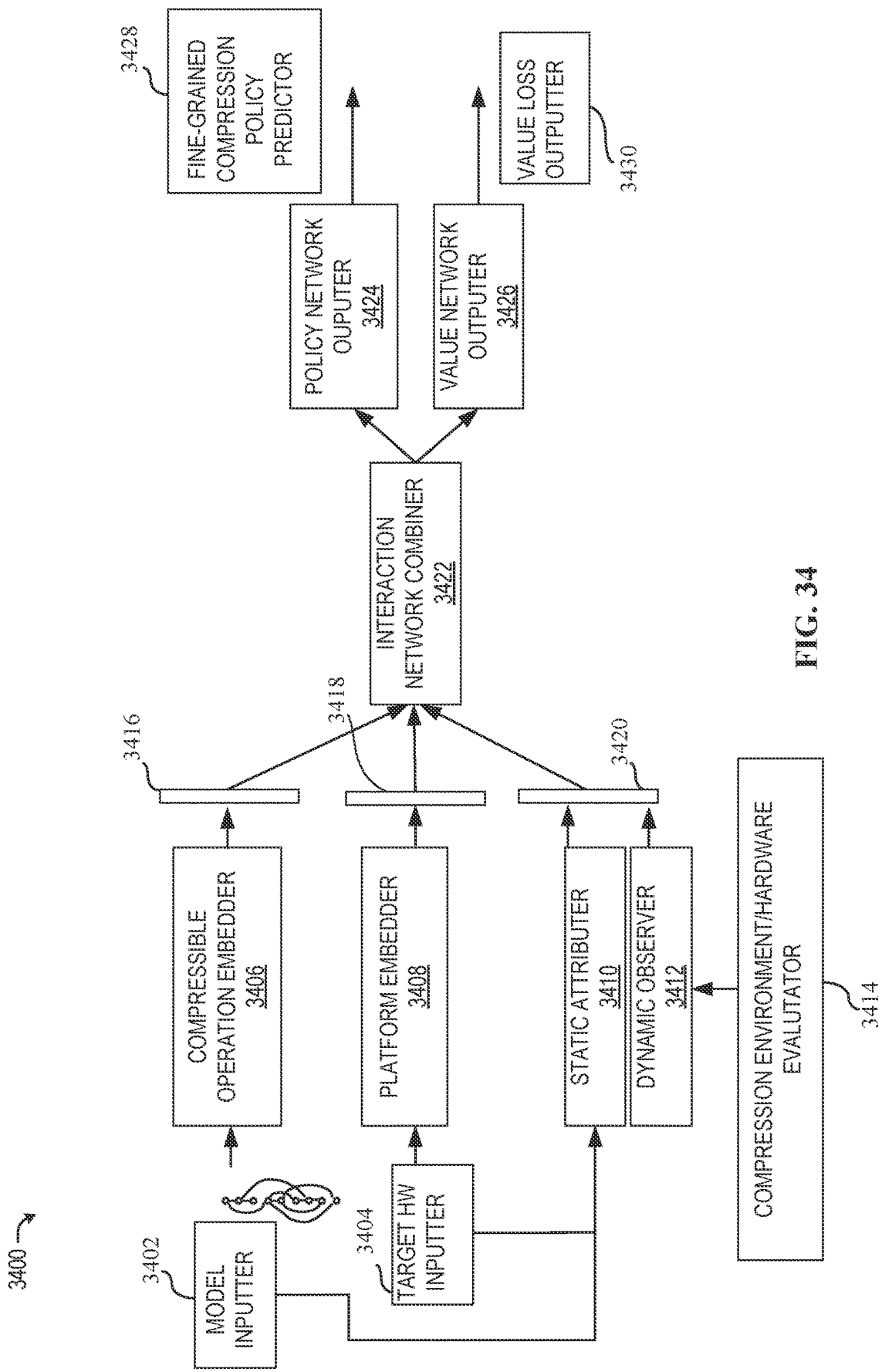

FIG. 34 is an example of a generalized agent architecture for the scalable model compression method for optimal platform specialization.

Figure 35:
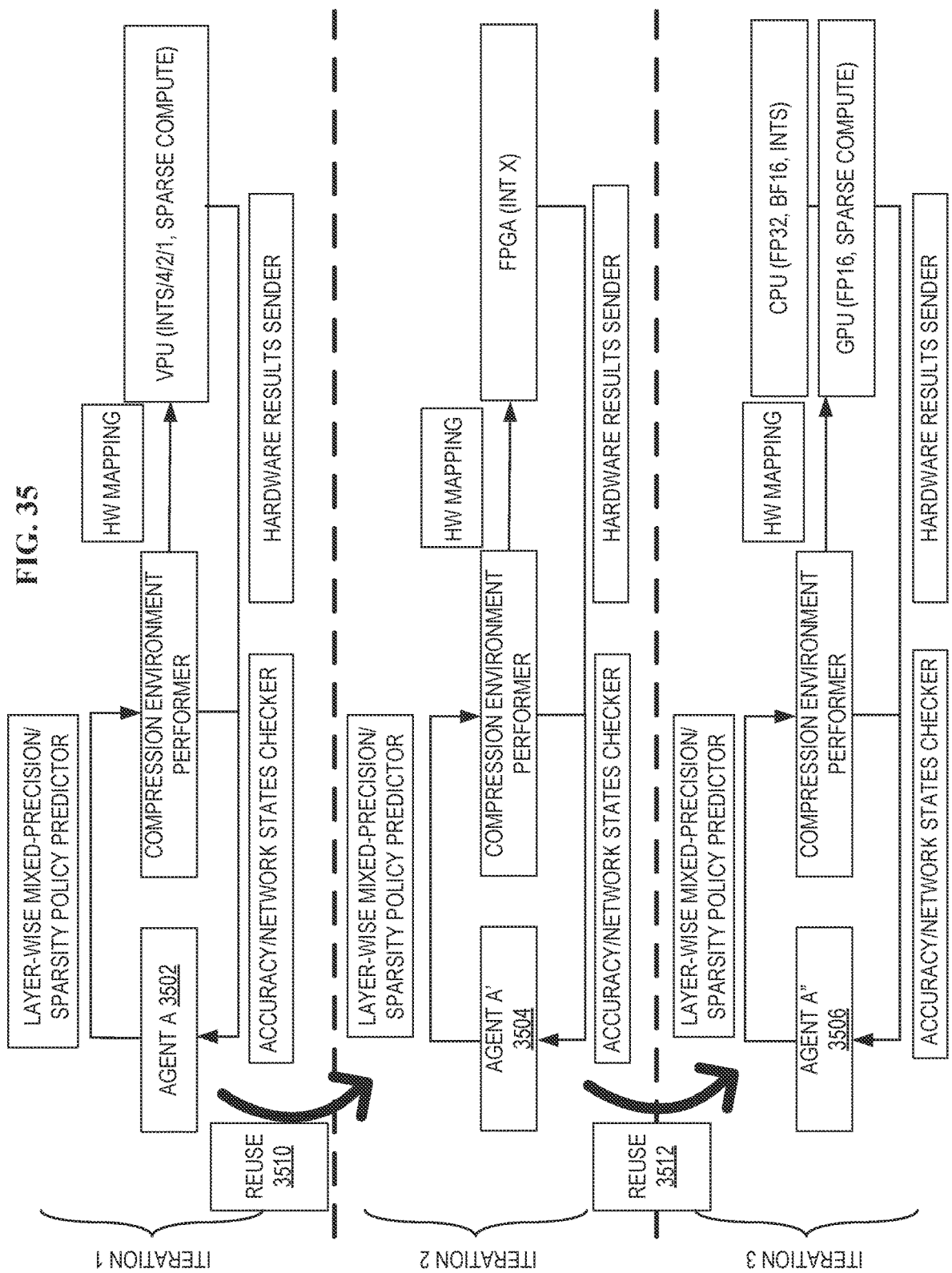

FIG. 35 is an example of transfer learning by reusing data of customers with different requirements to create a scalable model compression method for optimal platform specialization.

Figure 36:
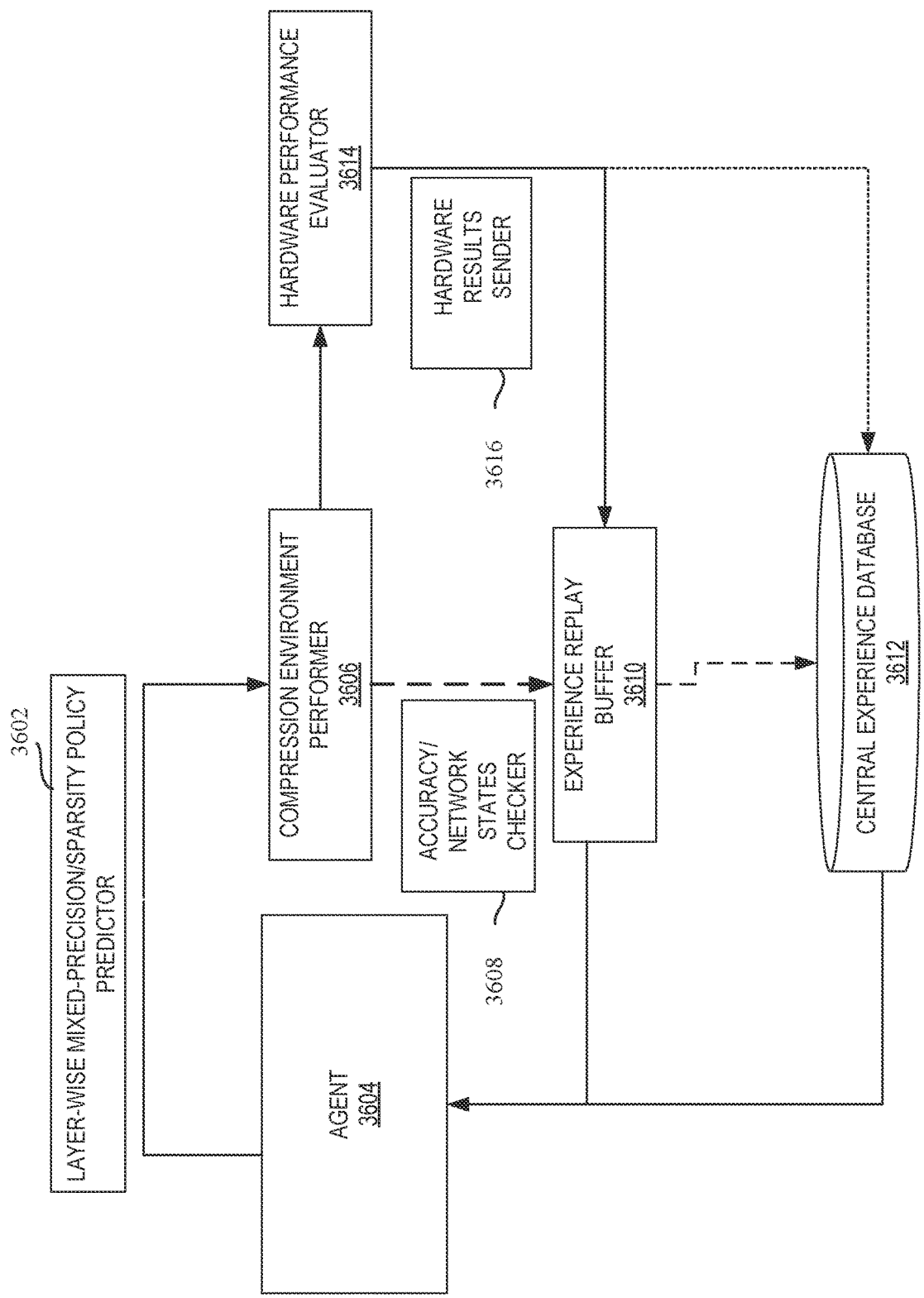

FIG. 36 is an example of knowledge accumulation via central database.

Figure 37:
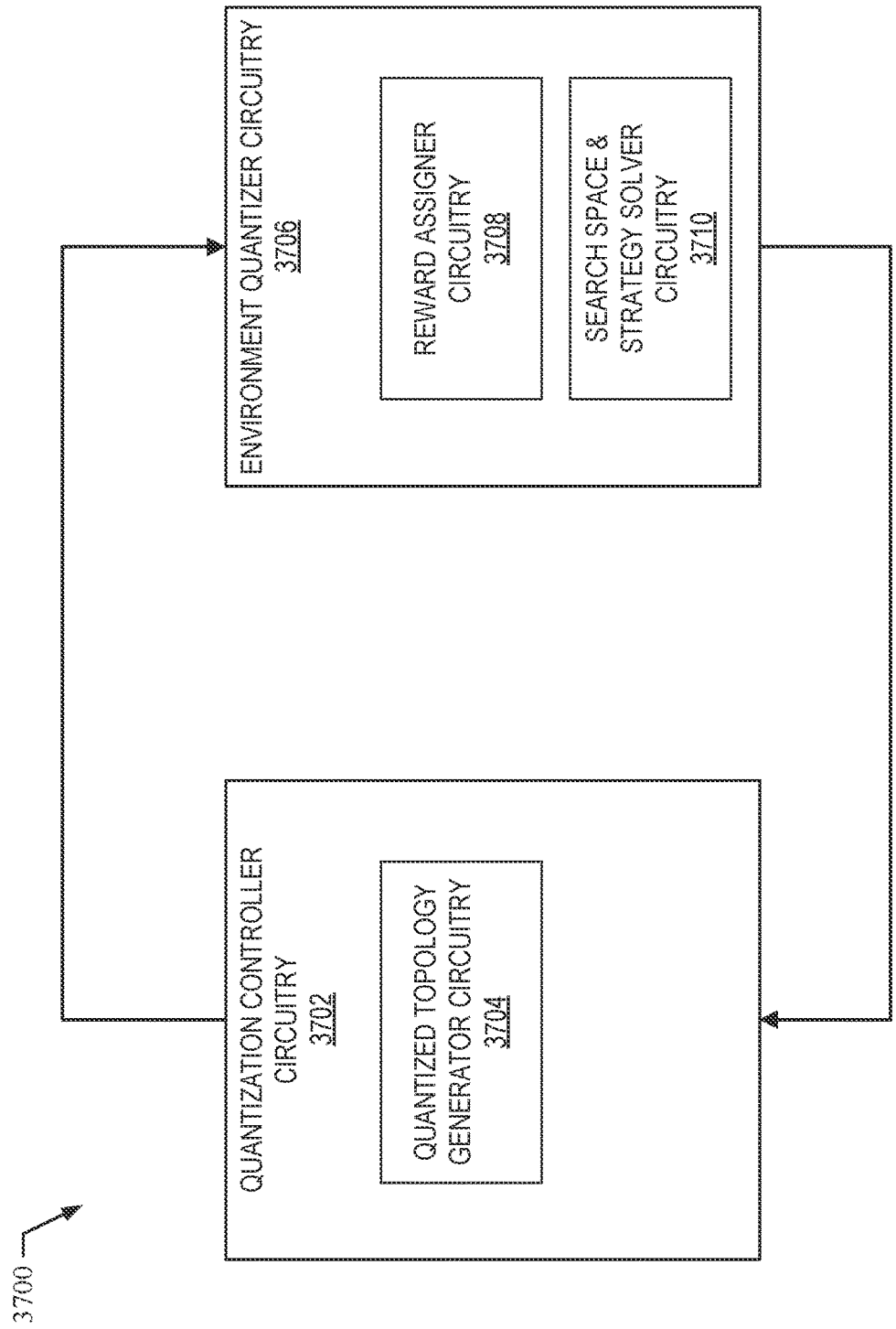

FIG. 37 is an example schematic illustration of a framework for generating and providing optimal quantization weights to deep learning models.

Figure 38:
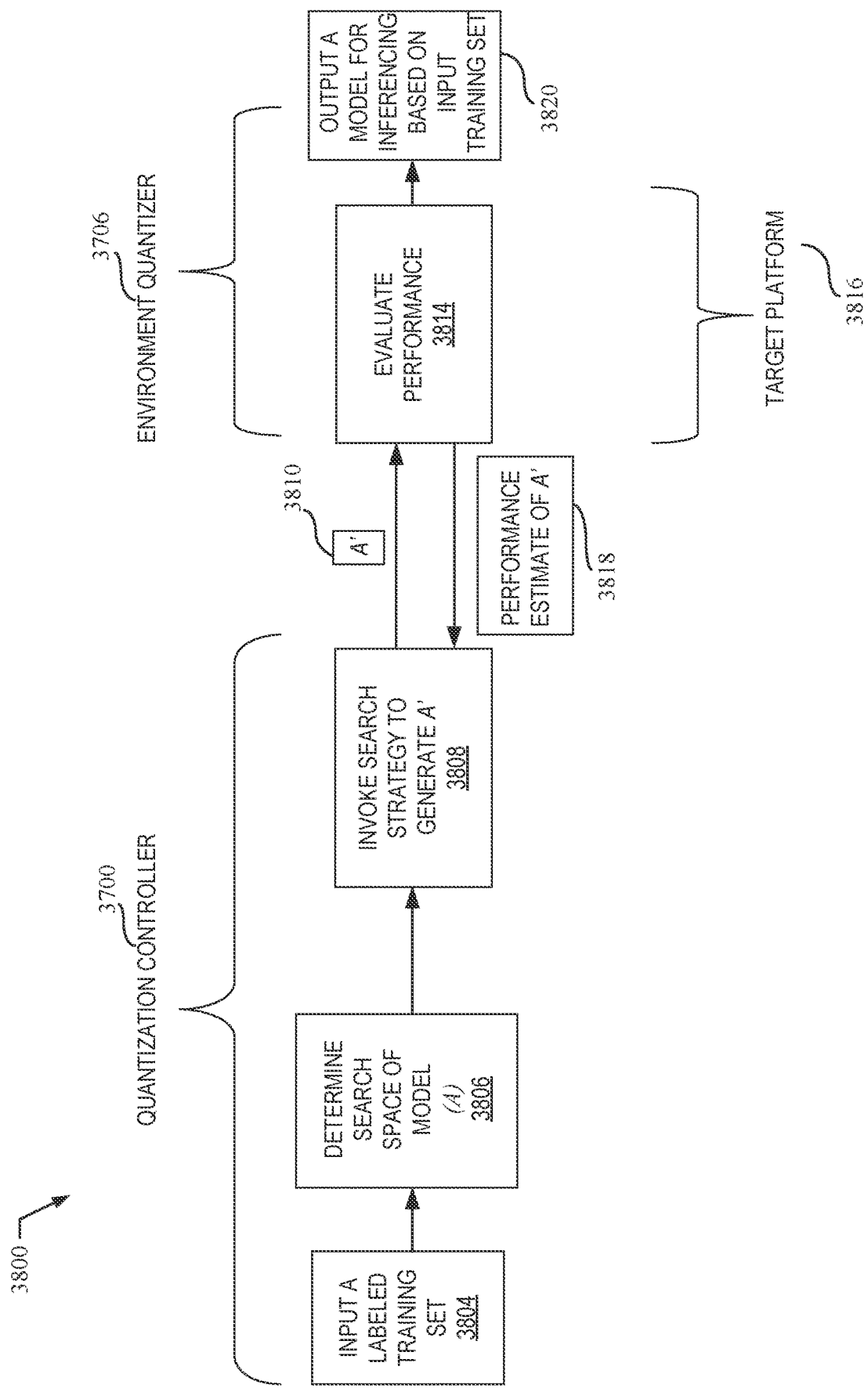

FIG. 38 is an example overview of a framework of methods for optimizing quantization efforts.

Figure 39:
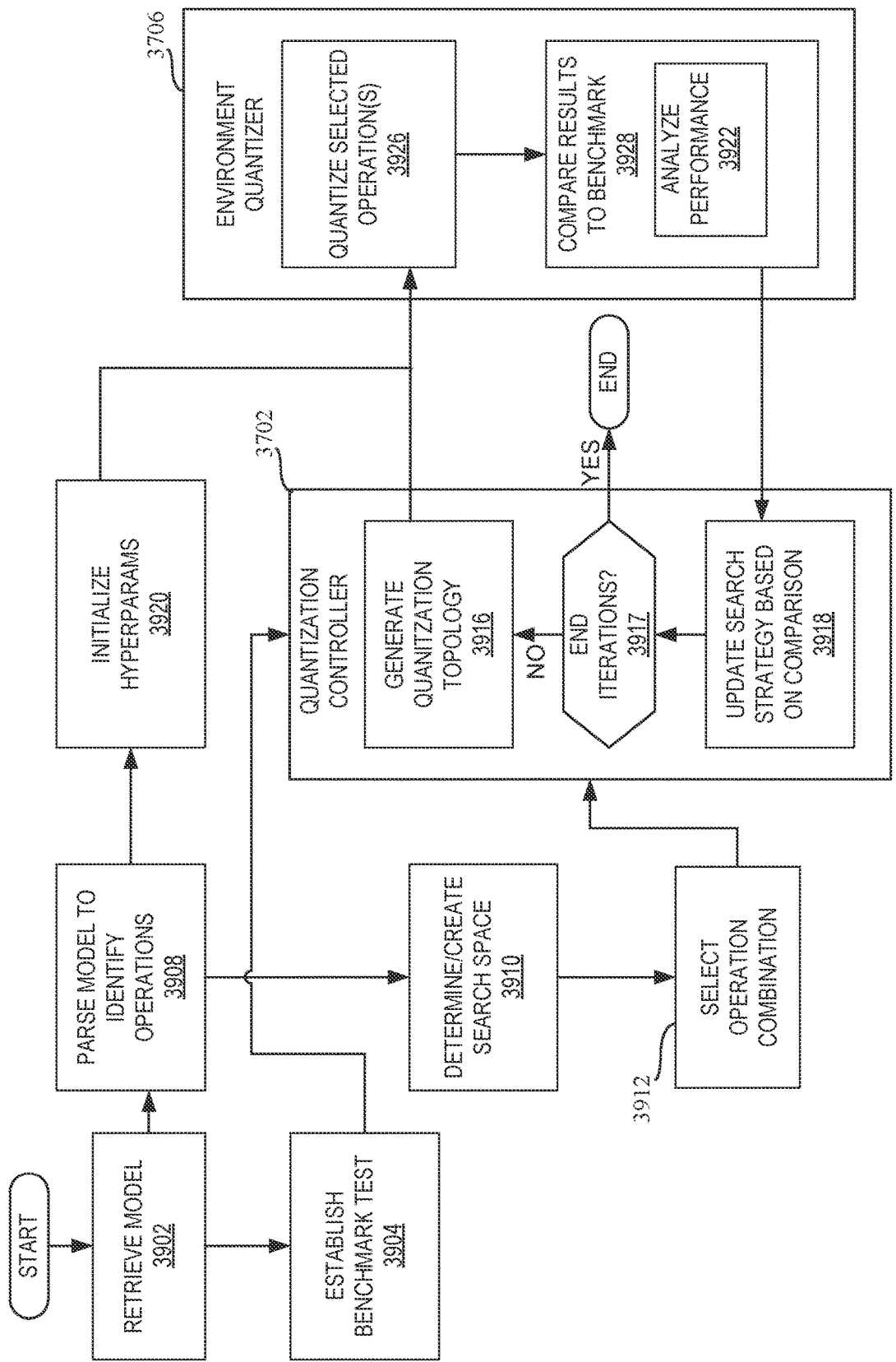

FIG. 39 is a flowchart representative of machine-readable instructions which may be executed to implement an apparatus and method for generating and providing optimal quantization weights to deep learning models.

FIG. 40 is an example of a sample action space.

Figure 41:
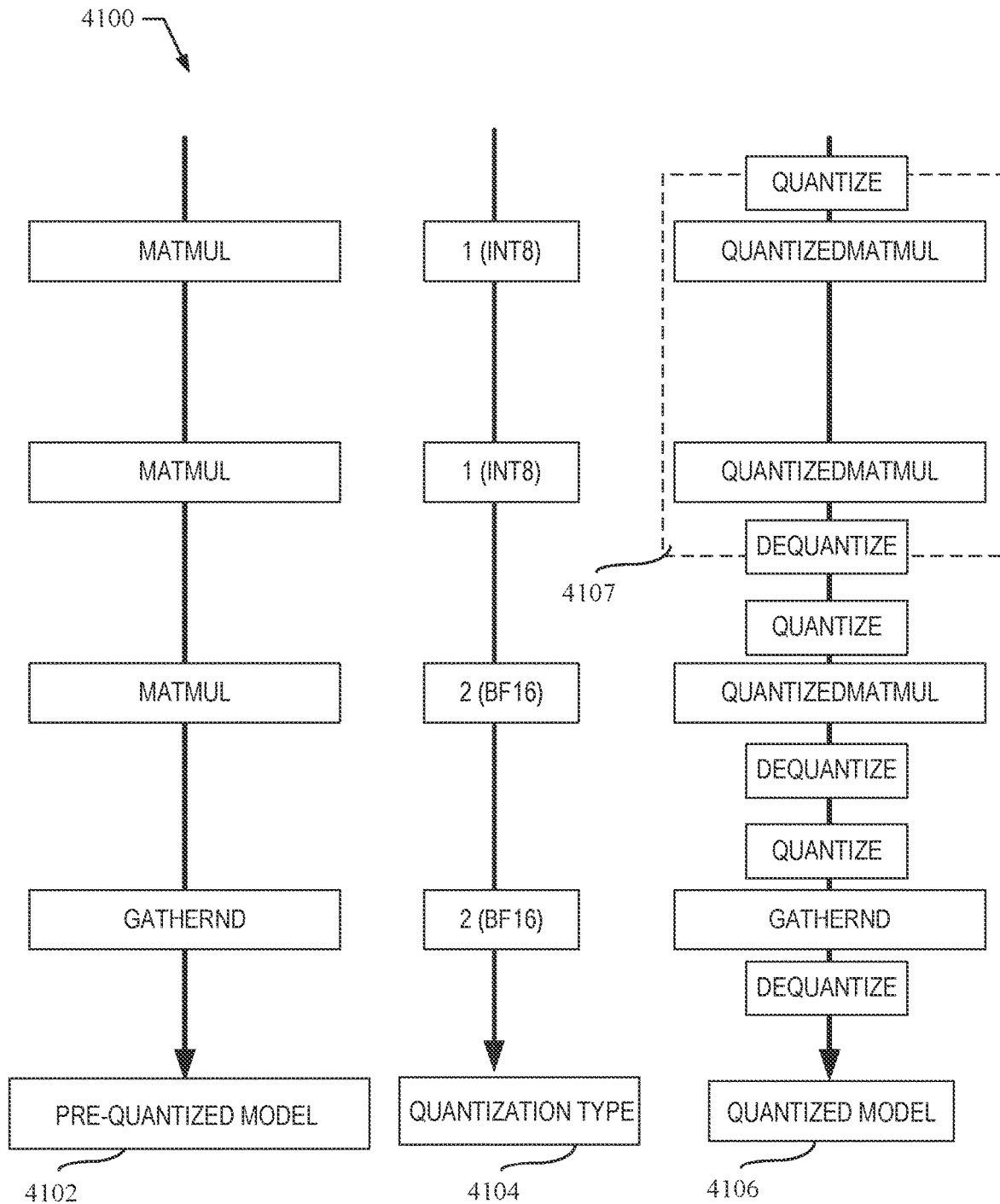

FIG. 41 is an example of a pre-quantized model and quantized model.

Figure 42:
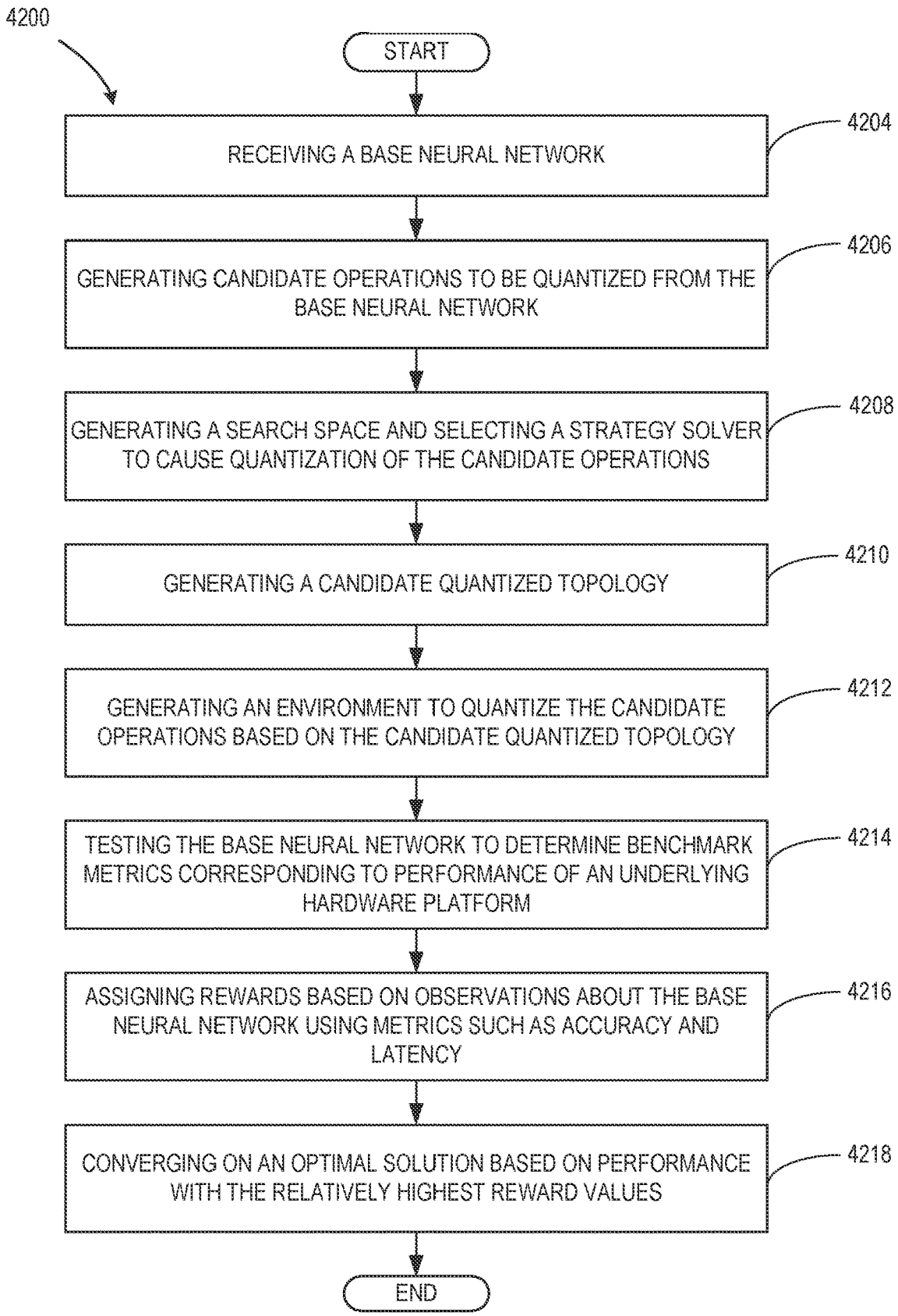

FIG. 42 is a flowchart representative of an example method of providing quantization weights to deep learning models.

Figure 43A:
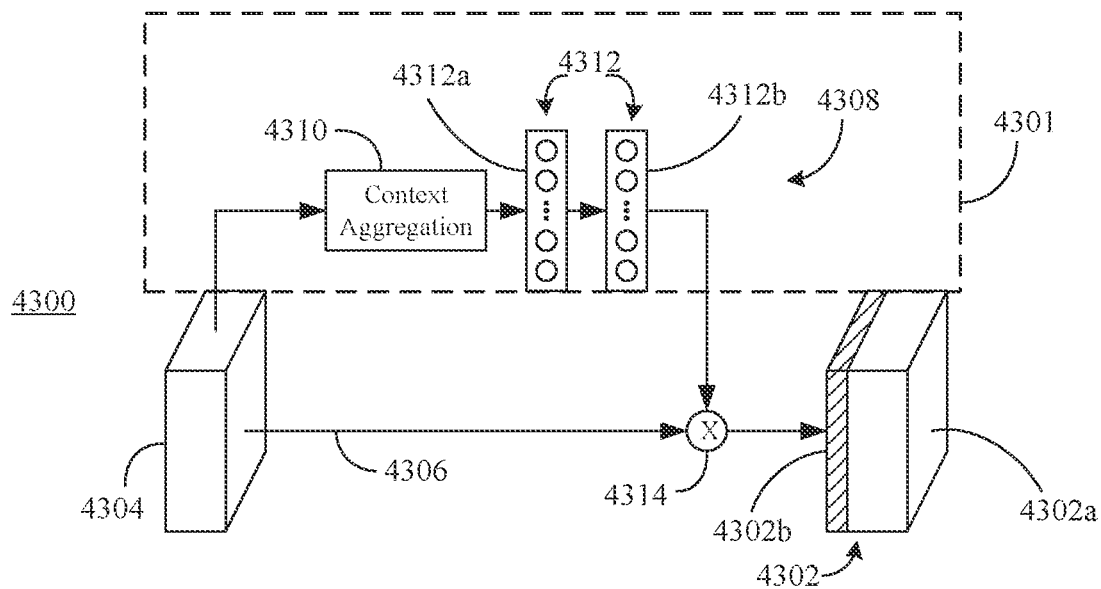

FIG. 43A is block diagram of an example of a branch path between layers in a neural network according to an example.

Figure 43B:
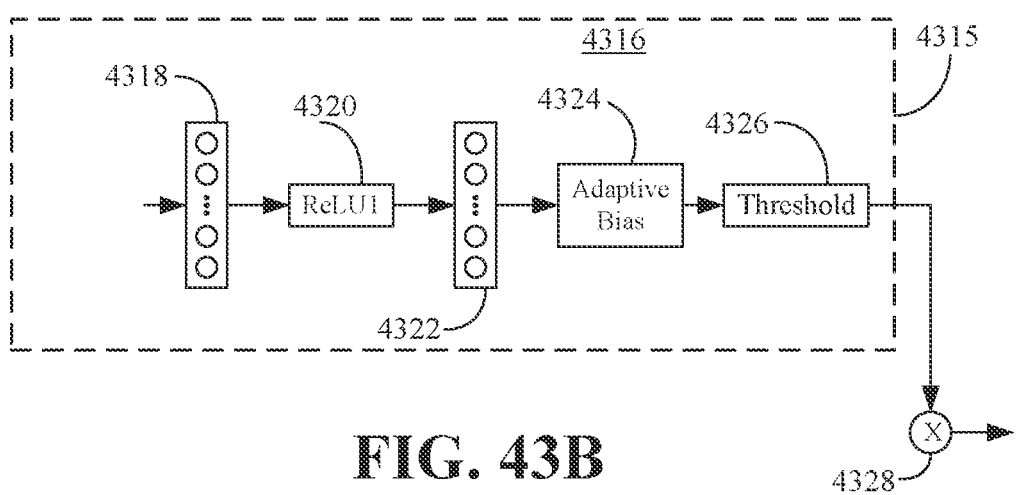

FIG. 43B is a block diagram of an example of a branch path that excludes channels from consideration based on a pruning ratio constraint according to an example.

Figure 43C:
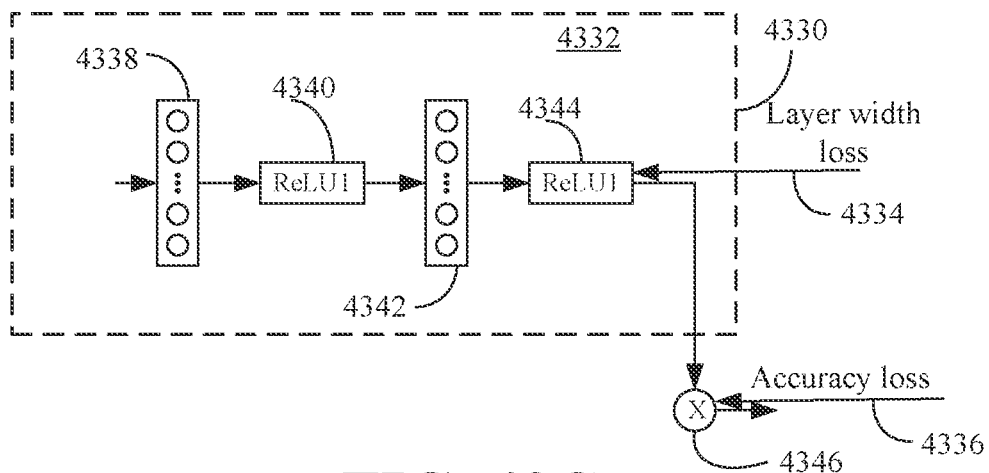

FIG. 43C is a block diagram of an example of a branch path that balances an accuracy constraint against a layer width loss according to an example.

Figure 44:
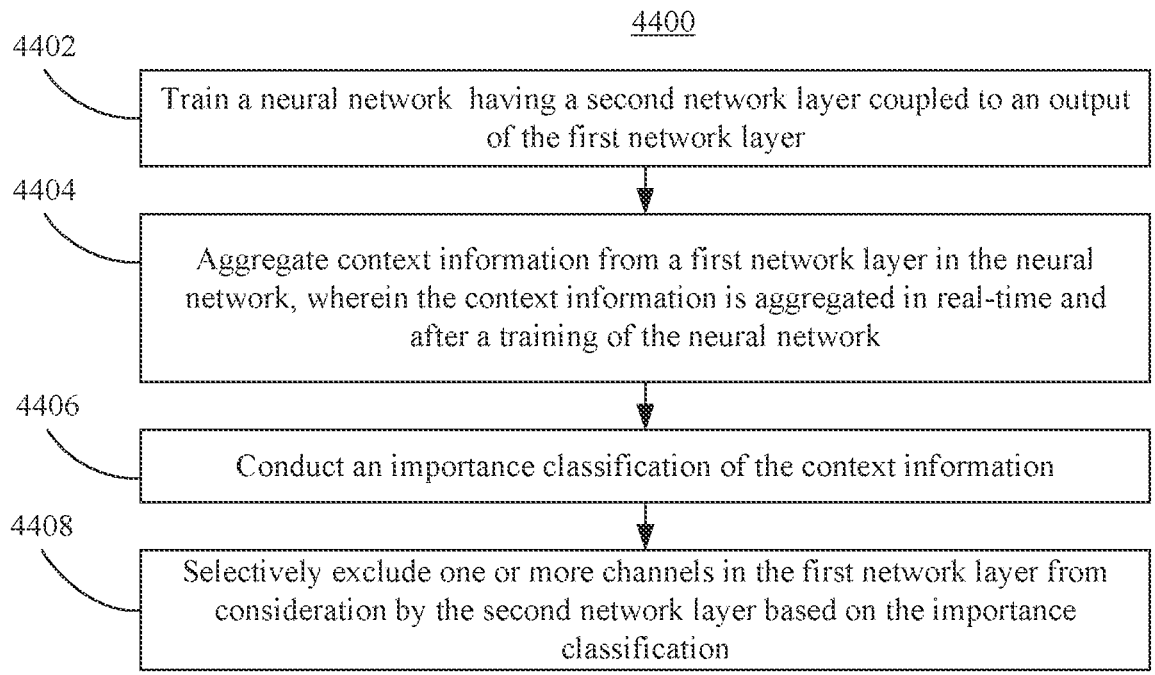

FIG. 44 is a flowchart of an example of a method of conducting pruning operations in a semiconductor apparatus according to an example.

Figure 45:
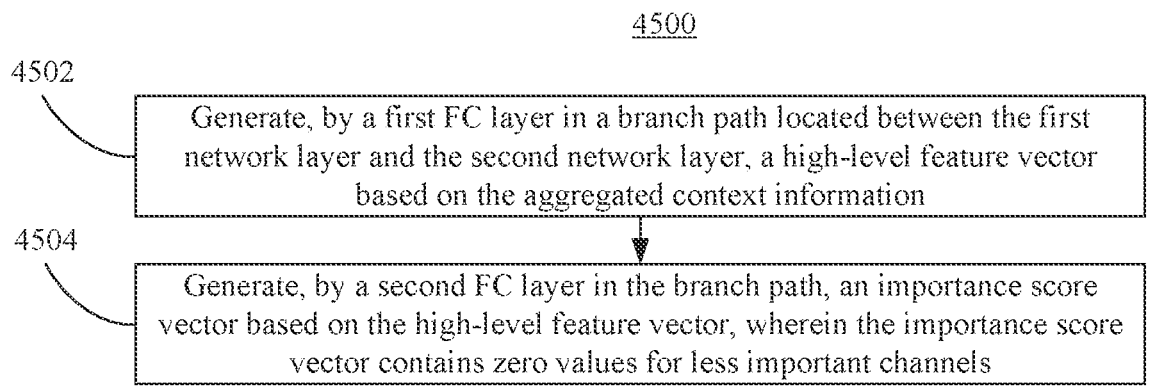

FIG. 45 is a flowchart of an example of a method of conducting an importance classification of context information according to an example.

Figure 46A:
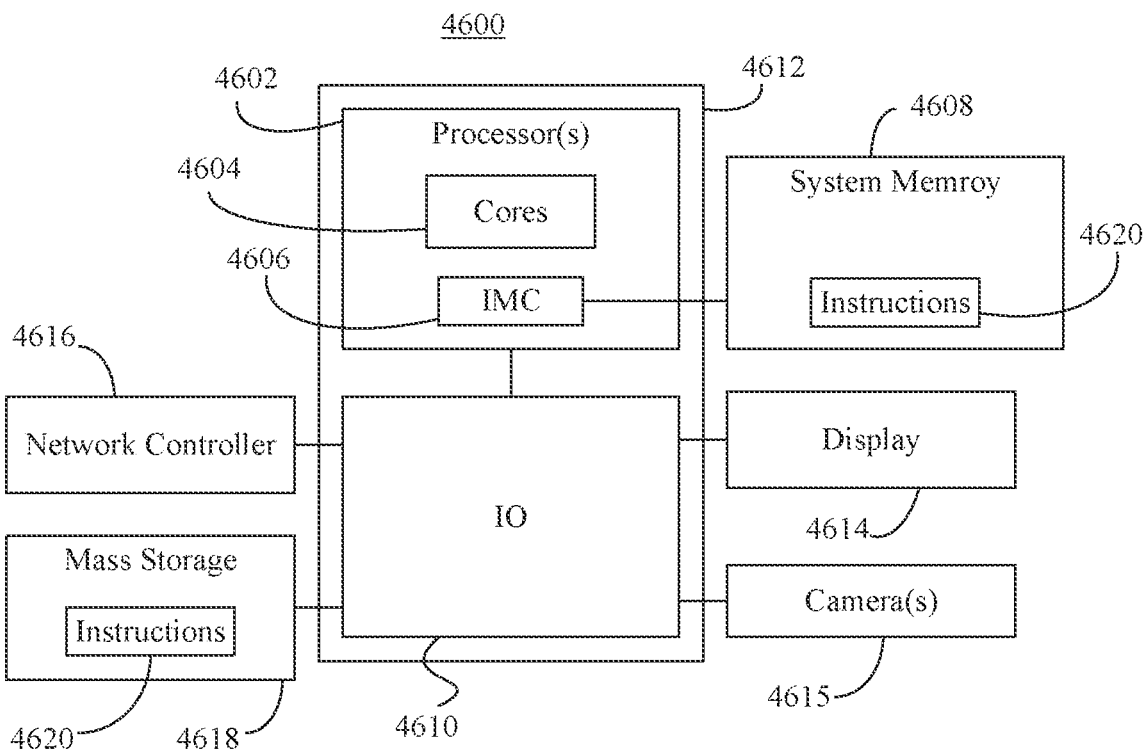

FIG. 46A is a block diagram of an example of a computer vision system according to an example.

Figure 46B:
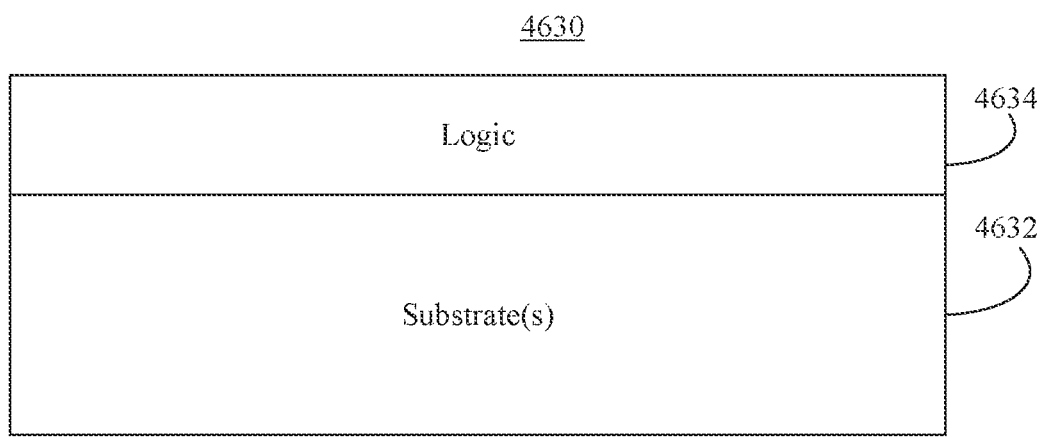

FIG. 46B is an illustration of an example of a semiconductor package apparatus according to an example.

Figure 46C:
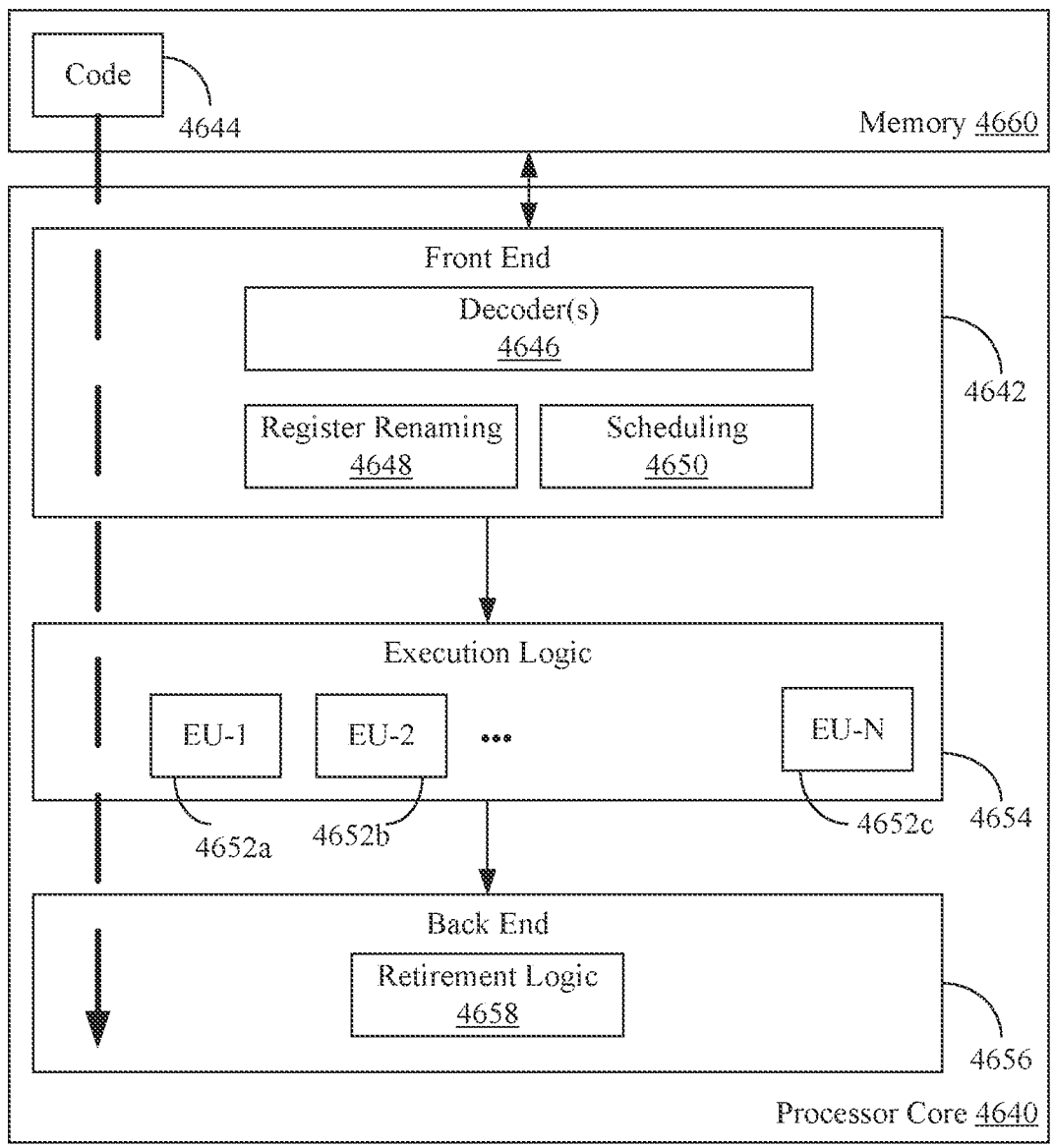

FIG. 46C is a block diagram of an example of a processor according to an example.

Figure 47:
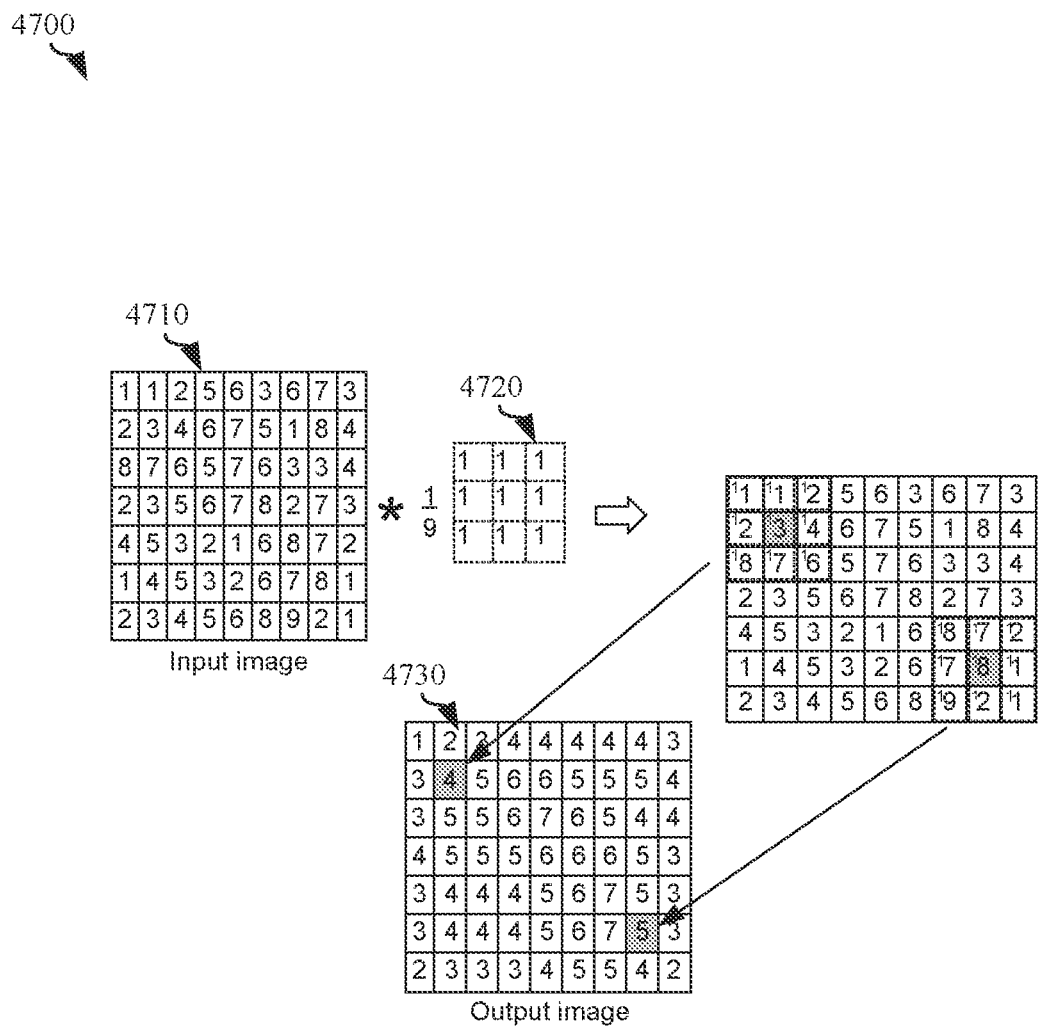

FIG. 47 is a schematic illustration of an example convolution operation using a static kernel.

Figure 48A:
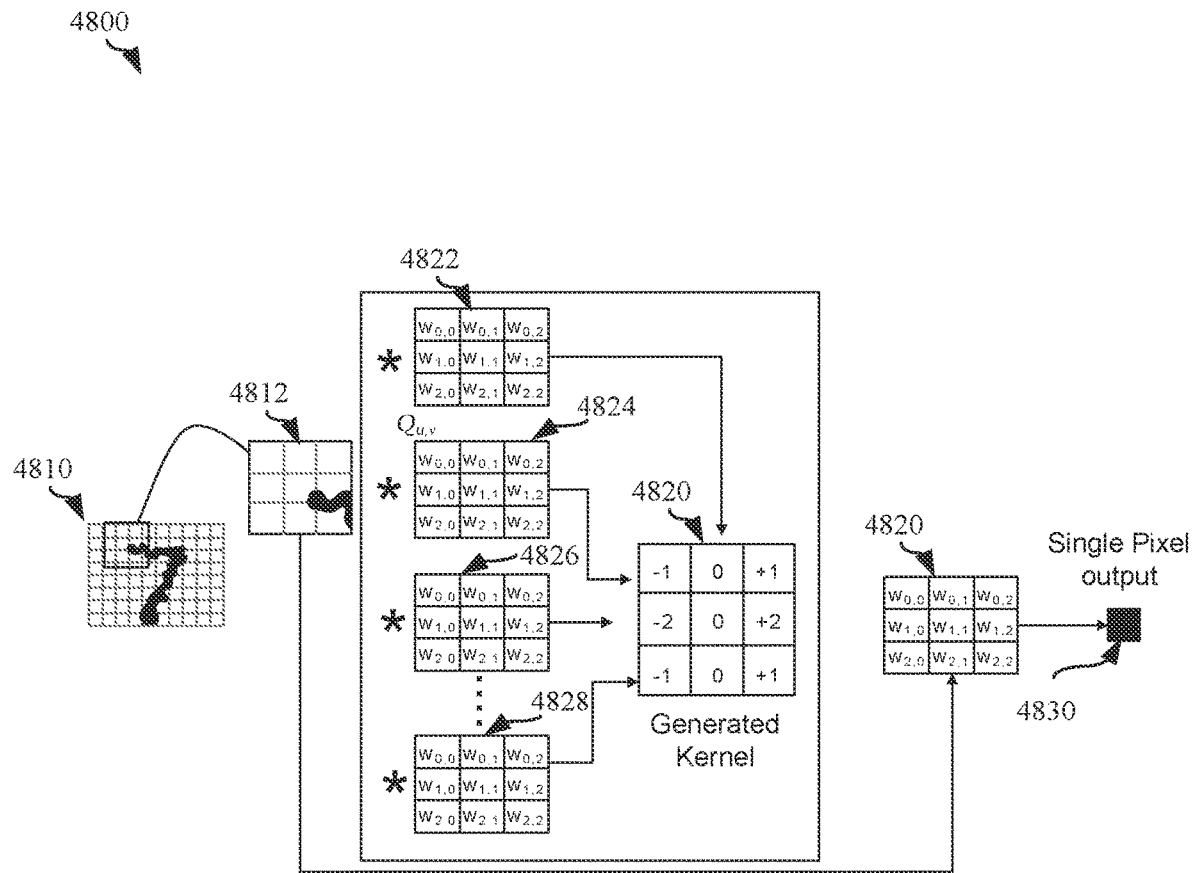

FIG. 48A is a schematic illustration of an example convolution operation using a dynamic kernel.

Figure 48B:
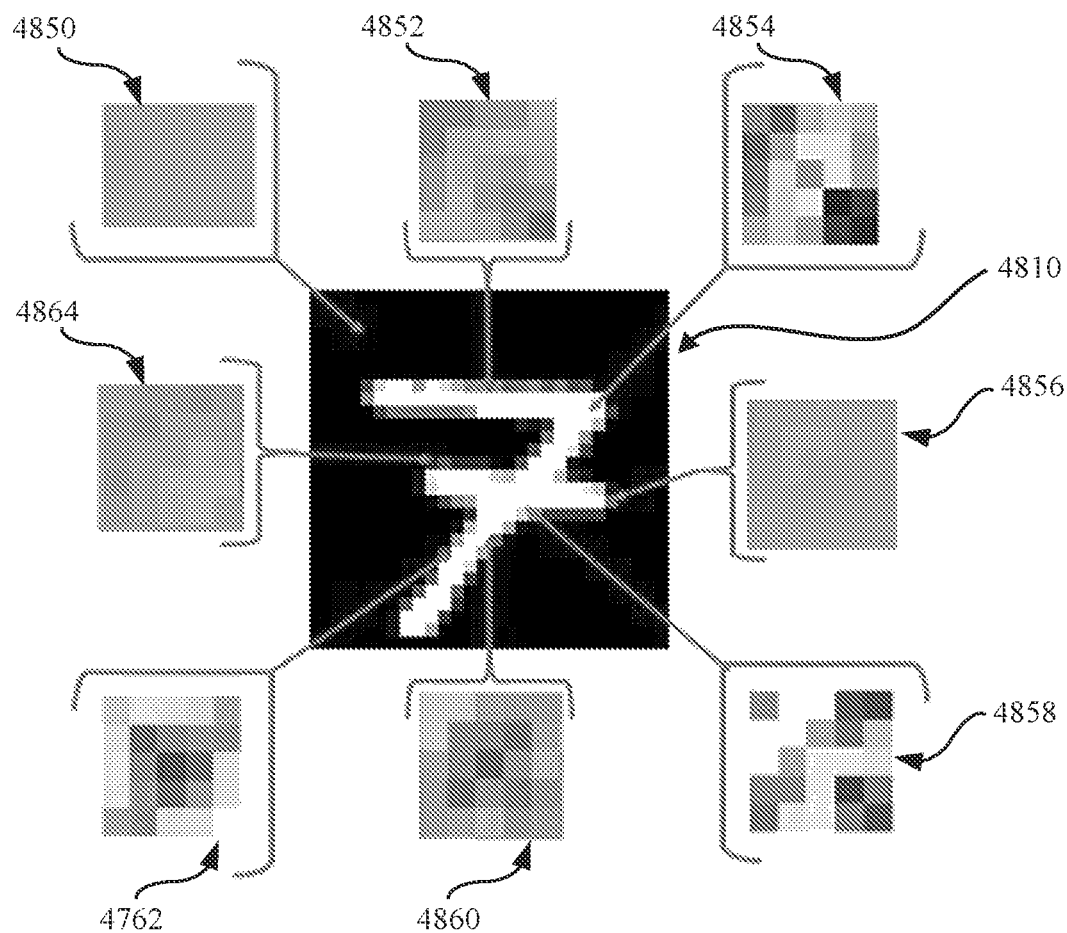

FIG. 48B illustrates an example input image and a plurality of different filters.

Figure 49:
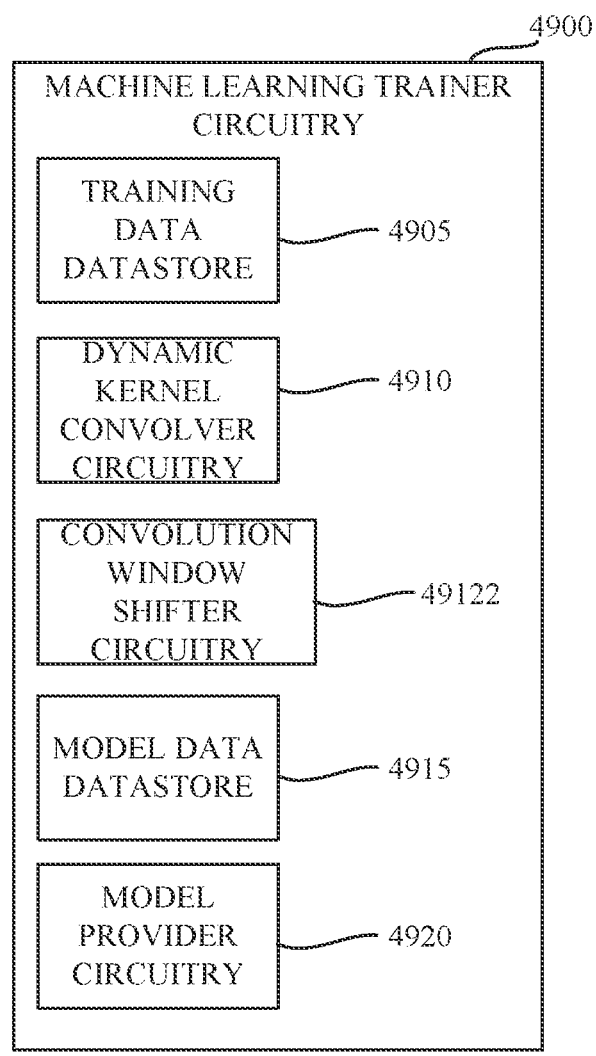

FIG. 49 is a block diagram of example machine learning trainer circuitry implemented in accordance with teachings of this disclosure for training an adaptive convolutional neural network (CNN).

Figure 50:
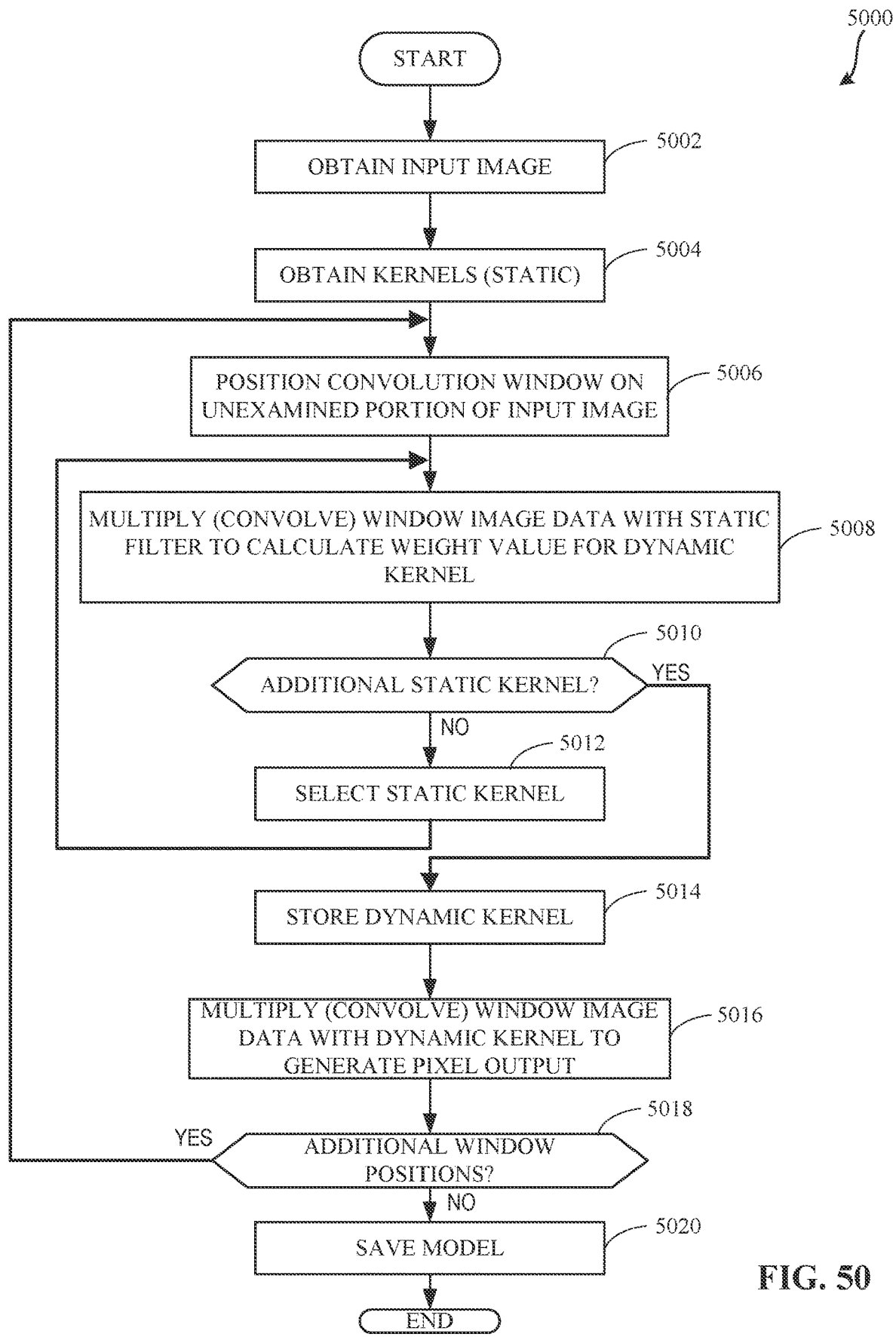

FIG. 50 is a flowchart representative of example machine-readable instructions which may be executed to implement the example machine learning trainer circuitry to train a CNN using dynamic kernels.

Figure 51:
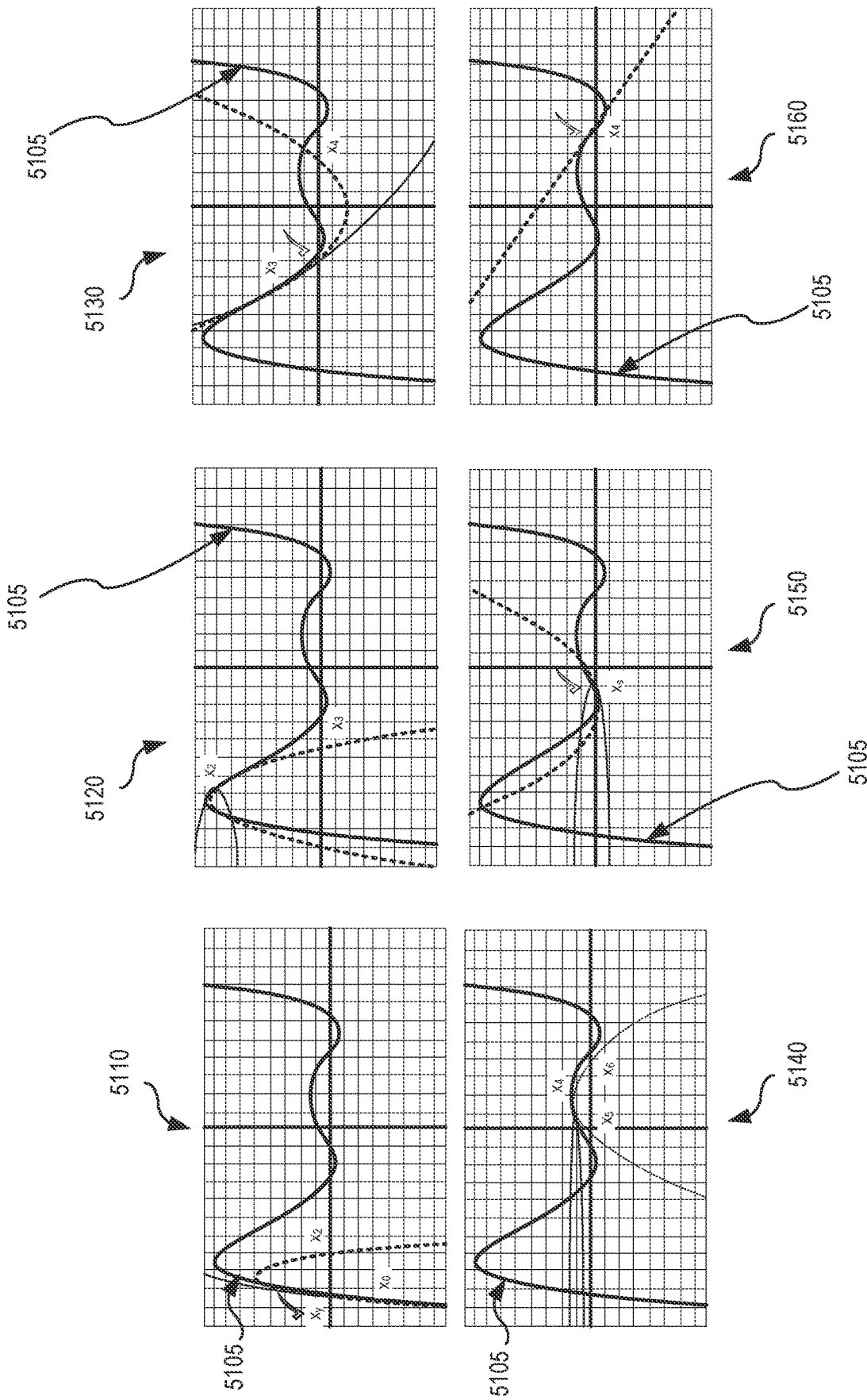

FIG. 51 includes graphs illustrating iterations of the example process for finding roots of a function.

Figure 52:
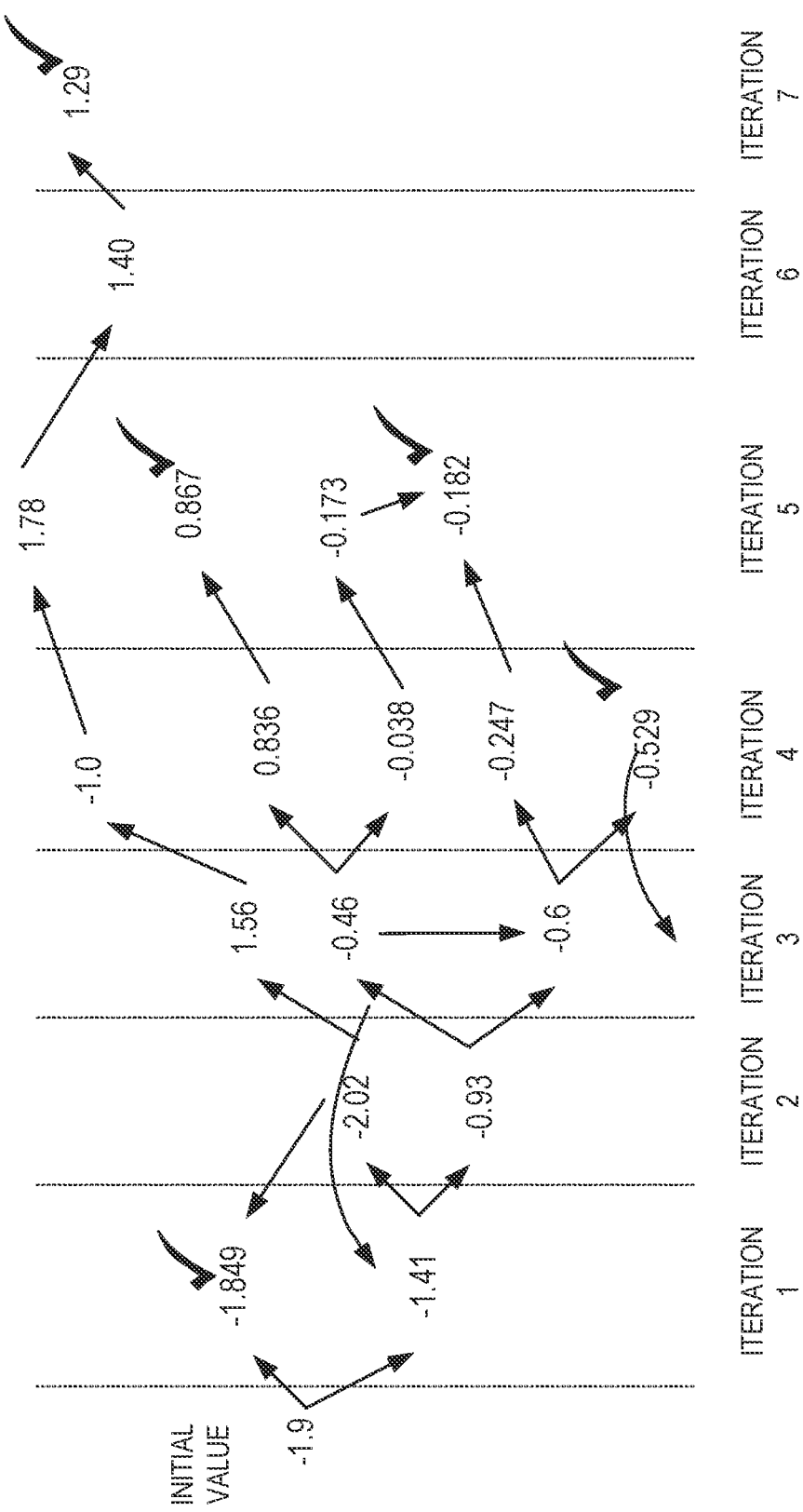

FIG. 52 represents values of seven iterations of the root finding process associated with the polynomial function of FIG. 51.

Figure 53:
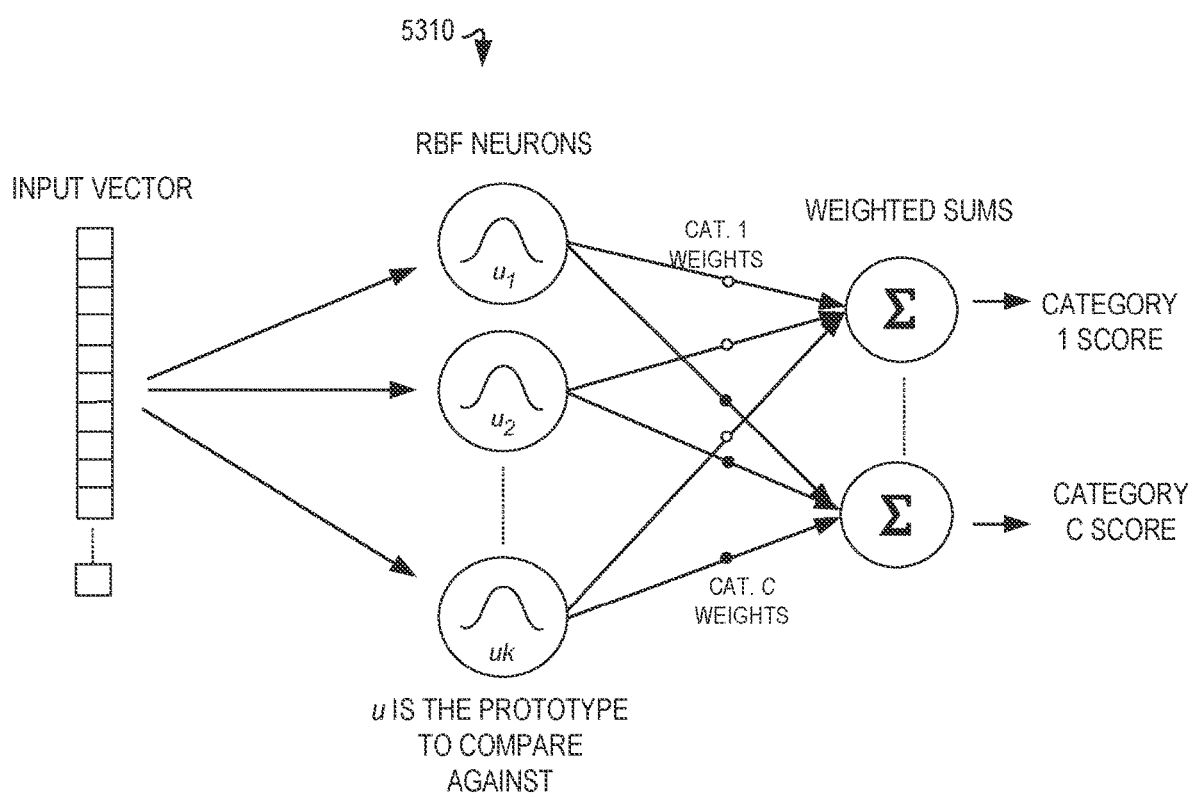

FIG. 53 is a block diagram of an example neural network.

Figure 54:
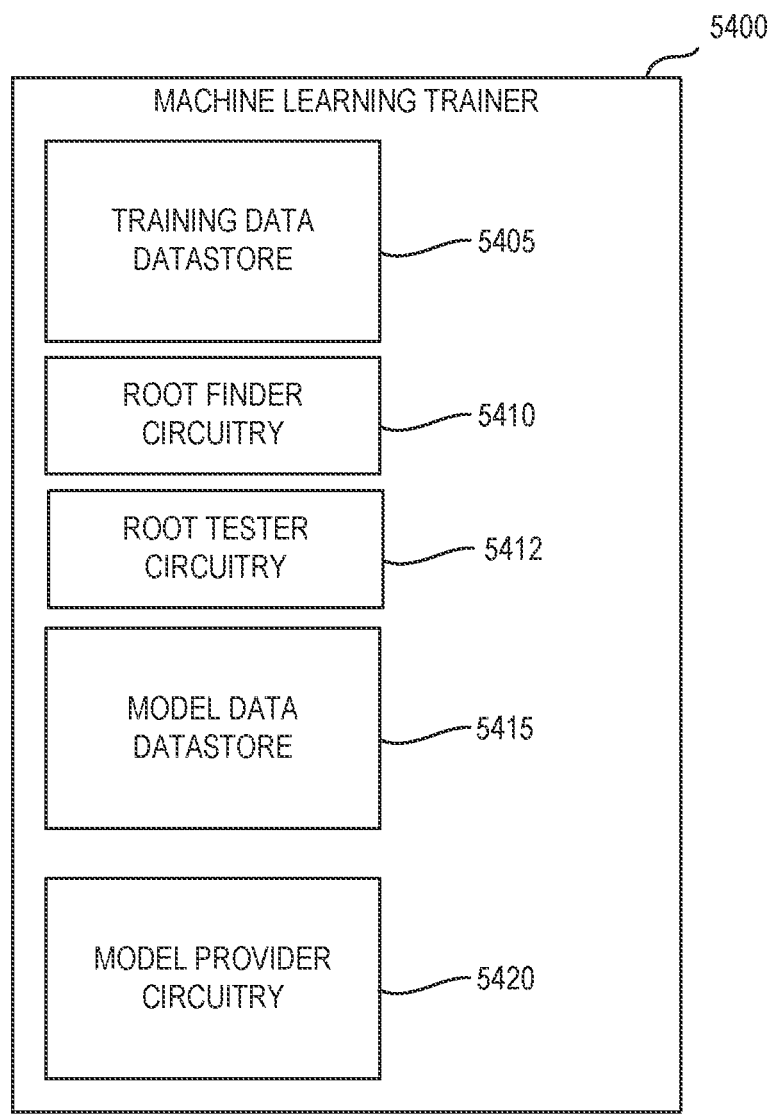

FIG. 54 is a block diagram of an example machine learning trainer 400 implemented in accordance with teachings of this disclosure to perform second order bifurcating for training of a machine learning model.

Figure 55:
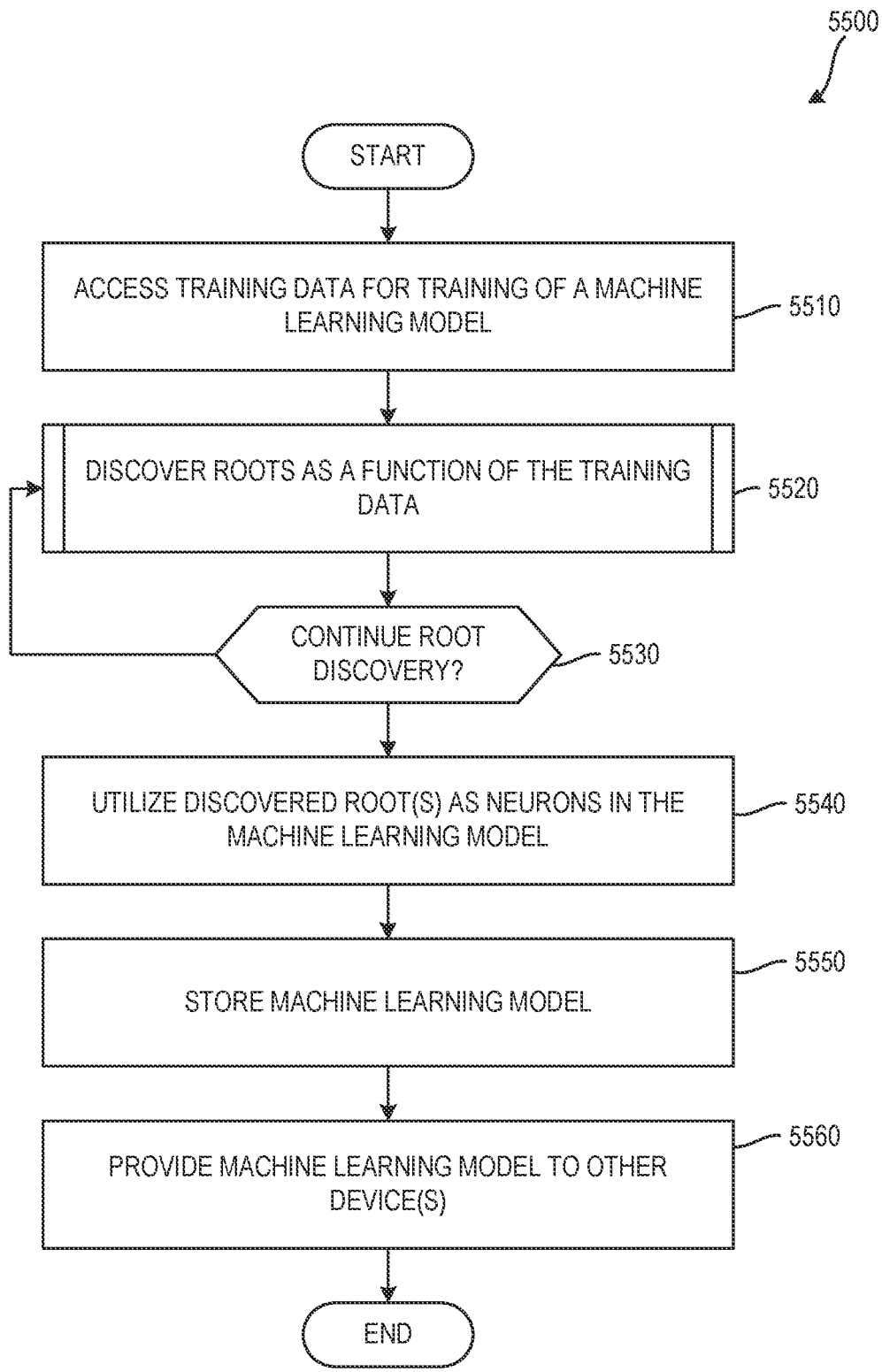

FIG. 55 is a flowchart representing example machine-readable instructions that may be executed to train a machine learning model using the roots identified by the root finder of FIG. 52.

Figure 56:
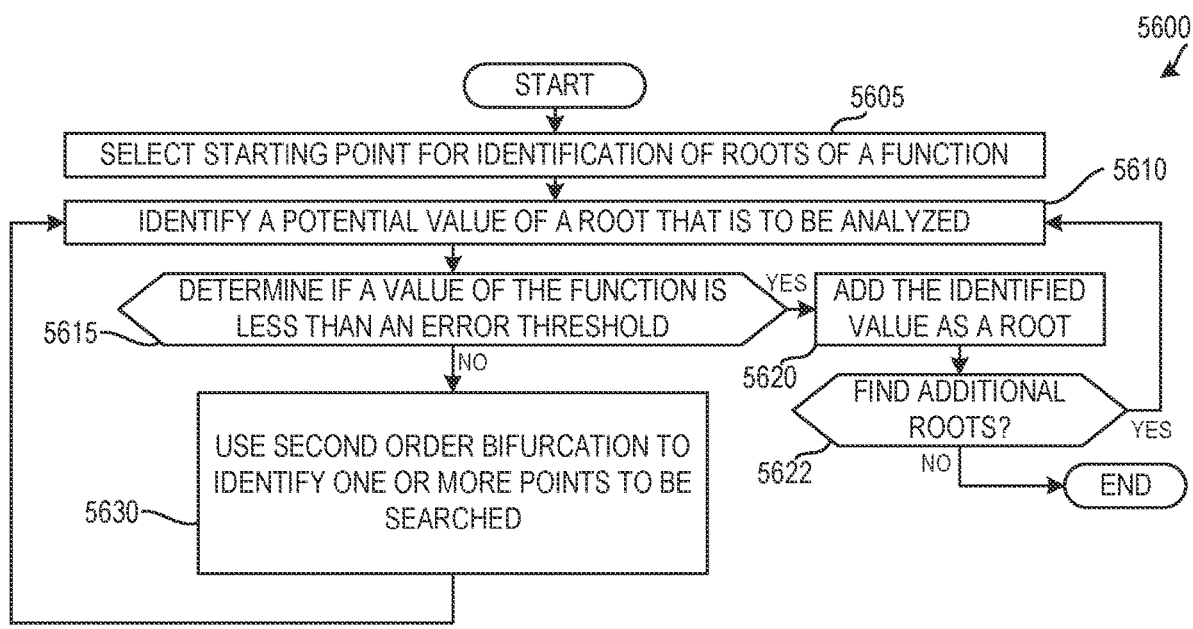

FIG. 56 is a flowchart representing example machine-readable instructions that may be executed to cause the example root finder and/or root tester to find roots of a function.

Figure 57:
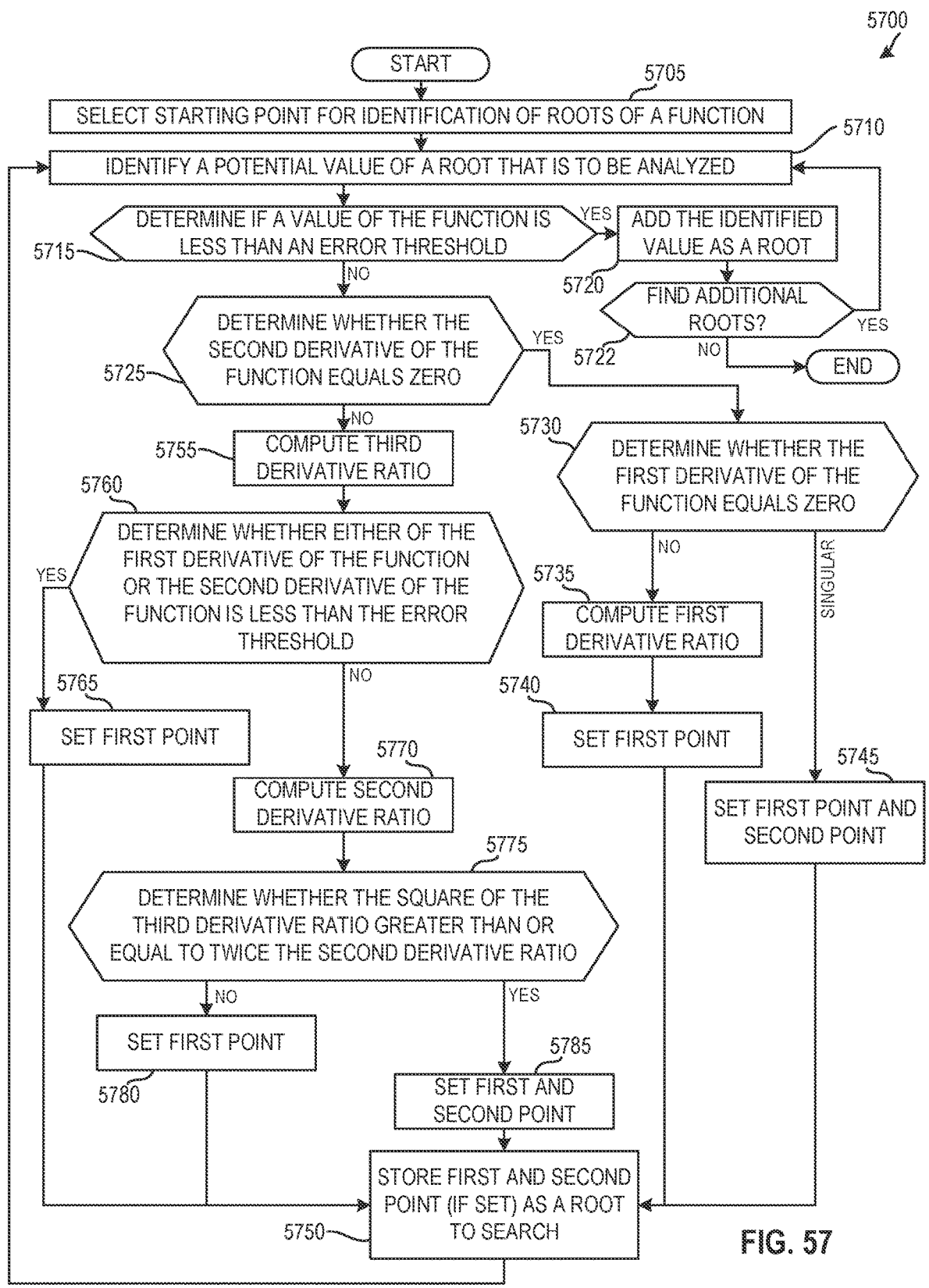

FIG. 57 is a flowchart representing example machine-readable instructions that may be executed to cause the example root finder to find roots of a function.

Figure 58:
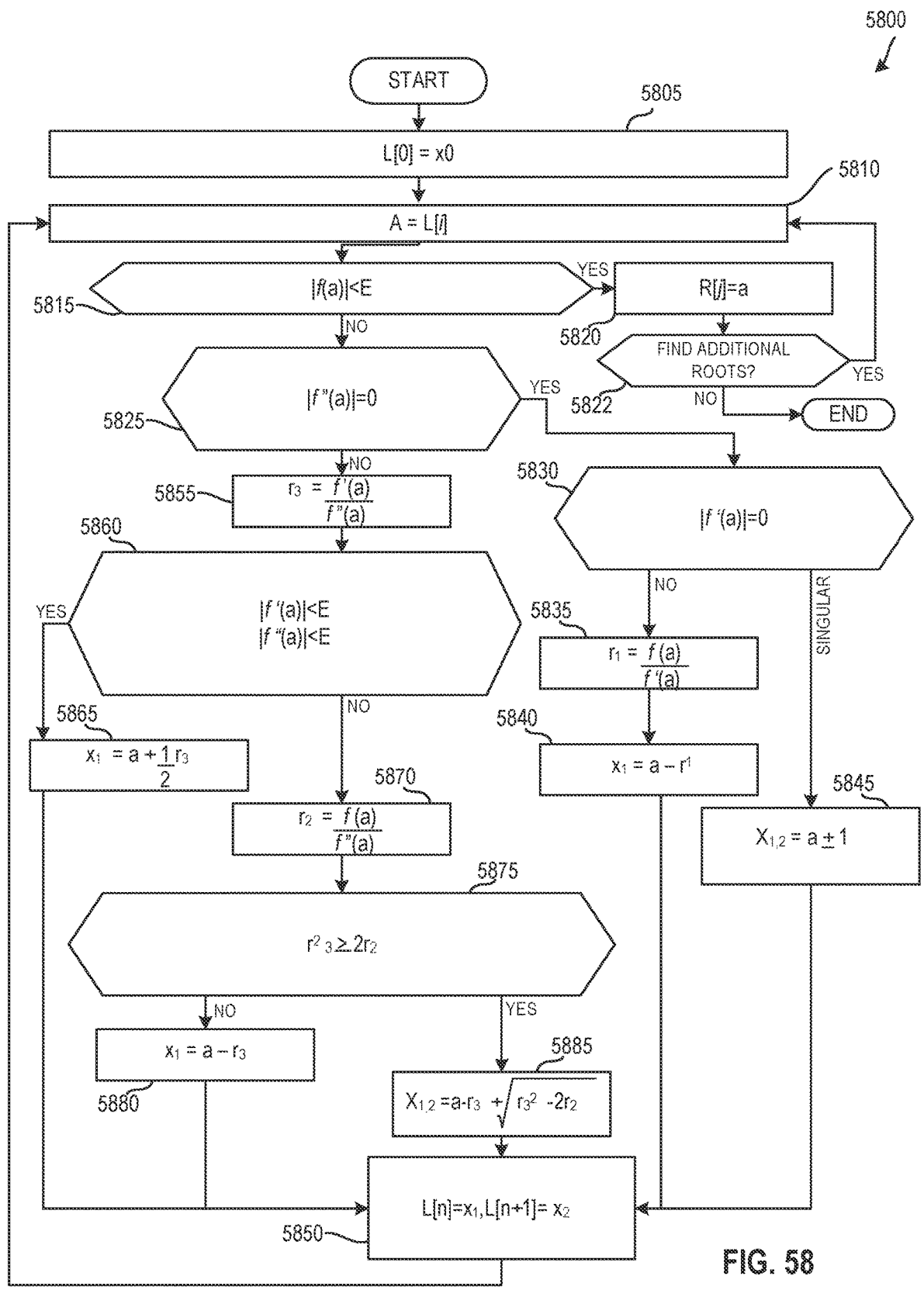

FIG. 58 is a flowchart representing example mathematical operations corresponding to the machine-readable instructions of FIG. 57.

Figure 59:
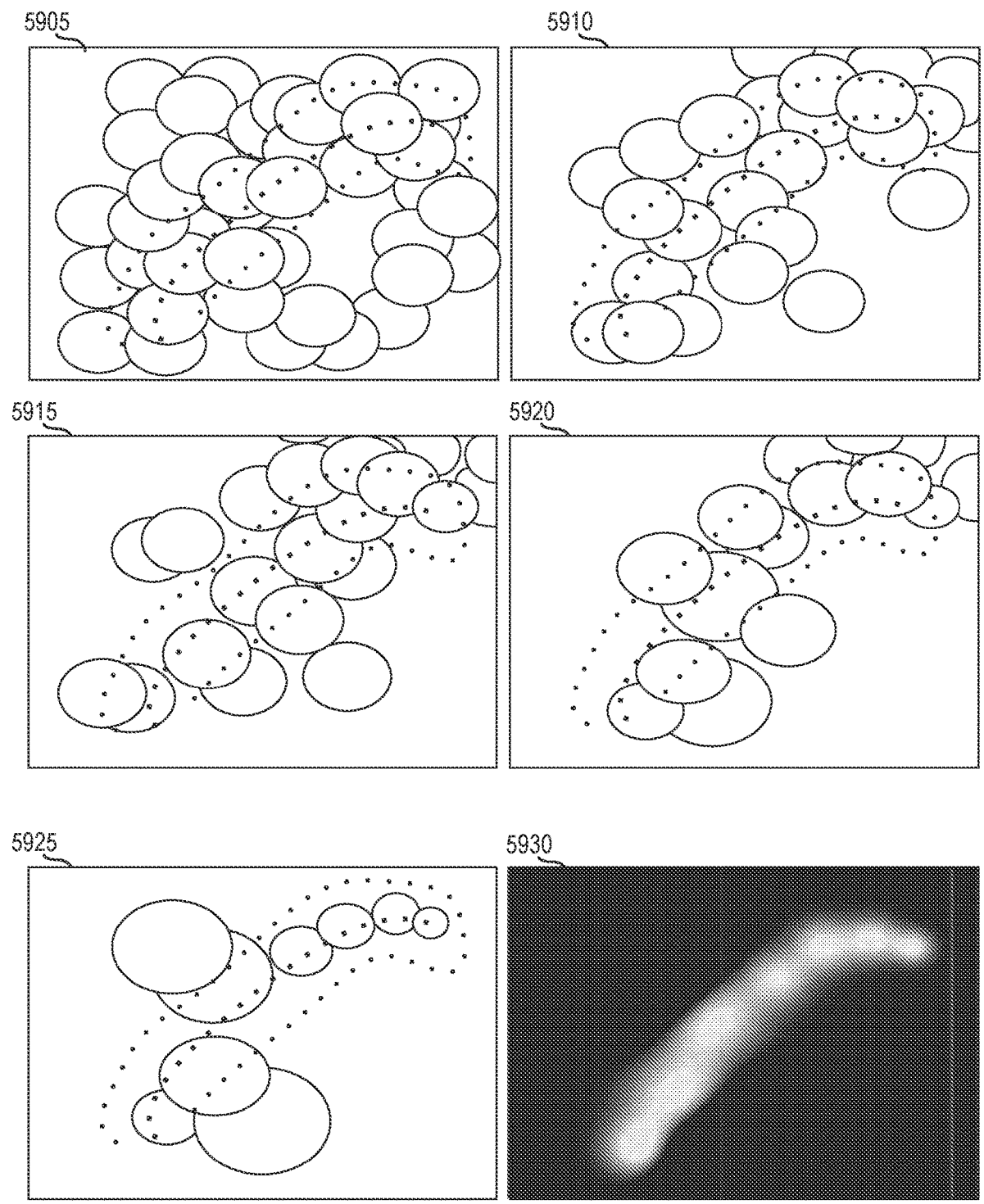

FIG. 59 represents an experiment to train a neural network to generate a particular output.

Figure 60A:
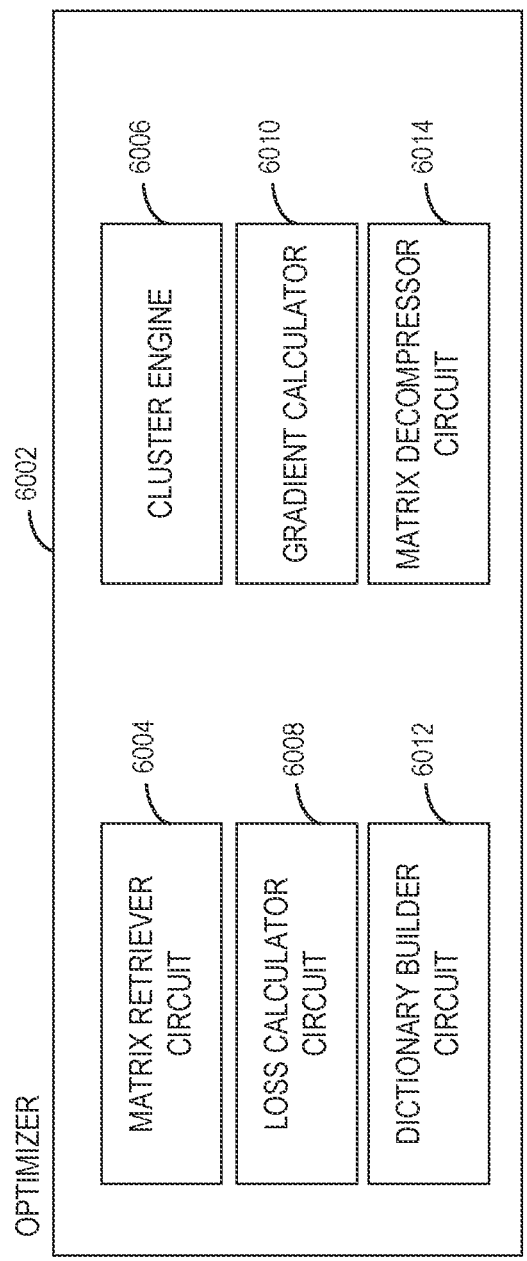

FIG. 60A is a block diagram of an example optimizer to generate neural network (NN) dictionaries.

Figure 60B:
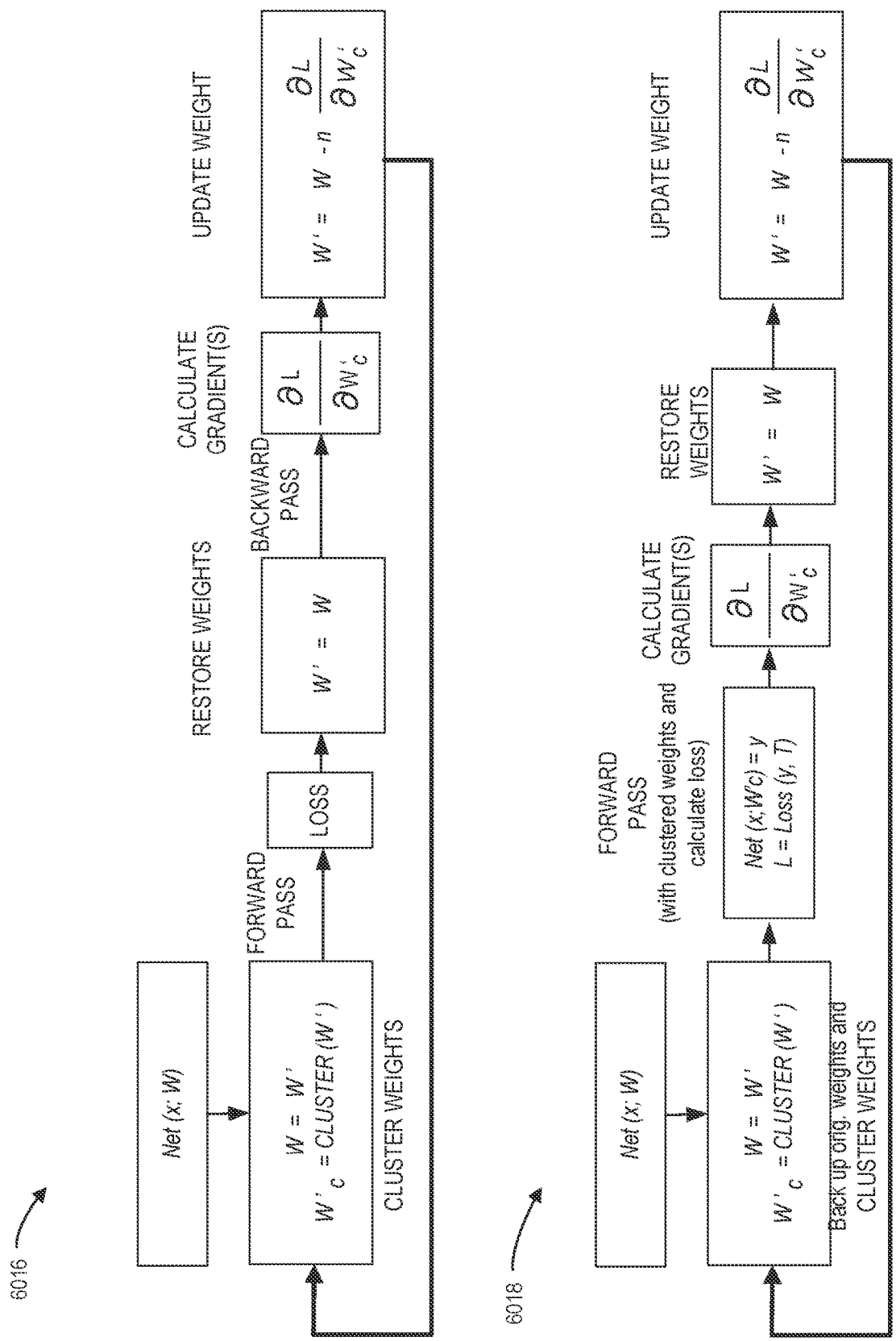

FIG. 60B is a block diagram of two example tuning methodologies.

Figure 61A:
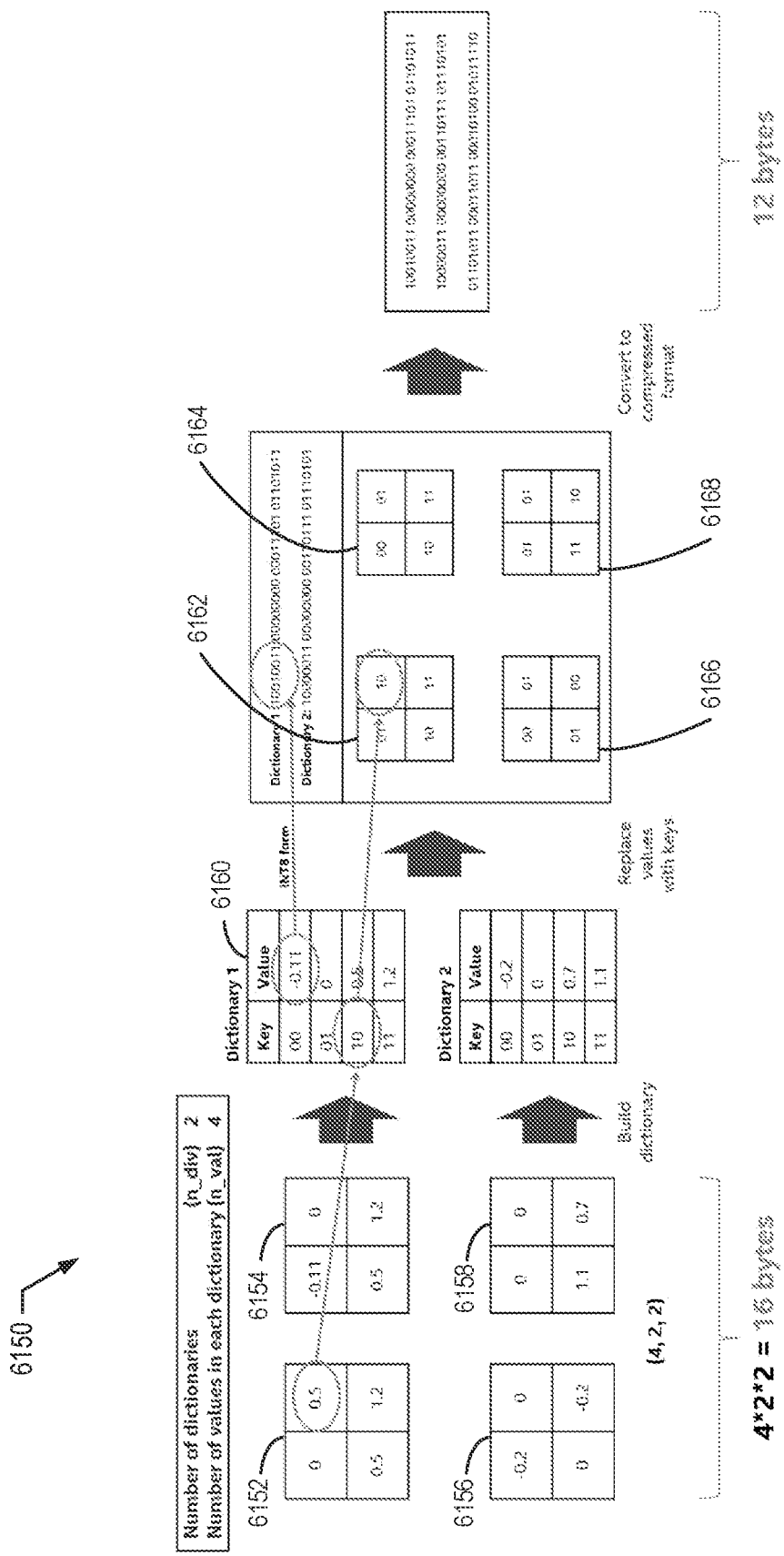

FIG. 61A is a block diagram of example dictionary key replacement.

Figure 61B:
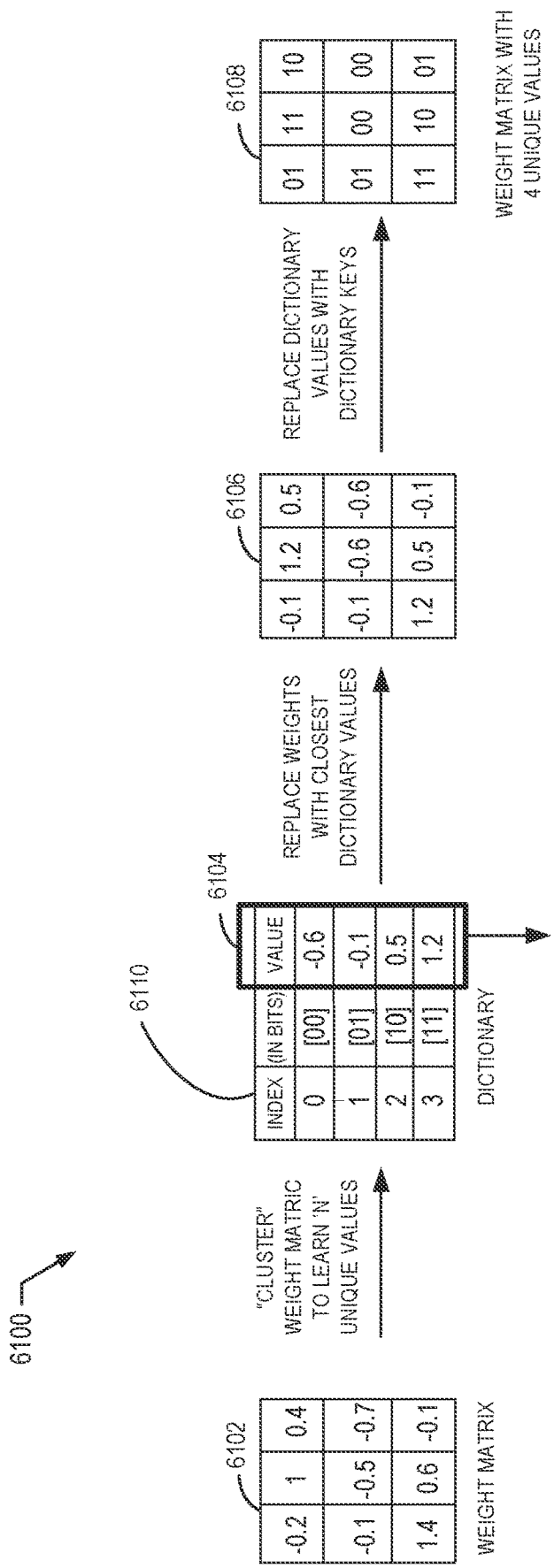

FIG. 61B is a block diagram of example matrix progressions to generate a NN dictionary.

Figure 62:
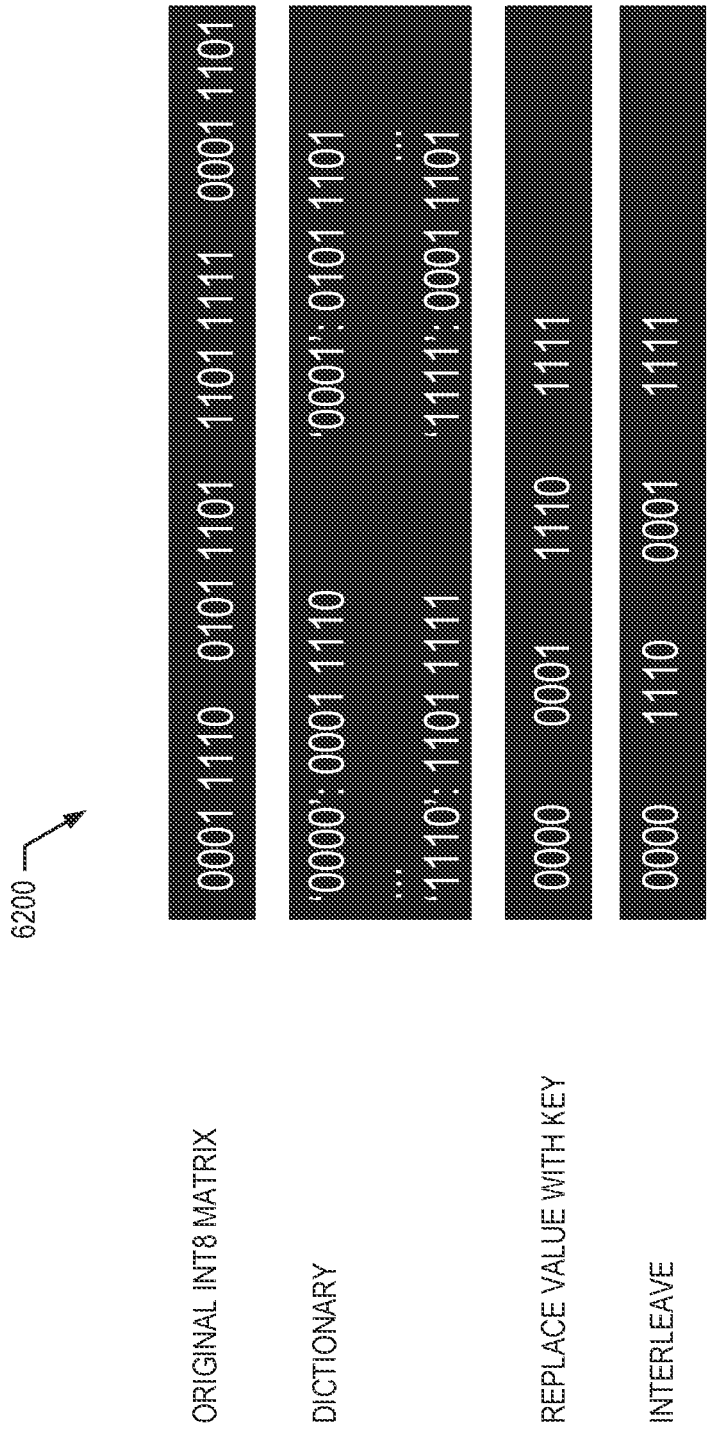

FIG. 62 illustrates an example compression process.

63 illustrates an example linear memory and indexing method for on-device dictionaries.

64 illustrates example matrix/tensor decompression during inference time.

65 through 68 are flowcharts representing example machine-readable instructions that may be executed to generate dictionaries.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. As used herein, data is information in any form that may be ingested, processed, interpreted and/or otherwise manipulated by processor circuitry to produce a result. The produced result may itself be data. As used herein, a model is a set of instructions and/or data that may be ingested, processed, interpreted and/or otherwise manipulated by processor circuitry to produce a result. Often, a model is operated using input data to produce output data in accordance with one or more relationships reflected in the model. The model may be based on training data. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some non-limiting examples disclosed herein, a Neural Network (NN) model is used but examples disclosed herein are not limited thereto.

In general, implementing a ML/AI system involves at least two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. In some examples, parameters are synonymous with metrics. In some examples, metrics include latency values (e.g., a duration of time in milliseconds), accuracy values (e.g., a percentage difference between a calculated value and a ground truth value (e.g., for a model)), etc. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AJ model (e.g., without the benefit of expected (e.g., labeled) outputs). Unsupervised training may be particularly helpful in circumstances where patterns in the data are not known beforehand. Unsupervised learning can be helpful to identify details that can further lead to data characterization (e.g., identifying subtle patterns in the data).

In examples disclosed herein, ML/AI models are trained using any training algorithm. In examples disclosed herein, training is performed until convergence and/or a threshold error metric is measured. As used herein "threshold" is expressed as data such as a numerical value represented in any form, that may be used by processor circuitry as a reference for a comparison operation. In examples disclosed herein, training is performed at any location within the Edge network that has, for example, adequate processing capabilities, adequate power, and/or adequate memory. Training is performed using hyperparameters that control how the learning is performed (e.g., a learning rate, a number of layers to be used in the machine learning model, etc.). In some examples re-training may be performed. Such re-training may be performed in response to feedback metrics and/or error metrics.

Training is performed using training data. In examples disclosed herein, the training data originates from any source, such as historical data from previously executed processes. In some examples, because supervised training is used, the training data is labeled.

Once training is complete, the model is deployed for use as an executable construct that processes an input and provides an output based on the network of nodes and connections defined in the model. The model is stored at one or more locations of the Edge network, including servers, platforms and/or IoT devices. The model may then be executed by the Edge devices.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 1:
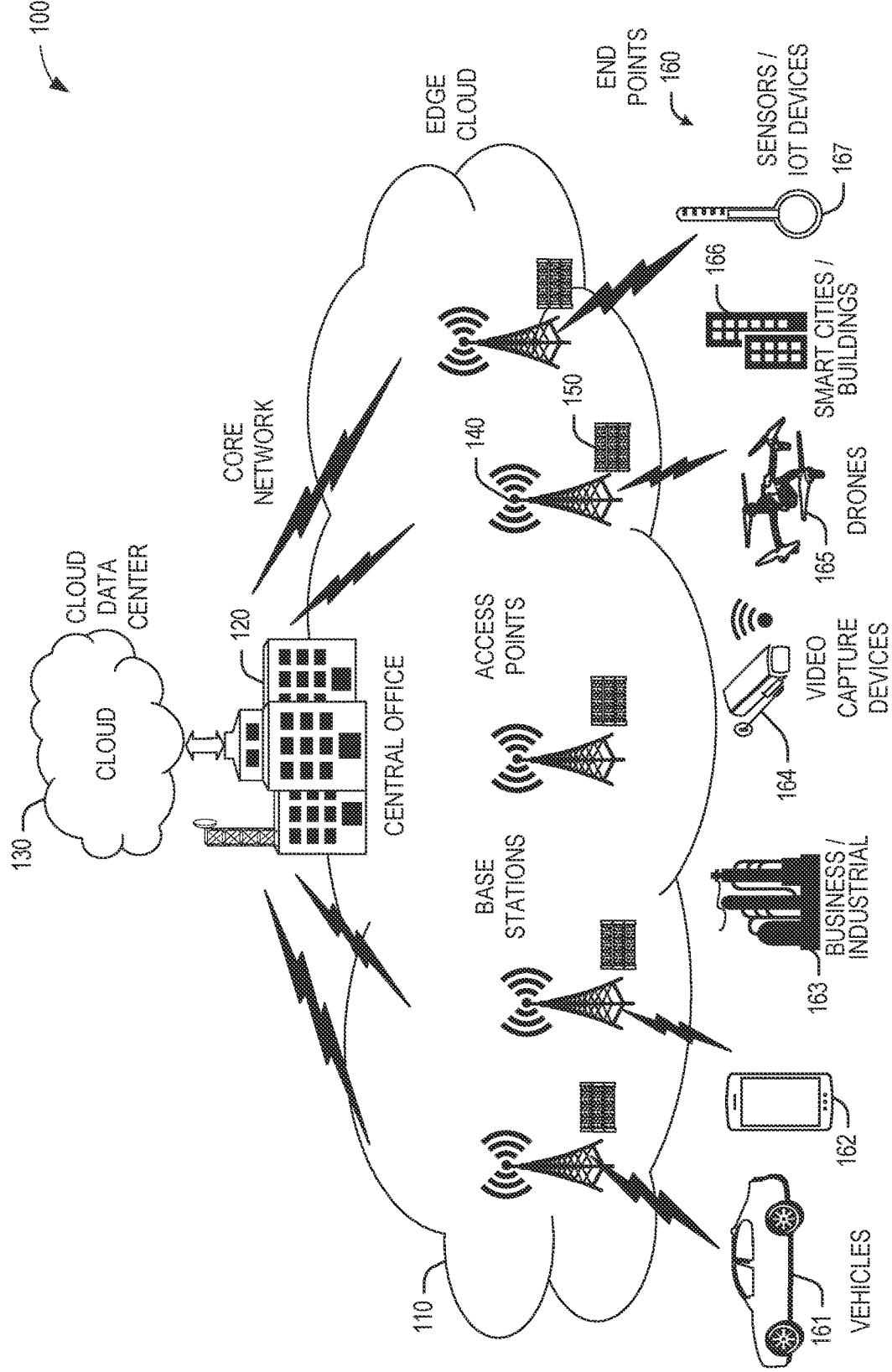
FIG. 1 illustrates an overview of an Edge cloud configuration for Edge computing.

FIG. 1 is a block diagram 100 showing an overview of a configuration for Edge computing, which includes a layer of processing referred to in many of the following examples as an "Edge cloud". As shown, the Edge cloud 110 is co-located at an Edge location, such as an access point or base station 140, a local processing hub 150, or a central office 120, and thus may include multiple entities, devices, and equipment instances. The Edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the Edge cloud 110 are critical to providing ultra-low latency response times for services and functions used by the endpoint data sources 160 as well as reduce network backhaul traffic from the Edge cloud 110 toward cloud data center 130 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to workload data where appropriate, or, bring the workload data to the compute resources. In some examples, a workload includes, but is not limited to executable processes, such as algorithms, machine learning algorithms, image recognition algorithms, gain/loss algorithms, etc.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
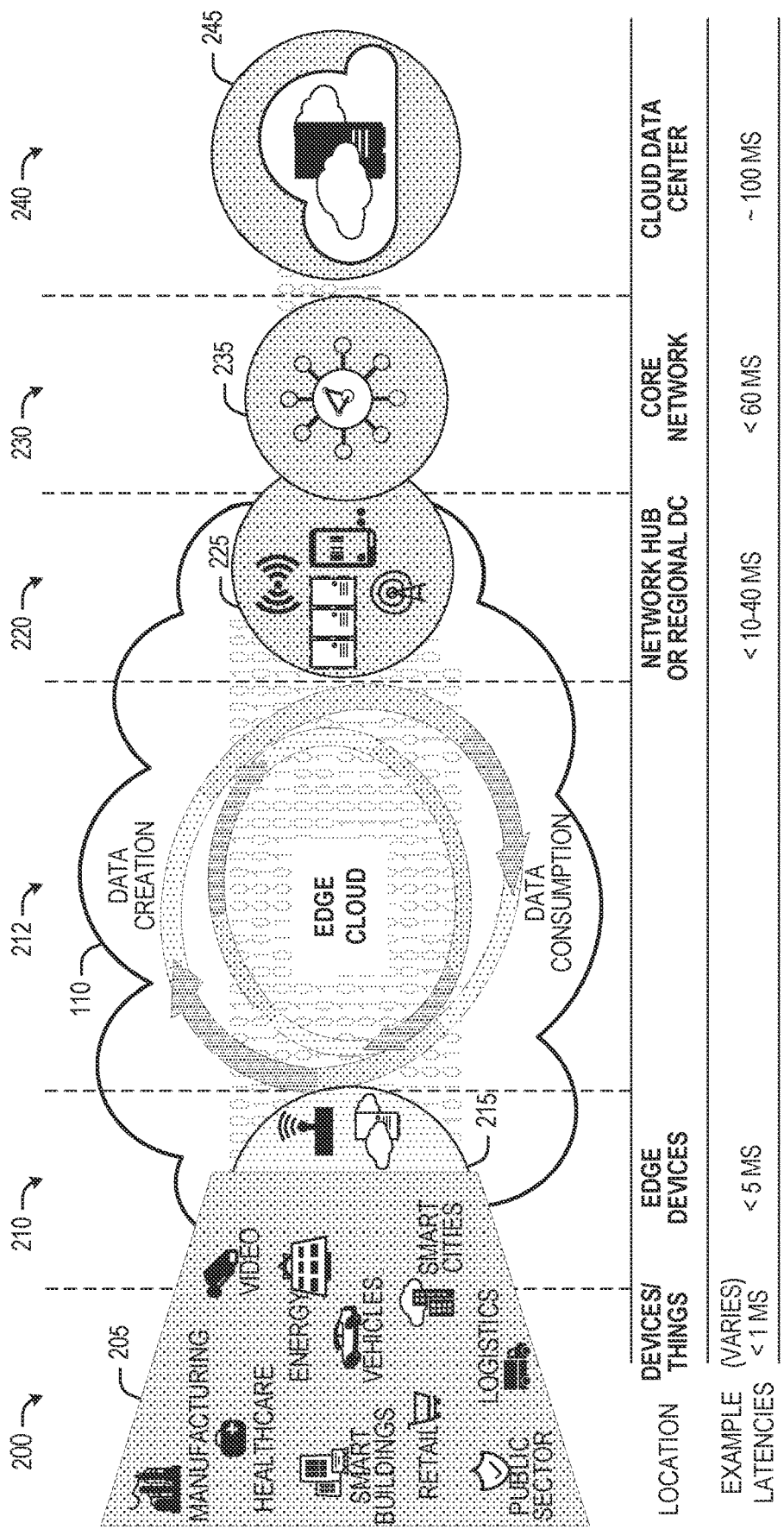
FIG. 2 illustrates operational layers among endpoints, an Edge cloud, and cloud computing environments.

FIG. 2 illustrates operational layers among endpoints, an Edge cloud, and cloud computing environments. Specifically, FIG. 2 depicts examples of computational use cases 205, utilizing the Edge cloud 110 among multiple illustrative layers of network computing. The layers begin at an endpoint (devices and things) layer 200, which accesses the Edge cloud 110 to conduct data creation, analysis, and data consumption activities. The Edge cloud 110 may span multiple network layers, such as an Edge devices layer 210 having gateways, on-premise servers, or network equipment (nodes 215) located in physically proximate Edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the Edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the Edge devices layer 210, to even between 10 to 40 ms when communicating with nodes at the network access layer 220. Beyond the Edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 235 or a cloud data center 245, a central office or content data network may be considered as being located within a "near Edge" layer ("near" to the cloud, having high latency values when communicating with the devices and endpoints of the use cases 205), whereas an access point, base station, on-premise server, or network gateway may be considered as located within a "far Edge" layer ("far" from the cloud, having low latency values when communicating with the devices and endpoints of the use cases 205). It will be understood that other categorizations of a particular network layer as constituting a "close", "local", "near", "middle", or "far" Edge may be based on latency, distance, number of network hops, or other measurable characteristics, as measured from a source in any of the network layers 200-240.

The various use cases 205 may access resources under usage pressure from incoming streams, due to multiple services utilizing the Edge cloud. To achieve results with low latency, the services executed within the Edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate. In some examples, an SLA is an agreement, commitment and/or contract between entities. The SLA may include parameters (e.g., latency) and corresponding values (e.g., time in milliseconds) that must be satisfied before the SLA is deemed in compliance or not.

Thus, with these variations and service features in mind, Edge computing within the Edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 110 (network layers 200-240), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 110.

As such, the Edge cloud 110 is formed from network components and functional features operated by and within Edge gateway nodes, Edge aggregation nodes, or other Edge compute nodes among network layers 210-230. The Edge cloud 110 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 110 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the Edge cloud 110 may be servers, multi-tenant servers, appliance computing devices, and/or any other type of computing devices. For example, the Edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 4B, described in further detail below. The Edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
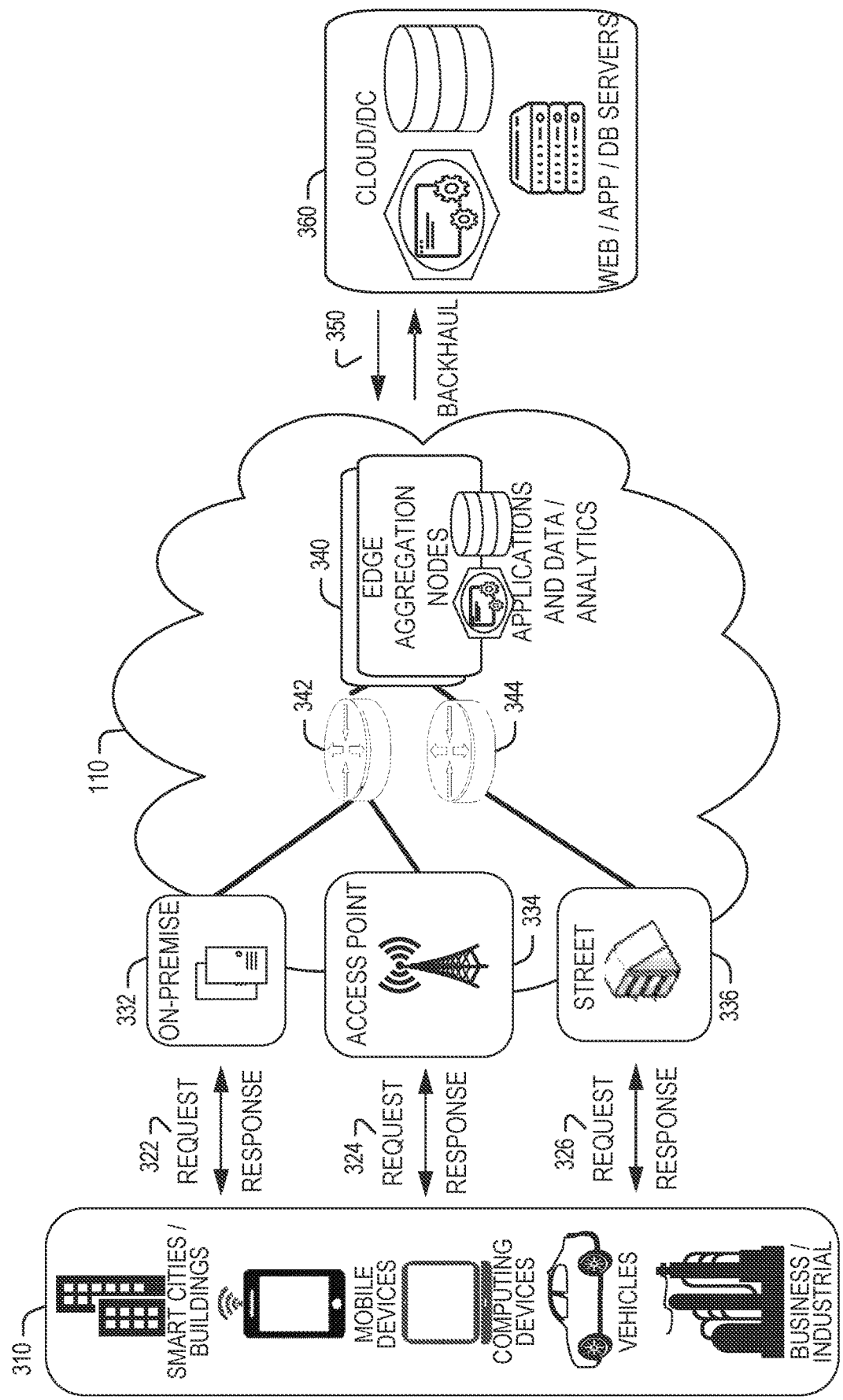
FIG. 3 illustrates an example approach for networking and services in an Edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the Edge cloud 110 to aggregate traffic and requests. Thus, within the Edge cloud 110, the TSP may deploy various compute and storage resources, such as at Edge aggregation nodes 340, to provide requested content. The Edge aggregation nodes 340 and other systems of the Edge cloud 110 are connected to a cloud or data center 360, which uses a backhaul network 350 to fulfill higher-latency requests from a cloud/data center for websites, applications, database servers, etc. Additional or consolidated instances of the Edge aggregation nodes 340 and the aggregation points 342, 344, including those deployed on a single server framework, may also be present within the Edge cloud 110 or other areas of the TSP infrastructure.

In further examples, any of the compute nodes or devices discussed with reference to the present Edge computing systems and environment may be fulfilled based on the components depicted in FIGS. 4A and 4B. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 4A:
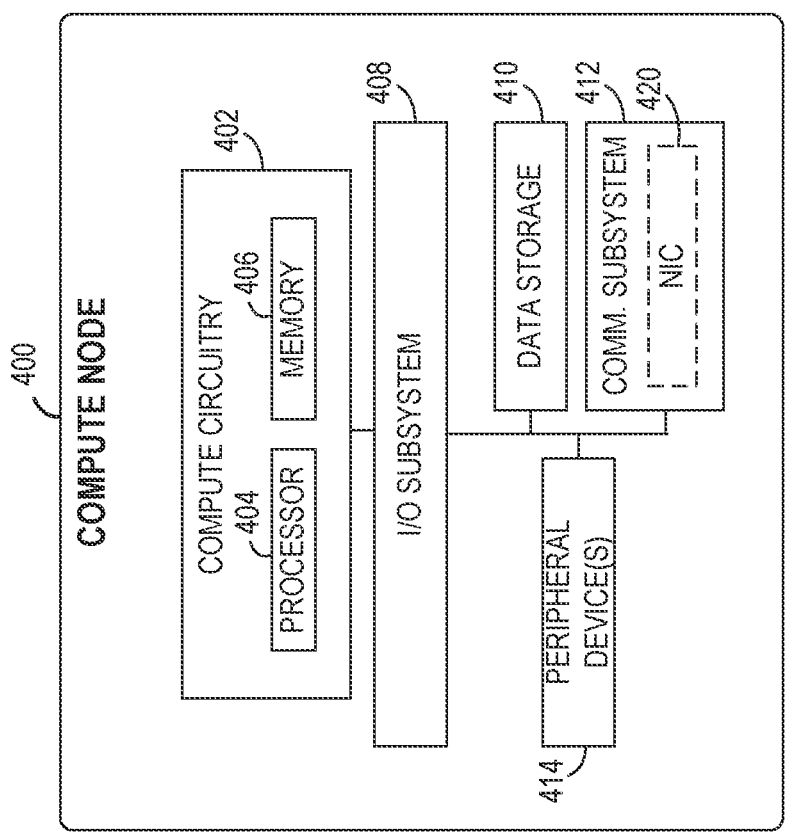
FIG. 4A provides an overview of example components for compute deployed at a compute node in an Edge computing system.

In the simplified example depicted in FIG. 4A, an Edge compute node 400 includes a compute engine (also referred to herein as "compute circuitry") 402, an input/output (I/O)

subsystem 408, data storage 410, a communication circuitry subsystem 412, and, optionally, one or more peripheral devices 414. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 400 may be embodied as any type of engine, device, or collection of devices capable of performing various compute functions. In some examples, the compute node 400 may be embodied as a single device such as an integrated circuit, an embedded system, a field-programmable gate array (FPGA), a system-on-a-chip (SOC), or other integrated system or device. In the illustrative example, the compute node 400 includes or is embodied as a processor 404 and a memory 406. The processor 404 may be embodied as any type of processor capable of performing the functions described herein (e.g., executing an application). For example, the processor 404 may be embodied as a multi-core processor(s), a microcontroller, a processing unit, a specialized or special purpose processing unit, or other processor or processing/controlling circuit.

In some examples, the processor 404 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 404 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 404 may work in coordination with each other to execute many types of operations and instructions within and on behalf of the compute node 400.

The memory 406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 406 may be integrated into the processor 404. The memory 406 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 402 is communicatively coupled to other components of the compute node 400 via the I/O subsystem 408, which may be embodied as circuitry and/or components to facilitate input/output operations with the compute circuitry 402 (e.g., with the processor 404 and/or the main memory 406) and other components of the compute circuitry 402. For example, the I/O subsystem D108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 408 may form a portion of a system-on-a-chip (SoC) and be incorporated, along with one or more of the processor 404, the memory 406, and other components of the compute circuitry 402, into the compute circuitry 402.

The one or more illustrative data storage devices/disks 410 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 410 may include a system partition that stores data and firmware code for the data storage device/disk 410. Individual data storage devices/disks 410 may also include one or more operating system partitions that store data files and executables for operating systems depending on, for example, the type of compute node 400.

The communication circuitry 412 may be embodied as any communication circuit, device, or collection thereof, capable of enabling communications over a network between the compute circuitry 402 and another compute device (e.g., an Edge gateway of an implementing Edge computing system). The communication circuitry 412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 412 includes a network interface controller (NIC) 420, which may also be referred to as a host fabric interface (HFI). The NIC 420 may be embodied as one or more add-in-boards, daughter cards, network interface cards, controller chips, chipsets, or other devices that may be used by the compute node 400 to connect with another compute device (e.g., an Edge gateway node). In some examples, the NIC 420 may be embodied as part of a system-on-a-chip (SoC) that includes one or more processors, or included on a multichip package that also contains one or more processors. In some examples, the NIC 420 may include a local processor (not shown) and/or a local memory (not shown) that are both local to the NIC 420. In such examples, the local processor of the NIC 420 may be capable of performing one or more of the functions of the compute circuitry 402 described herein. Additionally, or alternatively, in such examples, the local memory of the NIC 420 may be integrated into one or more components of the client compute node at the board level, socket level, chip level, and/or other levels.

Additionally, in some examples, a respective compute node 400 may include one or more peripheral devices 414. Such peripheral devices 414 may include any type of peripheral device found in a compute device or server such as audio input devices, a display, other input/output devices, interface devices, and/or other peripheral devices, depending on the particular type of the compute node 400. In further examples, the compute node 400 may be embodied by a respective Edge compute node (whether a client, gateway, or aggregation node) in an Edge computing system or like forms of appliances, computers, subsystems, circuitry, or other components.

Figure 4B:
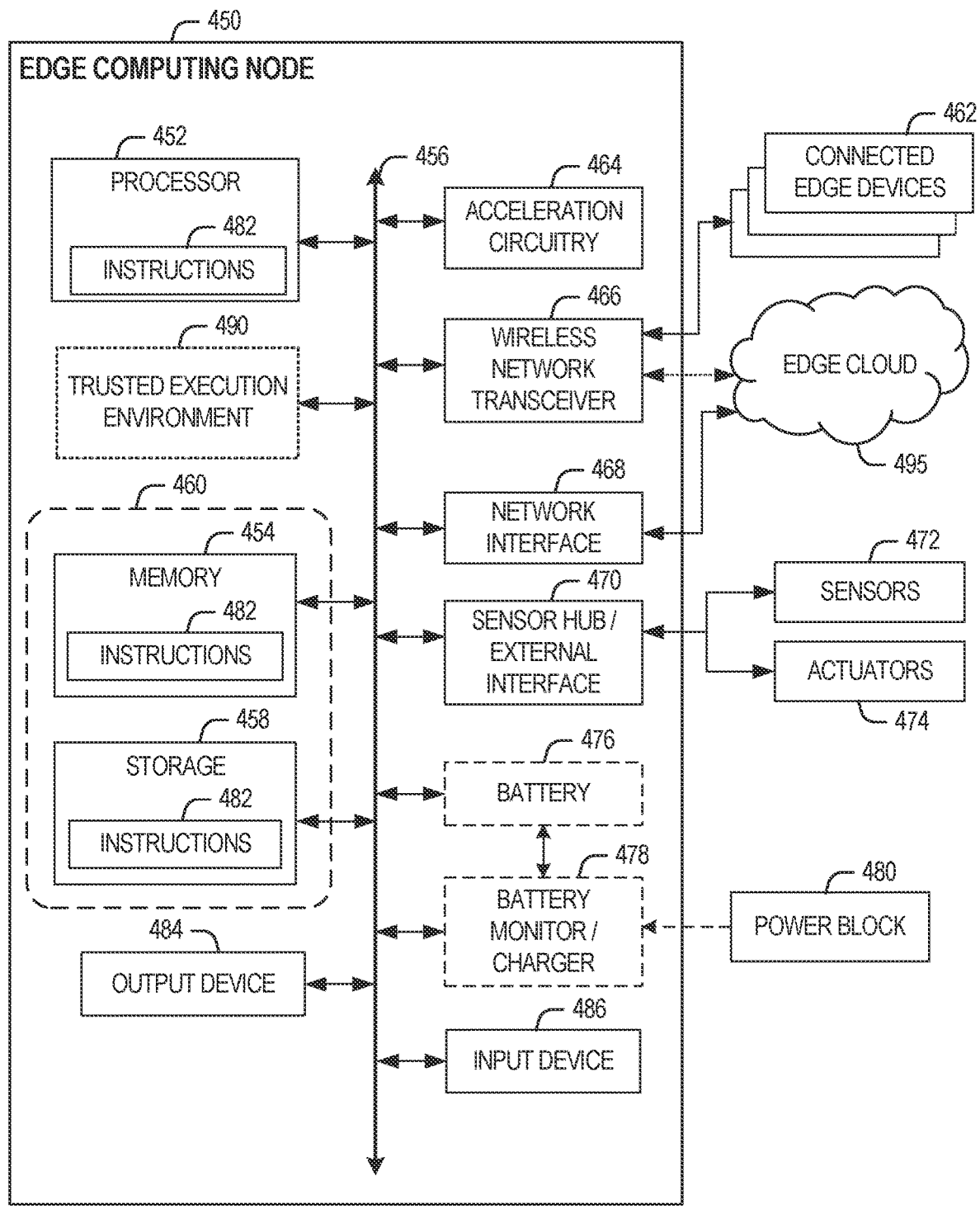
FIG. 4B provides a further overview of example components within a computing device in an Edge computing system.

In a more detailed example, FIG. 4B illustrates a block diagram of an example of components that may be present in an Edge computing node 450 for implementing the techniques (e.g., operations, processes, methods, and methodologies) described herein. This Edge computing node 450 provides a closer view of the respective components of node 400 when implemented as or as part of a computing device (e.g., as a mobile device, a base station, server, gateway, etc.). The Edge computing node 450 may include any combinations of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 450, or as components otherwise incorporated within a chassis of a larger system.

The Edge computing device 450 may include processing circuitry in the form of a processor 452, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 452 may be a part of a system on a chip (SoC) in which the processor 452 and other components are formed into a single integrated circuit, or a single package, such as the Edison™ or Galileo™ SoC boards from Intel Corporation, Santa Clara, California. As an example, the processor 452 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 452 and accompanying circuitry may be provided in a single socket form factor, multiple socket form factor, or a variety of other formats, including in limited hardware configurations or configurations that include fewer than all elements shown in FIG. 4B.

The processor 452 may communicate with a system memory 454 over an interconnect 456 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 458 may also couple to the processor 452 via the interconnect 456. In an example, the storage 458 may be implemented via a solid-state disk drive (SSDD). Other devices that may be used for the storage 458 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 458 may be on-die memory or registers associated with the processor 452. However, in some examples, the storage 458 may be implemented using a micro hard disk drive (HDD). Further, any number of new technologies may be used for the storage 458 in addition to, or instead of, the technologies described, such resistance change memories, phase change memories, holographic memories, or chemical memories, among others.

The components may communicate over the interconnect 456. The interconnect 456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 456 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 456 may couple the processor 452 to a transceiver 466, for communications with the connected Edge devices 462. The transceiver 466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 466 (or multiple transceivers) may communicate using multiple standards or radios for communications at a different range. For example, the Edge computing node 450 may communicate with close devices, e.g., within about 10 meters, using a local transceiver based on Bluetooth Low Energy (BLE), or another low power radio, to save power. More distant connected Edge devices 462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 466 (e.g., a radio transceiver) may be included to communicate with devices or services in a cloud (e.g., an Edge cloud 495) via local or wide area network protocols. The wireless network transceiver 466 may be a low-power wide-area (LPWA) transceiver that follows the IEEE 802.15.4, or IEEE 802.15.4g standards, among others. The Edge computing node 450 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 466, as described herein. For example, the transceiver 466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 466 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 468 may be included to provide a wired communication to nodes of the Edge cloud 495 or to other devices, such as the connected Edge devices 462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 468 may be included to enable connecting to a second network, for example, a first NIC 468 providing communications to the cloud over Ethernet, and a second NIC 468 providing communications to other devices over another type of network.

Given the variety of types of applicable communications from the device to another component or network, applicable communications circuitry used by the device may include or be embodied by any one or more of components 464, 466, 468, or 470. Accordingly, in various examples, applicable means for communicating (e.g., receiving, transmitting, etc.) may be embodied by such communications circuitry.

The Edge computing node 450 may include or be coupled to acceleration circuitry 464, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 456 may couple the processor 452 to a sensor hub or external interface 470 that is used to connect additional devices or subsystems. The devices may include sensors 472, such as accelerometers, level sensors, flow sensors, optical light sensors, camera sensors, temperature sensors, global navigation system (e.g., GPS) sensors, pressure sensors, barometric pressure sensors, and the like. The hub or interface 470 further may be used to connect the Edge computing node 450 to actuators 474, such as power switches, valve actuators, an audible sound generator, a visual warning device, and the like.

In some optional examples, various input/output (I/O) devices may be present within or connected to, the Edge computing node 450. For example, a display or other output device 484 may be included to show information, such as sensor readings or actuator position. An input device 486, such as a touch screen or keypad may be included to accept input. An output device 484 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 450. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 476 may power the Edge computing node 450, although, in examples in which the Edge computing node 450 is mounted in a fixed location, it may have a power supply coupled to an electrical grid, or the battery may be used as a backup or for temporary capabilities. The battery 476 may be a lithium ion battery, or a metal-air battery, such as a zinc-air battery, an aluminum-air battery, a lithium-air battery, and the like.

A battery monitor/charger 478 may be included in the Edge computing node 450 to track the state of charge (SoCh) of the battery 476, if included. The battery monitor/charger 478 may be used to monitor other parameters of the battery 476 to provide failure predictions, such as the state of health (SoH) and the state of function (SoF) of the battery 476. The battery monitor/charger 478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 478 may communicate the information on the battery 476 to the processor 452 over the interconnect 456. The battery monitor/charger 478 may also include an analog-to-digital (ADC) converter that enables the processor 452 to directly monitor the voltage of the battery D176 or the current flow from the battery 476. The battery parameters may be used to determine actions that the Edge computing node 450 may perform, such as transmission frequency, mesh network operation, sensing frequency, and the like.

A power block 480, or other power supply coupled to a grid, may be coupled with the battery monitor/charger 478 to charge the battery 476. In some examples, the power block 480 may be replaced with a wireless power receiver to obtain the power wirelessly, for example, through a loop antenna in the Edge computing node 450. A wireless battery charging circuit, such as an LTC4020 chip from Linear Technologies of Milpitas, California, among others, may be included in the battery monitor/charger 478. The specific charging circuits may be selected based on the size of the battery 476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 458 may include instructions 482 in the form of software, firmware, or hardware commands to implement the techniques described herein. Although such instructions 482 are shown as code blocks included in the memory 454 and the storage 458, it may be understood that any of the code blocks may be replaced with hardwired circuits, for example, built into an application specific integrated circuit (ASIC).

In an example, the instructions 482 provided via the memory 454, the storage 458, or the processor 452 may be embodied as a non-transitory, machine-readable medium 460 including code to direct the processor 452 to perform electronic operations in the Edge computing node 450. The processor 452 may access the non-transitory, machine-readable medium 460 over the interconnect 456. For instance, the non-transitory, machine-readable medium 460 may be embodied by devices described for the storage 458 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 460 may include instructions to direct the processor 452 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 482 on the processor 452 (separately, or in combination with the instructions 482 of the machine readable medium 460) may configure execution or operation of a trusted execution environment (TEE) 490. In an example, the TEE 490 operates as a protected area accessible to the processor 452 for secure execution of instructions and secure access to data. Various implementations of the TEE 490, and an accompanying secure area in the processor 452 or the memory 454 may be provided, for instance, through use of Intel@Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 450 through the TEE 490 and the processor 452.

Figure 5:
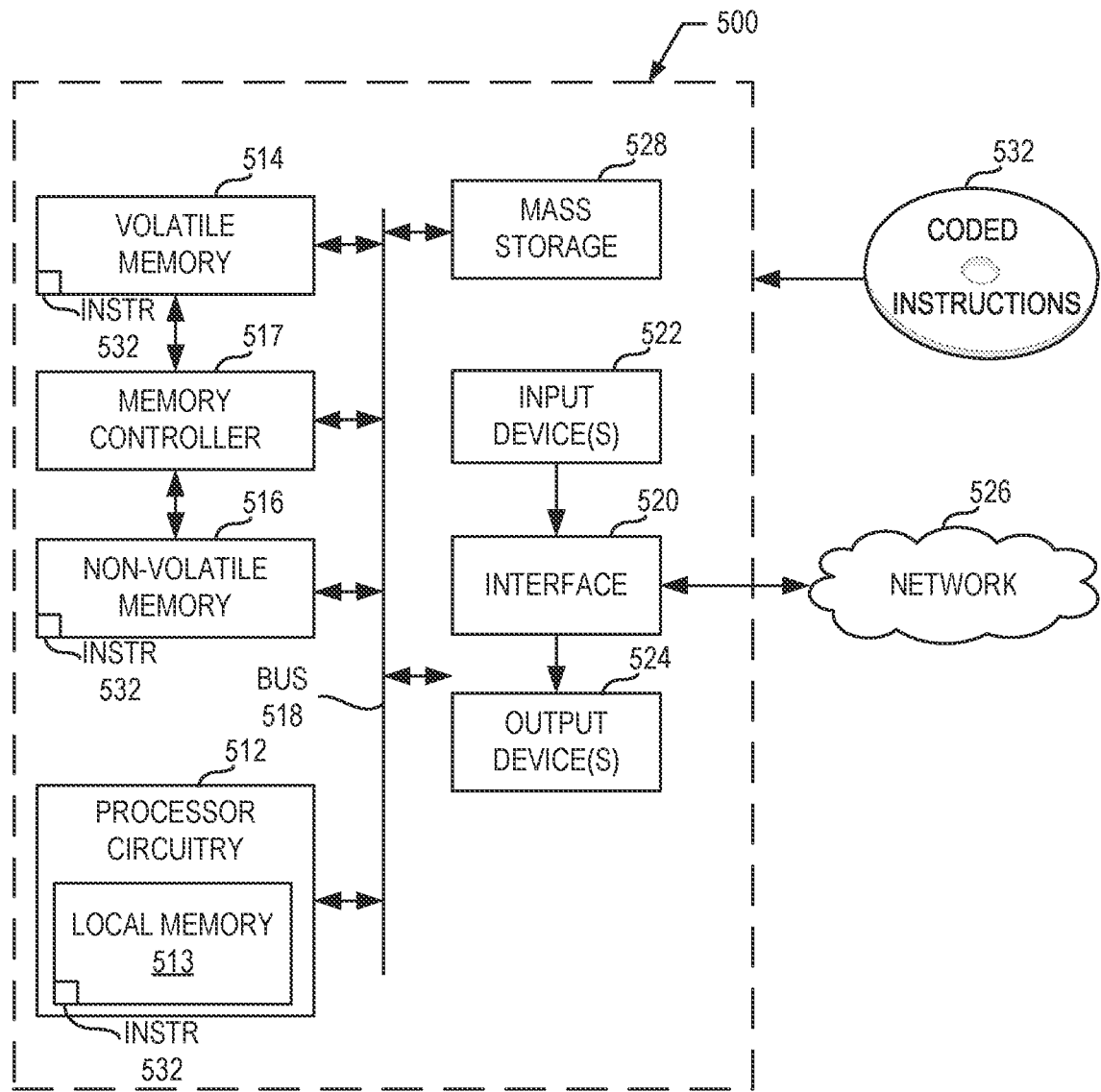
FIG. 5 is a block diagram of an example processor platform structured to execute machine readable instructions disclosed herein.

FIG. 5 is a block diagram of an example processor platform 500 structured to execute and/or instantiate the machine readable instructions and/or operations of any of the flowcharts disclosed herein to implement any of the apparatus and/or structure disclosed herein. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs microprocessors, CPUs, GPUs, DSPs, and/or microcontrollers from any desired family or manufacturer. The processor circuitry 512 may be implemented by one or more semiconductor based (e.g., silicon based) devices.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output devices D224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 532, which may be implemented by the machine readable instructions of any of the flowcharts disclosed herein, may be stored in the mass storage device 528, in the volatile memory 514, in the non-volatile memory 516, and/or on a removable non-transitory computer readable storage medium such as a CD or DVD.

Figure 6:
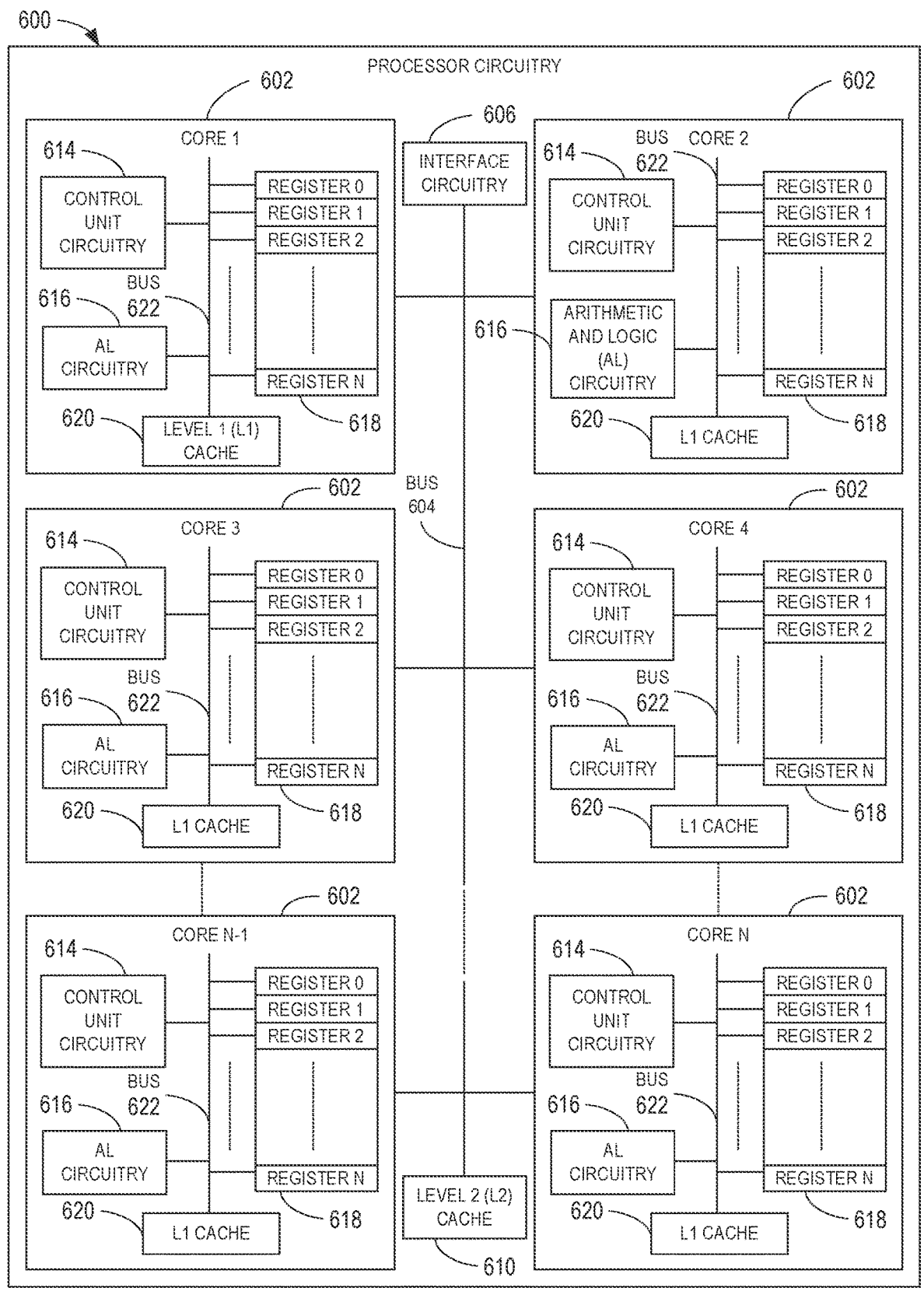
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may implement multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts disclosed herein.

The cores 602 may communicate by an example bus 604. In some examples, the bus 604 may implement a communication bus to effectuate communication associated with one(s) of the cores 602. For example, the bus 604 may implement at least one of an Inter-Integrated Circuit (I2C) bus, a Serial Peripheral Interface (SPI) bus, a PCI bus, or a PCIe bus. Additionally or alternatively, the bus 604 may implement any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the L1 cache 620, and an example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry D314 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core D302 to shorten access time. The bus 620 may implement at least one of an I2C bus, a SPI bus, a PCI bus, or a PCIe bus.

Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
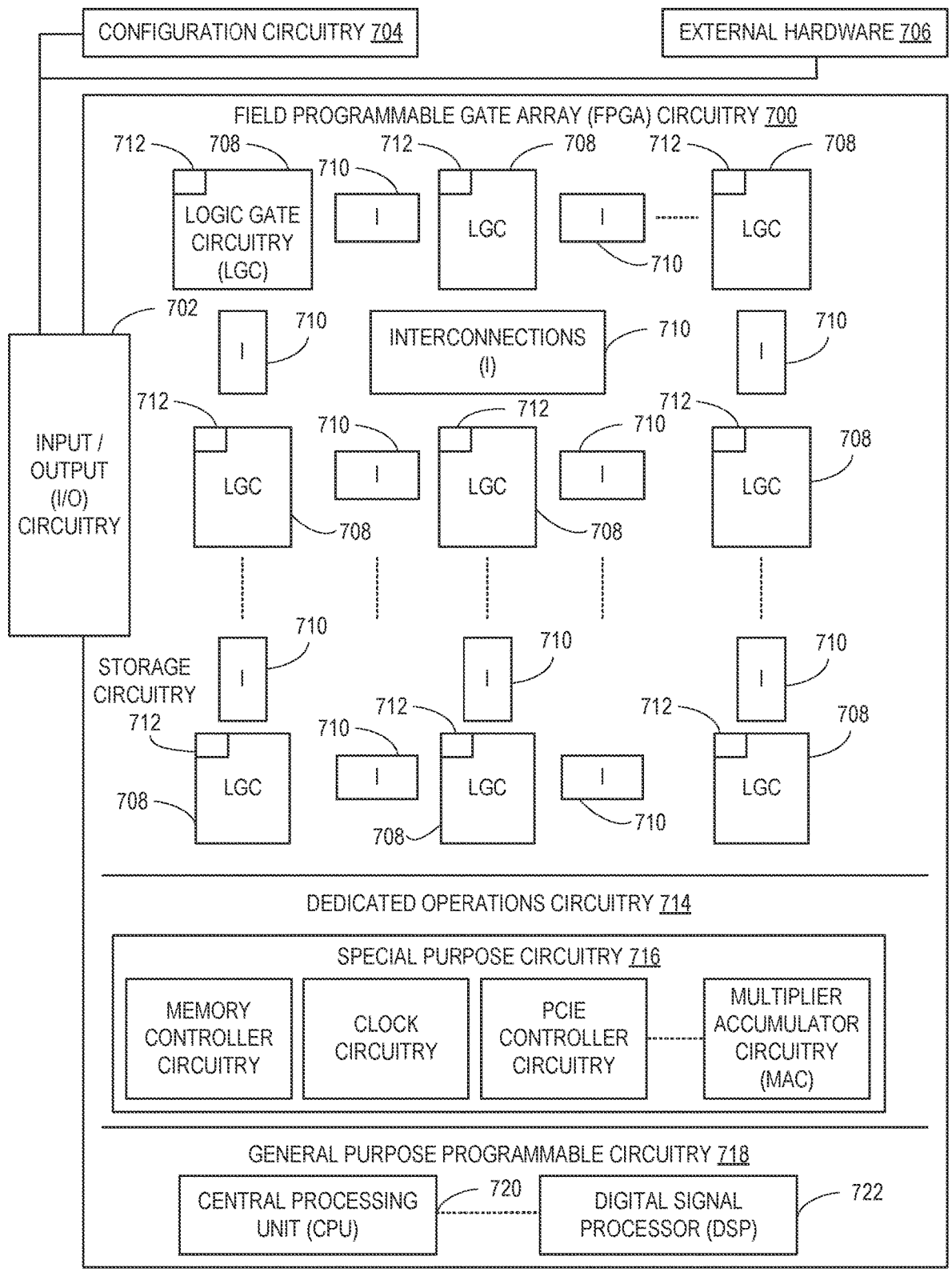
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts disclosed herein but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts disclosed herein in their entirety. In particular, the FPGA 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts disclosed herein. As such, the FPGA circuitry 700 may be structured to effectively instantiate some or all of the machine readable instructions of the flowcharts disclosed herein as dedicated logic circuits to perform the operations corresponding to those software instructions in a dedicated manner analogous to an ASIC. Therefore, the FPGA circuitry 700 may perform the operations corresponding to the some or all of the machine readable instructions of the instructions disclosed herein faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware (e.g., external hardware circuitry) 706. For example, the configuration circuitry 704 may implement interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may implement the microprocessor 600 of FIG. 6. The FPGA circuitry 700 also includes an array of example logic gate circuitry 708, a plurality of example configurable interconnections 710, and example storage circuitry 712. The logic gate circuitry 708 and interconnections 710 are configurable to instantiate one or more operations that may correspond to at least some of the machine readable instructions disclosed herein and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry D416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an onboard CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowchart disclosed herein may be executed by one or more of the cores 602 of FIG. 6 and a second portion of the machine readable instructions represented by the flowchart disclosed herein may be executed by the FPGA circuitry 700 of FIG. 7.

In some examples, the processor circuitry 512 of FIG. 5 may be in one or more packages. For example, the processor circuitry 500 of FIG. 5 and/or the FPGA circuitry 600 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
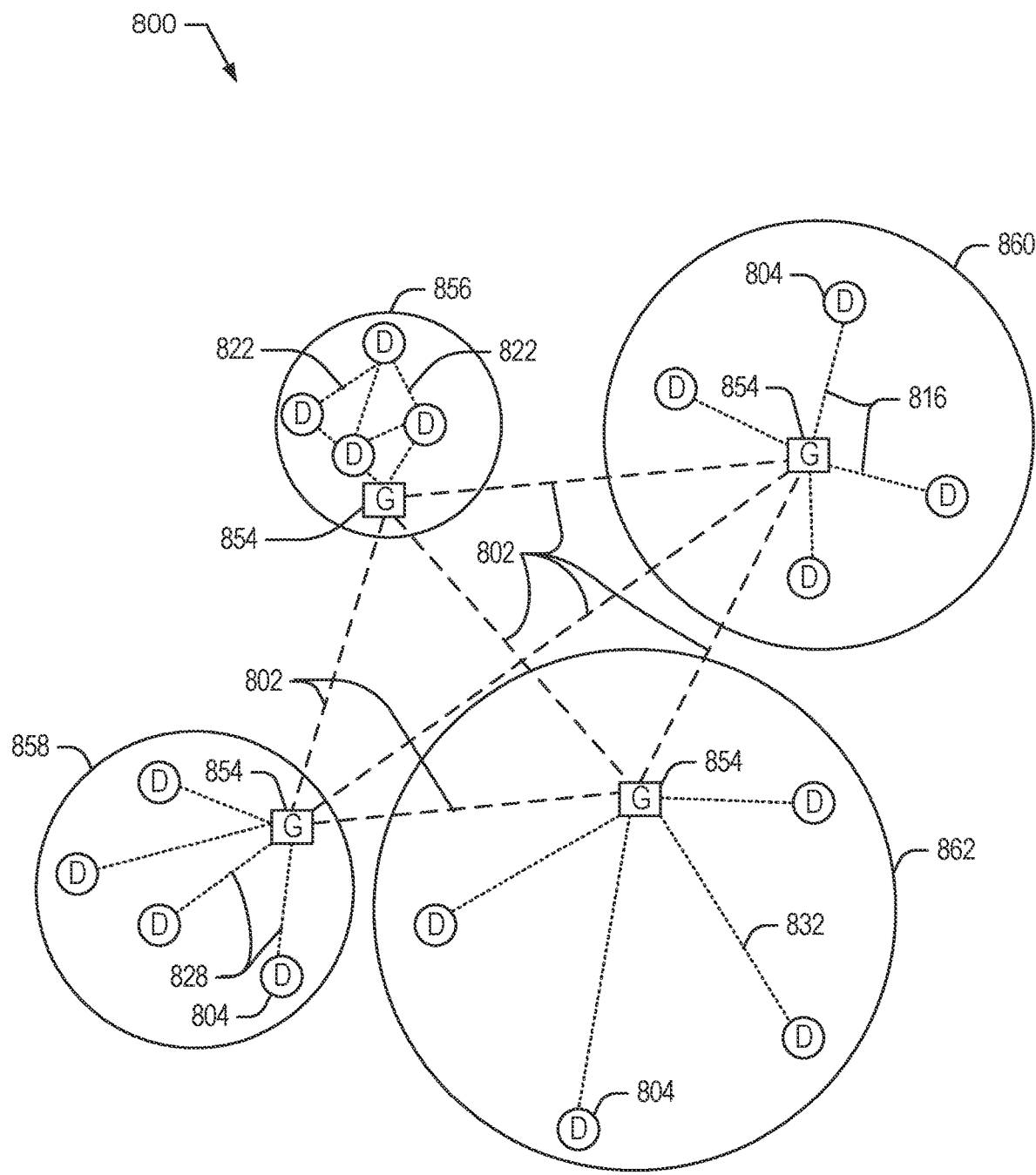
FIG. 8 illustrates a domain topology for respective internet-of-things (IoT) networks coupled through links to respective gateways, according to an example.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
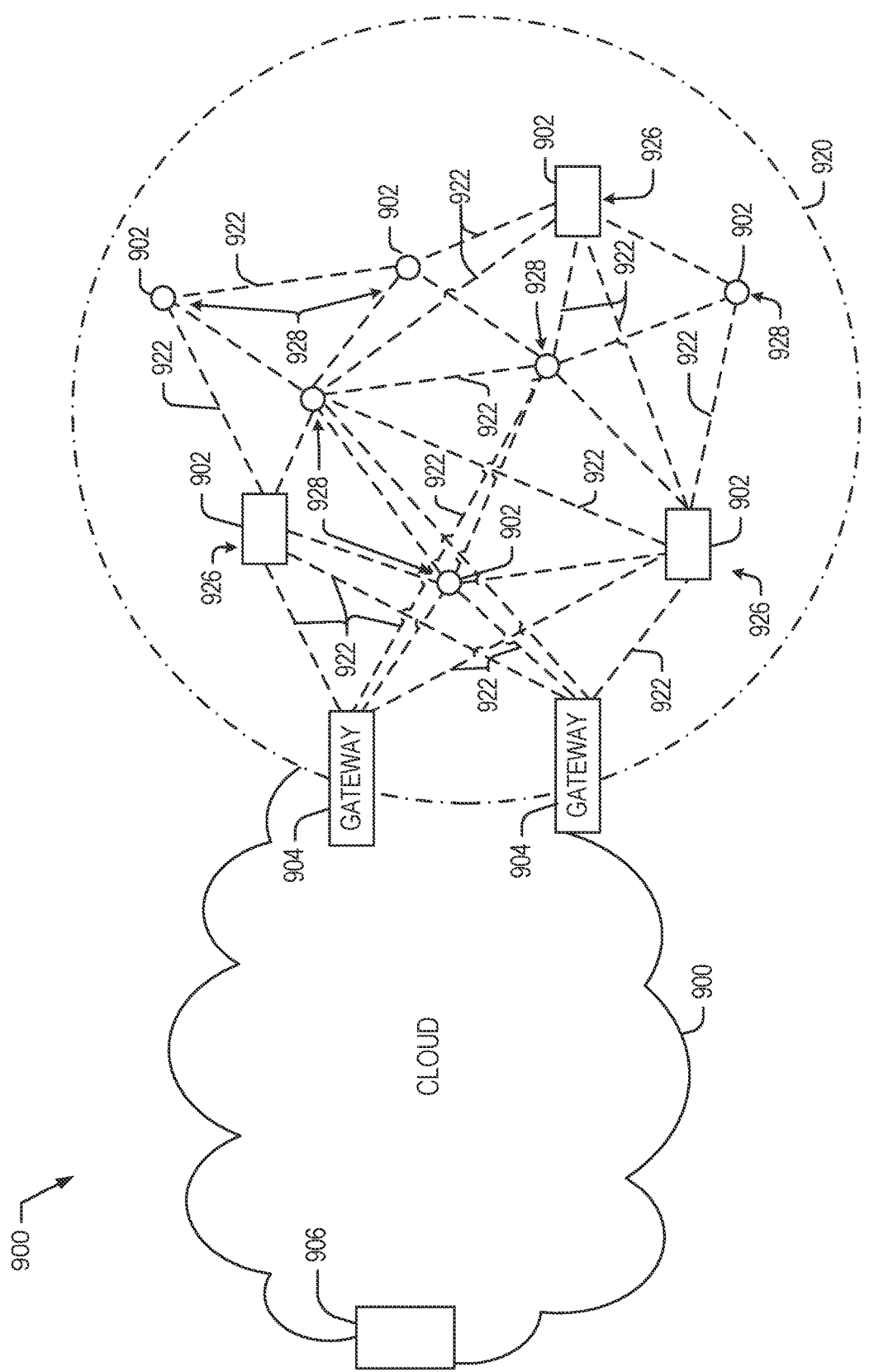
FIG. 9 illustrates a cloud computing network in communication with a mesh network of IoT devices operating as a fog device at the Edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8 and 9, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links F102 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices F104 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or integrated into "Edge" computing systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network F156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network F162 may include systems that perform non-Internet protocol (IP) to IP interconnections, addressing, and routing. Further, each of the IoT devices F104 may include the appropriate transceiver for wide area communications with that device. Further, each IoT device F104 may include other transceivers for communications using additional protocols and frequencies. This is discussed further with respect to the communication environment and hardware of an IoT processing device depicted in FIGS. 10 and 11.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 9 below.

FIG. 9 illustrates a cloud computing network in communication with a mesh network of IoT devices (devices 902) operating as a fog platform in a networked scenario. The mesh network of IoT devices may be termed a fog network 920, established from a network of devices operating at the Edge of the cloud 900. To simplify the diagram, not every IoT device 902 is labeled.

The fog network 920 may be considered to be a massively interconnected network wherein a number of IoT devices 902 are in communications with each other, for example, by radio links 922. The fog network 920 may establish a horizontal, physical, or virtual resource platform that can be considered to reside between IoT Edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the Edge and the cloud. Thus, references in the present document to the "Edge", "fog", and "cloud" are not necessarily discrete or exclusive of one another.

As an example, the fog network 920 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways F204 may be Edge devices that provide communications between the cloud F200 and the fog network 920, and may also provide the backend process function for data obtained from sensors 928, such as motion data, flow data, temperature data, and the like. The data aggregators 926 may collect data from any number of the sensors 928, and perform the back end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device F202 may be much less than the range to connect to the gateways 904.

The fog network 920 provided from these IoT devices 902 may be presented to devices in the cloud 900, such as a server 906, as a single device located at the Edge of the cloud 900, e.g., a fog network operating as a device or platform. In this example, the alerts coming from the fog platform may be sent without being identified as coming from a specific IoT device 902 within the fog network 920. In this fashion, the fog network 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog platform may be configured in a declarative programming style, enabling the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog network 920 device the IoT devices 902, such as particular sensors 928, needed to answer the query. The data from these sensors 928 may then be aggregated and analyzed by any combination of the sensors 928, data aggregators 926, or gateways 904, before being sent on by the fog network 920 to the server 906 to answer the query. In this example, IoT devices 902 in the fog network 920 may select the sensors 928 used based on the query, such as adding data from flow sensors or temperature sensors. Further, if some of the IoT devices 902 are not operational, other IoT devices 902 in the fog network 920 may provide analogous data, if available.

In other examples, the operations and functionality described herein may be embodied by an IoT or Edge compute device in the example form of an electronic processing system, within which a set or sequence of instructions may be executed to cause the electronic processing system to perform any one of the methodologies discussed herein, according to an example embodiment. The device may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 10:
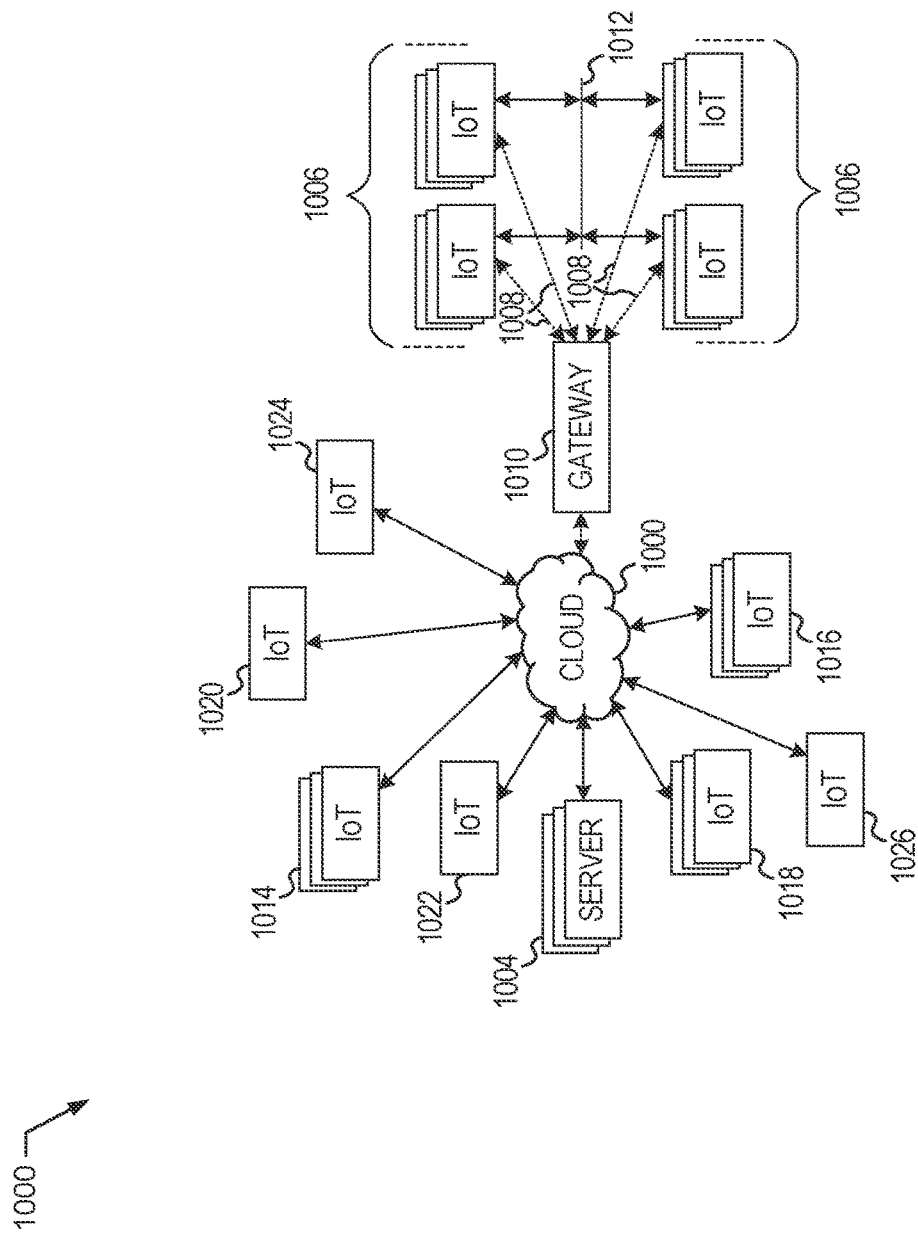
FIG. 10 illustrates a drawing of a cloud computing network, or cloud, in communication with a number of Internet of Things (IoT) devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local Edge cloud or fog implementation among a local area network. Further, the gateway 1028 that is depicted may operate in a cloud-to-gateway-to-many Edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As may be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

Figure 11:
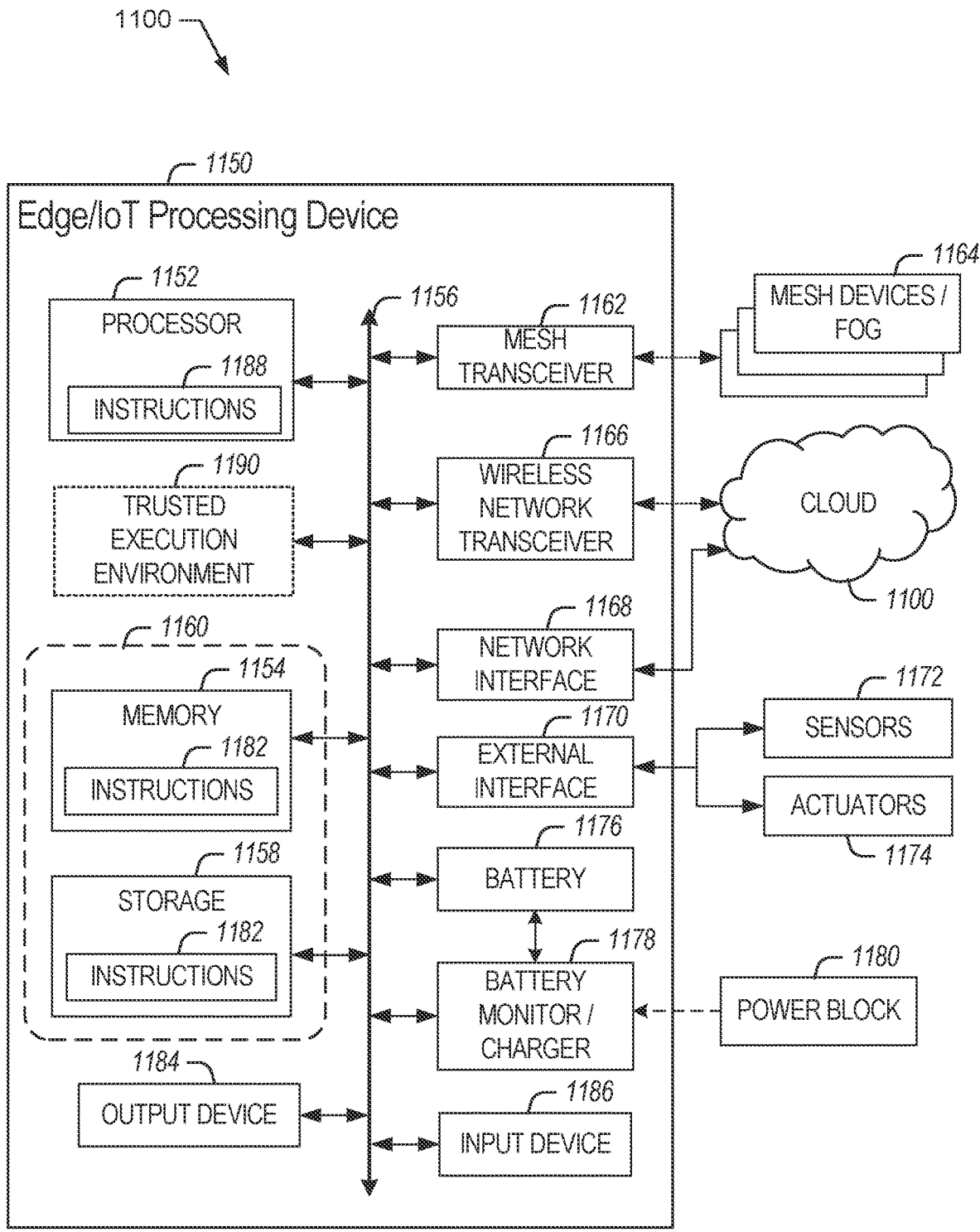
FIG. 11 illustrates a block diagram for an example IoT processing system architecture upon which any one or more of the techniques (e.g., operations, processes, methods, and methodologies) discussed herein may be performed, according to an example.

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include processing circuitry in the form of a processor 1152, which may be a microprocessor, a multi-core processor, a multithreaded processor, an ultra-low voltage processor, an embedded processor, or other known processing elements. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, CA. However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage F458 may be implemented using a micro hard disk drive (HDD). Further, any number of new technologies may be used for the storage F458 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect F456 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 1162, 1166, 1168, or 1170. Accordingly, in various examples, applicable means for communicating (e.g., receiving, transmitting, etc.) may be embodied by such communications circuitry.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ Communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1186 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, CA, among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may be embodied by devices described for the storage 1158 of FIG. 11 or may include specific storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and block diagram(s) of operations and functionality depicted above.

Also in a specific example, the instructions 1188 on the processor 1152 (separately, or in combination with the instructions 1188 of the machine readable medium 1160) may configure execution or operation of a trusted execution environment (TEE) 1190. In an example, the TEE 1190 operates as a protected area accessible to the processor 1152 for secure execution of instructions and secure access to data. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

Figure 12:
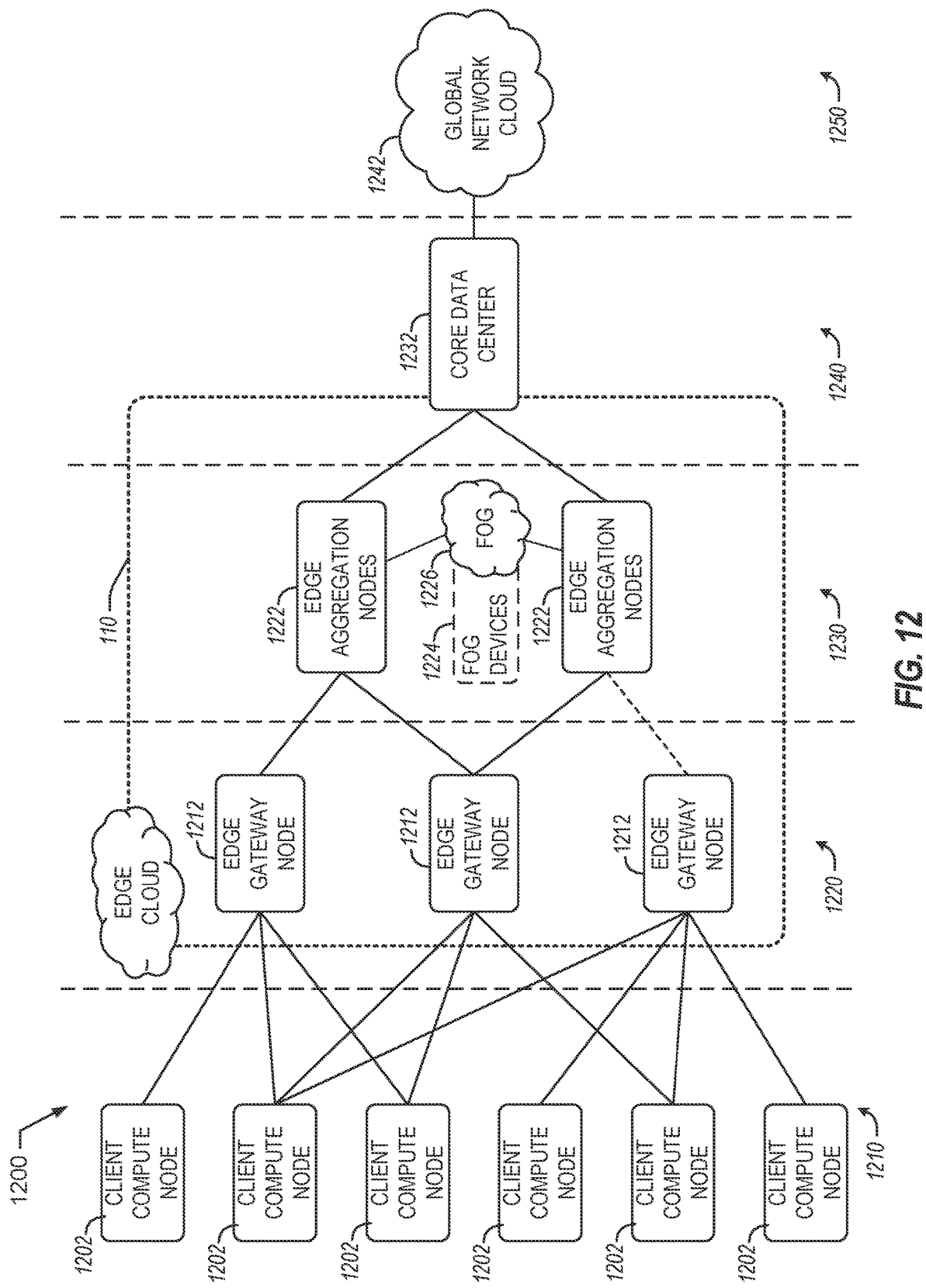
FIG. 12 illustrates an overview of layers of distributed compute deployed among an Edge computing system, according to an example.

At a more generic level, an Edge computing system may be described to encompass any number of deployments operating in an Edge cloud 110, which provide coordination from client and distributed computing devices. FIG. 12 provides a further abstracted overview of layers of distributed compute deployed among an Edge computing environment for purposes of illustration.

FIG. 12 generically depicts an Edge computing system for providing Edge services and applications to multi-stakeholder entities, as distributed among one or more client compute nodes 1202, one or more Edge gateway nodes 1212, one or more Edge aggregation nodes 1222, one or more core data centers 1232, and a global network cloud 1242, as distributed across layers of the network. The implementation of the Edge computing system may be provided at or on behalf of a telecommunication service provider ("telco", or "TSP"), internet-of-things service provider, cloud service provider (CSP), enterprise entity, or any other number of entities.

Each node or device of the Edge computing system is located at a particular layer corresponding to layers 1210, 1220, 1230, 1240, 1250. For example, the client compute nodes 1202 are each located at an endpoint layer 1210, while each of the Edge gateway nodes 1212 are located at an Edge devices layer 1220 (local level) of the Edge computing system. Additionally, each of the Edge aggregation nodes 1222 (and/or fog devices 1224, if arranged or operated with or among a fog networking configuration 1226) are located at a network access layer 1230 (an intermediate level). Fog computing (or "fogging") generally refers to extensions of cloud computing to the Edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with Edge computing as discussed herein; many of the Edge computing aspects discussed herein are applicable to fog networks, fogging, and fog configurations. Further, aspects of the Edge computing systems discussed herein may be configured as a fog, or aspects of a fog may be integrated into an Edge computing architecture.

The core data center 1232 is located at a core network layer 1240 (e.g., a regional or geographically-central level), while the global network cloud 1242 is located at a cloud data center layer 1250 (e.g., a national or global layer). The use of "core" is provided as a term for a centralized network location-deeper in the network-which is accessible by multiple Edge nodes or components; however, a "core" does not necessarily designate the "center" or the deepest location of the network. Accordingly, the core data center 1232 may be located within, at, or near the Edge cloud 110.

Although an illustrative number of client compute nodes 1202, Edge gateway nodes 1212, Edge aggregation nodes 1222, core data centers 1232, global network clouds 1242 are shown in FIG. 12, it should be appreciated that the Edge computing system may include more or fewer devices or systems at each layer. Additionally, as shown in FIG. 12, the number of components of each layer 1210, 1220, 1230, 1240, 1250 generally increases at each lower level (i.e., when moving closer to endpoints). As such, one Edge gateway node 1212 may service multiple client compute nodes 1202, and one Edge aggregation node 1222 may service multiple Edge gateway nodes 1212.

Consistent with the examples provided herein, each client compute node 1202 may be embodied as any type of end point component, device, appliance, or "thing" capable of communicating as a producer or consumer of data. Further, the label "node" or "device" as used in the Edge computing system 1200 does not necessarily mean that such node or device operates in a client or agent/minion/follower role; rather, any of the nodes or devices in the Edge computing system 1200 refer to individual entities, nodes, or subsystems which include discrete or connected hardware or software configurations to facilitate or use the Edge cloud 110.

As such, the Edge cloud 110 is formed from network components and functional features operated by and within the Edge gateway nodes 1212 and the Edge aggregation nodes 1222 of layers 1220, 1230, respectively. The Edge cloud A110 may be embodied as any type of network that provides Edge computing and/or storage resources which are proximately located to radio access network (RAN) capable endpoint devices (e.g., mobile computing devices, IoT devices, smart devices, etc.), which are shown in FIG. 12 as the client compute nodes 1202. In other words, the Edge cloud 110 may be envisioned as an "Edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the Edge cloud 110 may form a portion of or otherwise provide an ingress point into or across a fog networking configuration 1226 (e.g., a network of fog devices 1224, not shown in detail), which may be embodied as a system-level horizontal and distributed architecture that distributes resources and services to perform a specific function. For instance, a coordinated and distributed network of fog devices 1224 may perform computing, storage, control, or networking aspects in the context of an IoT system arrangement. Other networked, aggregated, and distributed functions may exist in the Edge cloud 110 between the cloud data center layer 1250 and the client endpoints (e.g., client compute nodes 1202). Some of these are discussed in the following sections in the context of network functions or service virtualization, including the use of virtual Edges and virtual services which are orchestrated for multiple stakeholders.

The Edge gateway nodes 1212 and the Edge aggregation nodes 1222 cooperate to provide various Edge services and security to the client compute nodes 1202. Furthermore, because each client compute node 1202 may be stationary or mobile, each Edge gateway node 1212 may cooperate with other Edge gateway devices to propagate presently provided Edge services and security as the corresponding client compute node 1202 moves about a region. To do so, each of the Edge gateway nodes 1212 and/or Edge aggregation nodes 1222 may support multiple tenancy and multiple stakeholder configurations, in which services from (or hosted for) multiple service providers and multiple consumers may be supported and coordinated across a single or multiple compute devices.

Figure 13:
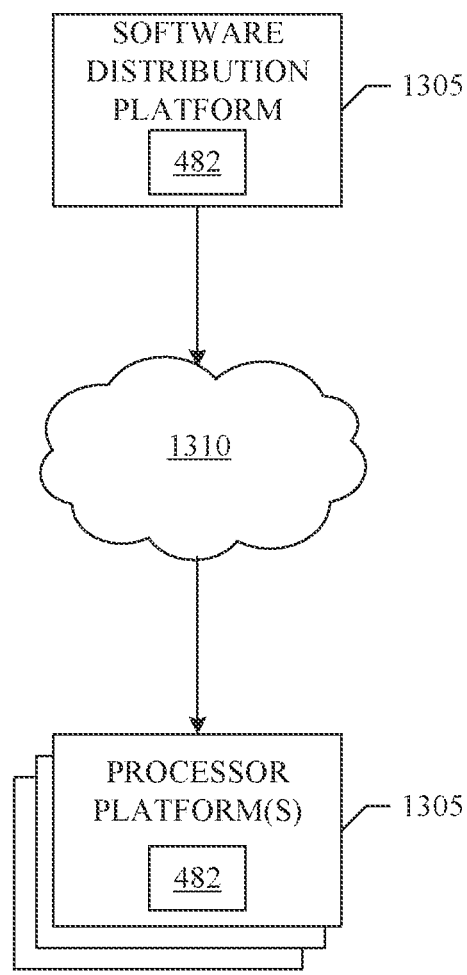
FIG. 13 is a block diagram of an example software distribution platform (e.g., one or more servers) to distribute software (e.g., software corresponding to the example machine readable instructions (corresponding to the flowcharts disclosed herein) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 532 of FIG. 5 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1305 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 532, which may correspond to the example machine readable instructions of all flowcharts disclosed herein. The one or more servers of the example software distribution platform 1305 are in communication with a network 1310, which may correspond to any one or more of the Internet and/or any of the example networks disclosed herein. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 1305. For example, the software, which may correspond to any of the example machine readable instructions disclosed herein, may be downloaded to the example processor platform 500, which is to execute the machine readable instructions 532 to implement the apparatus disclosed herein. In some examples, one or more servers of the software distribution platform 1305 periodically offer, transmit, and/or force updates to the software (e.g., the example machine readable instructions 532 of FIG. 5) to ensure improvements, patches, updates, etc., are distributed and applied to the software at the end user devices.

Workload Optimization for Heterogenous Target and Multitenancy Support (ID5)

Entities that service workload requests are chartered with the responsibility of distributing those workloads in a manner that satisfies client demands. In some environments, the underlying platform resources are known ahead of time so that a workload for a target computational resource is optimized. However, Edge computing resources are being utilized to a greater extent and the target computational devices are heterogeneous. Target computational devices may include CPUs, GPUs, FPGAs and/or other types of accelerators.

Current workload optimization is not handled in a scalable manner when the workload is operating on a first computational device (e.g., a CPU) at a first time and a second computational device (e.g., a GPU) at a second time, in which the computational devices from the first time to the second time are different. Current workload optimization also fails to consider service level agreements (SLAs) in combination with utilization information. Today, handling such dynamic inconsistencies in target computational devices causes workload efficiency to suffer, which further causes client expectation problems. Examples disclosed herein also support dynamic hybrid combinations. For example, in one instance a workload may only run on a CPU or a GPU, but at a second instance the workload may be structured to run on both, or on various combinations of computational resources.

Example improvements disclosed herein develop workload optimizations for heterogenous environments (e.g., a first edge platform with a CPU, a second edge platform with a GPU, a third edge platform with a combination of CPU and FPGA, etc.) in a manner that considers client SLA parameters and utilization parameters. In some examples disclosed herein, optimization for all devices of a current/known platform occurs prior to runtime (e.g., an inference phase) to allow dynamic switching of one or more portions of the workload (e.g., selection of different optimized graphs). In some examples disclosed herein, dynamic switching of one or more portions of the workload can be directed to alternate ones of the available heterogenous devices of the Edge network. In some examples, different available resources may be located at any location within the example Edge cloud 110 described above. In some examples, available resources reside at a far edge during a first time and due to, for example, changing demands of the far edge resources, remaining resources become limited to near edge locations within the Edge cloud 110. Examples disclosed herein accommodate for circumstances where workload requirements and corresponding choices for accelerators (e.g., based on need) are dynamic.

Examples disclosed herein consider any number and/or type of workload, such as AI algorithms, connected graphs, and/or other algorithms stitched together to accomplish a relatively larger task objective(s). For instance, when optimizing a ResNet50 neural network, examples disclosed herein identify whether particular layers are more suited to run on particular target devices, such as a CPU rather than a GPU.

FIG. 26A illustrates an example framework 2600 to optimize a workload. In the illustrated example of FIG. 26A, the framework 2600 includes an example workload or pool of workloads 2602 and example platform resources 2604 that are known to be available at a given moment. The example platform resources 2604 include any number and or type of devices capable of performing workload tasks including, but not limited to, CPUs, GPUs, FPGAs, ASICs, accelerators, etc. As described in further detail below, the workload 2602 is optimized in view of the respective resources 2604 to generate optimized graphs 2606 corresponding to each resource. In some examples, an optimized graph is represented as a neural architecture having a particular number of layers, connections (nodes), weights and/or hyperparameters. Example weights disclosed herein include one or more values represented by alphanumeric characters. Such values may be stored in one or more data structures (e.g., data structure(s)), in which example data structures include integers, floating point representations and/or characters. Weights and corresponding values to represent such weights represent data stored in any manner. Such data may also propagate from a first data structure to a second or any number of subsequent data structures along a data path, such as a bus. An aggregate of the optimized graphs 2606 is consolidated as a union of graphs 2608 and packaged within the workload 2602 to create a packaged workload 2610.

At least one benefit of the packaged workload 2610 is that examples disclosed herein include and/or otherwise embed additional semantic information into the workload so that on-the-fly decisions can occur in view of dynamic conditions during runtime 2612. Examples disclosed herein retrieve, receive and/or otherwise obtain SLA information/parameters 2614 and current utilization information 2616. As used herein, SLA parameters represent constraints to be satisfied by workload execution, such as accuracy metrics, speed metrics, power consumption metrics, cost (e.g., financial cost, processor burden cost, etc.) metrics, etc. As used herein, utilization parameters represent real-time operating conditions of platforms and/or underlying computing resources thereof that are executing the workload and/or operating conditions of candidate platforms that could be considered for the workload in the future.

Dynamic conditions include but are not limited to changing conditions of underlying hardware (and/or underlying allocated VMs), changing conditions of hardware characteristics (e.g., multiple tenant use versus single tenant use, cost of utilization of the underlying resources), and/or changing conditions of a Service Level Agreement (SLA). In some examples, a client with a workload to be executed and/or otherwise processed by computing resources is forced to move the workload to one or more alternate or additional resources. For instance, a current computing resource (e.g., one or more of the example resources 2604) may become unavailable, a current computing resource financial cost may exceed one or more SLA thresholds established by the client, and/or a current computing resource may be inundated by requests from one or more other tenants. However, in response to such dynamic possibilities, examples disclosed herein enable prompt adjustment of identifying which computing resources should handle the workload(s), which graph(s) to employ with the workload(s) in view of available computing resources, and/or invoke SLA renegotiation efforts.

Existing optimization techniques consider predetermined platforms corresponding to predetermined workloads and their graphs. However, examples disclosed herein acknowledge that different workload graphs can achieve workload objectives with comparable performance (e.g., speed). For instance, optimizations for ResNet50 include different types of graph configurations based on the underlying computational devices that will execute the workload. Example graph configurations may include different layer structure arrangements (e.g., in the event a convolutional neural network (CNN) is used), such as a first layer (e.g., 7×7 Conv layer) connected to a second layer (e.g., 5×5 Conv layer) connected to a third layer . . . etc. A graph configuration for a particular target computational device may be referred to as a path. However, an alternate target computational device may reveal an optimized graph configuration (e.g., a second path) that is different for the same workload (e.g., two 7×7 Conv layers connected). The example first and second paths may accomplish the workload objective and may even have substantially the same performance (e.g., efficiency, speed, power consumption). In some examples, the first and second paths may accomplish the workload objective with substantially similar performance in some respects (e.g., efficiency, speed, power consumption) and substantially different performance in other respects (e.g., cost (e.g., financial, processor burden), latency). Examples disclosed herein optionally expose one or more knobs to facilitate selection and/or adjustment of selectable options. Knobs include, but are not limited to particular target hardware device preferences (e.g., CPU, GPU, FPGA, accelerator, particular CPU core selection(s), uncore frequencies, memory bandwidth, cache partitioning/reservation, FPGA RTL partitioning, GPU execution units partitioning/reservation, etc.), and particular optimization parameter preferences (e.g., improved latency, improved energy consumption, improved accuracy, etc.). Knobs may be selected by, for example, a user and/or an agent. In some examples, knobs are selected, added, removed, etc. via an interface (e.g., a user interface, a graphical user interface (GUI)). In some examples, the interface renders, informs and/or otherwise displays current knobs and their corresponding values, in which alternate knobs and/or corresponding values can be augmented (e.g., selected by a user). Agent knob adjustment may occur in an automatic manner independent of the user in an effort to identify one or more particular optimized knob settings.

However, in the event of dynamic utilization parameters, changing conditions may cause one of these paths to deteriorate and/or otherwise fail to meet performance expectations. In other examples, changing conditions may have no effect on the efficacy and/or efficiency of workload performance, but might violate the SLA parameters (e.g., the workload costs too much to execute on the target computational device, the workload consumes too much power, etc.). FIG. 26 illustrates example graph semantic embedding for a graph of interest 2620. Examples disclosed herein accommodate for such dynamic conditions in heterogenous environments. In the illustrated example of FIG. 26, each node and each subgraph on a compute device (e.g., CPU, GPU, XPU, FPGA, etc.) corresponds to a particular cost (e.g., latency). Information related to nodes and subgraphs is collected and analyzed (i.e., type of compute e.g., vector, systolic, etc., input/output data size, etc.). Different embeddings capture corresponding probabilities of certain paths in a graph towards the accuracy of the network. Based on the available information, dynamic decisions are made to schedule part of subgraph on different available compute devices in a platform. Optimized graphs 2620 disclosed herein consider more than just a generic parameter in view of a predetermined computing device, but also incorporate semantic information that can trigger dynamic decisions of (a) candidate target computing devices to best handle the workload and (b) candidate graphs to best facilitate workload operation in view of dynamic SLA information, dynamic computing resource conditions, and key performance indicator (KPI) information. For instance, in response to a need (e.g., perhaps an unexpected need) to seek workload execution (e.g., an AI algorithm, ResNet50, etc.) from a cloud (e.g., a Google® Cloud platform, Amazon Web Services® Cloud platform), an attach point may include one or more computing devices different than what may have been used on prior occasions. A first or prior occasion of workload execution may have been in view of first SLA parameters/criteria, in which a financial cost of using such computing hardware was relatively low. In the event of changing SLA criteria and/or in the event of changing demand on the current computing hardware, examples disclosed herein adapt an applied model (e.g., optimized graphs). A first Cloud service provider (e.g., Google®) may have raised its prices for usage privileges, but a second Cloud service provider (e.g., AWS®) may have maintained or reduced their costs. Examples disclosed herein may partition workloads in view of these changing conditions.

FIG. 26C illustrates example optimizing circuitry 2630 to optimize workloads in a heterogenous environment. In the illustrated example of FIG. 26C, the optimizing circuitry 2630 includes example benchmark managing circuitry 2632, example SLA managing circuitry 2634, example hyper parameter tuning circuitry 2636, example reconfiguration managing circuitry 2638, example agent managing circuitry 2640, and example workload activity detecting circuitry 2642.

In some examples, the optimizing circuitry 2630 includes means for managing benchmarks, means for managing SLAs, means for tuning hyperparameters, means for managing reconfigurations, means for managing agents, and means for detecting workload activity. For example, the means for managing benchmarks may be implemented by benchmark managing circuitry 2632, the means for managing SLAs may be implemented by SLA managing circuitry 2634, the means for tuning hyperparameters may be implemented by hyperparameter tuning circuitry 2636, the means for managing reconfigurations may be implemented by the reconfiguration managing circuitry 2638, the means for managing agents may be implemented by the agent managing circuitry 2640, and the means for detecting workload activity may be implemented by the workload activity detecting circuitry 2642. In some examples, the benchmark managing circuitry 2632, the SLA managing circuitry 2634, the hyperparameter tuning circuitry 2636, the reconfiguration managing circuitry 2638, the agent managing circuitry 2640 and/or the workload activity detecting circuitry 2642 may be implemented by machine executable instructions disclosed herein and executed by processor circuitry, which may be implemented by the example processor circuitry 512 of FIG. 5 and/or example Field Programmable Gate Array (FPGA) circuitry. In other examples, the benchmark managing circuitry 2632, the SLA managing circuitry 2634, the hyperparameter tuning circuitry 2636, the reconfiguration managing circuitry 2638, the agent managing circuitry 2640 and/or the workload activity detecting circuitry 2642 is implemented by other hardware logic circuitry, hardware implemented state machines, and/or any other combination of hardware, software, and/or firmware. For example, the benchmark managing circuitry 2632, the SLA managing circuitry 2634, the hyperparameter tuning circuitry 2636, the reconfiguration managing circuitry 2638, the agent managing circuitry 2640 and/or the workload activity detecting circuitry 2642 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In operation, the example reconfiguration managing circuitry 2638 determines whether a workload has been detected for which optimization efforts have not yet occurred. If not, the example reconfiguration managing circuitry 2638 continues to wait for such an instance. However, in response to the example reconfiguration managing circuitry 2638 detecting a workload to be analyzed, the example agent managing circuitry 2640 invokes a workload agent to be associated and/or otherwise assigned with the workload evaluation (e.g., training). In some examples, the assigned workload agent is a reinforcement learning agent to perform exploration in view of a cost function. The example reconfiguration managing circuitry 2638 identifies candidate hardware resources, such as those communicatively connected via an Edge network, and stores such candidate resources in a storage (e.g., a database, memory) for later reference and consideration.

In connection with available hardware resources identified by the example reconfiguration managing circuitry 2638 (block 2706) and/or such resources stored in the storage, the example agent managing circuitry 2640 calculates and/or otherwise determines optimizations. As disclosed above, optimizations may be represented as models, graphs, such as the example graph of interest 2620. In particular, the example agent managing circuitry 2640 selects a candidate resource from the resource list and the example SLA managing circuitry 2634 retrieves current SLA information associated with the workload. The example hyper parameter tuning circuitry 2636 calculates an optimized graph for the selected resource. In some examples, the hyper parameter tuning circuitry 2636 applies a reinforcement learning model for the assigned agent to process, in which a cost function is evaluated in view of one or more parameters corresponding to the SLA information. Optimized graphs are calculated for all available candidate computing resources, and the example benchmark managing circuitry 2632 packages and/or otherwise embeds the optimization metrics as a union of graphs. Further, the example benchmark managing circuitry 2632 attaches/embeds the union of graphs to the workload so that dynamic decisions may occur in real time during an inference/runtime phase of the workload.

During a runtime phase, the example workload activity detecting circuitry 2642 monitors a platform for whether a labelled workload (e.g., a workload containing a union of graphs) has been invoked. If so, the example SLA managing circuitry 2634 retrieves current SLA information. While SLA information was disclosed above as being previously retrieved, examples disclosed herein acknowledge and address the fact that SLA information may change from time to time depending on, for example, client needs, budget, etc. The example reconfiguration managing circuitry 2638 retrieves current utilization information for the computing resources associated with the above-identified workload invocation. In some examples, utilization information is obtained with the aid of Intel® Resource Director Technology (RDT). Resource information may include, but is not limited to resource availability, current resource utilization (e.g., in view of multiple tenant utilization), and current resource cost (e.g., a dollar-per-cycle cost).

The example SLA managing circuitry 2634 determines whether the currently identified computing resources will satisfy the current SLA parameters and, if so, no further model adjustments are needed. However, in the event of deviations from the SLA parameters, the example reconfiguration managing circuitry 2638 selects an alternate path (e.g., alternate graph) that exhibits predicted SLA compliance to a threshold margin. Such selections have reduced computational requirements because, in part, examples disclosed herein include semantic information that identifies and/or otherwise reveals alternative paths that have already been calculated to achieve desired results. As such, alternative path selection occurs in a relatively faster manner with less computational burdens when compared to traditional techniques. Considering that one or more conditions have changed, the example agent managing circuitry 2640 assigns another agent to re-assess performance of the selected alternate path. The example benchmark managing circuitry 2632 updates the workload with new information corresponding to the newly selected path and the current conditions. The updated workload information includes updated semantic information that forms a part of the union of graphs.

In some examples, SLA performance objectives cannot be met in view of the candidate computing resources available at the current time. In such circumstances, the example benchmark managing circuitry 2632 attempts to renegotiate SLA parameters between competing tenants. Micropayments are provided by the benchmark managing circuitry 2632 to particular tenants as compensation for not meeting the SLA parameter requirements to a threshold degree (e.g., when insufficient SLA requirements are detected). In some examples, the benchmark managing circuitry 2632 provides such micropayments and subsequently moves the affected workload(s) to alternate computing resources to complete workload objectives, sometimes at a reduced performance (e.g., slower). In some examples, the benchmark managing circuitry 2632 allocates micropayments to a first tenant that agrees to relinquish a portion of available resources to a second tenant. As such, the first tenant does not consume that portion of resources so that the second tenant can utilize such resources to accomplish computing tasks. Micropayments provide to and/or otherwise allocated to the first tenant include access to one or more portions of available resources at a subsequent time. In some examples, the micropayments to the first tenant represent a portion of workload resources that is greater than those originally provided to the first tenant. In some examples, the micropayments to the first tenant reflect a quantity of computing cycles corresponding to one or more edge network devices. In some examples, the second tenant receives and/or otherwise obtains the use of computing resources having a reduced latency and the first tenant receives and/or otherwise obtains the use of computing resources having a relatively longer latency.

While an example manner of implementing the optimizing circuitry 2630 of FIG. 26C is illustrated in FIG. 26C, one or more of the elements, processes and/or devices illustrated in FIG. 26C may be combined, divided, re-arranged, omitted, eliminated and/or implemented in any other way. Further, the example benchmark managing circuitry 2632, the example SLA managing circuitry 2634, the example hyper parameter tuning circuitry 2636, the example reconfiguration managing circuitry 2638, the example agent managing circuitry 2640, the example workload activity detecting circuitry 2642 and/or, more generally, the example optimizing circuitry 2630 of FIG. 26C may be implemented by hardware, software, firmware and/or any combination of hardware, software and/or firmware. Example hardware implementation include implementation on the example compute circuitry 402 (e.g., the example processor 404) of FIG. 4A, or on the example processor 452 of the example computing node 450 of FIG. 4B. Thus, for example, any of the example benchmark managing circuitry 2632, the example SLA managing circuitry 2634, the example hyper parameter tuning circuitry 2636, the example reconfiguration managing circuitry 2638, the example agent managing circuitry 2640, the example workload activity detecting circuitry 2642 and/or, more generally, the example optimizing circuitry 2630 of FIG. 26C could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example benchmark managing circuitry 2632, the example SLA managing circuitry 2634, the example hyper parameter tuning circuitry 2636, the example reconfiguration managing circuitry 2638, the example agent managing circuitry 2640, the example workload activity detecting circuitry 2642 and/or, more generally, the example optimizing circuitry 2630 of FIG. 26C is/are hereby expressly defined to include a non-transitory computer readable storage device or storage disk such as a memory, a digital versatile disk (DVD), a compact disk (CD), a Blu-ray disk, etc. including the software and/or firmware. Example storage devices and/or storage disks may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Further still, the example optimizing circuitry 2630 of FIG. 26C may include one or more elements, processes and/or devices in addition to, or instead of, those illustrated in FIG. 26C, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 27:
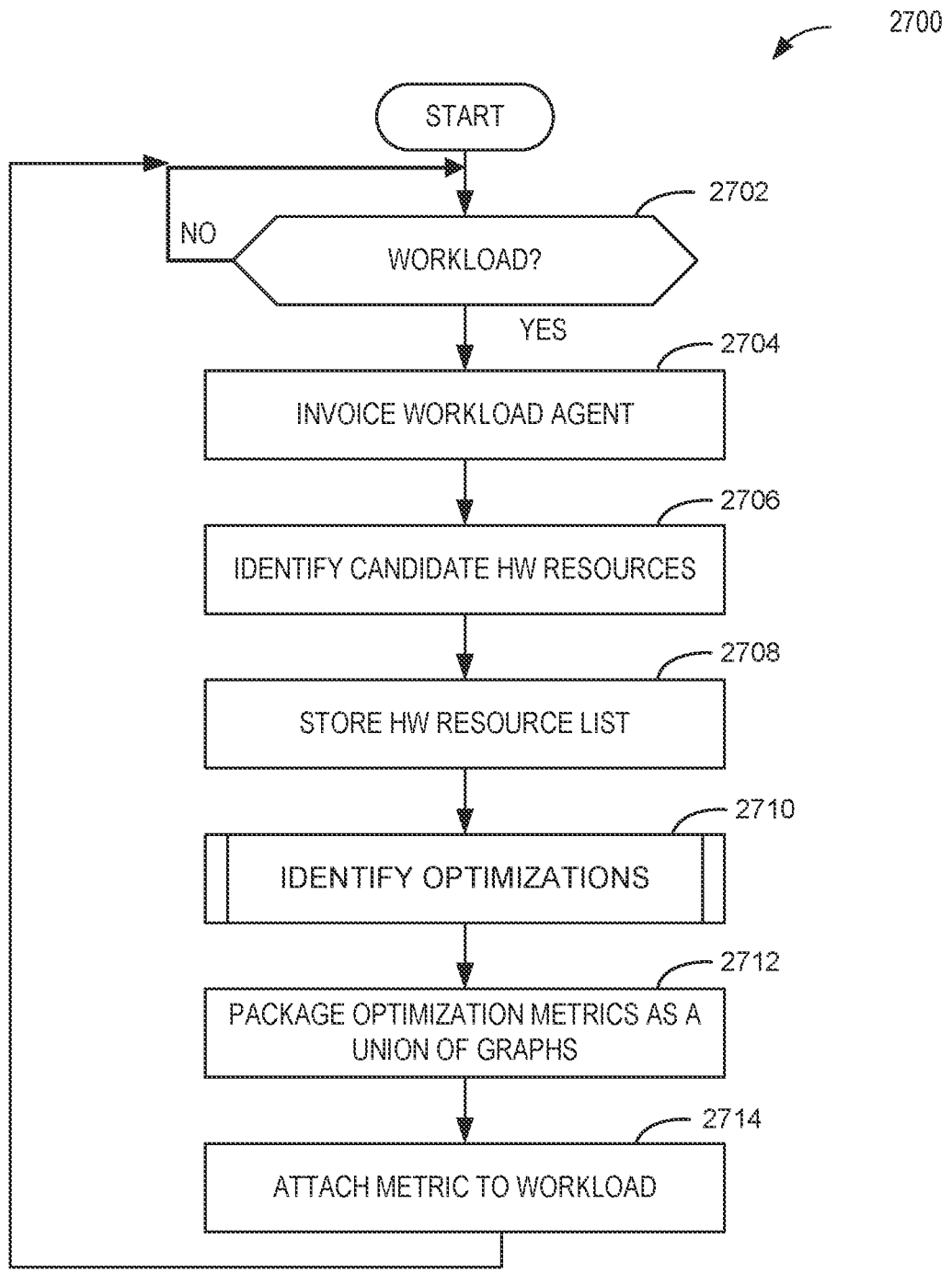
Figure 28:
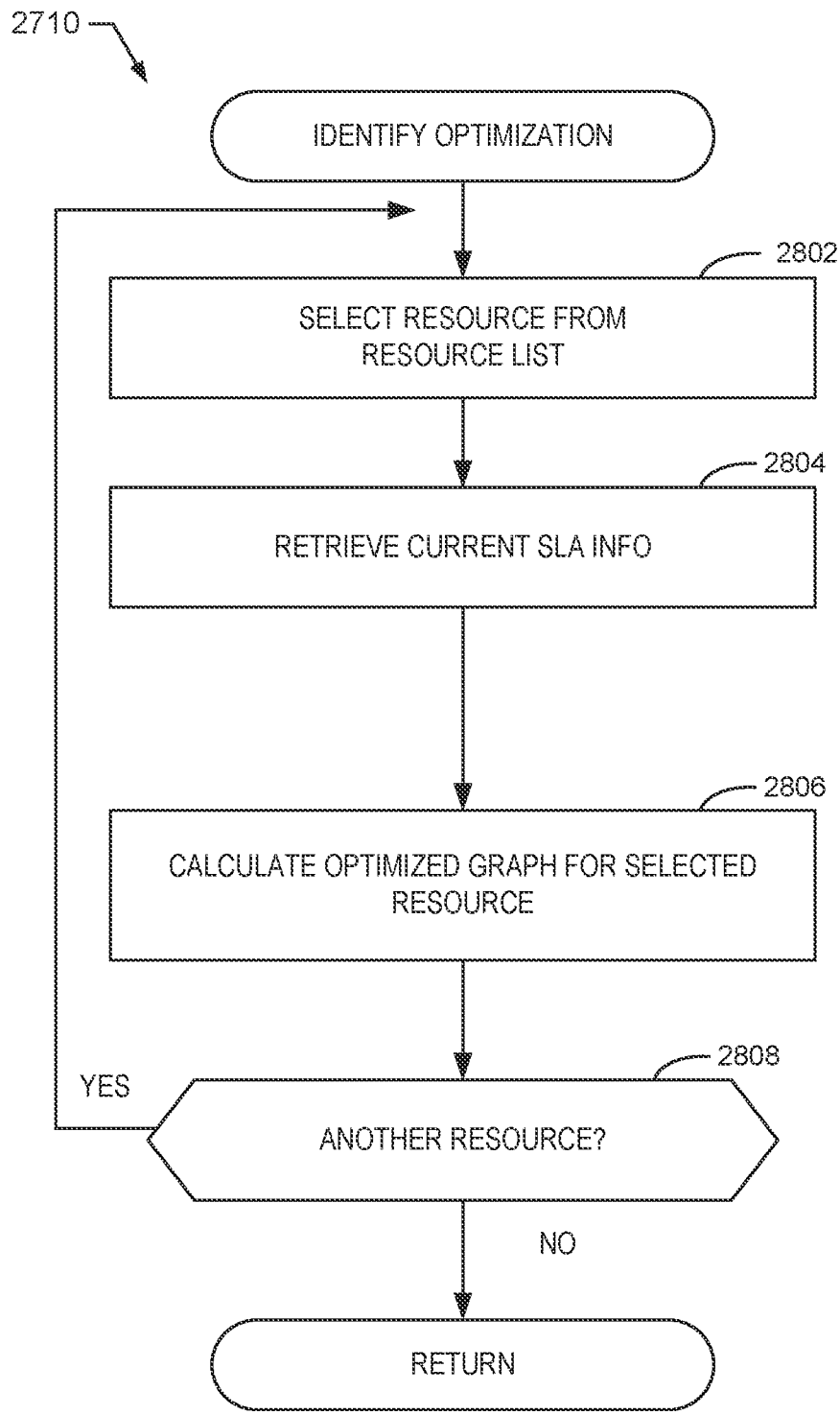
Figure 29:
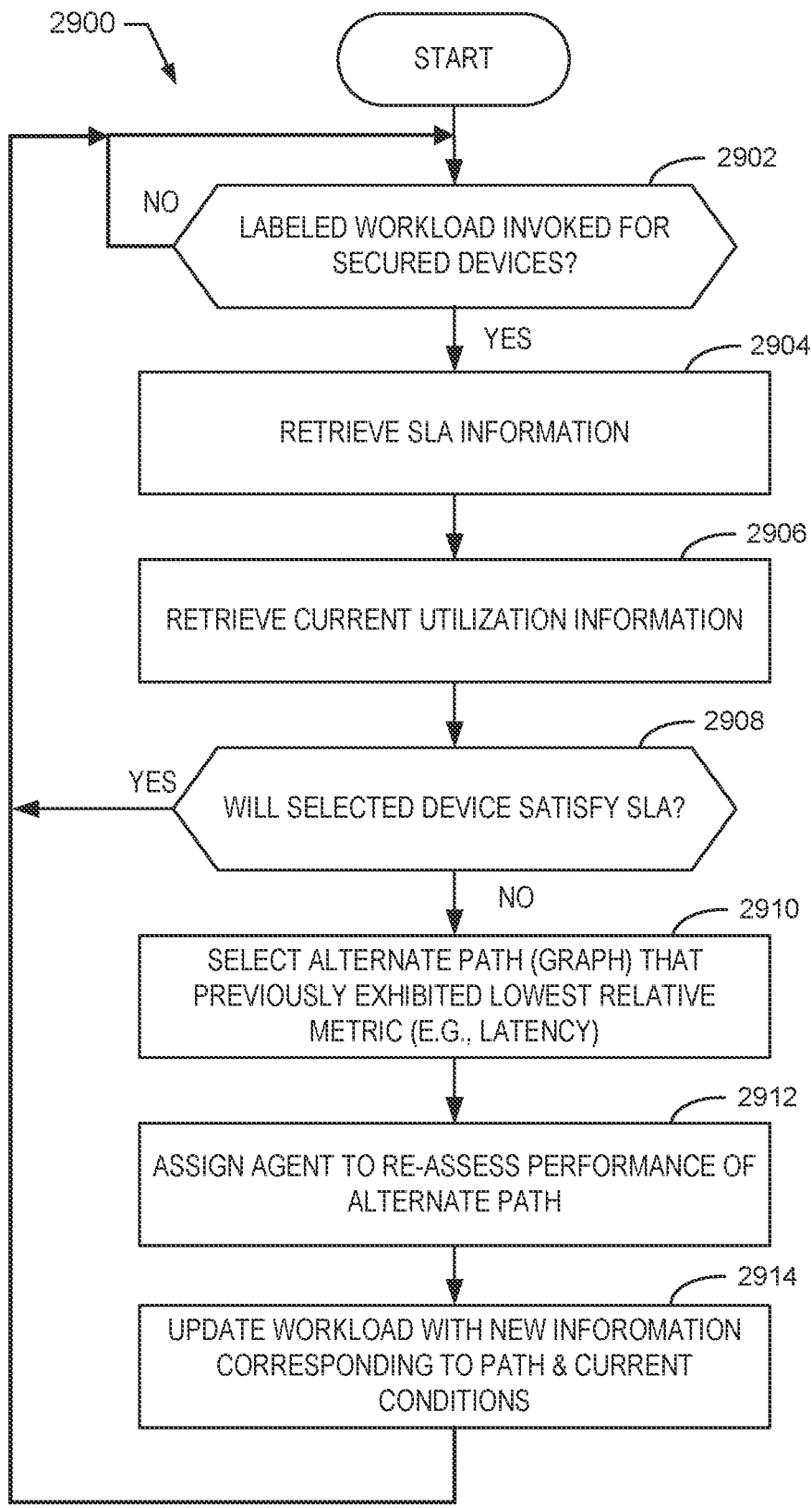

Flowcharts representative of example hardware logic, machine-readable instructions, hardware implemented state machines, and/or any combination thereof for implementing the optimizing circuitry 2630 of FIG. 26C is shown in FIGS. 27 through 29. The machine-readable instructions may be one or more executable programs or portion(s) of an executable program for execution by a computer processor and/or processor circuitry, such as the processor 452 shown in the example processor platform 450 discussed above in connection with FIG. 4B. The program may be embodied in software stored on a non-transitory computer readable storage medium such as a CD-ROM, a floppy disk, a hard drive, a DVD, a Blu-ray disk, or a memory associated with the processor 452, but the entire program and/or parts thereof could alternatively be executed by a device other than the processor 452 and/or embodied in firmware or dedicated hardware. Further, although the example program is described with reference to the flowcharts illustrated in FIGS. 27 through 29, many other methods of implementing the example optimizing circuitry 2630 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described throughout this disclosure may be stored in one or more of a compressed format, an encrypted format, a fragmented format, a compiled format, an executable format, a packaged format, etc. Machine-readable instructions as described herein may be stored as data or a data structure (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine-readable instructions disclosed throughout this disclosure may be stored in a state in which they may be read by processor circuitry, but require addition of a library (e.g., a dynamic link library (DLL)), a software development kit (SDK), an application programming interface (API), etc. to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described throughout this document can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 27 through 29 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 2700 of FIG. 27 includes block 2702, where the example reconfiguration managing circuitry 2638 determines whether a workload has been detected for which optimization efforts have not yet occurred. If not, the example reconfiguration managing circuitry 2638 continues to wait for such an instance. However, in response to the example reconfiguration managing circuitry 2638 detecting a workload to be analyzed (block 2702), the example agent managing circuitry 2640 invokes a workload agent to be associated and/or otherwise assigned with the workload evaluation (e.g., training) (block 2704). The example reconfiguration managing circuitry 2638 identifies candidate hardware resources (block 2706), such as those communicatively connected via an Edge network, and stores such candidate resources in a storage (e.g., a database, memory) (2708) for later reference and consideration.

In connection with available hardware resources identified by the example reconfiguration managing circuitry 2638 (block 2706) and/or such resources stored in the storage, the example agent managing circuitry 2640 calculates and/or otherwise determines optimizations (block 2710). Example FIG. 28 discloses further detail in connection with calculating optimizations of block 2710. In the illustrated example of FIG. 28, the example agent managing circuitry 2640 selects a candidate resource from the resource list (block 2802) and the example SLA managing circuitry 2634 retrieves current SLA information associated with the workload (block 2804). The example hyper parameter tuning circuitry 2636 calculates an optimized graph for the selected resource (block 2806). The example agent managing circuitry 2640 determines whether there is another candidate resource to consider for optimization calculations (block 2808) and, if so, control returns to block 2802). Otherwise, control returns to the illustrated example of FIG. 27.

Returning to FIG. 27, the example benchmark managing circuitry 2632 packages the optimization metrics as a union of graphs (block 2712, and the example benchmark managing circuitry 2632 attaches the union of graphs to the workload (block 2714) so that dynamic decisions may occur in real time during an inference/runtime phase of the workload.

FIG. 29 illustrates an example program 2900 to optimize a workload during runtime conditions. In the illustrated example of FIG. 29, the example workload activity detecting circuitry 2642 monitors a platform for whether a labelled workload (e.g., a workload containing a union of graphs) has been invoked (block 2902). If so, the example SLA managing circuitry 2634 retrieves current SLA information (block 2904). The example reconfiguration managing circuitry 2638 retrieves current utilization information for the computing resources associated with the above-identified workload invocation (block 2906). The example SLA managing circuitry 2634 determines whether the currently identified computing resources will satisfy the current SLA parameters (block 2908) and, if so, no further model adjustments are needed and control returns to block 0902. However, in the event of deviations from the SLA parameters, the example reconfiguration managing circuitry 2638 selects an alternate path (e.g., alternate graph) that exhibits predicted SLA compliance to a threshold margin (block 2910). Considering that one or more conditions have changed, the example agent managing circuitry 2640 assigns another agent to re-assess performance of the selected alternate path (block 2912). The example benchmark managing circuitry 2632 updates the workload with new information corresponding to the newly selected path and the current conditions (block 2914).

Example methods, apparatus, systems, and articles of manufacture to optimize resources in Edge networks are disclosed herein. Further examples and combinations thereof include the following: Example 67 includes an apparatus comprising at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to invoke an exploration agent to identify platform resource devices, select a first one of the identified platform resource devices, generate first optimization metrics for the workload corresponding to the first one of the identified platform resource devices, the first optimization metrics corresponding to a first path, embed first semantic information to the workload, the first semantic information including optimized graph information and platform structure information corresponding to the first one of the identified platform resource devices, select a second one of the identified platform resource devices, generate second optimization metrics for the workload corresponding to the second one of the identified platform resource devices, the second optimization metrics corresponding to a second path, embed second semantic information to the workload, the second semantic information including optimized graph information and platform structure information corresponding to the second one of the identified platform resource devices, and select the first path or the second path during runtime based on (a) service level agreement (SLA) information and (b) utilization information corresponding to the first and second identified platform resource devices.

Example 68 includes the apparatus as defined in example 67, wherein the processor is to determine a utilization deviation corresponding to the first and second ones of the platform resource devices, compare the utilization deviation with the SLA information, and migrate the workload to one of the first path or the second path to satisfy at least one threshold of the SLA information.

Example 69 includes the apparatus as defined in example 67, wherein the SLA information includes at least one of latency metrics, power consumption metrics, resource cost metrics, or accuracy metrics.

Example 70 includes the apparatus as defined in example 67, wherein the processor circuitry is to determine a quantity of tenants participating with the identified platform resource devices when generating the first optimization metrics and the second optimization metrics.

Example 71 includes the apparatus as defined in example 70, wherein the processor circuitry is to embed information corresponding to the quantity of tenants with the first and second semantic information.

Example 72 includes the apparatus as defined in example 67, wherein the processor circuitry is to provide micropayments to a tenant in response to insufficient SLA requirements.

Example 73 includes At least one non-transitory computer readable storage medium comprising instructions that, when executed, cause at least one processor to at least invoke an exploration agent to identify platform resource devices, select a first one of the identified platform resource devices, generate first optimization metrics for the workload corresponding to the first one of the identified platform resource devices, the first optimization metrics corresponding to a first path, embed first semantic information to the workload, the first semantic information including optimized graph information and platform structure information corresponding to the first one of the identified platform resource devices, select a second one of the identified platform resource devices, generate second optimization metrics for the workload corresponding to the second one of the identified platform resource devices, the second optimization metrics corresponding to a second path, embed second semantic information to the workload, the second semantic information including optimized graph information and platform structure information corresponding to the second one of the identified platform resource devices, and select the first path or the second path during runtime based on (a) service level agreement (SLA) information and (b) utilization information corresponding to the first and second identified platform resource devices.

Example 74 includes the at least one computer readable storage medium as defined in example 73, wherein the instructions, when executed, cause the at least one processor to determine a utilization deviation corresponding to the first and second ones of the platform resource devices, compare the utilization deviation with the SLA information, and migrate the workload to one of the first path or the second path to satisfy at least one threshold of the SLA information.

Example 75 includes the at least one computer readable storage medium as defined in example 73, wherein the SLA information includes at least one of latency metrics, power consumption metrics, resource cost metrics, or accuracy metrics.

Example 76 includes the at least one computer readable storage medium as defined in example 73, wherein the instructions, when executed, cause the at least one processor to determine a quantity of tenants participating with the identified platform resource devices when generating the first optimization metrics and the second optimization metrics.

Example 77 includes the at least one computer readable storage medium as defined in example 76, wherein the instructions, when executed, cause the at least one processor to embed information corresponding to the quantity of tenants with the first and second semantic information.

Example 78 includes the at least one computer readable storage medium as defined in example 7, wherein the instructions, when executed, cause the at least one processor to provide micropayments to a tenant in response to insufficient SLA criteria.

Example 79 includes a method to optimize a workload, the method comprising invoking an exploration agent to identify platform resource devices, selecting a first one of the identified platform resource devices, generating first optimization metrics for the workload corresponding to the first one of the identified platform resource devices, the first optimization metrics corresponding to a first path, embedding first semantic information to the workload, the first semantic information including optimized graph information and platform structure information corresponding to the first one of the identified platform resource devices, selecting a second one of the identified platform resource devices, generating second optimization metrics for the workload corresponding to the second one of the identified platform resource devices, the second optimization metrics corresponding to a second path, embedding second semantic information to the workload, the second semantic information including optimized graph information and platform structure information corresponding to the second one of the identified platform resource devices, and selecting the first path or the second path during runtime based on (a) service level agreement (SLA) information and (b) utilization information corresponding to the first and second identified platform resource devices.

Example 80 includes the method as defined in example 79, further including determining a utilization deviation corresponding to the first and second ones of the platform resource devices, comparing the utilization deviation with the SLA information, and migrating the workload to one of the first path or the second path to satisfy at least one threshold of the SLA information.

Example 81 includes the method as defined in example 79, wherein the SLA information includes at least one of latency metrics, power consumption metrics, resource cost metrics, or accuracy metrics.

Example 82 includes the method as defined in example 79, wherein generating the first optimization metrics and the second optimization metrics further includes determining a quantity of tenants participating with the identified platform resource devices.

Example 83 includes the method as defined in example 82, further including embedding information corresponding to the quantity of tenants with the first and second semantic information.

Example 84 includes the method as defined in example 79, further including providing micropayments to a tenant in response to detecting insufficient SLA parameters.

Example 85 includes an apparatus comprising agent managing circuitry to invoke an exploration agent to identify platform resource devices, select a first one of the identified platform resource devices, generate first optimization metrics for the workload corresponding to the first one of the identified platform resource devices, the first optimization metrics corresponding to a first path, and select a second one of the identified platform resource devices, and generate second optimization metrics for the workload corresponding to the second one of the identified platform resource devices, the second optimization metrics corresponding to a second path, benchmark managing circuitry to embed second semantic information to the workload, the second semantic information including optimized graph information and platform structure information corresponding to the second one of the identified platform resource devices, and reconfiguration managing circuitry to select the first path or the second path during runtime based on (a) service level agreement (SLA) information and (b) utilization information corresponding to the first and second identified platform resource devices.

Example 86 includes the apparatus as defined in example 85, wherein the reconfiguration managing circuitry is to determine a utilization deviation corresponding to the first and second ones of the platform resource devices, compare the utilization deviation with the SLA information, and migrate the workload to one of the first path or the second path to satisfy at least one threshold of the SLA information.

Example 87 includes the apparatus as defined in example 85, wherein the SLA information includes at least one of latency metrics, power consumption metrics, resource cost metrics, or accuracy metrics.

Example 88 includes the apparatus as defined in example 85, wherein generating the first optimization metrics and the second optimization metrics further includes determining a quantity of tenants participating with the identified platform resource devices.

Example 89 includes the apparatus as defined in example 88, wherein the benchmark managing circuitry is to embed information corresponding to the quantity of tenants with the first and second semantic information.

Example 90 includes a system comprising means for managing agents to invoke an exploration agent to identify platform resource devices, select a first one of the identified platform resource devices, generate first optimization metrics for the workload corresponding to the first one of the identified platform resource devices, the first optimization metrics corresponding to a first path, select a second one of the identified platform resource devices, and generate second optimization metrics for the workload corresponding to the second one of the identified platform resource devices, the second optimization metrics corresponding to a second path, means for managing benchmarks to embed second semantic information to the workload, the second semantic information including optimized graph information and platform structure information corresponding to the second one of the identified platform resource devices, and means for managing reconfigurations to select the first path or the second path during runtime based on (a) service level agreement (SLA) information and (b) utilization information corresponding to the first and second identified platform resource devices.

Example 91 includes the system as defined in example 90, wherein the means for managing reconfigurations is to determine a utilization deviation corresponding to the first and second ones of the platform resource devices, compare the utilization deviation with the SLA information, and migrate the workload to one of the first path or the second path to satisfy at least one threshold of the SLA information.

Example 92 includes the system as defined in example 90, wherein the SLA information includes at least one of latency metrics, power consumption metrics, resource cost metrics, or accuracy metrics.

Example 93 includes the system as defined in example 90, wherein generating the first optimization metrics and the second optimization metrics further includes determining a quantity of tenants participating with the identified platform resource devices.

Example 94 includes the system as defined in example 93, wherein the means for managing benchmarks is to embed information corresponding to the quantity of tenants with the first and second semantic information.

Example ID5(A) is the apparatus of any of examples 67-72, further including: in response to detecting a target resource is incapable of satisfying the SLA, selecting an alternate path corresponding to a next satisfied metric.

Example ID5(B) is the apparatus of example ID5(A), wherein the next satisfied metric is at least one of a next lowest latency or a next greatest accuracy.

Example ID5(C) is the computer-readable storage medium of any of examples 73-78, further including selecting an alternate path corresponding to a next satisfied metric in response to detecting a target resource is incapable of satisfying the SLA.

Example ID5(D) is the computer-readable storage medium of example ID5(C), wherein the next satisfied metric is at least one of a next lowest latency or a next greatest accuracy.

Dynamic Model Adaptation (ID3)

In examples disclosed herein, a computing environment includes one or more processor cores that execute one or more workloads, such as, but not limited to, an artificial intelligence (AI) model. The example computing environment includes multiple tenants structured to run on the processor cores. During execution, an AI model (e.g., a neural network, a decision tree, a Naïve Bayes classifier, etc.) uses resources of a computing device such as cache and memory. However, these resources are limited in that cache (e.g., last level cache (LLC), level three (L3), level four (L4), etc.) is limited to an amount of cache space (e.g., kilobytes, megabytes, etc.) in a processor, and memory (e.g., kilobytes, megabytes, gigabytes, etc.) is limited to an amount of bandwidth (e.g., a rate of data transfer in units of megabytes per second) available to access the memory (e.g., due to read/write access speeds of the memory, due to speed of a memory bus between the processor and the memory, etc.). The amount of cache space and memory bandwidth available to the AI model directly affects the quality of service (QoS) for the AI model. When a computing device or computing node runs multiple AI models for multiple tenants in a multi-tenant computing environment, the AI models share the available cache space and memory bandwidth of the computing device or computing node. When a computing device or computing node runs multiple AI workloads and non-AI workloads, the AI models share the available cache space and memory bandwidth with the non-AI workloads and the other AI models.

However, a lack of coordination between the AI models on how to share such resources makes it difficult or impossible to maintain suitable QoS levels across the multiple AI models. Examples disclosed herein use a model-based approach to dynamically adapt resource availability across multiple AI models in a computing environment to maintain QoS at suitable levels (e.g., according to service level agreements (SLAs)) to improve execution performance across the multiple AI models in a multi-tenant computing system.

Examples disclosed herein generate a resource utilization model which includes generating any number of candidate models (e.g., runtime models) with varying resource utilization to determine how to allocate resources to different workloads (e.g., AI models) using a rewards-based system. Generally speaking, a given workload typically involves numerous models to be invoked to accomplish computation objectives. Of course, depending on available resources, particular combinations of these models (e.g., all of which can contribute to the computational objectives) perform better or worse. In other examples, underlying computational resources (e.g., logically grouped as a number of nodes) are utilized based on workload demands, in which different tenants make particular demands on the available nodes. Proper selection of these one or more candidate models is useful in many ways to improve performances of workload execution. In addition, this can be used to substantially reduce or eliminate noisy neighbor issues in cloud environments. A noisy neighbor is a tenant of a cloud computing system that monopolizes a large amount of resources, sometimes to the detriment of other tenants.

Figure 14:
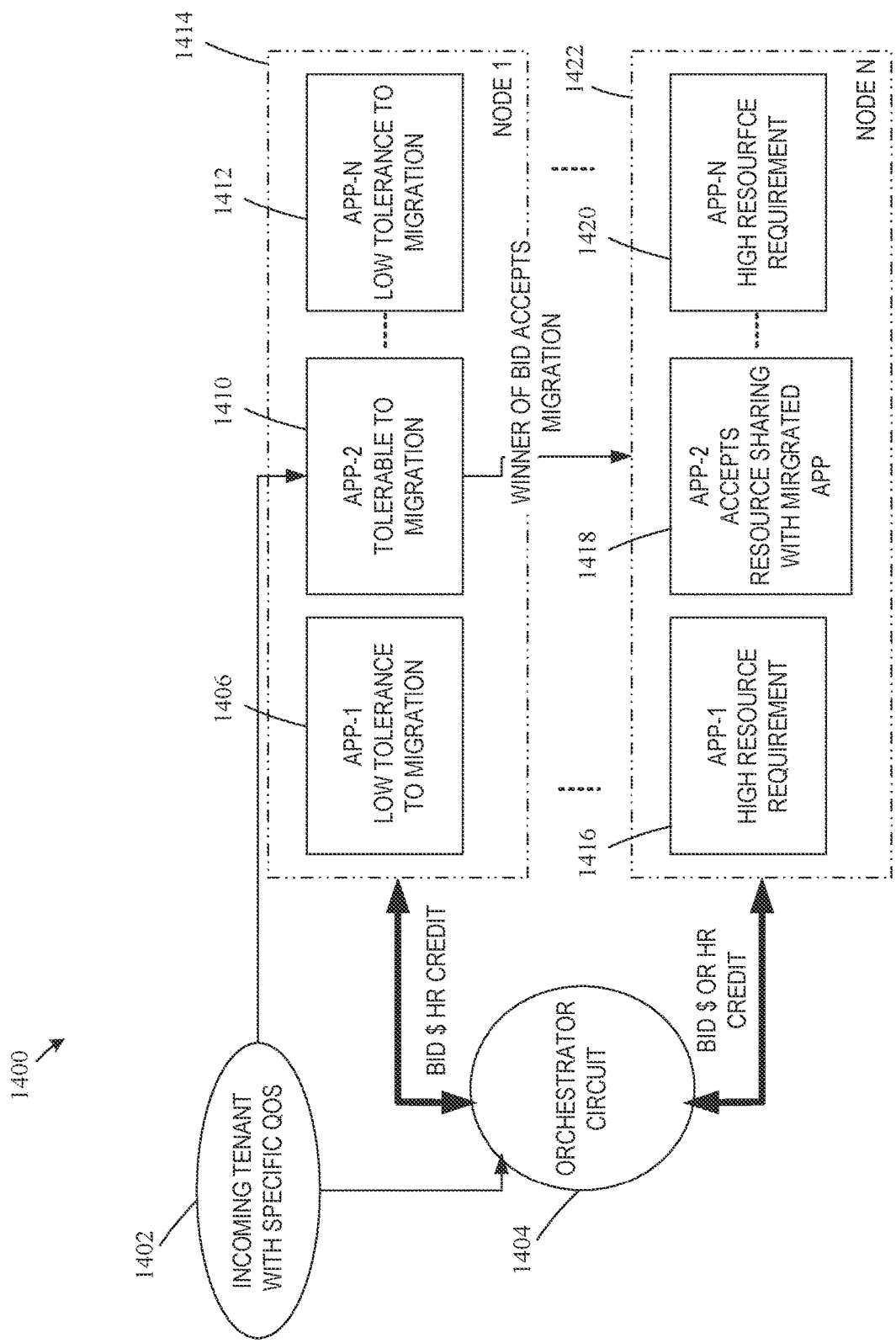
FIG. 14 is a block diagram of an example environment including an example orchestrator and a plurality of multi-core computing nodes executing artificial intelligence (AI) models.

FIG. 14 is an example environment 1400 with an example tenant 1402, an example orchestrator circuit 1404, a first node 1414, and a second node 1422. The example first node ID3_114 includes a plurality of workloads. As used herein, a workload may be an instance, a number of applications, a number of artificial intelligence models, etc. The example first node 1414 includes a first workload 1406, a second workload 1410, and a third workload 1412 (e.g., an $n^{th}$ workload). The example second node 1422 includes a fourth workload 1416, a fifth workload 1418, and a sixth workload 1420 (e.g., an $n^{th}$ workload).

The example orchestrator circuit 1404 is to place the workloads between the different nodes of the edge network, based on resource utilization data. For example, resource utilization data may be cache size and/or memory bandwidth. Some of the example workloads (e.g., second workload 1410) may be tolerable to migration, wherein the example orchestrator circuit 1404 may migrate the workload from the first node to a second node. In some examples, the development and/or execution of the artificial intelligence models is altered based on the other workloads operating on the nodes. To illustrate, if an example node has a total of ten ("10") gigabytes of cache, and an example first workload requires 7 gigabytes, an example second workload may perform at a first level of accuracy (e.g., 95%) with a five ("5") gigabytes of cache, and the second workload may perform at a second level of accuracy (e.g., 90%) with three ("3") gigabytes of cache. To accomplish these optimizations, the example orchestrator (as discussed in further detail below) negotiates with the second workload to reduce the cache requirement of the second workload to include the first workload (which requires 7 gigabytes) and the second workload (which requires between 3-5 gigabytes) on the node which has a total of 10 gigabytes of available cache.

In some examples, the orchestrator circuit 1404 negotiates with the example nodes (e.g., first node 1414, a second node 1422) or the example workloads (e.g., first workload 1406, second workload 1410, fifth workload 1418, etc) with any type of incentive (e.g., money credit, a time-based credit to allow resource utilization, etc.).

In the example of 1400, an incoming tenant 1402 has a new workload to execute. The new workload has specific quality of service (QoS) requirements which the example orchestrator circuit 1404 utilizes to determine which node to execute the new workload.

Figure 15:
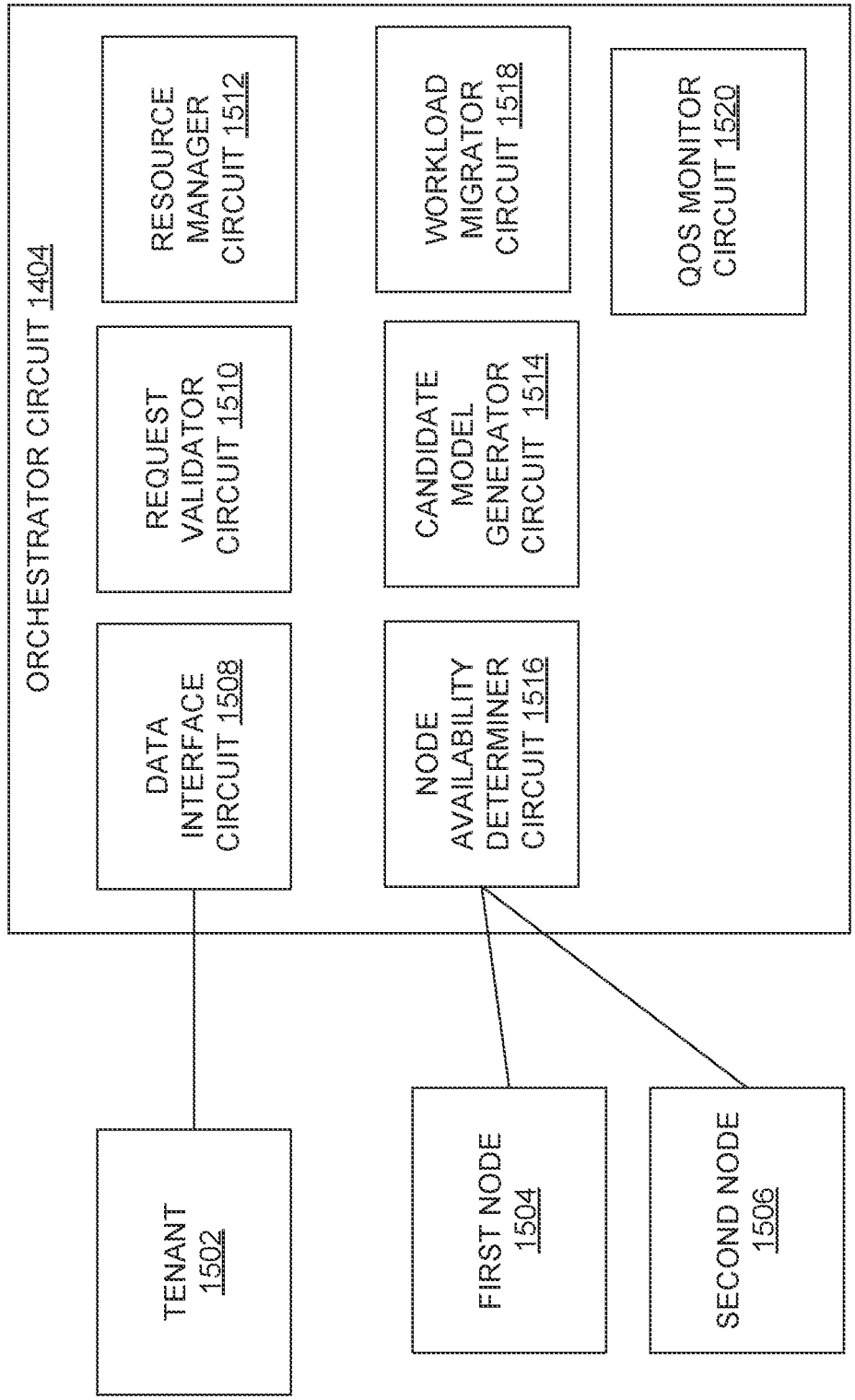
FIG. 15 is a block diagram of the example orchestrator of FIG. 14.

FIG. 15 is a block diagram of the example orchestrator circuit 1404. The example orchestrator circuit 1404 includes an example data interface circuit 1508, an example request validator circuit 1510, an example resource manager circuit 1512, an example node availability determiner circuit 1516, an example candidate model generator circuit 1514, an example workload migrator circuit 1518, and an example quality of service (QoS) monitor circuit 1520. The example orchestrator circuit 1404 is in communication with an example tenant 1402, an example first node 1504 of an edge network, and an example second node 1506 of an Edge network.

The example data interface circuit 1508 receives a request for a new workload from the tenant 1502. The new workload from the tenant 1502 includes specific quality of service requirements such as the quality of service may be a function of frequency, cache, memory bandwidth, power, deep learning (DL) precision (e.g., INT8, BF16), DL model characteristics, and/or migration-tolerance.

The example request validator circuit 1510 is to determine if the request from the tenant 1502 is a legitimate request. The request validator circuit 1510 may determine if the request is legitimate based on provisioned policies with revocation list (e.g., by an orchestrator) or data center fleet administrator(s).

The example resource manager circuit 1512 is to monitor the nodes of the edge network (e.g., a first node 1504, a second node 1506). The example resource manager circuit 1512 may determine the cache size and memory bandwidth availability of the nodes and determine the workloads currently running on the nodes.

The example node availability determiner circuit 1516 negotiates with the example nodes to determine availability for a new workload. The negotiation may include money credit or time credit.

The functionality of the example candidate model generator circuit 1514 may be implemented in the example node or may be implemented in the example orchestrator. The example candidate model generator circuit 1514 is to generate, for a first artificial intelligence model, a plurality of candidate models with varying resource utilization (e.g., a first candidate model may use a small amount of cache while a second candidate model may use a large amount of cache). The example resource manager may use a resource utilization model which tracks the various inferencing accuracy of the different candidate models, generated by the candidate model generator circuit 1514, with different cache size requirements.

The example workload migrator circuit 1518 is to determine to migrate (e.g., relocate, move) a workload from an example first node 1504 to an example second node 1506.

The example QoS monitor circuit 1520 is to determine the quality of service of the workloads over time, and in response to a significant drop in quality of service, trigger a migration with the example resource manager circuit 1512.

Figure 16:
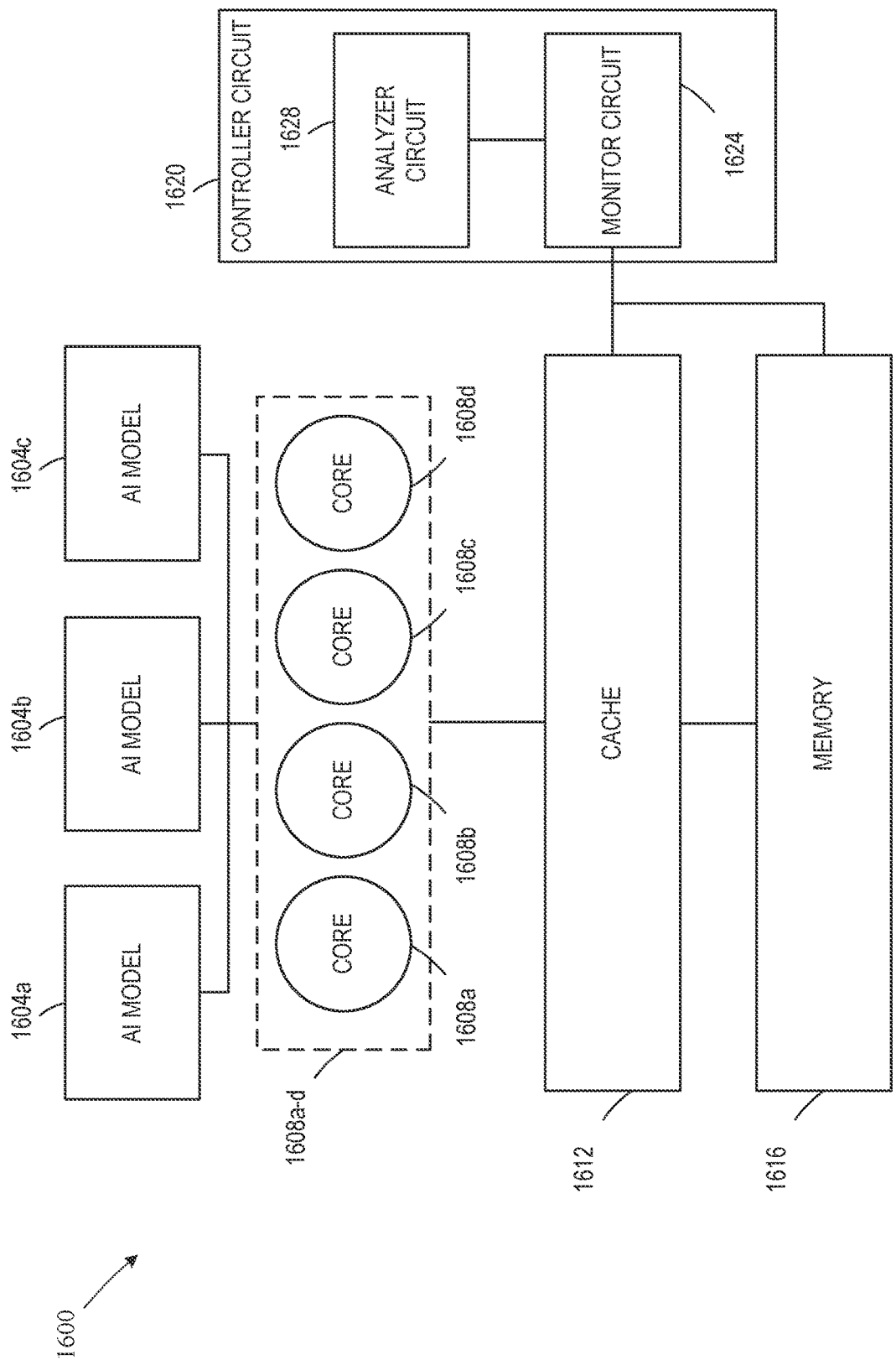
FIG. 16 is a block diagram of an example multi-core computing node executing AI models and utilizing a controller.

FIG. 16 is a block diagram of an example multi-core computing node 1600 (e.g., a computer, a host server, a gateway, etc.) executing multiple AI models 1604*a-c*. The example multi-core computing node 1600 includes multiple cores 1608*a-d* which execute the AI models 1604*a-c*. In some examples, the AI models 1604*a-c* execute within a sandbox environment on the multi-core computing node 1600. A sandbox environment is a security mechanism that separates running programs in an attempt to mitigate system failures and/or software vulnerabilities from spreading. Executing the AI models 1604*a-c* in a sandbox environment allows the multi-core computing node 1600 much more control over the resources the AI models 1604*a-c* can access. The resources may include cache space and/or memory bandwidth. Although three AI models 1604*a-c* and four processing cores 1608*a-d* are shown, examples disclosed herein may be implemented using any other number of AI models and/or any other number of cores. In examples disclosed herein, the AI models 1604*a-c* may be any AI models or programs (e.g., neural networks, decision trees, Naïve Bayes classifiers, etc.). The example multi-core computing node 1600 determines which ones of the cores 1608*a-d* execute ones of the AI models 1604*a-c*. The example multi-core computing node 1600 includes cache 1612 and memory 1616 that may be allocated to the multiple cores 1608*a-d* to execute ones of the AI models 1604*a-c*. The example cache 1612 may be last level cache (LLC) or any other cache for use by the multiple cores 1608*a-d*. The example memory 1612 may be dynamic random access memory (DRAM), synchronous DRAM (SDRAM), static random access memory (SRAM), and/or any other type of memory suitable for use as system memory shared by all of the cores 1608*a-d*. In some examples, space on the cache 1612 and bandwidth for the memory 1616 allocated to ones of the AI models 1604*a-c* may not be sufficient for that AI model 1604*a-c* to execute at an acceptable performance or may be underutilized when an excessive amount of those resources are allocated to ones of the AI models 1604*a-c*. To improve performance related to cache space and memory bandwidth, examples disclosed herein provide an example controller 1620 to monitor resource utilizations of the cache 1612 and the memory 1616 and determine whether to modify allocations of cache size and/or memory bandwidth across the AI models 1604*a-c*.

The example controller 1620 may be an artificial intelligence or machine learning system. In examples disclosed herein, the controller 1620 utilizes a neural network architecture to generate a resource utilization model for an AI model 1604*a-c* that tracks the resource utilization of the AI model. For example, the controller may generate candidate models with varying resource utilization corresponding to the AI model. For example, the resource utilization model that tracks the resource utilization of the AI model 1604*a* may include a first candidate AI model 1712*a* of FIG. 17, a second candidate AI model 1712*b* of FIG. 17, and the third candidate AI model 1712*c* of FIG. 17. The example controller 1620 may use reinforcement learning techniques to better optimize resource utilization models relative to situations where the reinforcement learning techniques are not used. The example controller 1620 may also utilize a differential approach. In a differential approach, the controller 1620 may contain either a supergraph and/or a supernetwork to create a path in the neural network architecture.

The example controller 1620 includes an example monitor circuit 1624 and an example analyzer circuit 1628. The example monitor circuit 1624 collects resource utilization data about the cache 1612 and the memory 1616. The resource utilization data collected by the example monitor circuit 1624 includes, but is not limited to, space utilization of the cache 1612, space utilization of the memory 1616, and bandwidth utilization of the memory 1616. In examples disclosed herein, the bandwidth of the memory 1616 indicates how fast data may be accessed in the memory 1616. The example monitor circuit 1624 provides the collected resource utilization data for access by the analyzer circuit 1628. The example monitor circuit 1624 periodically or aperiodically collects statistics about the cache 1612 and the memory 1616 to perform ongoing analyses of space and bandwidth utilizations and allocations. In some examples, the controller 1620 modifies the generation of specific candidate models and/or the generation of the overarching resource utilization model based on performance of a previously generated candidate models. In these examples, the performance of a candidate model is based on actual data access latency (e.g., pertaining to memory bandwidth) and/or cache inferencing accuracy (e.g., pertaining to cache size) of the candidate model when compared to the expected latency and/or accuracy of the candidate model.

The example analyzer circuit 1628 accesses the collected resource utilization data to generate candidate models representative of different space utilizations of the cache 1612 across the multiple AI models 1604*a-c* and different bandwidth utilizations of the memory 116 across the multiple AI models 1604*a-c*. As such, the resource generation models track candidate models, define (e.g., set, track, instantiate) cache space utilization parameter values and memory bandwidth utilization parameter values for the AI model 1604*a-c*. The cache space utilization parameter defines how much space in the cache 1612 ones of the AI models 1604*a-c* may utilize which determines the plurality of candidate models that may be generated according to the cache space utilization parameter. The memory bandwidth utilization parameter values define how much bandwidth of the memory 1616 ones of the AI models 1604*a-c* may utilize, which determines the plurality of candidate models that may be generated according to the memory bandwidth. For example, if the cache space utilization parameter is a minimum value of two ("2"), a candidate model that uses a cache space value of one ("1") is not generated. The example analyzer circuit 1628 may generate multiple candidate models for the AI models 1604*a-c* to analyze different combinations of cache space utilization values and memory bandwidth utilization values to achieve target QoS levels for the AI models 1604*a-c*. The example analyzer circuit 1628 selects one or more of the multiple candidate models to invoke on the cache 1612 and the memory 1616.

In some examples, the analyzer circuit 1628 selects a candidate model based on a comparison of expected resource utilization and actual resource utilization. For example, after resource allocations of a previously selected candidate model are applied in executing the AI models 1604*a-c*, the example monitor circuit 1624 collects subsequent actual resource utilization data corresponding to the running AI models 1604*a-c*. In addition, the example analyzer circuit 1628 generates subsequent candidate models and corresponding expected resource utilization data to continue analyzing QoS levels and modifying cache space and memory bandwidth allocations across the AI models 1604*a-c* to maintain suitable QoS levels. During such subsequent analyses, the analyzer circuit 1628 compares expected resource utilization data to actual resource utilization data. In this manner, the analyzer circuit 1628 can select a subsequent candidate model that will more closely satisfy the cache space and memory bandwidth needs of the AI models 1604a-c to replace the currently running AI model.

Figure 17:
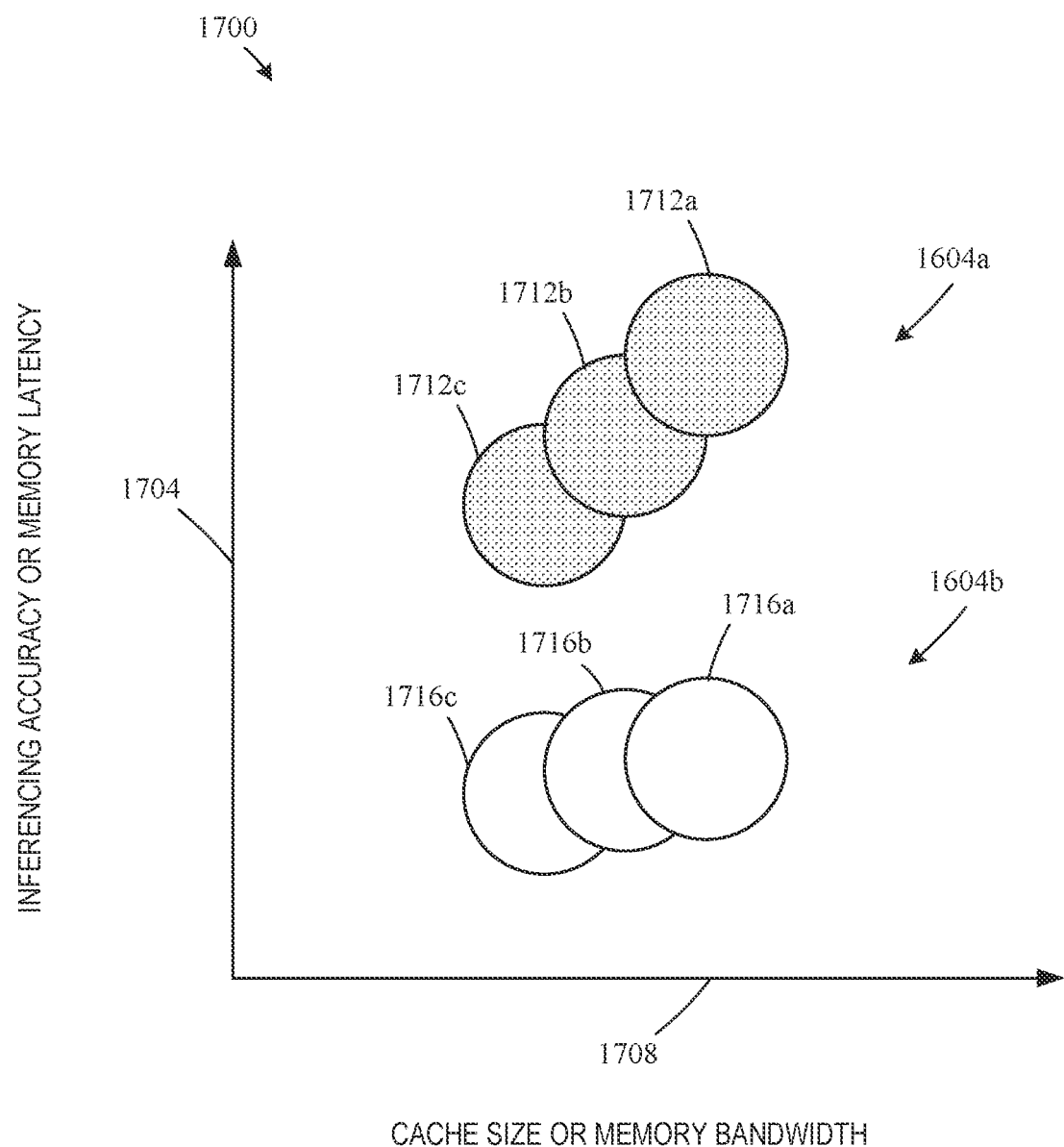
FIG. 17 is an example performance map of candidate models with varying cache size and memory bandwidth utilization.

FIG. 17 is an example performance map 1700 of generated candidate models (e.g., runtime models). The candidate models vary in cache size and/or memory bandwidth utilization. Although examples disclosed herein are described based on cache space and memory bandwidth resources, examples disclosed herein may be implemented with other types of resources including hardware-level resources, operating system-level resources, network resources, etc. In addition, types of resources for analyses may be fixed (e.g., unchangeable) or may be user-selectable and/or system-selectable (e.g., selected by artificial intelligence, selected by a program, selected based on a configuration file, etc.).

In other examples, candidate models may additionally or alternatively be generated to analyze performance tradeoffs between different device types for executing workloads. For example, additional performance maps and/or axes data may be generated to show comparative views of different device types selectable to execute workloads. In such examples, the analyzer circuit 1628 may generate candidate models and expected resource utilization data for a workload executed using central processing unit (CPU) versus the workload executed using a graphics processing unit (GPU). In this manner, the example analyzer circuit 1628 may facilitate selecting a candidate model to allocate resources and/or select different types of resources to execute workloads. Examples of different types of resources for which candidate models may be generated include, but are not limited to, GPUs, CPUs, and/or cross-architecture processing units (XPUs), etc.

Turning to FIG. 17, the Y-axis 1704 of the example performance map 1700 represents inferencing accuracy or memory latency, and the x-axis 1708 represents cache size or bandwidth usage of candidate models 1712a-c, 1716a-c. The candidate models 1712a-c, 1716a-c are for two AI models 1704a-c executing on a multi-core computing node 1600. In this example, the candidate models 1712a-c (that show varying resource utilization) are generated for an AI model 1604a, and the candidate models 1716a-c (that show varying resource utilization) are generated for an AI model 1604b. The example performance map 1700 shows a combined representation of cache inferencing accuracy performance versus cache size and memory latency performance versus memory bandwidth. In some examples, the performance values can be normalized along the y-axis 1704 and the cache and bandwidth utilization values can be normalized along the x-axis 1708 so that impacts on performances for different combinations of cache size and memory bandwidth can be simultaneously shown in a single graph or performance map. Alternatively, two separate performance maps can be generated. In such examples, one performance map can show cache inferencing accuracy performance versus cache size, and another performance map can show memory latency performance versus memory bandwidth.

In examples disclosed herein, cache inferencing accuracy performance represents how often information in cache is used or accessed by subsequent instructions (e.g., cache hits). For example, a larger cache size accommodates caching more information. As such, a processing core can load more information into cache from memory based on inferences that such information will be subsequently accessed. The larger a cache size, the more likely that inferentially loaded information in cache will result in a cache hit. In examples disclosed herein, memory latency performance represents the amount of time it takes to retrieve information from memory. As memory bandwidth increases, memory latency performance improves (e.g., latency decreases).

The example analyzer circuit 1628 generates expected resource utilization data for cache size and memory bandwidth for the candidate models 1712a-c, 1716a-c. In some examples, the analyzer circuit 1628 selects the candidate model 1712a based on the expected resource utilization data. In such examples, the selected candidate model 17a may be selected based on its expected resource utilization data satisfying a desired performance for the AI model 1604a.

In some examples, the analyzer circuit 1628 may select the candidate model 1712a for the AI model 1704a because the candidate model 1712a satisfies a desired inferencing accuracy performance for the AI model 1604a. In other examples, the analyzer circuit 1628 may select the candidate model 1712a for the AI model 1604a because the candidate model 1712a satisfies a desired memory latency for the AI model 1604a.

In some examples, the analyzer circuit 1628 may run two AI models, and select the candidate model 1712a and the candidate model 1716c. The selection of models 1712a and 1716c rewards the AI model that utilizes either cache size or memory bandwidth more effectively.

This example is written in terms of analyzing cache space, but memory bandwidth may be tracked similarly. In the example of FIG. 17, the analyzer circuit 1628 generates three candidate models for the first artificial intelligence model 1604a with a low cache variant model 1716c (e.g., a first candidate model 1716c), a medium cache variant model 1716b (e.g., a second candidate model 1716b), and a high cache variant model 1716a (e.g., a third candidate model 1716a). In the example of FIG. 17, the analyzer circuit 1728 generates three candidate models from the second artificial intelligence model 1604b with a low cache variant model 1716c (e.g., a first candidate model 1716c), a medium cache variant model 1716b (e.g., a second candidate model 1716ba, and a high cache variant model 1716a (e.g., a third candidate model 1716a). In the example of FIG. 17, the analyzer circuit 1628 determines that there is not a significant (e.g., drastic, according to a threshold) improvement (e.g., increase) in inferencing accuracy or memory latency due to the increase from the lower cache variants to the higher cache variants for the candidate models 1716a-c corresponding to the AI model 1604b. In the example of FIG. 17, the analyzer circuit 1628 determines that there is a significant improvement (e.g., increase) in inferencing accuracy or memory latency due to the increase from the lower cache variants to the higher cache variants for the candidate models 1712a-c corresponding to the AI model 1604a. The slope (e.g., the accuracy over cache size or memory bandwidth) for the improvement of the artificial intelligence model 1604b is lower than the slope for the improvement of the artificial intelligence model 1604a. Based on the limited cache space, the analyzer 1628 may determine to not reward the artificial intelligence model 1604b and not select the candidate model 1716a to run, because the example AI model 1604a is able to utilize the additional cache more effectively than the example AI model 1604b. In some examples, the resource generation model may be thought of as a function, wherein, for a specific model, an input of cache size on the axis 1708 has a corresponding output of inferencing accuracy or memory latency. The resource generation model may describe how a given artificial intelligence model may respond to varying cache sizes.

In the example of FIG. 17, the example analyzer circuit 1628 may select the candidate model with the better resource utilization for memory bandwidth and inferencing accuracy or memory latency. As described above, such selections may be based on comparing a slope of the first group of candidate models (1604a) to a slope of the second group of candidate models (1604b).

In other examples, the analyzer circuit 1628 may generate candidate models for more than one of the AI models 1604a-c at a time. In these examples, the analyzer circuit 1628 may select a candidate model for the AI models 1604a-c based on optimization rules. For example, the candidate models 1716a-c are generated for the AI model 1604b, and the candidate models 1712a-c are generated for the AI model 1604a. In this example, the candidate model 1716a has the highest bandwidth usage 1708 and the candidate model 1716c has the lowest bandwidth usage 1708.

In some examples, the example analyzer circuit 1628 selects a candidate model 1716a-c to invoke without comparing to another candidate model 1712a-c. In such examples, the analyzer circuit 1628 may select candidate model 1716a based on having the highest bandwidth usage 1708. In such examples, the analyzer circuit 1628 can select a candidate model based on the number of tenants in a multi-tenant computing environment. In some examples, the tenants may be other artificial intelligence models or may be non-AI workloads. In other examples, the analyzer circuit 1628 selects candidate models based on QoS needs and/or the performance map 1700. For example, the analyzer circuit 1628 may compare multiple sets of candidate models 1712a-c, 1716a-c and selects a candidate model 1712a-c, 1716a-c to optimize cache inferencing accuracy and/or memory latency. In such an example, the analyzer circuit 1628 may select the candidate model 1712a for the AI model 1604a and the candidate model 1716c for the AI model 1604b. In this example, the analyzer circuit 1628 selects the selected candidate models 1712a, 1716c as the latency difference between candidate model 1716a and candidate model 1716c is not as large as the latency difference between candidate model 1712a and candidate model 1712c.

If the example analyzer circuit 1628 has previously generated and selected a candidate model for the AI model 1604a-c, the analyzer circuit 1628 may compare recently collected resource utilization data with expected resource utilization data of other candidate models. The analyzer circuit 1628 may select a new candidate model based on the comparison.

Figure 18:
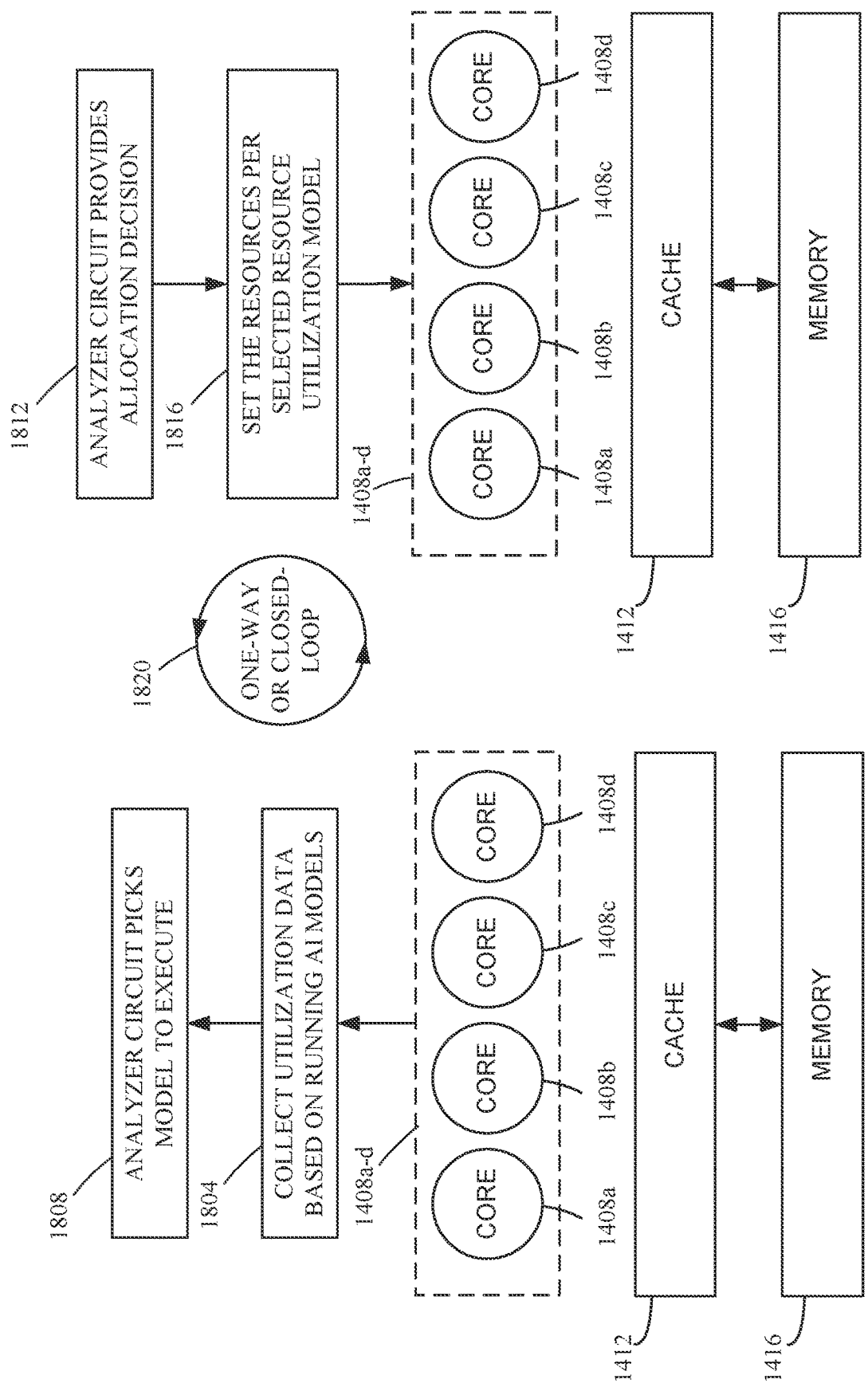
FIG. 18 is a block diagram of an example system flow for the multi-core computing node of FIG. 14.

FIG. 18 is a block diagram of an example system flow for the multi-core computing node of FIG. 16. At block 1604, the example monitor 1624 (FIG. 1) collects resource utilization data based on the running AI models 1604a-c. For example, the collected resource utilization data may include, but is not limited to, the space utilization of the cache 1612, the space utilization of the memory 1616, and/or the bandwidth utilization of the memory 1616. In examples disclosed herein, the bandwidth of the memory 1616 indicates how fast data may be accessed in the memory 1616. The example monitor 1624 may collect the resource utilization data from the AI models 1604a-c via the multi-cores 1608a-d, and/or directly via the cache 1612 and/or the memory 1616.

At block 1808, the example analyzer circuit 1628 generates candidate models based on the collected resource utilization data. In this example, the generated candidate models may define space utilization parameters for an AI model 1604a-c of the cache 1612. For example, a space utilization parameter may define how much space in the cache 1612 the AI model 1604a-c may utilize. Also in this example, the generated resource utilization models may define utilization parameters for an AI model 1604a-c of the memory 1616. The example analyzer circuit 1628 may define bandwidth utilization parameters for the bandwidth of the memory 1616. A bandwidth utilization parameter may define how much bandwidth of the memory 1616 the AI model 1604a-c may utilize. The example analyzer circuit 1628 may generate multiple candidate models 1712a-c for the AI model 1604a-c.

The example analyzer circuit 1628 selects a generated candidate model 1712a-c (FIG. 17) to invoke. For example, the analyzer circuit 1628 selects one of the candidate models 1712a-c for use with AI model 1604a. The example analyzer circuit 1628 selects one(s) of the candidate models 1712a-c based on the collected resource utilization data. For example, if the collected resource utilization data does not satisfy a desired cache inferencing accuracy performance, the example analyzer circuit 1628 may select the candidate model 1712a based on it having a different cache space utilization expected to improve the cache inferencing accuracy performance. For another example, if the candidate model 1712a satisfies a desired memory latency performance, the analyzer circuit 1628 may select the candidate model 1712a based on it having a different memory bandwidth utilization than the collected resource utilization data such that the different memory bandwidth utilization is expected to improve the memory latency performance.

In other examples, the analyzer circuit 1628 may generate candidate models for more than one of the AI models 1604a-c at a time. In these examples, the analyzer circuit 1628 may select a candidate model for the AI models 1604a-c based on optimization rules. For example, the candidate models 1716a-c are generated for the AI model 1604b and the resource utilization models 1712a-c are generated for the AI model 1604a. In this example, the candidate model 1716a has the highest bandwidth usage 1708 and the candidate model 1716c has the lowest bandwidth usage 1708.

In some examples, the example analyzer circuit 1628 selects a candidate model 1716a-c to invoke without comparing to another candidate model 1712a-c. In such examples, the analyzer circuit 1628 may select resource utilization model 1716a based on having the highest bandwidth usage 1708. In such examples, the analyzer circuit 1628 can select a candidate model based on the number of tenants in a multi-tenant computing environment. In other examples, the analyzer circuit 1628 selects candidate models based on QoS needs and/or performance maps (e.g., the performance map 1700 of FIG. 17). For example, the analyzer circuit 1628 may compare multiple sets of candidate models 1712a-c, 1716a-c and select a candidate model 1712a-c, 1716a-c to optimize memory latency. In such an example, the analyzer circuit 1628 may select the candidate model 1712a for the AI model 1604a and the candidate model 1716c for the AI model 1604b. In this example, the analyzer circuit 1628 selects the selected candidate models 1712a, 1716c as the most effective use of the limited resources.

In some examples, the monitor circuit 1624 creates a collected resource utilization signature to represent a collection of resource utilization data. The monitor circuit 1624 may create a collected resource utilization signature for a group of AI models 1604a-c. For example, the monitor circuit 1624 may create a collected resource utilization signature for the group of AI models containing AI model 1604a and AI model 1604b and a different collected resource utilization signature for the group of AI models containing AI model 1604*b* and AI model 1604*c*. The collected resource utilization signature contains information about previous candidate models 1712*a-c*, 1716*a-c* selected for a group of AI models, the expected resource utilization data for the previously selected candidate models, and the newly collected resource utilization data for the group of AI models. The analyzer circuit ID33428 may access the collected resource utilization signature to compare the newly generated candidate models 1712*a-c*, 1716*a-c* to past resource utilization data to better select a resource utilization model for the AI models in the group that best optimizes the performance of the computing node 1600 of FIG. 16 when compared to an example where the collected resource utilization signature is not utilized.

At block 1812, the example analyzer circuit 1628 provides the selected candidate model to the example monitor circuit 1624. At block 1816, the example monitor circuit 1624 sets the cache size and/or memory bandwidth resources per the selected candidate model. The example monitor circuit 1624 may instruct the cache 1612 and/or the memory 1616 to commit an amount of space and/or bandwidth, respectively, to one or more AI models (e.g., the AI models 1604*a-c* of FIG. 16) based on the selected candidate model. The example monitor circuit 1624 may instruct the cache 1612 and/or the memory 1616 via the multi-cores 1608*a-d* or directly via the cache 1612 and/or the memory 1616.

The system flow of FIG. 18 may be either one-way or a closed-loop 1820. For example, if the system flow is a one-way process, the controller circuit 1620 collects resource utilization data for the AI models 1604*a-c* and determines a candidate model to invoke for each AI model 1604*a-c* a single time. In a one-way process, the controller circuit 1620 collects resource utilization data and generates candidate models based on expected resource utilization data that is likely to achieve a desired performance. In one-way process examples, the controller circuit 1620 does not collect actual resource utilization data of previously applied candidate models for comparison in selecting a subsequent resource utilization model. In other examples, if the system flow of FIG. 18 is a closed-loop process, the controller circuit 1620 collects actual resource utilization data and generates subsequent candidate models for the AI models 1604*a-c* in a recurring fashion. In these examples, the controller circuit 1620 may analyze actual resource utilization data and performance data associated with previously applied candidate models to analyze and select subsequent candidate models to move closer to a desired performance. Unlike the one-way process, the closed-loop process may continue to generate, analyze, and select subsequent candidate models based on collected resource utilization data and expected resource utilization data.

In some examples, the orchestrator circuit 1404 includes means for orchestrating a circuit. For example, the means for orchestrating a circuit may be implemented by orchestrator circuitry 1404. In some examples, the orchestrator circuitry 1404 may be implemented by machine executable instructions such as that implemented by at least blocks corresponding to FIGS. 19, 20 and/or 21 executed by processor circuitry, which may be implemented by the example processor circuitry 512 of FIG. 5, the example processor circuitry 600 of FIG. 6, and/or the example Field Programmable Gate Array (FPGA) circuitry 700 of FIG. 7. In other examples, the orchestrator circuitry 1404 is implemented by other hardware logic circuitry, hardware implemented state machines, and/or any other combination of hardware, software, and/or firmware. For example, the orchestrator circuitry 1404 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for orchestrating 1404 includes means for data interfacing, means for node availability determining, means for request validating, means for model generating, means for resource managing, means for workload migrating and means for QoS monitoring, which may be implemented, respectively, by the example data interface circuit 1508, the example node availability determiner circuit 1516, the example request validator circuit 1510, the example candidate model generator circuit 1514, the example resource manager circuit 1512, the example workload migrator circuit 1518 and the example QoS monitor circuit 1520.

While an example manner of implementing the example orchestrator circuit 1404 of FIGS. 14 and 15, and implementing the example controller circuit 1620 of FIG. 16 is illustrated in FIGS. 14, 15 and FIG. 16, one or more of the elements, processes, and/or devices illustrated in FIGS. 14, 15 and/or 16 may be combined, divided, re-arranged, omitted, eliminated, and/or implemented in any other way. Further, the example data interface circuit 1508, the example node availability determiner circuit 1516, the example request validator circuit 1510, the example candidate model generator circuit 1514, the example resource manager circuit 1512, the example workload migrator circuit 1518, the example QoS monitor circuit 1520, the example controller circuit 1620 and/or, more generally, the orchestrator circuit 1404 of FIGS. 14, 15 and/or 16, may be implemented by hardware, software, firmware, and/or any combination of hardware, software, and/or firmware. Thus, for example, any of the example data interface circuit 1508, the example node availability determiner circuit 1516, the example request validator circuit 1510, the example candidate model generator circuit 1514, the example resource manager circuit 1512, the example workload migrator circuit 1518, the example QoS monitor circuit 1520, the example controller circuit 1620 and/or, more generally, the orchestrator circuit 1404 of FIGS. 14, 15 and/or 16, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data interface circuit 1508, the example node availability determiner circuit 1516, the example request validator circuit 1510, the example candidate model generator circuit 1514, the example resource manager circuit 1512, the example workload migrator circuit 1518, the example QoS monitor circuit 1520, the example controller circuit 1620 and/or, more generally, the orchestrator circuit 1404 of FIGS. 14, 15 and/or 16 is/are hereby expressly defined to include a non-transitory computer readable storage device or storage disk such as a memory, a digital versatile disk (DVD), a compact disk (CD), a Blu-ray disk, etc., including the software and/or firmware. Further still, the example orchestrator circuit 1404 of FIGS. 14, 15 and 16 may include one or more elements, processes, and/or devices in addition to, or instead of, those illustrated in FIGS. 14, 15 and 16, and/or may include more than one of any or all of the illustrated elements, processes and devices.

Figure 19:
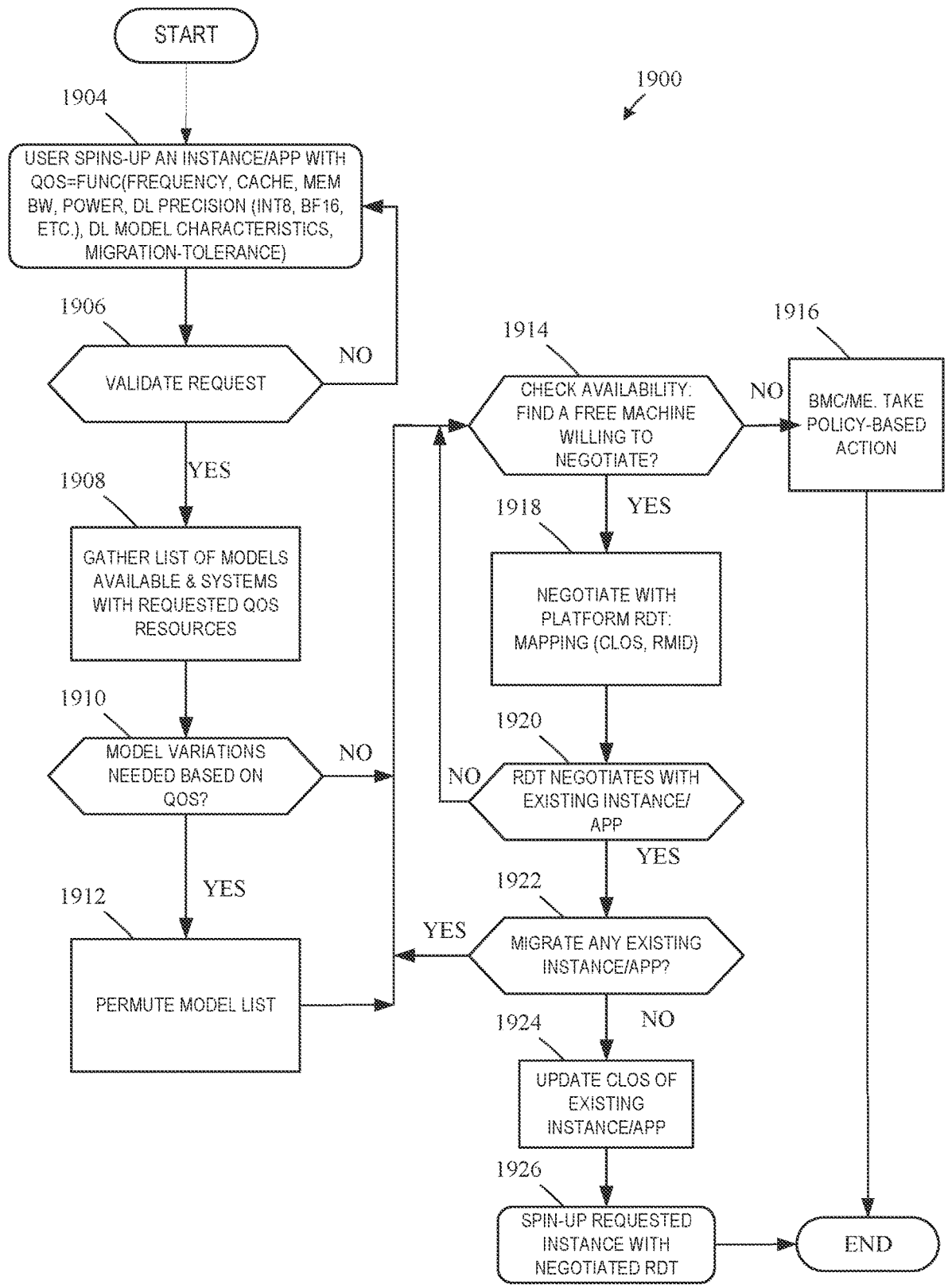
FIGS. 19, 20, and 21 are flowcharts representative of example machine readable instructions that may be executed by example processor circuitry to implement the orchestrator of FIG. 14.
Figure 20:
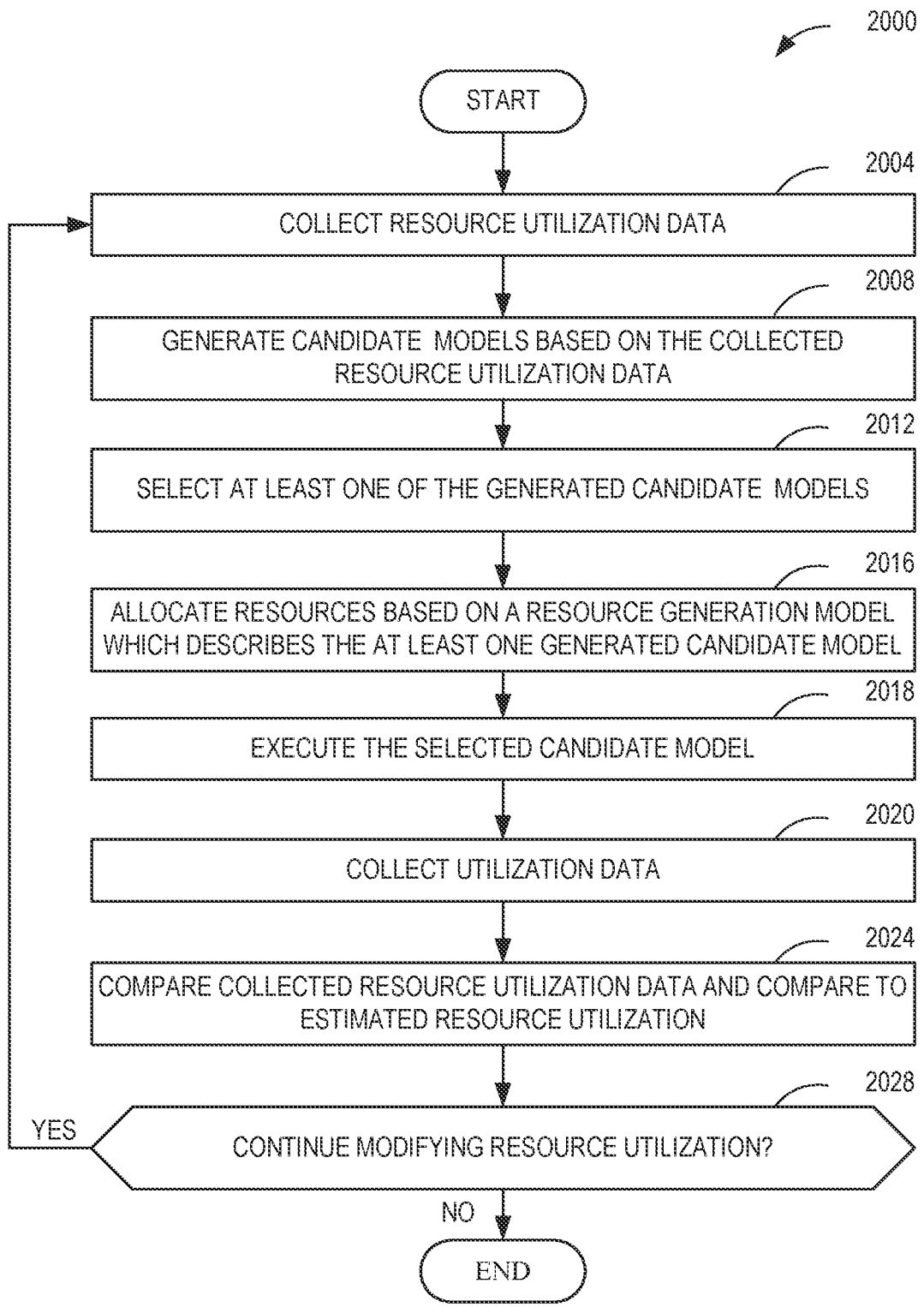
Figure 21:
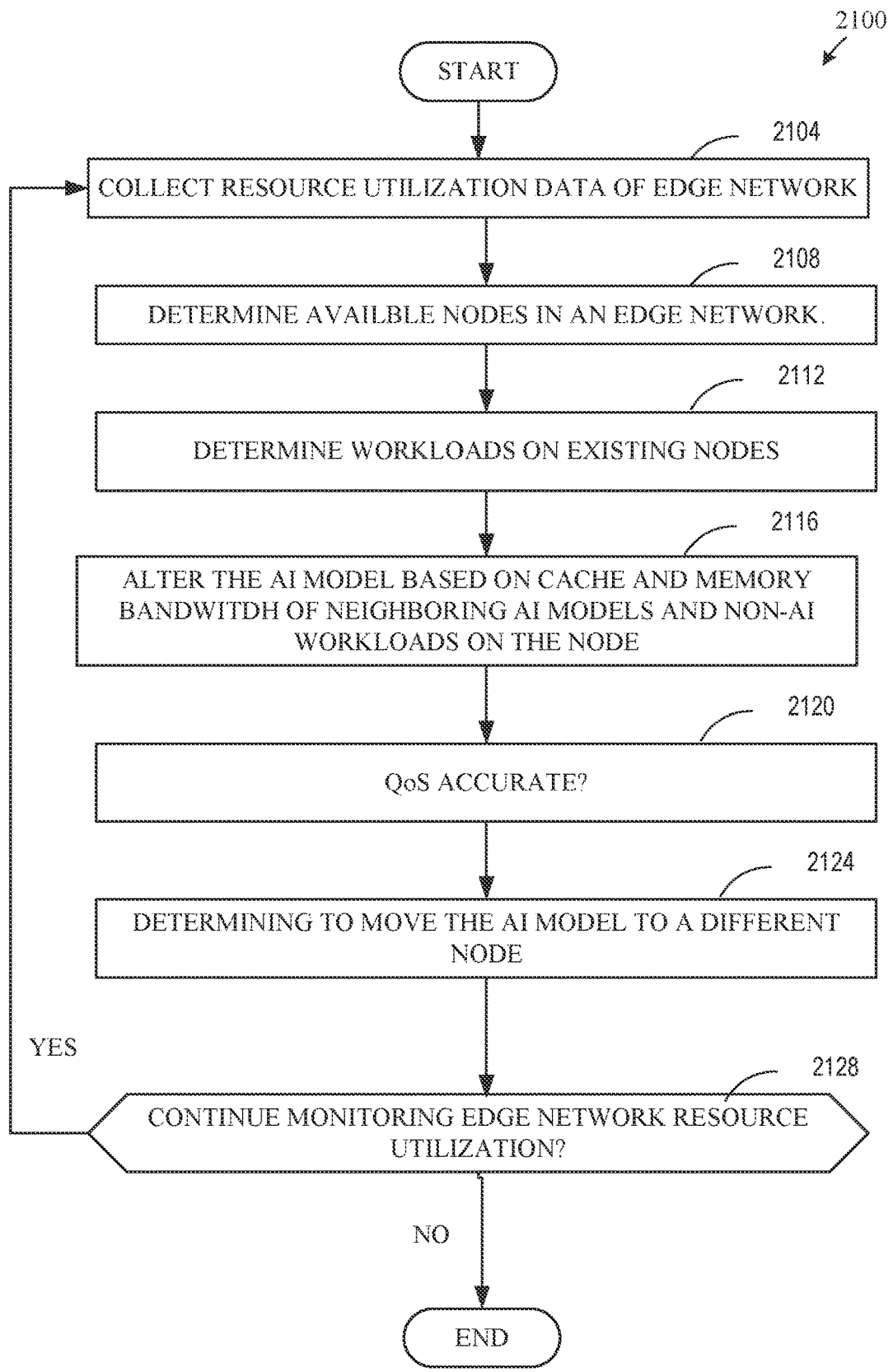

Flowcharts representative of example hardware logic circuitry, machine readable instructions, hardware implemented state machines, and/or any combination thereof for implementing the orchestrator circuit 1404 and/or the controller circuit 1620 of FIGS. 14, 15 and 16 are shown in FIGS. 19, 20 and 21. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 19, 20 and 21, many other methods of implementing the example orchestrator circuit 1404 and/or the example controller circuit 1620 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 19, 20 and/or 21 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 19 is a flowchart representative of example machine readable instructions and/or example operations 1900 that may be executed and/or instantiated by processor circuitry to determine if an artificial intelligence model is to be moved from a first node to a second node. The machine readable instructions and/or operations 1900 of FIG. 1900 begin at block 1904, at which the example data interface circuit 1508 of the example orchestrator circuit 1404 receives a workload (e.g., instance, app, artificial intelligence model) with a user-defined quality of service from a tenant 1504. For example, the quality of service may be a function of frequency, cache, memory bandwidth, power, DL precision (e.g., INT8, BF16), DL model characteristics, and migration-tolerance.

At block 1906, the example request validator circuit 1510 determines if the request is valid. For example, the example request validator circuit 1510 may determine the request (e.g., workload from the tenant) is valid (e.g., "YES"). Control advances to block 1908. Alternatively, the example validator circuit 1510 may determine the request is not valid (e.g., "NO"). Control returns to block 1904. The example validator circuit 1510 may determine the request is valid, as described above.

At block 1908, the example resource manager circuit 1512 gathers a list of the models available and systems with the requested quality of service resources. For example, the example resource manager circuit 1512 monitors the node devices (e.g., first node 1504, a second node 1506) and determines the workloads (e.g., applications, artificial intelligence models) currently running on the node devices.

At block 1910, the example resource manager circuit 1512 determines if model variations are needed based on the user-requested quality of service. For example, the resource manager circuit 1512 may compare the quality of service characteristics of the artificial intelligence models available with the user-requested quality of service. If the example resource manager circuit 1512 determines that model variations are not needed (e.g., "NO"), control advances to block 1914. If the example resource manager circuit 1512 determines that model variations are needed (e.g., "YES"), control advances to block 1912.

At block 1912, the example candidate model generator circuit 1514 performs a permutation of the model list. For example, the example candidate model generator circuit 1514 may generate a plurality of candidate models for a first artificial intelligence model. If the example minimum cache size is ten ("10") megabytes, the example candidate model generator circuit 1514 may generate a first candidate model with a cache size of ten ("10") and a second candidate model with a cache size of fifteen ("15") to determine if an increase in cache size significantly increases performance. Control advances to block 1914.

At block 1914, the example node availability determiner circuit 1516 checks availability of the node devices to find a free and/or otherwise partially available machine that is willing and/or able to negotiate. For example, the example node availability determiner circuit 1516 may monitor the first node 1504 and the second node 1506 and determine that the first node 1504 has the required cache space to accept the new workload. If the example node availability determiner circuit 1516 is unable to find an available node (e.g., "NO"), control advances to block 1916. Alternatively, if the example node availability determiner circuit 1516 finds an available node (e.g., "YES"), control advances to block 1918.

At block 1916, the example orchestrator circuit 1404 executes a policy-based action (e.g., a baseboard management controller (BMC) to monitor action(s), ME). After block 1916, the example instructions 1900 end.

At block 1918, the example node availability determiner circuit 1516 negotiates with the available node. For example, the example node availability determiner circuit 1516 may determine a mapping of CLoS and SRMID). In some examples, money or time may be negotiated. In still other examples, price for the virtual instance can be lowered and/or micropayments may be provided for future rentals. In some examples, the node availability determiner circuit 1516 facilitates bidding for resources, and such bidding may be guided by one or more active policies (e.g., aggressive bidding for best latency improvements). In some examples, learned settings may be fed forward via, for example, transfer learning.

At block 1920, the example orchestrator circuit 1404 (e.g., RDT) negotiates with existing workloads (e.g., applications, instances, artificial intelligence models). If the example orchestrator circuit 1404 successfully negotiates with the example existing workloads being executed on the nodes (e.g., first node 1504, a second node 1506) (e.g., "YES"), control advances to block 1922. Alternatively, if the example orchestrator circuit 1404 does not successfully negotiate with the example existing workloads being executed on the nodes (e.g., "NO"), control returns to block 1914.

At block 1922, the example workload migrator circuit 1518 determines to migrate a workload (e.g., instance, application, artificial intelligence model) from a first node to a second node. For example, the example workload migrator circuit 1518 may determine to migrate a workload (e.g., "YES"), control returns to block 1914. For example, the node that negotiated with the node availability determiner circuit 1516 may have the cache size for the first (e.g., new) workload. Alternatively, the example workload migrator circuit 1518 may determine to not migrate a workload (e.g., "NO"), control advances to block 1924. In some examples, the node may not have the cache size, such that a second (e.g., different) workload may be migrated to a second node.

At block 1924, the example orchestrator circuit 1404 may update the CLoS of existing workloads (e.g., instances, applications, artificial intelligence models).

At block 1926, the example orchestrator circuit 1404 instantiates the workload (e.g., spin-up the requested instance) requested by the tenant 1402. The instructions 1900 end.

FIG. 20 is a flowchart representative of example machine readable instructions and/or example operations 2000 that may be executed and/or instantiated by processor circuitry to determine the candidate model to select. The instructions 2000 begins at block 2004 at which the example monitor circuit 1624 (FIG. 16) collects resource utilization data. For example, the collected resource utilization data may include, but is not limited to, the space utilization of the cache 1624, the space utilization of the memory 1616, and/or the bandwidth utilization of the memory 1616. In examples disclosed herein, the bandwidth of the memory 1616 indicates how fast data may be accessed in the memory 1616.

At block 2008, the example analyzer circuit 1628 (FIG. 146) generates resource utilization models based on the collected resource utilization data. In this example, the generated resource utilization models may define space utilization parameters for an AI model 1604*a-c* of the cache 1612. For example, the space utilization parameter may define how much space in the cache 1612 the AI model 1604*a-c* may utilize. Also in this example, the generated candidate models may define resource utilization parameters for an AI model 1604*a-c* of the memory 1616. The analyzer 1628 may define bandwidth utilization parameters for the bandwidth of the memory 1616. The bandwidth utilization parameter may define how much bandwidth of the memory 1616 the AI model 1604*a-c* may utilize. The analyzer circuit 1628 may generate multiple candidate models candidate 1712*a-c* for the AI model 1604*a-c*.

At block 2012, the example analyzer circuit 1628 selects at least one of the generated candidate models 1712*a-c*. For example, the analyzer circuit selects one of the candidate models 1712*a-c* for use with the AI model 1604*a*. The example analyzer circuit 1628 selects one(s) of the candidate models 1712*a-c* based on the collected resource utilization data. For example, if the candidate model 1712*a* shows better inferencing accuracy performance with expected space utilization different than the collected space utilization data, the analyzer circuit 1628 may select candidate model 1712*a*. In another example, if the candidate model 1712*a* shows better memory latency performance with expected bandwidth utilization different than the collected bandwidth utilization data, the analyzer circuit 1628 may select candidate model 1712*a*.

In other examples, the analyzer circuit 1628 may generate candidate models for more than one of the AI models 1604*a-c* at a time. In these examples, the analyzer circuit 1628 may select a candidate model for the AI models 1604*a-c* based on optimization rules. For example, the candidate models 1716*a-c* are generated for the AI model 1604*b* and the candidate models 1712*a-c* are generated for the AI model 1604*a*. In this example, the candidate model 1716*a* has the highest bandwidth usage 1708 and the candidate model 1716*c* has the lowest bandwidth usage 1708.

In some examples, the example analyzer circuit 1628 selects a candidate model 1716*a-c* without comparing to another candidate model 1712*a-c*. In such examples, the analyzer circuit 1628 may select candidate model 1716*a* based on having the highest bandwidth usage 1708. In such examples, the analyzer circuit 1628 can select a candidate model based on the number of tenants in a multi-tenant computing environment. In other examples, the analyzer circuit 1628 selects candidate models based on QoS needs and/or a performance map. For example, the analyzer circuit 1628 may compare multiple sets of candidate models 1712*a-c*, 1716*a-c* and selects a candidate model 1712*a-c*, 1716*a-c* to optimize latency. In such an example, the analyzer circuit 1628 may select the candidate model 1712*a* for the AI model 1604*a* and the candidate model 1716*c* for the AI model 1604*b*. In this example, the analyzer circuit 1628 selects the selected candidate models 1712*a*, 1716*c* as the latency difference between candidate model 1716*a* and candidate model 1716*c* is not as large as the latency difference between candidate model 1712*a* and candidate model 1712*c*.

The analyzer circuit 1628 generates expected resource utilization data for the selected resource utilization model. If the analyzer circuit 1628 generates additional resource utilization models for the AI model 1604*a*, the generated resource utilization models may be based on the expected resource utilization data for the selected model.

At block 2016, the example monitor circuit 1624 allocates resources based on the selected resource utilization model. The example monitor circuit 1624 may instruct the cache 1612 and/or the memory 1616 to commit an amount of space and/or bandwidth, respectively, to an AI model (e.g., an AI model 1604*a-c* of FIG. 16) based on the selected resource utilization model. For example, the monitor circuit 1624 may set knobs in hardware to allocate the resources based on the selected resource utilization model. For example, the selected resource utilization model may describe a plurality of candidate models which shows the performance in response to the amount of resources utilized.

At block 2018, the example computing node 1600 executes AI models 1604*a-c*. For example, the AI models 1604*a-c* executes using the resources based on the at least one selected resource utilization models.

At block 2020, the example monitor circuit 1624 collects actual resource utilization data from the cache 1612 and the memory 1616 and/or actual performance of the AI models 1604*a-c*. The collected actual resource utilization data may include, but is not limited to, the space utilization of the cache 1612, the space utilization of the memory 1616, and/or the bandwidth utilization of the memory 1616. The actual performance may include cache inferencing accuracy and/or memory latency.

At block 2024, the example analyzer circuit 1628 compares the collected actual resource utilization data and/or actual performance to the expected resource utilization data and/or expected performance of one or more subsequent resource utilization models. The example performance map 1700 of FIG. 17 indicates the expected resource utilization data and expected performance of the example candidate models 1712*a-c*, 1716*a-c*. For example, the analyzer circuit 1628 may select the candidate model 1712*a*. In this example, the analyzer circuit 1628 saves the expected resource utilization data of the candidate model 1712*a*. The collected actual resource utilization data and/or performance may be compared to the expected resource utilization data and/or performance. A subsequent candidate model may be selected based on the comparison showing improved performance.

At block 2028, the example analyzer circuit 1628 determines whether to continue modifying resource utilization of the cache 1612 and/or the memory 1616. In a one-way process, the analyzer circuit 1628 determines to not continue modifying resource utilization of the cache 1612 and/or the memory 1616. However, in a closed-loop process, the analyzer circuit 1628 may determine to either continue modifying resource utilization or to not continue modifying resource utilization (e.g., based on measured performances of the AI models 1604*a-c*). If the example analyzer circuit 1628 determines to continue generating resource utilization models, the process returns to block 1604. If the example analyzer circuit 1628 determines to not continue generating resource utilization models, the instructions 2000 of FIG. 20 end.

FIG. ID219 is an overview of example operations 2100 that may be executed by the processor to execute the instructions to orchestrate the migration of workloads in an edge network.

As discussed above, FIG. 6 is a block diagram of an example implementation of the processor circuitry 512 of FIG. 5. In this example, the processor circuitry 512 of FIG. 5 is implemented by a microprocessor 600. For example, the microprocessor 600 may implement multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 19, 20 and/or 21.

From the foregoing, it will be appreciated that example systems, methods, apparatus, and articles of manufacture have been disclosed that improve efficiency of computing devices that share resources. In particular, examples disclosed herein remove operator discretion regarding which models to apply to resource allocation to workloads, and enable the negotiation of workloads competing for same/similar resources. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to optimize resources in Edge networks are disclosed herein. Further examples and combinations thereof include the following: Example 1 includes an apparatus comprising at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to generate first candidate models, generate second candidate models, the first candidate models to be allocated first resources and the second candidate models to be allocated second resources, collect first resource utilization data corresponding to a workload executing the first resources, collect second resource utilization data corresponding to the workload executing the second resources, calculate a first slope corresponding to workload performance and the first resources, calculate a second slope corresponding to workload performance and the second resources, and select one of the first candidate models or the second candidate models based on a comparison of the first and second slope.

Example 2 includes the apparatus as defined in example 1, wherein the processor circuitry is to select the first candidate models or the second candidate models based on a threshold slope value.

Example 3 includes the apparatus as defined in example 1, wherein the processor circuitry is to allocate a first quantity of cache to the workload.

Example 4 includes the apparatus as defined in example 3, wherein the first quantity of cache corresponds to a first node of a computing platform.

Example 5 includes the apparatus as defined in example 1, wherein processor circuitry is to acquire the first resource utilization data as at least one of workload accuracy or workload latency.

Example 6 includes the apparatus as defined in example 1, wherein the workload includes a plurality of artificial intelligence models from dissimilar tenants of a multi-tenant computing environment.

Example 7 includes the apparatus as defined in example 1, wherein the processor circuitry is to determine whether the first candidate models and the second candidate models tolerate migration.

Example 8 includes the apparatus as defined in example 7, wherein the processor circuitry is to skip integration of models that do not tolerate migration.

Example 9 includes At least one non-transitory computer readable storage medium comprising instructions that, when executed, cause at least one processor to at least monitor, in a first phase, a hardware platform to identify features to train an artificial intelligence model, extract information regarding the hardware platform associated with a marker related to the features occurring during the first phase, and store the information in a database to, in a second phase, enable hardware-aware training of the artificial intelligence model.

Example 10 includes the at least one computer readable storage medium as defined in example 9, wherein the instructions, when executed, cause the at least one processor to select the first candidate models or the second candidate models based on a threshold slope value.

Example 11 includes the at least one computer readable storage medium as defined in example 9, wherein the instructions, when executed, cause the at least one processor to allocate a first quantity of cache to the workload.

Example 12 includes the at least one computer readable storage medium as defined in example 11, wherein the first quantity of cache corresponds to a first node of a computing platform.

Example 13 includes the at least one computer readable storage medium as defined in example 9, wherein the instructions, when executed, cause the at least one processor to acquire the first resource utilization data as at least one of workload accuracy or workload latency.

Example 14 includes the at least one computer readable storage medium as defined in example 9, wherein workload includes a plurality of artificial intelligence models from dissimilar tenants of a multi-tenant computing environment.

Example 15 includes the at least one computer readable storage medium as defined in example 9, wherein the instructions, when executed, cause the at least one processor to determine whether the first candidate models and the second candidate models tolerate migration.

Example 16 includes the at least one computer readable storage medium as defined in example 15, wherein the instructions, when executed, cause the at least one processor to skip integration of models that do not tolerate migration.

Example 17 includes a method comprising generating first candidate models, generating second candidate models, the first candidate models to be allocated first resources and the second candidate models to be allocated second resources, collecting first resource utilization data corresponding to a workload executing the first resources, collecting second resource utilization data corresponding to the workload executing the second resources, calculating a first slope corresponding to workload performance and the first resources, calculating a second slope corresponding to workload performance and the second resources, and selecting one of the first candidate models or the second candidate models based on a comparison of the first and second slope.

Example 18 includes the method as defined in example 17, further including selecting the first candidate models or the second candidate models based on a threshold slope value.

Example 19 includes the method as defined in example 17, further including allocating a first quantity of cache to the workload.

Example 20 includes the method as defined in example 19, wherein the first quantity of cache corresponds to a first node of a computing platform.

Example 21 includes the method as defined in example 17, further including acquiring the first resource utilization data as at least one of workload accuracy or workload latency.

Example 22 includes the method as defined in example 17, wherein the workload includes a plurality of artificial intelligence models from dissimilar tenants of a multi-tenant computing environment.

Example 23 includes the method as defined in example 17, further including determining whether the first candidate models and the second candidate models tolerate migration.

Example 24 includes the method as defined in example 23, further including skipping integration of the models that do not tolerate migration.

Example 25 includes a system comprising means for analyzing to generate first candidate models, and generate second candidate models, the first candidate models allocated a first resource allocation and the second candidate models allocated a second resource allocation, and means for monitoring to collect first resource utilization data corresponding to a workload executing the first resource allocation, collect second resource utilization data corresponding to the workload executing the second resource allocation, the means for analyzing to calculate a first slope corresponding to workload performance and first resource allocation, calculate a second slope corresponding to workload performance and second resource allocation, and select one of the first candidate models or the second candidate models based on a comparison of the first and second slope.

Example 26 includes the system as defined in example 25, wherein the means for analyzing is to select the first candidate models or the second candidate models based on a threshold slope value.

Example 27 includes the system as defined in example 25, wherein the first candidate models allocate a first quantity of cache to the workload.

Example 28 includes the system as defined in example 27, wherein the first quantity of cache corresponds to a first node of a computing platform.

Example 29 includes the system as defined in example 25, wherein the first resource utilization data includes at least one of workload accuracy or workload latency.

Example 30 includes the system as defined in example 25, further including means for orchestrating to determine whether the first candidate models and the second candidate models tolerate migration.

Example 31 includes an apparatus to adapt workload model selection comprising an analyzer circuit to generate first candidate models, and generate second candidate models, the first candidate models allocated a first resource allocation and the second candidate models allocated a second resource allocation, and a monitor circuit to collect first resource utilization data corresponding to a workload executing the first resource allocation, collect second resource utilization data corresponding to the workload executing the second resource allocation, the analyzer circuit to calculate a first slope corresponding to workload performance and first resource allocation, calculate a second slope corresponding to workload performance and second resource allocation, and select one of the first candidate models or the second candidate models based on a comparison of the first and second slope.

Example 32 includes the apparatus as defined in example 31, wherein the analyzer circuit is to select the first candidate models or the second candidate models based on a threshold slope value.

Example 33 includes the apparatus as defined in example 31, wherein the first candidate models allocate a first quantity of cache to the workload.

Example 34 includes the apparatus as defined in example 33, wherein the first quantity of cache corresponds to a first node of a computing platform.

Example 35 includes the apparatus as defined in example 31, wherein the first resource utilization data includes at least one of workload accuracy or workload latency.

Example 36 includes the apparatus of example 31, wherein the workloads are a plurality of AI models of different tenants of a multi-tenant computing environment.

Example 37 includes the apparatus as defined in example 31, further including an orchestrator circuit to determine whether the first candidate models and the second candidate models tolerate migration.

Example ID3(A) is the apparatus of any of examples 1-8, further including a plurality of tenants executing at least one of neural networks, decision trees or Naïve Bayes classifiers with at least one of last level cache, level three cache or level four cache.

Example ID3(B) is the apparatus of any of examples 1-8, further including selecting combinations of the candidate models based on relative performance metrics at a first time with first tenants, and selecting alternate ones of the combinations of the candidate models based on the relative performance metrics at a second time with second tenants.

Example ID3(C) is the computer readable storage medium of any of examples 9-16, wherein the instructions, when executed, cause at least one processor to at least select combinations of the candidate models based on relative performance metrics at a first time with first tenants, and select alternate ones of the combinations of the candidate models based on the relative performance metrics at a second time with second tenants.

Example ID3(D) is the method of any of examples 17-24, further including selecting combinations of the candidate models based on relative performance metrics at a first time with first tenants, and selecting alternate ones of the combinations of the candidate models based on the relative performance metrics at a second time with second tenants.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

Featurization Automation (ID4)

Machine learning (ML) and/or other artificial intelligence (AI) model formation (e.g., training, testing, and deployment) involves leveraging a data set of information. Often, the quality and amount of data in the data set determines the quality of the resulting model. Selection of which data in a data set is important for training, testing, and/or validation of a model is referred to as featurization. A feature store or database is a library of featurizations that can be applied to data of a certain type. Featurization data stored in the database can then be used to train, test, etc., a machine learning network construct.

Manual selection of features is difficult, if not impossible. Correlations, verifications, and/or other analysis cannot be done manually by a human. As such, model quality suffers, which results in erroneous model outcomes and introduces failures or faults in systems and processes relying on the model output to function. Automated featurization can remedy these problems and improve the operation and accuracy of ML/AI models and associated systems, processes, etc.

Automated machine learning (referred to as automated ML or AutoML) automates formation of ML and/or other AI models. In AutoML, a plurality of pipelines are created in parallel to test a plurality of algorithms and parameters for. The service iterates through ML algorithms paired with feature selections, where each iteration produces a model with a training score.

Automated featurization can help drive AutoML by automatically identifying, capturing, and leveraging relevant, high-quality feature data for model training, testing, validation, etc. For example, featurization automation can assist an ML algorithm to learn better, forming an improved ML model for deployment and utilization. Featurization can include feature normalization, missing data identification and interpolation, format conversion and/or scaling, etc. Featurization can transform raw data into a set of features to be consumed by a training algorithm, etc. In certain examples, featurization is based on an analysis of an underlying platform (e.g., hardware, software, firmware, etc.) on which a model will be operating.

Automated featurization provides important benefits in an edge computing environment, an Internet of Things (IoT) environment (which may be an edge computing environment or other network infrastructure, etc.), cloud computing environment, etc. In such environments, resource capabilities can vary greatly, and providing an ability for quick, automated featurization of available resources enables the automation of AI algorithm/model optimization on edge/IoT devices, etc. For example, an IoT device, such as a user device, a cloud server rack, etc., can include a system for automated featurization. Such a system can be provided in silicon as part of a platform providing a software and AI framework, for example.

To date, efforts to scale deployment of AI algorithms on computing platforms have been manual, involving a massive human effort. Such manual effort also renders impossible large scale optimization across multiple customers, multiple models, and multiple products. As described herein, automated featurization addresses these challenges and enables hardware-aware neural architecture exploration based on automated featurization of underlying platform characteristics for a given workload. As such, new AI features can be discovered, and machine-generated AI algorithms can be optimized for particular hardware and/or software platforms. Certain examples provide automated featurization that can scale across large data sets, diverse data sets, and many use cases. Certain examples enable design of AI algorithm and hardware for rapid discovery of new AI features and design of AI silicon.

Certain examples provide hardware-aware AutoML, which leverages one or more underlying hardware platforms or architectures when training ML and/or other learning network models. To enable AutoML, a featurization search is conducted to identify hardware (and software and/or firmware) characteristics that can be converted to features for training, testing, etc., of an AutoML model. A challenge associated with hardware-aware AutoML is exposing underlying hardware capability to a featurization search. In certain examples, hardware characteristics are identified and input into the automated featurization search. The data set formed for training and/or testing the ML network model can then be more focused on the platform on which the model is to be deployed.

In certain examples, a featurization search is conducted to analyze a workload associated with (e.g., being executed using) a hardware platform. For example, operations such as latency, energy, memory bandwidth, other resource utilization, etc., can be measured in a search space to help identify features of the hardware platform. Rather than manual measurement of operations, which is very resource intensive and time consuming, if not impossible, a search space for a hardware platform can be defined in terms of blocks (also referred to as code blocks) and cells for a given workload. Portions of the underlying hardware can be exposed in connection with specified code blocks. Microcode hooks and telemetry information from the underlying hardware platform can be used to automatically gather data associated with code blocks in the featurization search.

In certain examples, "mile markers" or other indicators are associated with a start and/or end of a code block, other microcode benchmark, etc. Values (e.g., parameter values, register values, code execution status values, etc.) captured at mile markers can be saved in a database and/or other data store to form a basis for automated hardware-aware neural architecture search and network training using identified features, for example. For example, during a warm-up phase in which search and exploration of an AI algorithm begins to be optimized and/or otherwise tailored for an underlying platform, mile markers can be specified to allow the underlying hardware to collect statistics such as number of cycles required by an associated code block, an amount of data movement involved, etc. After statistics have been gathered and saved (e.g., in a database) in the warm-up phase, the statistics can be used to generate (e.g., train, test, validate, etc.) an ML or other AI network that is optimized and/or otherwise tailored for the underlying hardware platform on which the network will execute, for example. As such, network model accuracy and effectiveness can be improved while reducing front end overhead from a manual search or training process.

In certain examples, mile markers associated with the code or compute blocks trigger microcode executing with respect to the hardware underneath the code block to capture telemetry and code execution statistics with respect to the underlying hardware. The statistics can be "frozen" and saved (e.g., in a database, other data store, etc.). The statistics can be made available for a neural network architecture search, etc. In certain examples, as information is being captured, the statistics/information can be stored in a "global" database that includes statistics from multiple hardware platforms. Information in the global database can enable cross-platform model optimization, exploration for future hardware, etc.

Mile markers provide a flexible, dynamic ability to explore and evaluate an underlying hardware platform with or without one or more workloads for execution. In certain examples, mile markers can be automatically placed according to one or more criterion (e.g., a configurable policy, one or more parameters, etc.) and can be automatically identified, captured, and saved for further use in neural architecture exploration, for example. For example, rather than running a full workload, an automated featurization search process can run mile markers and collect information from those mile markers to compare different configurations and/or different architectures as a proxy for estimating data movement, latency, and/or other characteristics from workload execution on the underlying hardware platform. If a mile marker is known, the marker can be associated with the position of known micro-operation benchmarks such as memory access, etc., not only hardware. As such, the benchmark can be leveraged without executing the mile marker, for example. In other examples, a mile marker can be simulated (e.g., in association with a convolution, etc.) to obtain a value of the mile marker without actually running the underlying hardware. As such, during a training and exploration phase, mile markers can be used in a variety of ways to obtain hardware events from running, simulating, etc., the mile marker. Depending on how a mile marker is leveraged, exploration can run faster, have higher fidelity, etc.

In certain examples, a mile marker can provide a specific micro benchmark exploration. A marker can be added to understand a certain hardware characteristic. In certain examples, a hierarchy of micro-operation levels can be constructed, and mile markers can be examined to determine how the mile markers impact the hierarchy. As such, mile markers can be used to understand what is happening underneath the microarchitecture pipeline.

In certain examples, mile markers can be leveraged for more than a feature or characteristic analysis of an underlying platform. For example, mile markers can be used to evaluate microcode patches for deployment across one or more hardware platforms. Telemetry from mile markers can help to tune and optimize microcode deployment by leveraging platform telemetry statistics. Extensions can help to find an optimal search space for microcode patches (e.g., can be customized per platform rather than one-size-fits-all approach), for example.

Alternatively or additionally, mile markers can be leveraged across platform elements and protocols. For example, mile markers can be extended from microcode patch efficiency monitoring and tuning to correspond to other logic blocks in a platform running firmware. Mile markers corresponding to a start and/or end of such logic blocks can be leveraged to tune different platform elements, protocols, etc.

Captured information and associated analysis can be saved in a cloud-accessible data store, made available to local applications, etc., to affect change(s) in local and remote platform behavior. For example, information can be exposed to applications running locally on a hardware platform to affect a change in and/or otherwise modify platform behavior and/or application behavior via the location application(s). In certain examples, characterization and tuning of individual logic blocks, groups of logic blocks, an entire platform, etc., can be crowd-sourced across a fleet or cluster of servers from one or more data centers in a hyper-cloud deployment for workload deployment and fleet management at scale.

Figure 22A:
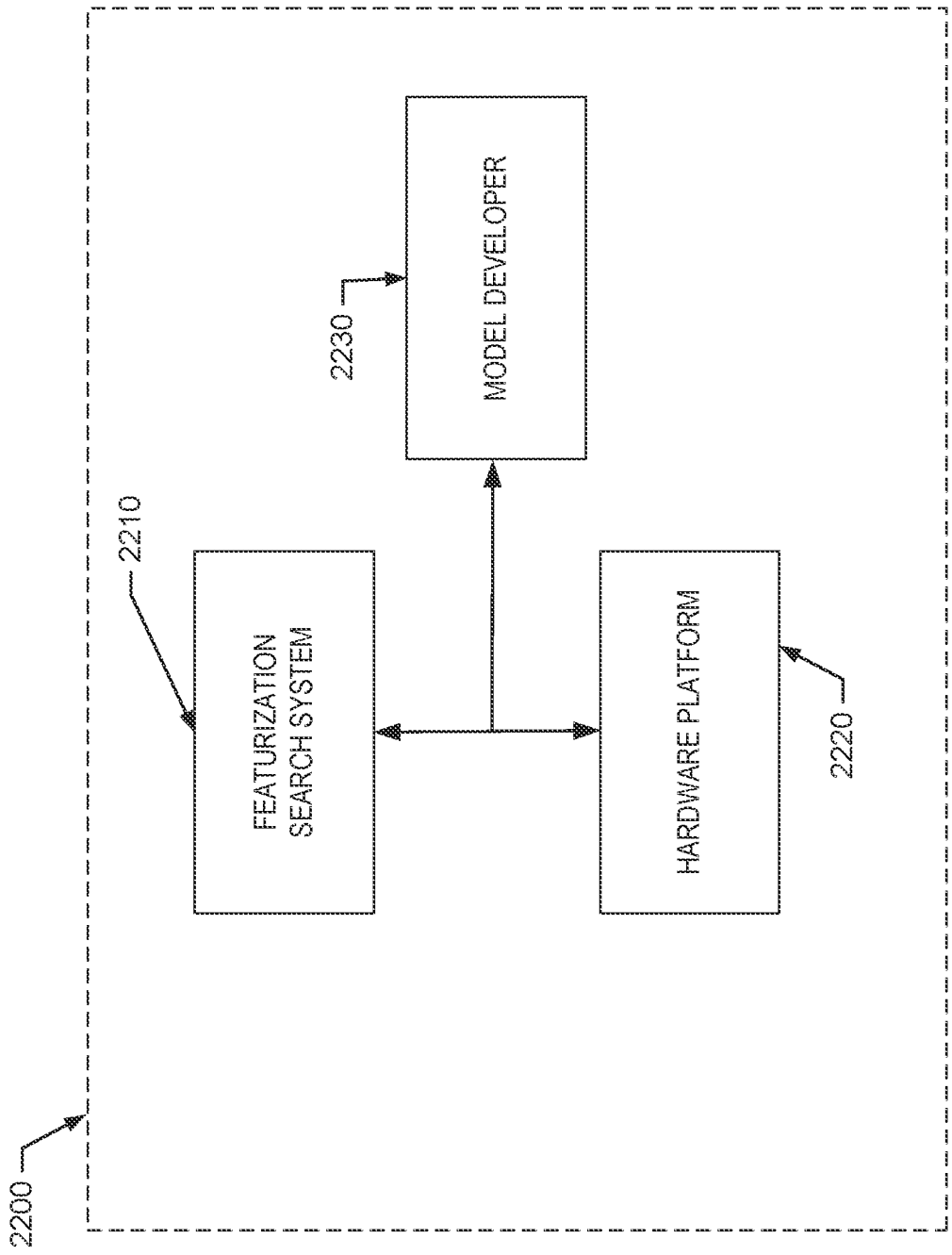
FIG. 22A illustrates an example automated machine learning apparatus.

FIG. 22A is a block diagram of an example AutoML apparatus 2200 including an example featurization search system 2210, an example hardware platform 2220, and an example model developer circuitry 2230. The example featurization search system 2210 analyzes the example hardware platform 2220, which includes hardware, software, and firmware, to determine features associated with the example platform 2220. The example featurization search system 2210 divides and/or otherwise organizes the hardware and software of the example platform 2220 into blocks. Mile markers or event indicators (e.g., code start, code end, microcode benchmark, etc.) are captured by the example featurization search system 2210 examining the configuration and activity of the example platform 2220. The example featurization search system 2210 saves the captured mile marker values and other associated data, analytics, etc., to form features associated with the example platform 2220. Features can be organized into one or more data sets to drive development of an AI model (e.g., for training, testing, etc., of an ML network and/or other AI model), for example. The features can serve as a basis for automated hardware-aware neural architecture search and network training using the identified features saved, aggregated, normalized, and/or otherwise processed as one or more data sets, for example. In the example of FIG. 22A, features and other extracted and/or evaluated information can be used by the example model developer circuitry 2230 to generate, train, test, and deploy AI models, for example. For example, identified features and associated telemetry data can be used to form one or more data sets for training, testing, and/or other validation of an AI model construct (e.g., AI model development).

Figure 22B:
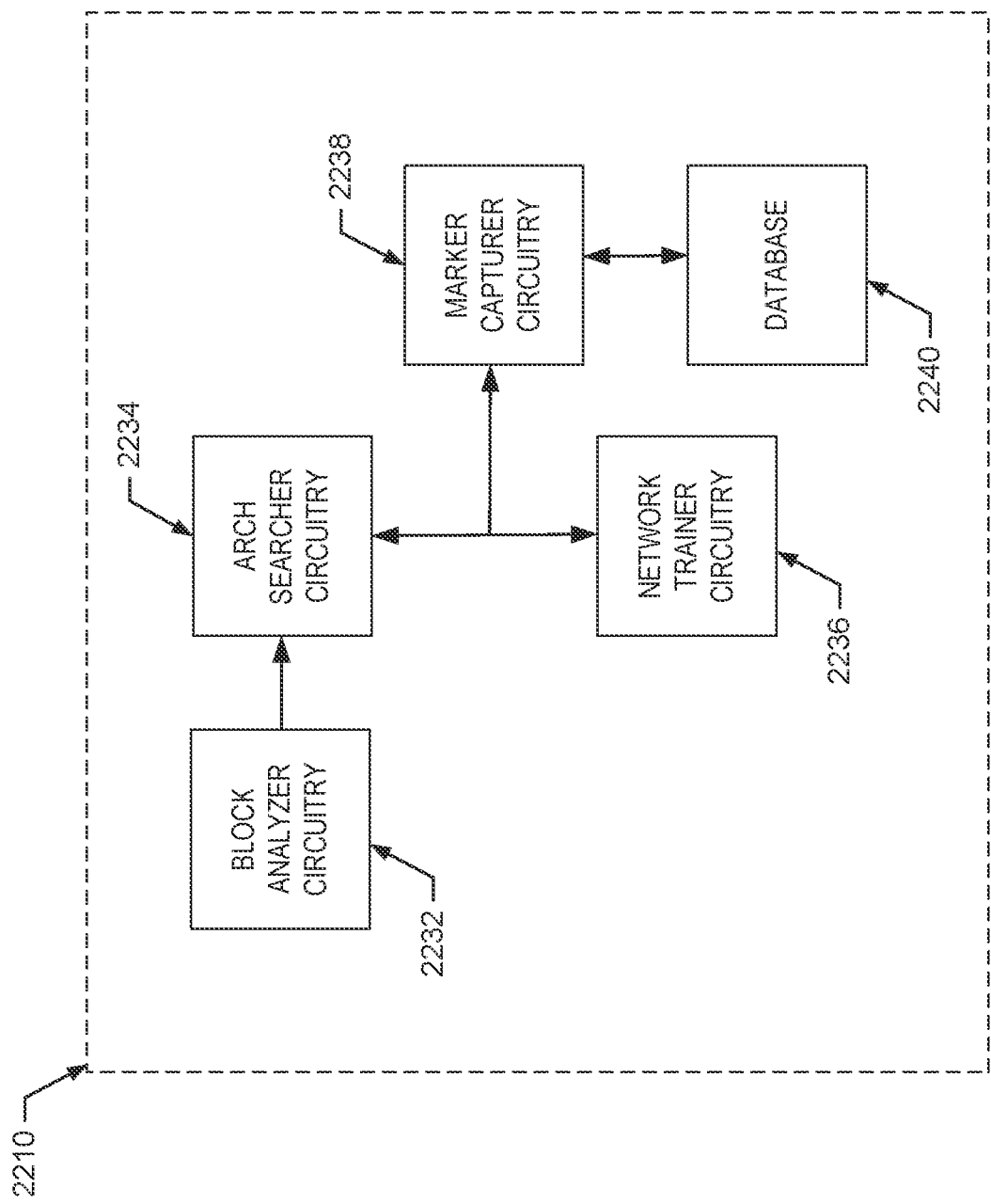
FIG. 22B illustrates an implementation of the example featurization search system of FIG. 22A.

FIG. 22B illustrates an example implementation of the example featurization search system 2210 of FIG. 22A. The example featurization search system 2210 includes an example block analyzer circuitry 2232, an example architecture searcher circuitry 2234, an example network trainer circuitry 2236, an example marker capturer circuitry 2238, and an example database 2240. The example block analyzer circuitry 2232 defines an example feature search space of a workload associated with the example hardware platform circuitry 2220, for example, in terms of code or computation blocks or cells. A beginning and/or end of a block can be associated with a marker (e.g., a "mile marker") or other indicator associated with an action or state (e.g., a hardware, platform, or code state, etc.) at a beginning or end of execution of the associated code block by the underlying processing hardware of the example platform circuitry 2220. The example block analyzer circuitry ID4_B10 communicates with the example architecture searcher circuitry 2234 to provide the code blocks and associated markers during a warm-up phase of architecture search with respect to the example hardware platform 2220.

The example architecture searcher circuitry 2234 works with the example marker capturer 2238 and the example network trainer circuitry 2236 to capture values associated with markers as the code blocks are executed in conjunction with training of a network (e.g., a ML network model, neural network model, other AI model, etc.) by the example network trainer circuitry 2236 during an initial, warm-up phase of architecture exploration and training. For example, the architecture searcher circuitry 2234 monitors execution of software code, microcode, etc., on the hardware platform 2220 and/or facilitates simulation of software code, microcode, etc., with respect to the example platform 2220. As the architecture searcher 2238 monitors real and/or simulated execution to evaluate the platform 2220 with respect to the network, the example marker capturer 2238 captures markers and/or other indicators associated with a hardware and/or software state at a start and/or end of the associated code block and/or microcode/micro-operation benchmark, etc. Captured values can be saved in the example database 2240 to drive a next stage or phase of neural architecture exploration using the example architecture searcher circuitry 2234 and the example network trainer circuitry 2236. For example, captured values can include hash key (or embedding) of a micro block/operation along with input/output dimensions used as an index to an entry in the database 2240 to store parameters such as latency, memory footprint, power, etc. Using information extracted at the marker(s) reveals characteristics of the underlying hardware and allows the example architecture searcher circuitry 2234 to be hardware away in its architecture search and training of an ML and/or other AI network using the example network trainer circuitry 2236, for example.

As such, in operation during a warm-up phase, the example architecture searcher circuitry 2234 begins optimizing or otherwise improving an AI algorithm for an underlying platform in conjunction with the example network trainer circuitry 2236. The example marker capturer circuitry 2238 measures and/or otherwise captures hardware statistics associated with software program code execution (e.g., in conjunction with microcode evaluation and capture, etc.), such as a number of cycles associated with execution of the code block, an amount of data movement associated with execution of the code block, etc. In certain examples, code (e.g., microcode, program code, etc.) associated with a mile marker can be simulated, rather than actually executed on the underlying platform 2220. The gathered statistics are saved by the example marker capturer in the example database 2240 to be used, alone or in conjunction with data from the same and/or other hardware platform(s), in an exploration phase to develop an ML and/or other hardware-aware AI architecture by incorporating hardware features from the database 2240 via the example architecture searcher 2234 and the example network trainer circuitry 2236 to identify and train an AutoML and/or other AI network with respect to the underlying hardware platform 2220 on which the network will execute, for example. The marker data in the database 2240 can be used to form or drive a feature engine, tailored to the platform 2220, to model features for analysis with respect to the platform 2220, for example.

Figure 22C:
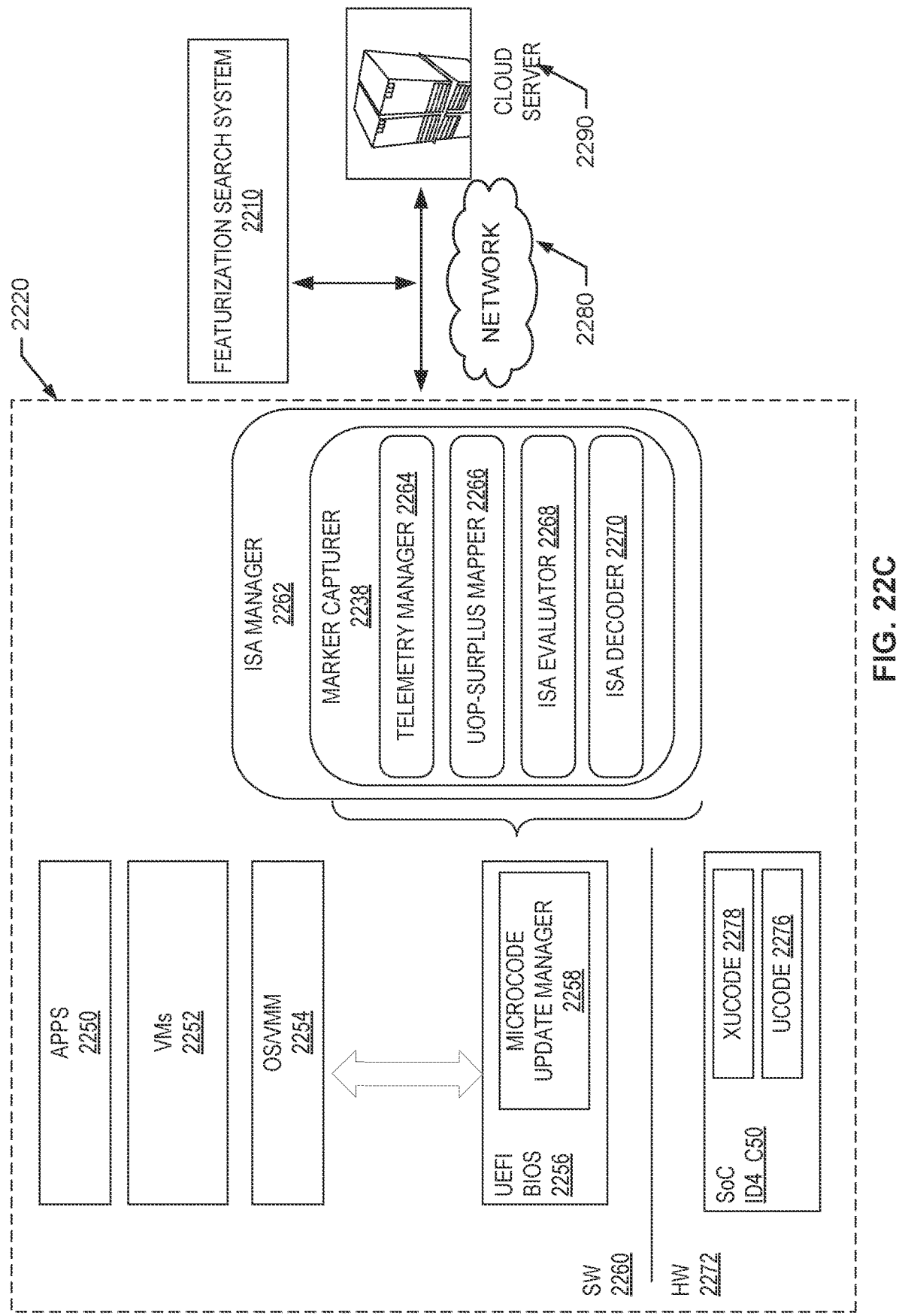
FIG. 22C is an implementation of the example hardware platform of FIG. 22A on which the example featurization search system of FIG. 22A can operate and/or be implemented.

FIG. 22C is an implementation of the example hardware platform 2220 on which the example featurization search system 2210 of FIGS. 22A-22B operates and/or can be implemented. The example hardware platform 2220 includes one or more applications 2250, virtual machines (VMs) 2252, an operating system (OS)/virtual memory manager (VMM) 2254 executing with respect to a unified extensible firmware interface (UEFI)/basic input/output system (BIOS) 2256 in a software layer 2260 of the example hardware computing platform 2220 of FIG. 22B. As shown in the example of FIG. 22C, the example UEFI/BIOS 2256 includes a microcode update manager 2258. The example microcode update manager 2258 works with an example instruction set architecture (ISA) manager circuitry 2262 to configure specific ISA behavior, evaluate ISA configuration, and take actions based on associated policy.

As shown in the example of FIG. 22C, a hardware layer 2272 includes a system-on-a-chip (SoC) and/or other processor/processing hardware. The example SoC/hardware 2274 includes microcode 2276 and secure microcode 2278 to facilitate hardware operations of the example hardware circuitry 2274. The example microcode 2276 and secure microcode 2278 interpose an organization layer between the hardware 2274 and the ISA of the example processing platform 2220 of FIG. 22C.

The example ISA manager 2262 can be used to implement all or part of the example marker capturer circuitry 2238 of FIG. 22B. While the example of IFG.22C shows the example ISA manager circuitry 2262 implemented as part of the example platform 2220, all or part of the ISA manager circuitry 2262 (e.g., at last the marker capturer circuitry 2238, etc.) can be implemented as part of the featurization search system 2210, etc. As shown in the example of FIG. 22C, the example ISA manager circuitry 2272 implements the example marker capturer circuitry 2238 using an example telemetry manager 2264, an example microoperation (UOP) surplus mapper 2266, an example ISA evaluator 2268, and an example ISA decoder 2270. The example ISA manager 2272 communicates via a network 2280 with a cloud-based server 2290 and/or other computing device. As such, the example marker capturer circuitry 2238 can provide captured marker data to the example server 2290 via the example network 2280. An external device can access the marker data via the example server 2290, for example.

As shown in the example of FIG. 22C, the example telemetry manager 2264 can capture one or more key performance indicators through interaction with the example microcode update manager 2258 in the software (SW) layer 2260 monitoring microcode 2276, 2278 in the hardware (HW) layer 2272. The example UOP-surplus mapper 2266 generates a new ISA and/or mile marker for execution by the microcode 2276, 2278. The example ISA evaluator 2268 dispatches the ISA and/or associated mile marker and evaluates information associated with a state of the hardware and/or software at the mile marker. The example ISA decoder 2270 processes the ISA and/or mile marker information for inclusion in the example database 2240.

As such, certain examples provide automated performance monitoring for an example hardware base 2272 and associated software 2260. Example mile markers and associated data can be captured against multiple platforms to create an offline and/or online database 2240 to enable cross platform model optimization, for example. The example microcode dispatcher 2276 and/or 2278 can execute and/or capture information with respect to one or more mile markers and convey information to the example microcode manager 2258 to be provided to the example ISA manager circuitry 2262. Latency, energy, bandwidth, etc., can be estimated from one or more markers/motifs using composition of micro-benchmarks running on the example platform 2220, performance modeling or simulation based on mile markers, etc.

Data associated with the captured/simulated mile markers, stored in the example database 2240 and/or used in real-time, is exposed to one or ML/DL frameworks to optimize a resulting network, such as an AutoML network being trained by the example network trainer circuitry 2262, etc. In certain examples, mile marker data collected online can be merged or fused with data collected offline (e.g., data fusion for time-series data, etc.). As such, a model can continue to reflect actual workloads even after the platform has been deployed.

In certain examples, data in the database 2274 stores data from mile markers captured across a plurality of hardware and/or software versions/generations, configurations/form factors of a same version/generation, etc. For example, mile marker data collected from a twenty core part, a fifty-six core part, a one hundred fifty watt thermal design power (TDP) tool, etc., can be stored, leveraged, and shared via the database 2240. In certain examples, the cloud server 2290 can leverage telemetry and mile marker data from the database 2274 (e.g., implemented as a cloud-accessible database) to identify one or more bottlenecks such as a compute bottleneck, a memory bottleneck, an interconnect bottleneck, a communication bottleneck, etc. Lessons learned from one deployment can be fed forward so that future neural network searches can learn from prior data collection and analysis, for example. Mile markers can be augmented across attachment points, accelerators, etc. Mile markers can be provided across accelerator attachment points, for example.

For example, using compute express link (CXL)™ interconnect technologies, mile marker data collection and analysis can be scaled to other attachment points. Accelerator attachment points and communication protocols can be analyzed and determined. Elements of a heterogenous architecture can be examined to evaluate a change in mile markers based on a change in accelerator attachment points, communication protocols, central processing unit (CPU) usage, general processing unit (GPU) usage, etc. Telemetry can be exposed from the database 2240 to the cloud server 2290 and/or to one or more applications 2250, etc., running on the example platform 2220. As such both local applications 2250 and remote systems can benefit from the mile marker capture, telemetry analysis, etc., to enable change based on platform 2220 behavior, for example.

In certain examples, microcode patches can be evaluated for deployment. Telemetry from mile markers can be used to help tune and improve microcode deployment by leveraging the platform telemetry statistics observed and shared with the AutoML framework via the database 2240. AutoML framework extensions can help to find a beneficial search space for microcode patches. For example, the microcode search space can be customized per platform 2220 rather than a one-size-fits-all approach.

The example microcode update manager 2258 can also be used to validate a new microcode patch and/or download to the platform 2220, as well as perform mile marker identification and capture. For example, a new microcode patch is evaluated using telemetry and performance hooks exposed for the mile marker analysis.

In certain examples, mile markers are extended across platform elements and protocols. Mile markers can be extended from processor microcode patch efficiency monitoring and tuning to evaluate other blocks in the platform 2220 running their own firmware, for example. Information can be exposed to applications running locally, as well as the cloud 2290, to affect change in (e.g., modify) platform 2220 behavior and/or application 2250 behavior via the local application(s) 2250, for example. In certain examples, characterizing and tuning of individual components, as well as the full platform 2220, can be crowd-sourced across a fleet or cluster of servers from one or more data centers in a hyper cloud deployment for at scale workload deployment and fleet management.

Figure 22D:
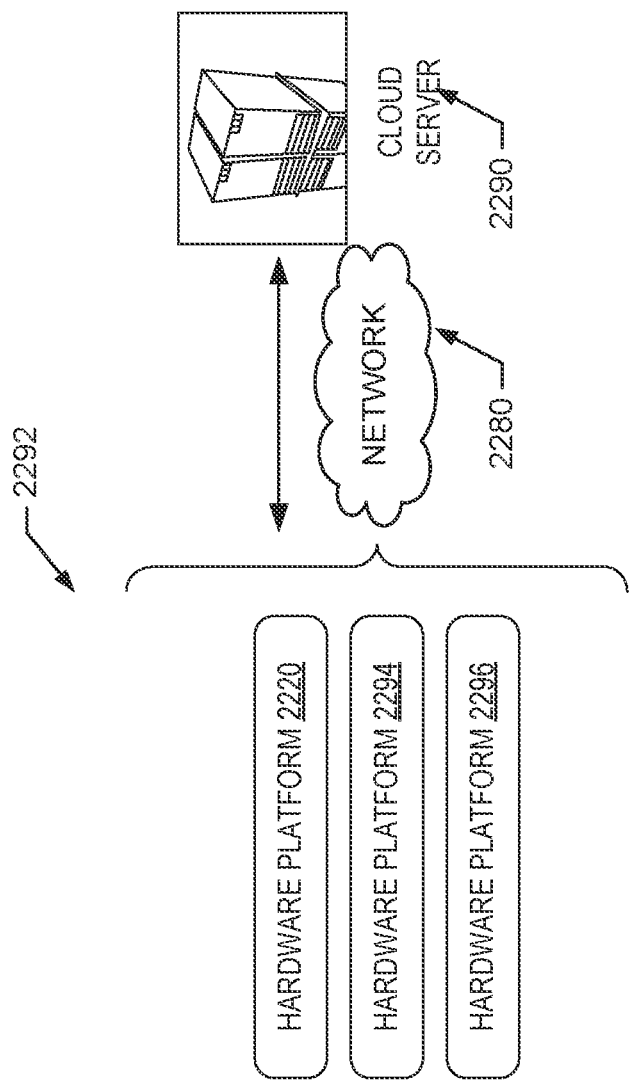
FIG. 22D illustrates an example crowd-sourced deployment of a plurality of hardware platforms gathering data at a server.

FIG. 22D illustrates an example implementation in which crowd-sourced analytics are tracked across crowd-sourced platforms. As discussed above, information can be exposed to applications running locally, as well as in "the cloud", to affect a change in platform behavior via the local application(s). In certain examples, characterization and tuning of individual, as well as platform-level settings, behavior, etc., can be crowd-sourced across a fleet or cluster of servers from one or many data centers in a hyper-cloud deployment for workload deployment and fleet management at scale.

FIG. 22D illustrates an example crowd-sourced deployment 2292 in which a plurality of hardware platforms 2220, 2294, 2274 provide analytics (e.g., content, device data, connectivity information, processor information (e.g., CPIs, XPUs, etc.) via the network 2280 to the cloud server 2290 configured as a crowd-sourced cloud server 2290. The crowd-sourced cloud server 2290 provides analytics for a mile marker (e.g., TEE) or set of mile markers such as patch evaluation/characterization, mile marker telemetry analytics, content analytics, secure timer, device attributes, policy management, etc., in a secure storage on the crowd-sourced cloud server 2290, for example. As such, data corresponding to a mile marker can be gathered and aggregated from multiple platforms 2220, 2294, 2296, and analyzed for storage and further use via the cloud server 2290.

While an example manner of implementing the $portion\ of\ the\ example\ featurization\ search\ system$ 2210 of FIG. 22A is illustrated in FIGS. 22B-22D, one or more of the elements, processes and/or devices illustrated in FIGS. 22B-22D may be combined, divided, re-arranged, omitted, eliminated and/or implemented in any other way. Further, the example block analyzer circuitry 2210, the example architecture searcher circuitry 2234, the example network trainer circuitry 2236, the example marker capturer circuitry 2238, the example database 2240, the example software layer 2260, the example hardware layer 2272, the example processing hardware 2274, the example ISA manager circuitry 2272, the example network 2280, the example server 2290, and/or more generally, the example featurization search system 2210 of FIGS. 22A-22D may be implemented by hardware, software, firmware and/or any combination of hardware, software and/or firmware. Thus, for example, any of the example block analyzer circuitry 2232, the example architecture searcher circuitry 2234, the example network trainer circuitry 2236, the example marker capturer circuitry 2238, the example database 2240, the example ISA manager circuitry 2262, the example hardware layer 2262, the example processing hardware 2274, the example ISA manager circuitry 2272, the example network 2280, the example server 2290, and/or more generally, the example featurization search system 2210 of FIGS. 22A-22D could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example block analyzer circuitry 2232, the example architecture searcher circuitry 2234, the example network trainer circuitry 2236, the example marker capturer circuitry 2238, the example database 2240, the example software layer 2260, the example hardware layer 2262, the example processing hardware 2274, the example ISA manager circuitry 2272, the example network 2280, and the example server 2290 is/are hereby expressly defined to include a non-transitory computer readable storage device or storage disk such as a memory, a digital versatile disk (DVD), a compact disk (CD), a Blu-ray disk, etc. including the software and/or firmware. Further still, the example block analyzer 2232, the example architecture searcher 2234, the example network trainer 2236, the example marker capturer 2238, the example database 2240, the example software layer 2260, the example hardware layer 2262, the example processing hardware 2274, the example ISA manager circuitry 2272, the example network 2280, the example server 2290, and/or more generally, the example featurization search system 2210 of FIGS. 22A-22C may include one or more elements, processes and/or devices in addition to, or instead of, those illustrated in FIGS. 22B-22D, and/or may include more than one of any or all of the illustrated elements, processes and devices.

One or more of the elements, processes, and/or devices described above can be implemented using processor circuitry including at least one of a) a central processing unit, a graphic processing unit or a digital signal processor; b) a Field Programmable Gate Array (FPGA); or Application Specific Integrate Circuitry (ASIC). In such implementations, the at least one of the central processing unit, the graphic processing unit or the digital signal processor have control circuitry to control data movement within the processor circuitry, arithmetic and logic circuitry to perform one or more first operations corresponding to instructions, and one or more registers to store a result of the one or more first operations, the instructions in the apparatus. In such implementations, the FPGA includes logic gate circuitry, a plurality of configurable interconnections, and storage circuitry, the logic gate circuitry and interconnections to perform one or more second operations, the storage circuitry to store a result of the one or more second operations. In such implementations, the ASIC includes logic gate circuitry to perform one or more third operations. The processor circuitry is to at least one of perform at least one of the first operations, the second operations or the third operations to execute processes, functions, and/or implement elements or devices described above.

In certain examples, one or more of the elements, processes, and/or devices described above can be implemented using an apparatus including at least one memory; instructions in the apparatus; and processor circuitry including control circuitry to control data movement within the processor circuitry, arithmetic and logic circuitry to perform one or more operations on the data, and one or more registers to store a result of one or more of the operations, the processor circuitry to execute the instructions to implement one or more of the elements, processes, and/or devices described above.

Flowcharts representative of example hardware logic, machine readable instructions, hardware implemented state machines, and/or any combination thereof for implementing the all or part of the example featurization search system 2210 of FIG. 22A are shown in FIGS. 23E-25G. The machine readable instructions may be one or more executable programs or portion(s) of an executable program for execution by a computer processor and/or processor circuitry. The programs may be embodied in software stored on a non-transitory computer readable storage medium such as a CD-ROM, a floppy disk, a hard drive, a DVD, a Blu-ray disk, or a memory associated with the processor, but the entire program and/or parts thereof could alternatively be executed by a device other than the processor and/or embodied in firmware or dedicated hardware. Further, although the example programs are described with reference to the flowcharts illustrated in FIGS. 23-25, many other methods of implementing the example portion of the example featurization search system 2210 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

As mentioned above, the example processes of FIGS. 23-25 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

In certain examples, a marker capturing means can be implemented by the example marker capturer circuitry 2238 to extract information regarding the hardware platform 2274 associated with a marker occurring during a first phase (e.g., the warm-up phase). The example marker capturing means is to store the information in a database, such as the example database 2240. In certain examples, an architecture searching means can be implemented by the example architecture searcher circuitry 2234 to, in the first phase, monitor a hardware platform to identify features associated with the marker to train an artificial intelligence model and, in a second phase (e.g., the exploration phase) to execute hardware-aware training of the artificial intelligence model using information from the database.

Figure 23:
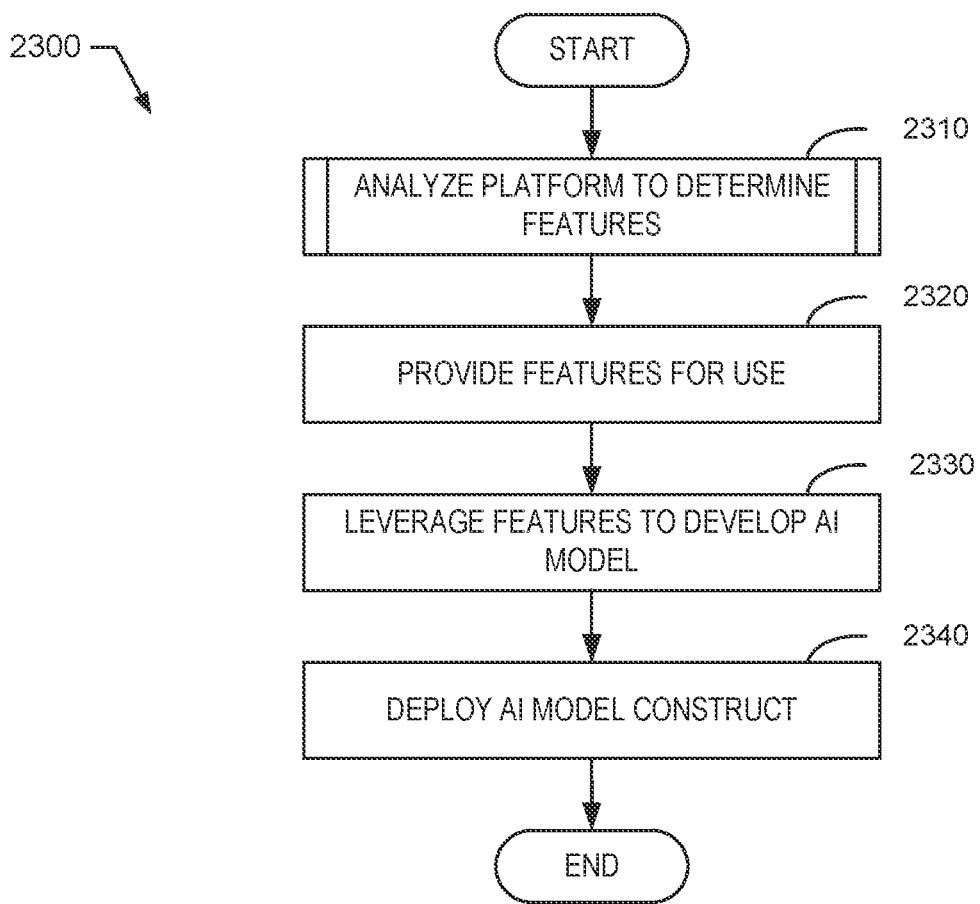
FIGS. 23-25 are flowcharts representative of machine readable instructions which may be executed to implement all or part of the example featurization search system of FIGS. 22A-22D.

FIG. 23 is a flowchart representative of machine readable instructions which may be executed to implement all or part of the example AutoML apparatus 2200 of FIG. 22A. In the example process 2300 of FIG. 23, the example featurization search system 2210 analyzes the example hardware platform 2220 to determine features associated with the example platform 220. (Block 2310). For example, the example featurization search system 2210 divides and/or otherwise organizes the hardware and software of the example platform 2220 into blocks. Mile markers or event indicators (e.g., code start, code end, microcode benchmark, etc.) are captured by the example featurization search system 2210 examining the configuration and activity of the example platform 2220. The example featurization search system 2210 saves the captured mile marker values and other associated data, analytics, etc., to form features associated with the example platform 2220. Features can be organized into one or more data sets for training, testing, etc., of an ML network and/or other AI model, for example. Features can also be organized by architecture (e.g., CPU, GPU, FPGA, vision processing unit (VPU), XPU, etc.), and/or by platform capability (e.g., different generation processors have different capabilities, etc.), etc. The features are provided for use via the example database 2240 (Block 2320) and can serve as a basis for automated hardware-aware neural architecture search and network training using the identified features saved, aggregated, normalized, and/or otherwise processed as one or more data sets, for example.

The example model developer circuitry 2230 uses features and other extracted and/or evaluated information to generate, train, test, and/or otherwise validate one or more AI models. (Block 2330). For example, identified features and associated telemetry data can be used to form one or more data sets for training, testing, and/or other validation of an AI model construct. The AI model construct is customized for an underlying architecture and configuration based on the features and associated data, for example. In certain examples, the AI model construct is customized for data processing in addition to compute optimization and precision selection (e.g., FP32, INT8, INT4, other operations, etc.). The AI model construct can then be deployed on the example platform 2220. (Block 2340).

Figure 24:
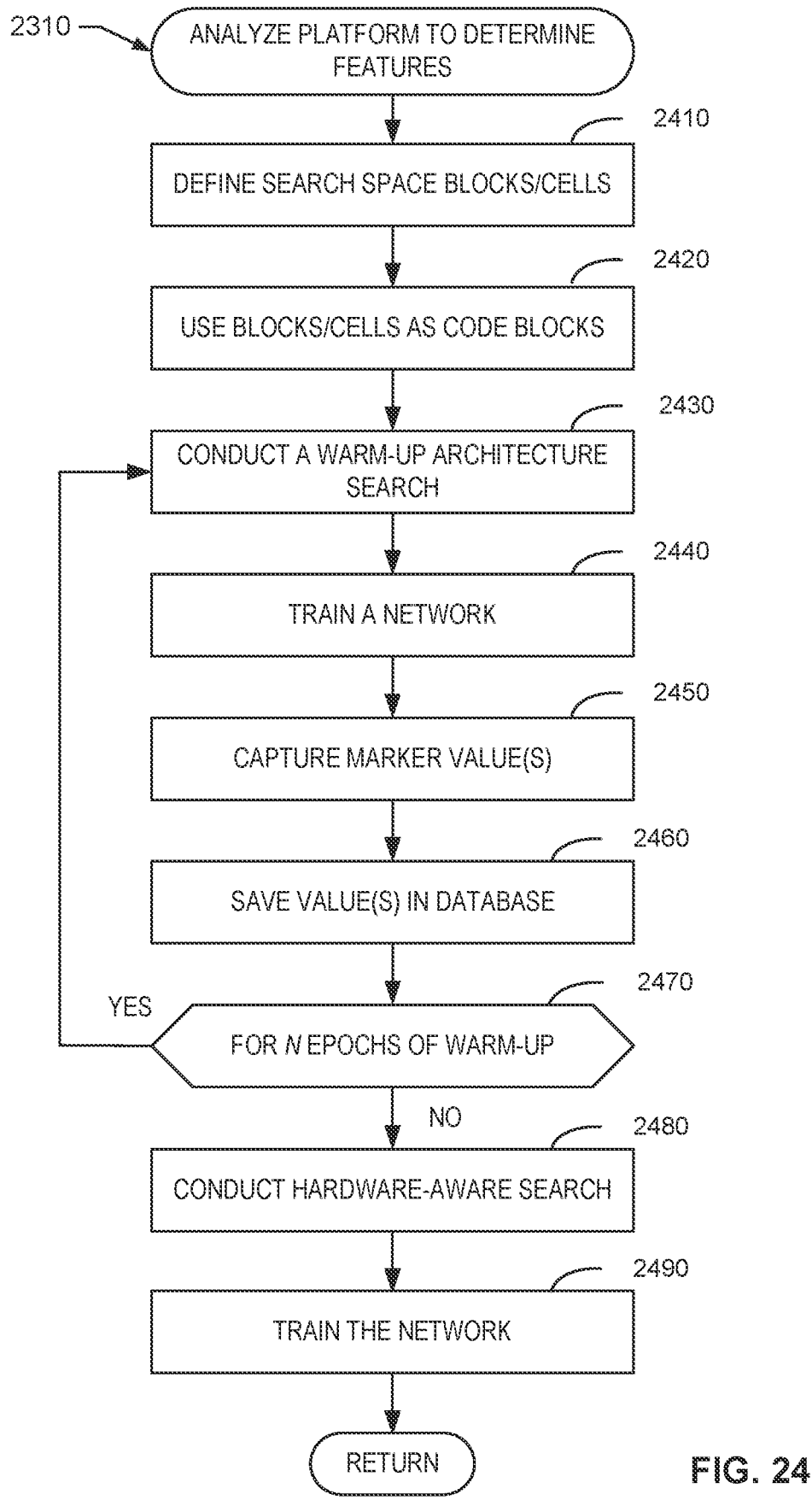

FIG. 24 is a flowchart representative of machine readable instructions which may be executed to implement all or part of the example featurization search system of FIGS. 22A-22D to analyze the example platform 2220 to determine features associated with the example platform 2220. (Block 2310 of the example of FIG. 23). In the example process 2310 of FIG. 24, the example block analyzer 2232 defines a featurization search space in terms of blocks or cells. (Block 2410). Blocks/cells can be associated with markers or "hooks" (e.g., a custom code or function executed at a start of a code block, at an end of a code block, at a point of execution within the code block, etc., to provide a parameter value, status value, other data to the marker capturer 2238) to enable telemetry information to be extracted with respect to the blocks or cells, for example. The example block analyzer 2232 uses the blocks or cells as code blocks for monitoring. (Block 2420). During a warm-up phase, the example architecture searcher circuitry 2234 searches for features with respect to the code blocks. (Block 2430). For example, the architecture searcher circuitry 2234 monitors code to identify features that can be used to form data set(s) for training, testing, and/or validating an AI network model. Code blocks are examined while the example network trainer circuitry 2236 is training the AI network model for accuracy in the warm-up phase. (Block 2440). The example marker capturer circuitry 2238 captures mile marker and/or other indicator values. (Block 2440). For example, telemetry and/or other data associated with a start of a compute block, an end of a compute block, an execution point with a compute block, etc., can be collected by the example marker capturer circuitry 2238 to determine a number of cells, code movement, parameter values, etc. In certain examples, the marker capturer circuitry 2238 interacts with the microcode 2276, 2278 to capture data values, usage statistics, etc., for the example platform 2220. After processing the values to format the values, analyze the values, normalize the values, etc., the values/statistics are saved in the example database 2240. (Block 2460). Statistics are collected and updated for code blocks and saved in the example database 2240 for a number n epochs of the warm-up phase, for example. (Block 2470). In certain examples, code blocks can be simulated, rather than actually executed, to gather marker data for processing, storage, and usage.

Operation then shifts to a neural architecture exploration phase, in which the example architecture searcher circuitry 2240 conducts a hardware-aware featurization search based on the hardware information saved by the example marker capturer circuitry 2240 in the example database 2240. (Block 2480). In certain examples, the database 2240 includes marker information from a plurality of hardware captures, etc. The example network trainer circuitry 2236 can then train a network model (e.g., an AutoML network model, another ML network model, a DL network model, etc.) based on the hardware-aware featurization search of the architecture searcher circuitry 2234 (e.g., results stored in the database 2240) to provide a trained network model for testing and deployment. (Block 2490).

Figure 25:
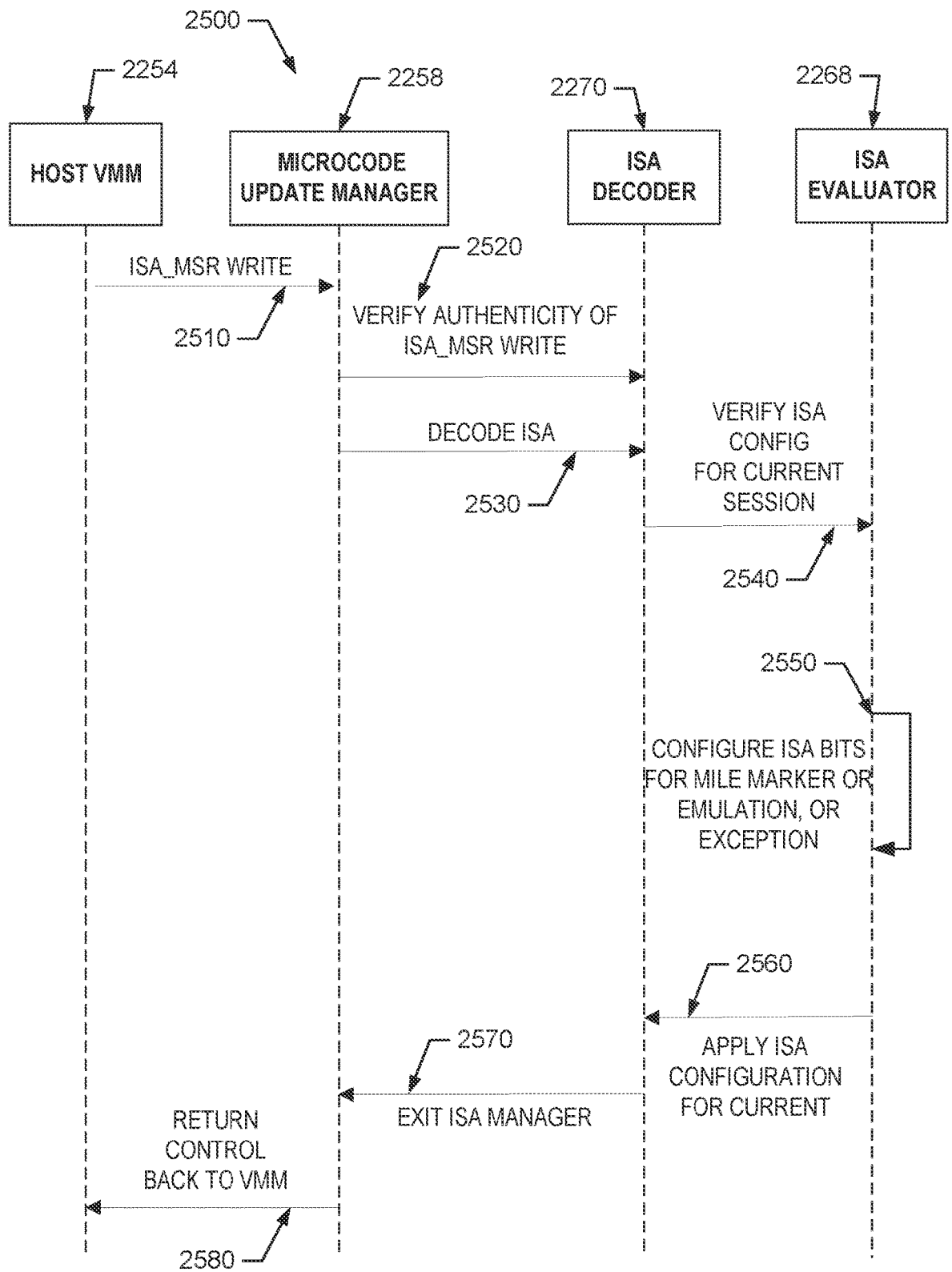

FIG. 25 is a flowchart representative of machine readable instructions which may be executed to implement all or part of the example featurization search system of FIGS. 22A-22C. In particular, the example process 2500 of FIG. 25G is an example implementation of capturing marker values (Block 2450) using the example marker capturer circuitry 2238 and its associated ISA manager circuitry 2262. As shown in the example of FIG. 25, the example host VMM 2250 performs a write (2510) to a model-specific register (MSR) associated with the ISA of the example processing platform 2220. The example microcode update manager 2258 communicates with the example ISA decoder 2270 to verify (2520) the authenticity of the writing of ISA information by the VMM 2250 to the MSR. The example microcode update manager 2258 also communicates with the example ISA decoder 2270 to decode (2530) the ISA information associated with the write. The example ISA decoder 2270 verifies (2540) an ISA configuration for a current session involving bits of a message passing interface (MPI) with the example ISA evaluator 2268. The example ISA evaluator 2268 also configures (2530) MPI bits of the ISA to allow execution of a mile marker, emulation, or to generate an exception based on provisioned policies for the session. As such, the mile marker can execute or be emulated/simulated to allow capture of data related to the mile marker, or an exception is generated if such execution/emulation is against provisioned policies for the platform 2220 or its current session, for example. The ISA evaluator 2268 applies (2560) the ISA configuration to the ISA decoder 2270 for the current session, and the ISA decoder 2270 triggers an exit (2570) from configuration by the example ISA manager 2262. The example microcode update manager 2258 then returns control (2580) to the host VMM 2254.

Thus, certain examples enable a neural architecture search and training of a resulting neural network (and/or other AI network) to be hardware-aware and automatically capture and identify features of the hardware (and software) to optimize the resulting network model according to the underlying hardware (and/or software). The architecture search can examine a particular architecture configuration, taking into account latency, efficiency, and/or other configuration requirements/statistics in the measured code blocks to enable AutoML to train a network that satisfies these constraints.

In certain examples, blocks represent layers of a neural network (e.g., an ML network, etc.) and/or operations within a layer, depending on a desired level of granularity. The blocks and associated markers can be agnostic to a chosen architecture search strategy. Captured information is leveraged from the database to make an architecture search hardware-aware of the underlying platform(s) on which a resulting neural network can be run. Information can be stored in the example database for one or more hardware configurations at one or more levels of granularity to be applied, exported, shared, and/or otherwise used for network architecture identification and network training, for example. In certain examples, the resulting database can be packaged and deployed for use in a variety of AI network model training scenarios.

Mile markers and/or other indicators are tracers in underlying hardware, microcode, and/or pipeline execution to understand pipeline and associated hardware telemetry and store associated information in the database. In certain examples, operation codes (opcodes) and/or other machine instructions can be exposed to allow third parties to collect telemetry information and develop network models without input from the platform provider. For example, the example systems and methods described herein can enable an application programming interface (API) to allow third parties to define a search space, access values in the database, capture marker information to add to the database, etc.

From the foregoing, it will be appreciated that example systems, methods, apparatus, and articles of manufacture have been disclosed that provide automated featurization of a hardware platform and associated software to enable hardware-aware search and development of AI models. The disclosed systems, methods, apparatus, and articles of manufacture improve the efficiency and effectiveness of training, testing, and deploying AI models by enabling hardware-aware model development through identification and capture of features relevant to particular platform(s), configuration(s), etc., on which the AI model is to be deployed. The disclosed systems, methods, apparatus, and articles of manufacture are accordingly directed to one or more improvement(s) in the design and manufacture of processor circuitry to monitor, capture, process, and store such features and deploy them in a database for hardware-aware AI model development.

Using the disclosed systems, methods, apparatus, and articles of manufacture, mile markers can be configurable based on one or more policies and remotely managed by an entity such as a cloud server, edge server, administrator, etc. Based on telemetry and insights from mile markers, neural architecture search strategies can be improved based on past learning, incorrect predictions, etc., as evaluated using the telemetry data, mile marker insights, etc.

The following paragraphs provide various examples of the implementations disclosed herein.

Example 38 is an apparatus including: at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus; a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry including logic gate circuitry to perform one or more third operations; the processor circuitry to at least one of perform at least one of the first operations, the second operations or the third operations to: monitor, in a first phase, a hardware platform to identify features to train an artificial intelligence model; extract information regarding the hardware platform associated with a marker related to the features occurring during the first phase; and store the information in a database to, in a second phase, enable hardware-aware training of the artificial intelligence model.

Example 39 is the apparatus of example 38, wherein the processor circuitry is to at least one of perform at least one of the first operations, the second operations or the third operations to organize a feature search space into code blocks including a first code block associated with the marker.

Example 40 is the apparatus of example 38, wherein the processor circuitry is to at least one of perform at least one of the first operations, the second operations or the third operations to execute hardware-aware training of the artificial intelligence model with the information from the database.

Example 41 is the apparatus of example 38, further including a memory to store the database, the database accessible by one or more devices to drive development of the artificial intelligence model.

Example 42 is the apparatus of example 41, wherein the database is a cloud-accessible database.

Example 43 is the apparatus of example 41, wherein the information in the database is accessible to modify behavior of an application running on the hardware platform.

Example 44 is the apparatus of example 41, wherein the database is to include information gathered from at least one of a plurality of platforms or a plurality of configurations of the hardware platform.

Example 45 is the apparatus of example 41, wherein the marker is simulated rather than executed.

Example 46 includes at least one non-transitory computer readable storage medium including instructions that, when executed, cause at least one processor to at least: monitor, in a first phase, a hardware platform to identify features to train an artificial intelligence model; extract information regarding the hardware platform associated with a marker related to the features occurring during the first phase; and store the information in a database to, in a second phase, enable hardware-aware training of the artificial intelligence model.

Example 47 is the at least one computer readable storage medium of example 46, wherein the at least one processor is to organize a feature search space into code blocks including a first code block associated with the marker.

Example 48 is the at least one computer readable storage medium of example 46, wherein the at least one processor is to train the artificial intelligence model using the information in the database.

Example 49 is the at least one computer readable storage medium of example 46, wherein the at least one processor is to modify behavior of an application running on the hardware platform using the information in the database.

Example 50 is the at least one computer readable storage medium of example 46, wherein the at least one processor is to simulate execution of the marker to extract the information.

Example 51 includes a method including: monitoring, in a first phase, a hardware platform to identify features to train an artificial intelligence model; extracting information regarding the hardware platform associated with a marker related to the features occurring during the first phase; and storing the information in a database to enable hardware-aware training of the artificial intelligence model in a second phase.

Example 52 is the method of example 51, further including organizing a feature search space into code blocks including a first code block associated with the marker.

Example 53 is the method of example 51, further including training the artificial intelligence model using the information in the database.

Example 54 is the method of example 51, further including modifying behavior of an application running on the hardware platform using the information in the database.

Example 55 is the method of example 51, further including simulating execution of the marker to extract the information.

Example 56 includes a system including: marker capturing means to extract information regarding the hardware platform associated with a marker occurring during a first phase, the marker capturer to store the information in a database; and an architecture searching means to, in the first phase, monitor a hardware platform to identify features to train an artificial intelligence model and, in a second phase, execute hardware-aware training of the artificial intelligence model using the information from the database.

Example 57 is an apparatus including: at least one memory; instructions in the apparatus; and processor circuitry including control circuitry to control data movement within the processor circuitry, arithmetic and logic circuitry to perform one or more operations on the data, and one or more registers to store a result of one or more of the operations, the processor circuitry to execute the instructions to implement at least: a marker capturer to extract information regarding the hardware platform associated with a marker occurring during a first phase, the marker capturer to store the information in a database; and an architecture searcher to, in the first phase, monitor a hardware platform to identify features associated with the marker to train an artificial intelligence model and, in a second phase, execute hardware-aware training of the artificial intelligence model using the information from the database.

Example 58 is the apparatus of example 57, wherein the processor is to implement a block analyzer to organize a feature search space into code blocks including a first code block associated with the marker.

Example 59 is the apparatus of example 57, wherein the processor is to implement a network trainer to train the artificial intelligence model with the architecture searcher.

Example 60 is the apparatus of example 57, further including the database, the database accessible by one or more devices to drive development of the artificial intelligence model.

Example 61 is the apparatus of example 60, wherein the database is a cloud-accessible database.

Example 62 is the apparatus of example 57, wherein the information in the database is accessible to modify behavior of an application running on the hardware platform.

Example 63 is the apparatus of example 57, wherein the database is to include information gathered from at least one of a plurality of platforms or a plurality of configurations of the hardware platform.

Example 64 is the apparatus of example 57, wherein the marker is simulated rather than executed.

Example 65 is the apparatus of example 57, wherein the marker capturer includes: a telemetry manager to capture the information related to the marker; a microoperation surplus mapper to generate the marker; an instruction set architecture evaluator to dispatch the marker and evaluate at least one of a hardware state or a software state included in the information associated with the marker; and an instruction set architecture decoder to process the information for storage in the information in the database.

Example 66 is the apparatus of example 57, wherein the processor is in communication with a cloud server via a network.

Example 67 is the apparatus of any of examples 38-45, wherein extracting information regarding the hardware platform associated with a marker occurring during the first phase includes: capturing the information related to the marker; generating the marker; dispatching the marker and evaluating at least one of a hardware state or a software state included in the information associated with the marker; and processing the information for storage in the information in the database.

Example 68 is the computer-readable storage medium of any of examples 46-50, wherein the instructions, when executed, cause at least one processor to at least: extract information regarding the hardware platform associated with a marker occurring during the first phase includes: capturing the information related to the marker; generate the marker; dispatch the marker and evaluate at least one of a hardware state or a software state included in the information associated with the marker; and process the information for storage in the information in the database.

Example 69 is the method of any of examples 51-55, wherein extracting information regarding the hardware platform associated with a marker occurring during the first phase includes: capturing the information related to the marker; generating the marker; dispatching the marker and evaluating at least one of a hardware state or a software state included in the information associated with the marker; and processing the information for storage in the information in the database.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent. Although the examples disclosed herein have been shown in examples related to semiconductors and/or microprocessors, the examples disclosed herein may be applied to any other appropriate interconnect (e.g., a layered interconnect) application(s) or etching processes in general.

Scalable Model Compression (ID6)

Efficient artificial intelligence (AI) and deep learning (DL) accelerators feature high-throughput mixed-precision and sparse compute capability. Model compression is a technique to adapt a neural network (NN) to cause the advantages of these features.

Two example classes/techniques of model compression, also called model optimization, include (1) Quantization and (2) Pruning. Both methods are predominant techniques of "compression" for the NN. Quantization is the process of converting a neural network execution graph that is originally operating in a first precision (e.g., floating point (FP32/16)) to operate in the target hardware (IHW) at a second precision (e.g., Int8/4/2/1). For example, the sum and product of each layer is operating at the prescribed units of the HW to provide layer-wise precision prescription solution (e.g., first precision, second precision). The layer-wise precision prescription solution provides deployment of a neural network in low precision and seizes lower power consumption and higher throughput of low-precision arithmetic units. Pruning is the process of sparsifying (introducing zeros) neural network parameters, resulting in computation and memory capacity/bandwidth savings. For example, connections (e.g., weights) and neurons (intermediate inputs/features) are pruned at every layer to provide a layer-wise pruning rate. These model compression techniques improve model efficiency by reducing memory requirements to store the model. For example, by pruning particular neurons the corresponding weights do not need to be stored, thus enabling storage savings for the model. Additionally, during runtime these particular weights and intermediate inputs don't need to be fetched from storage for execution. Furthermore, quantizing to a relatively lower precision also lowers the amount of space necessary for model storage. Model compression can be achieved using one and/or a combination of techniques. Other model compression techniques not mentioned above can also be utilized in examples disclosed herein.

However, in some examples, model compression causes accuracy degradation. To achieve improved performance and accuracy on target hardware, selection of fine-grained (layer-wise) precision and/or sparsity is required to occur in a manner consistent with specific parameters of that target hardware. Fine grained/layer-wise/per-layer compression precision includes layer-wise quantization and/or layer-wise pruning. Layer-wise quantization (e.g., (1) quantization) varies operating bit width (e.g., precision) at every layer. Layer-wise pruning (e.g., (2) pruning) varies sparsity levels (e.g., the number of zeros) at every layer. Appropriate selection of fine-grained (layer wise) precision and/or sparsity can vary based on network topology, available hardware, and/or performance targets/expectations. Examples disclosed herein improve model accuracy by, in part, automating the search of fine-grained design and optimizing performance and accuracy on target HW.

Existing techniques to compress models are unscalable and inefficient for large-scale model adaptation. The current techniques (e.g., an optimizer/learning agent) are repeated independently from scratch for every instance of a model (e.g., a neural network), its target platform and corresponding performance goals of the model. As a result, for every new workload having one or more models to be optimized (e.g., compressed), optimization resources (e.g., exploration agents) are spawned from a ground state absent of anything learned from previously spawned agents. Efficient example solutions to support scaling are disclosed herein. Examples disclosed herein create a scaling technique to support multiple XPU platforms (e.g., mix of architectures collectively described as XPU includes CPU, GPU, VPU, FPGA, etc.) where target deployment can be any combination of XPU platforms (heterogeneous inference). Examples disclosed herein include an adaptable system that supports different neural network topologies, datasets from different customers (e.g., tenants), and different target performance-accuracy trade-offs to support scaling and create a model (e.g., neural network) with improved efficiency.

Examples disclosed herein apply transferable and reusable agents without the need of optimizer/agent learning from scratch. The agents of examples disclosed herein are executable processes that learn internal representations of the relationship between policy/actions and the type of task, topology and/or target HW. The agents of examples disclosed herein prescribe the pruning rate and quantization rate for target hardware. Examples disclosed herein facilitate a manner of automation of a new set of HW targets, a new network architecture, and corresponding performance goals that converge comparatively faster than existing techniques.

FIG. 30A is an example framework of structure and machine-readable instructions which may be executed to implement a search flow for model compression. FIG. 30A shows the framework to apply transferable and re-usable agents without the need of optimizer/agent learning from scratch. In operation, an example input receiver circuitry 3002 is an example structure that receives, retrieves and/or otherwise obtains inputs (e.g., from a user, manual inputs, inputs from storage, etc.). The example input receiver circuitry 3002 includes example automation HW target receiver circuitry 3004, example training dataset receiver circuitry 3006, and example trained network definition receiver circuitry 3008.

Inputs include but are not limited to those from the example automation HW target receiver circuitry 3004. The example automation HW target receiver circuitry 3004 is an example structure that receives, retrieves and/or otherwise obtains the type of input target HW (e.g., VPU (int8/4/2/1), FPGA, CPU+GPU) and the required performance target(s). In some examples, target HW information is retrieved from user input, storage devices (e.g., databases) containing platform configuration data, and/or assets that seek information from hardware that is communicatively connected via one or more networks.

Inputs also include but are not limited to those from the example training dataset receiver circuitry 3006, which is an example structure that receives, retrieves and/or otherwise obtains training dataset(s) (e.g., from the user, from one or more training dataset storage devices, etc.). Training dataset(s) can be a full or subset of the original training dataset that is utilized to achieve the trained network of 3008. The training dataset(s) are used to recover the accuracy degradation caused by compression policies (e.g., quantization, pruning).

Inputs also include but are not limited to those from the example trained network definition receiver circuitry 3008. The trained network definition receiver circuitry 3008 is an example structure that receives, retrieves and/or otherwise obtains trained network(s) from the user. Trained networks are needed as they are the target of optimization, in which they are quantized or pruned. The trained network, when optimized (e.g., using quantization or pruning) can perform a new task (e.g., object detection, recommendation system) on a different data set (e.g., different images, different user inputs). Trained networks provide baseline of task performance (e.g., accuracy, latency), serving as the reference for observing any degradation due to compression. Instead of repeating the network training and starting with randomized initialized weights, the previous weights from the pretrained network can be saved and applied as initial weight values for the new task. Some advantages to using a pre-trained network include saving time, power, and resources because the pre-trained network gives the new task a quicker starting point.

An example agent 3010, also known as a learner or optimizer, is spawned or otherwise invoked to learn and optimize a scalable model compression for improved performance in view of particular platform characteristics. In the illustrated example of FIG. 30A the example agent 3010 is an optimization algorithm and/or hardware that is implemented and/or otherwise represented in one or more neural networks. It can be, but is not limited to, deep reinforcement learning, Bayesian optimization, and/or evolutionary algorithms. In the examples disclosed herein, the example agent is directed to deep reinforcement learning algorithms. Examples disclosed herein can be located at and/or otherwise perform optimization tasks at any location of the example Edge cloud, such as the example Edge cloud 110 of FIGS. 1, 2 and 3. Additionally, examples disclosed herein may be located at and/or otherwise perform optimization tasks at any one or more of the multiple network layers (e.g., the endpoint layer 200, the Edge devices layer 210, the network access layer 220, the core network layer 230 and/or the cloud data layer 240. Additionally, the example agent 3010 can predict a per-layer compression policy in each iteration. The per-layer compression policy is a way to gain higher performance while preserving the accuracy of a neural network. Compression of neural networks reduces the amount of data transfer and computing during the execution of the neural network. Per-layer compression policies provide varying sensitivity towards compression. Optimal layer-wise configurations minimize accuracy degradation that can occur because of compression. Furthermore, the example agent 3010 learn(s) from environment and hardware performance feedback. One way it can learn is recognizing the relationships between data. Over any number of search iterations, the example agent 3010 eventually learns the best trade-off policy that minimizes network accuracy impact and maximizes hardware performance. The example agent 3010 also contains example experience replay buffer circuitry 3012.

The example experience replay buffer circuitry 3012 is an example structure that contains data from previous iterations. The example experience replay buffer circuitry 3012 contains a historical policy, a reward, feedback from a compression environment, and/or evaluated hardware that is saved to substantiate the training of the example agent 3010 by speeding up and improving the training. Generally speaking, the experience replay buffer circuitry 3012 contains feedback and provides a dataset or experience for the agent 3010 to use to train (e.g., to learn the best compression policy of each neural network layer) any input neural network.

Example layer-wise mixed-precision sparsity policy predictor circuitry 3013 is an example structure that takes the prediction from the agent 3010 and checks for changes in delta (e.g., monitoring for diminishing or increasing returns) to decide when to stop iterations when performance is no longer improving. The example agent 3010 is responsible for, in part, predicting/inferencing a layer-wise mixed-precision configuration that is consumed by an example compression environment performer circuitry 3016. Layer-wise mixed-precision configuration is a technique used to find the optimal configuration for every layer of a trained neural network so inference is accelerated, and accuracy is maintained. The training of the neural network happens in full precision and hence the trained neural network is required to be input via trained network definition receiver circuitry 3008. Training involves training an agent. During each iteration, the layer-wise mixed-precision sparsity policy predictor circuitry 3013 explores a potential solution and by the end of the iteration, the layer-wise mixed-precision sparsity policy predictor circuitry 3013 is converged to an optimal solution. The agent is the predictor/inferencer that is reused during training. The output of the trained agent is a layer-wise or mixed-precision and/or sparsity policy.

The example compression environment performer circuitry 3016 is an example structure that performs compression and evaluates post compression metrics such as accuracy and distortion. The example compression environment performer circuitry 3016 receives a neural network fine-grained compression framework (e.g., realized as a policy and/or a particular configuration) from the layer-wise mixed-precision sparsity policy predictor circuitry 3013 and from the agent 3010. Additionally, the compression environment performer circuitry 3016 creates a hardware specific execution graph for hardware performance evaluation. The hardware specific execution graph provides feedback on latency, throughput, and/or power. Furthermore, the example compression environment performer circuitry 3016 provides feedback on post-compression accuracy and network dynamic observations to the agent 3010. The example compression environment performer circuitry 3016 is also communicatively connected to an example HW executable 3018 (e.g., target hardware or a software simulator) to perform compression and devaluate post compression metrics.

An example accuracy/network states checker circuitry 3014 is an example structure that checks for the accuracy and state of the neural network. The accuracy/network states checker circuitry 3014 compares a value (e.g., input by user, a threshold value and/or a predetermined value) to the accuracy and state of the neural network to determine if it has reached a predefined threshold (e.g., determined by user input and/or a predetermined value). The accuracy/network states checker circuitry 3014 serves as samples for the agent 3010 to learn from. The result of the comparison can determine if a change needs to occur (e.g., adjust weights) or to use/release the resulting value/model. The output of the accuracy/network states checker circuitry 3014 is stored in the experience replay buffer circuitry 3012.

The example HW executables 3018 is an example structure that takes the results from the compression environment performer circuitry 3016 and sends the results from the hardware specific execution graph for hardware performance evaluation and sends it to an example hardware performance evaluator circuitry 3024.

The example hardware performance evaluator circuitry 3024 is an example structure that evaluates the performance of a predicted policy of the example agent 3010. The example hardware performance evaluator circuitry 3024 can be a simulation model (e.g., statistical) or it can be a profiling application that deploys the hardware-mapped graph on the real target hardware. The example hardware performance evaluator circuitry 3024 also sends the performance feedback and hardware specific dynamic observations to the agent 3010.

An example hardware results sender circuitry 3020 is an example structure that receives evaluations from the example hardware performance evaluator circuitry 3024 and sends hardware metrics such as latency, throughput, and power to the agent 3010.

Example network outputer circuitry 3022 is an example structure that outputs the sparse and/or mixed-precision network deployable model on target hardware. The example network outputer circuitry 3022 outputs a compressed network with layer-wise configurations and a compressed network that is specific to target hardware. The resulting example optimal compression from the example network outputer circuitry 3022 can be employed in the application running on targeted hardware. The example network outputer circuitry 3022 sends an output that causes the compression environment performer circuitry 3016 to achieve compression goals with minimal accuracy impact.

FIG. 30B illustrates example compression techniques. A fully trained NN 3026 is illustrated on the left side with a fully connected network of nodes. In the illustrated example of FIG. 30B, nodes are represented as circles and weights are represented as lines between respective circles. The fully trained NN 3026 undergoes a fine-grained/layer-wise/per-layer compression policy, which can include layer-wise pruning 3028 and/or layer-wise quantization 3030. Example layer-wise pruning 3028 includes varying a sparsity level (e.g., number of zeros) at different layers. Example layer-wise quantization 3030 includes varying operating bit width (e.g., precision) at different layers.

Pruning 3028 is a compression technique that allows models to begin with a large NNs (e.g., NNs with more layers) and remove weights and/or nodes to reduce the size of the trained model, making it easier (e.g., relatively less bandwidth required) to distribute, and minimize loss in accuracy and performance. Pruning methods include layer-wise pruning, which allows the connections (e.g., weights) and neurons (e.g., intermediate input/features) to be pruned at every layer to increase accuracy and performance and decrease size and time to output results. An example of pruning weights can include setting individual parameters to zero and making the network sparse. This would lower the number of parameters in the model while keeping the architecture the same. An example of pruning nodes can include removing entire nodes from the network. This would make the NN architecture itself smaller, while aiming to keep the accuracy of the initial larger network.

Quantization 3030 is a compression technique that converts full precision to a lower precision. Quantization creates noise wherein noise refers to the distortion caused by rounding due to limited resolution of a given precision. For example, if 2 bits are used to represent values ranging between 0 and 1 then the simplest way to represent that is to have 00, 01, 10, 11 binaries to evenly represent the range (e.g., (0.25, 0.5, 0.75, 1)). Any given values between the intervals will be rounded to the closest value. For example, 0.89 will be rounded to 1 and be represented as 11, the value is distorted by 0.11. As described, quantization creates noise and distorts the original neural network and results in accuracy degradation. To circumvent the problem, neural network layers are quantized in a non-uniform way as some layers are more sensitive to distortion.

Both pruning and quantization are predominant "compression" techniques of NN. The compression techniques may result in 11 W-agnostic and 11 W-dependent model compression. HW-agnostic model compression results including model storage size and/or runtime memory footprint/bandwidth. HW-agnostic model compression is not dependent on custom HW, but some compression techniques provide HW-dependent results that require one or more particular architectures to execute pruned and/or quantized models having high throughput and/or low latency. HW-dependent model compression improves computation for specific HW that are dependent on the structure of the HW.

FIG. 30C is another example of a compression framework. This is only one example of how one or more agents can make predictions, however, there are many other methods to accomplish this task and other tasks. Agent 3031 predicts pruning/quantization for one, multiple, or all layers at once. The agent 3031 may be implemented in a manner consistent with the example agent 3010 of FIG. 30A. This example compression technique shows the example agent 3031 traversing each layer $\{t_0, \ldots, t_n\}$ in a target model 3038. At each layer quantizers 3040, 3042, 3044 quantize the target model 3038 and make a prediction given the state of the layer. An example agent controller 3032 (e.g., deep deterministic policy gradient (DDPG), a type of deep reinforcement learning algorithm) gathers and stores the samples from the target model 3038 in addition to samples from an example experience buffer 3034. The experience buffer 3034 stores data that is independently distributed to break any temporal correlation of behavior and distributes/averages data over many of its previous states to avoid oscillations or divergence in the model. The agent controller 3032 samples the experiences from the experience replay buffer 3034 and uses the samples to train the NN. The feedback from the quantization environment 3048 includes accuracy, model size, layer distortion and the feedback from the hardware evaluator 3050 includes the latency, throughput, and/or power all are assimilated to provide a metric of "goodness" (e.g., resulting in optimal solution) of a mixed precision 3047. These rewards, together with other attributes are saved to the experience buffer. The reward function 3036 gives rewards or more value to results (e.g., accuracy, model size, layer, latency, throughput, power) that output results with higher accuracy, accurate model size, lower power consumption, higher performance, etc. and/or reach specific targets set by the user, and/or pre-set in the storage. The agent 3031 retrieves and/or otherwise obtains samples of the quantized data 3047 from the target model 3038. The agent 3031 uses samples of the quantized data 3047 from the buffer and uses them to alter its network (e.g., alter, change, improve). In some examples, alterations are applied with different magnitudes depending on, for instance, a number of iterations or epochs a process or model has performed. Early instances of iterations, such as when there is no data available, will involve relatively greater magnitude changes to parameter adjustments. However, as iterations increase, the results of a modeling effort (e.g., a gain/loss function) may produce values that are relatively closer to ground truth values, or results during subsequent iterations may be relatively small. In such circumstances, the alterations may be relatively smaller and/or otherwise proportional to the amount of change in a calculated value from one iteration to the next. The agent 3031 then traverses through the quantizer 3038 to infer the precision by executing its network. The quantized data 3047 include mapping the input values from a large set (e.g., a continuous set of data) to output values in a smaller set often with finite numbers of elements. This can be implemented using rounding and/or truncation or any other method. The result of the quantization environment 3048 can be sent back to the agent 3031 where it is then evaluated for accuracy, model size, and layer distortion 3052. The result of the quantization environment ID6_148 can also be sent to a hardware evaluator 3050 if it is to be implemented on a specific hardware. The resulting data from the target model 3038 can be implemented for use in a hardware (e.g., VPU (int8/4/2/1), FPGA, CPU+GPU). The hardware is then evaluated for latency, throughput, and power 3054 and sent back to the agent 3031 where it can be applied to the reward function 3036. This example compression technique can be applied to different neural networks for different and tasks such as(e.g., object detection, text-to-speech synthesis, recommendation system) and different hardware (e.g., VPU (int8/4/2/1), FPGA, CPU+GPU).

FIG. 31 is an example of a framework 3100 including structure and machine-readable instructions which may be executed to implement a search flow for a model compression method for three example customers with different requirements. The example structures of FIG. 31 correspond to examples disclosed in FIG. 30A. However, such examples are adapted for each customer A 3202, customer B 3204, customer C 3206 (see FIG. 32, discussed in further detail below) which correspond to agent A 3102, agent B 3108, agent C 3114 respectively.

An example agent A 3102 is an example of the agent 3010 disclosed above that is associated with and/or otherwise services the requirements of the customer A 3102. The requirements of the agent A 3102 include an object detection workload, a VPU (Int8/4/2/1) target hardware, and a 2× latency improvement with ±1% accuracy goal. An example VPU (Int8/4/2/1, Sparce Compute) 3104 is an example structure for the example hardware performance evaluator circuitry 3024 for the Customer A 3202.

An example agent B 3106 is an example of the agent 3110 disclosed above that is associated with and/or otherwise services the requirements of the customer B 3204. The requirements of the example agent B 3106 include a text-to-speech synthesis workload, a FPGA target hardware, and a 50% of original model size, +3% accuracy impact. An example FPGA (Int X) 3108 is an example structure for the hardware performance evaluator circuitry 3024 for the customer B 3204.

An example agent C 3110 is an example of the agent 3010 disclosed above that is associated with an/or otherwise services the requirements of the customer C 3206. The requirements of the agent C 3110 include a recommendation system workload, a CPU+GPU target hardware, and a 30% sparce Int8 embedding, +1% accuracy impact. An example CPU (FP32, BF16, INT X) 3112 is an example structure for the hardware performance evaluator circuitry 3024 for the Customer C 3206.

An example GPU (FP16, sparce compute) 3114 is an example structure for the hardware performance evaluator circuitry 3024 for the customer C 3206. Generally speaking, the illustrated example of FIG. 31 illustrates that traditional agent techniques that require initialization of an agent, the processing involving agent learning/training, and complete re-initialization and learning of an agent in the event a new customer requests evaluation tasks. Stated differently, examples disclosed herein retain the benefit of agent training when moving to one or more additional or alternative workload or target network training tasks, thereby saving computational resources and time savings to find the optimal configuration.

FIG. 32 is an example of three customers with different requirements. An example customer A 3202 is an example of a customer with the requirements corresponding to the agent A 3102 that include an object detection workload, a VPU (Int8/4/2/1) target hardware, and a 2× latency improvement with ±1% accuracy goal. An example customer B 3204 is an example of a customer with the requirements corresponding to the agent B 3106 that include a text-to-speech synthesis workload, a FPGA target hardware, and a 50% of original model size, +3% accuracy impact. An example customer C 3206 is an example of a customer with the requirements corresponding to the agent C 3110 that include a recommendation system workload, a CPU+GPU target hardware, and a 30% sparce Int8 embedding, +1% accuracy impact.

FIG. 33 is an example of the productivity improvement after using scalable model compression techniques disclosed herein. The illustrated example of FIG. 33 includes a first example A 3302 to illustrate the total time it would take to train three agents using a regular neural network method that does not involve a scalable model compression method for optimal platform specialization. The three learning agents include a first learning agent 3304, a second learning agent 3306, and a third learning agent 3308, all of which represent three different example customers who require models to be trained. The example three learning agents (3304, 3306 and 3308) are all individually spawned from scratch. Stated differently, the skilled agents of example A begin their execution tasks with default properties (e.g., settings, values, parameters, etc.) In this case a total search time 3310 is a function of a sum of the execution of each learning agent. In other words, it can take the same amount of time or more time to train one or more models due to the serial nature of the learning agent training process and the fact that traditional techniques do not realize the benefit of prior training efforts for subsequent agent configuration.

The illustrated example of FIG. 33 includes a second example B 3312 to illustrate the total time it would take to train seven models (e.g., each model having at least one corresponding agent) using examples disclosed herein. That is example B 3312 illustrates, scalable model compression methods for platform specialization. The example seven reusable agents include a first reusable agent 3316, a reusable skilled agent 3318, a third reusable agent 3320, a fourth reusable agent 322, a fifth reusable agent 3324, a sixth reusable agent 3326, and a seventh reusable agent 3328. These example seven reusable agents correspond to seven different customers that require models to be trained. In a first iteration for the example first reusable agent 3316 the total search time value 3330 takes the longest amount of relative time to train the model. In the second iteration for the example second reusable agent 3318 the total search time value 3330 takes less time to train the model than it took for the example first reusable agent 3316. For the following reusable agents: the example third reusable agent 3320, the example fourth reusable agent 3322, the example fifth reusable agent 3324, the example sixth reusable agent 3326, and the example seventh reusable agent 3328 it will take less time to train the models than it took for the example first learning agent 3316 and the example second learning agent 3318. In particular, the aforementioned improvement is enabled an/or otherwise caused by the fact that each subsequent agent that is invoked and/or otherwise assigned a task (e.g., a modeling task) does not start from a ground zero configuration state.

Comparing the first example A 3302 and the second example B 3312 there is a distinct advantage with Example B 3312 where the scale of delivery of compressed models for a given turn around time/lead shows a temporal improvement for finding optimal compression policies for large-scale customers (or custom models) and hardware platforms. As described above, instead of learning from scratch at every instance, examples disclosed herein enable the learning agents to become more efficient over time and take less time to train the model. The time to find an optimal policy for new tasks is faster and more scalable for various customers and their diverse requirements. Examples disclosed herein are implemented through a generalized learning architecture that supports all types of neural network operators and platform (Edge) architectures. Examples disclosed herein are implemented through transfer learning of one or more learning agents. In some examples, this is implemented through knowledge accumulation via a central experience database.

There is a distinct advantage in using a scalable model compression method for optimal platform specialization if there is a constraint where only one project can be run at any given time. Because projects are executed sequentially, efficiency and speed is improved for each project to have a shorter run-time. Stated differently, each project would require fewer resources to complete. For the same fixed amount of time and computing resources, a relatively greater number of projects can be completed as compared to conventional techniques (regardless of serial or parallel implementation).

FIG. 34 is an example of a generalized agent architecture 3400 for example scalable model compression techniques for improved platform specialization. Examples disclosed herein enable transferability of skilled agents for tasks (e.g., compression tasks (layer-wise pruning and/or quantization) that satisfy input objectives and constraints). A learned agent has the internal representation (e.g., mathematical function) of how compression decisions on neural network operators affect accuracy and performance. The internal representation is a mathematical function (e.g., formula) that maps the input variable to a common contextual measure (e.g., set of values). As such, examples disclosed herein reuse the agent to save computational exploration efforts on improbable action spaces (configuration). Examples disclosed herein optionally expose one or more knobs to facilitate selection and/or adjustment of selectable options. Knobs can include decisions for actionable compression, or the output of agent prediction. Regarding quantization, knobs can include changes in the precision target (e.g., int8, int4, int1, etc.), changes in the type of quantization (e.g., per-channel, per tensor), changes in affine or non-uniform quantization. Regarding precision, knobs can include type of importance method and/or type of granularity (e.g., fine-grained, vector-level, kernel level). Knobs may be selected by, for example, a user and/or the agent(s). Agent knob adjustment may occur in an automatic manner independent of the user in an effort to identify one or more particular optimized knob settings.

For example, an agent could learn that a fully-connected (FC) layer poses more redundancy than convolutional layer (e.g., more FC layers). However, the agent would also learn that the compressibility is also determined by the particular location of FC layers as the distortion at different parts of the network could degrade accuracy differently. When mixed-precision compute is unavailable, the agent learns to be more aggressive in pruning as it is the only way to improve performance via memory savings. As the example agent learns the complex interplay of the variables. In some examples herein, variables can include factors that affect compressibility of the network including the type of operator (e.g., FC, convolutional layer, embedding, etc.). In some examples herein, variables can include next-level attributes of the operator including the location of the operator, the connectivity between operators, the dataset size used by the target network, and/or hardware attributes. Examples disclosed herein retain the prior knowledge to help the agent to decide the probable solutions when it is reused in another (e.g., similar) network architecture and platform target.

No certain or predetermined architecture on interaction, policy, or value network is enforced because examples disclosed herein enable the realization that there are many different topologies that can efficiently complete the task. Rather, examples disclosed herein facilitate selection of the best topology based on observed iterations while the network converges on an optimal solution for the task.

In the illustrated example of FIG. 34, an example model inputter 3402 is an example structure that receives an input model (e.g., from the user, from storage). An example target HW inputter 3404 is an example structure that receives target HW information (e.g., from the user). An example compressible operation embedder 3406 is example structure that employs embedding layers in agent architecture to map models under compression to latent space representations (vectors). For example, the compressible operation embedder 3406 maps arbitrary input network operator(s) to a common dimension (fixed-length) of vector (a set of values) which contextually draws the relativity between different inputs with respect to the output space (e.g., abstract space, latent space). This function is not known or infeasible to derive analytically and the function is trained using machine learning procedures (e.g., deep learning).

In some examples, each compressible operation is translated to one/multi-hot encoding. These embeddings will be learned during reinforcement learning operations performed by the agent. Because the learned embeddings are one/multi-hot encoded, they can be reused (e.g., reused on new target networks) and expanded(e.g., new addition of operator internal representation). An example one-hot encoding includes representing the presence of an object (e.g., "car") in an example five-dimensional vector like [0,1,0,0,0]. An example multi-hot encoding also includes first label-encoding classes, thus having only a single number which represents the presence of a class (e.g., 1 for "car") and then convert the numerical labels to binary vectors of size [$\log_2$ 5]=3 (e.g., "computer"=[0,0,0], "car"=[0,0,1], "phone"=[0, 1,0]). One/multi-hot encoding can be reused and expanded on any set of optimization targets.

An example operation latent representor 3416 is an example structure that normalizes the compressible operation embedder 3406. At least one advantage with normalizing the compressible operation embedder 3406 is it creates a normalized vector that is the same size regardless the size of the input so that it can be re-used for further iterations and other customers.

An example platform embedder 3408 is example structure that embeds layers in agent architecture to map platform attributes to latent space representation (vector). Each compressible operation is a layer that can be mapped on mixed-precision/sparse HW and is translated to one/multi-hot encoding. Categorical HW attributes such as CPU, VPU, GPU, FPGA, SKU, etc. capability types are also encoded in a similar fashion. These embeddings will be learned during reinforcement learning operations by the agent. As they are one/multi-hot encoded, the learned embeddings can be reused and expanded on any target hardware.

An example HW latent representator 3418 is example structure that normalizes the platform embedder 3408. The advantage with normalizing the platform embedder 3408 is it creates a normalized vector that is the same size regardless the size of the input so that it can be re-used for further iterations and other customers.

An example static attributer 3410 is an example structure with real value quantities that can include (e.g., store) operator hyperparameters (e.g., convolution kernel size, stride, input feature map size) and hardware attributes (e.g., number of processing elements, cache size). The static attributer 3410 is a direct representation of attributes of model(s) under compression and the properties of the input target hardware, which are static during the lifetime of the search/reinforcement learning flow. The static attributor 3410 is a memory (e.g., storage) that includes these hyper-parameters (e.g., attributes, properties).

An example dynamic observer 3412 is example structure with real value quantities which can be quantities that indicate the states of an explored policy (e.g., compression distortion per operator, compression budget, relative accuracy). Dynamic features are usually the feedback from the compression environment and hardware evaluator.

An example normalized dense feature representor ID6_520 is an example structure that normalizes the static attributer 3410 and dynamic observer 3412. The advantage with normalizing the static attributer 3410 and dynamic observer 3412 is it creates a normalized vectors that's the same size regardless of the size of data so that it can be re-used for further iterations and other customers.

An example compression environment/hardware evaluator 3414 is an example structure that evaluates information sent from the compression environment performer circuitry 3016.

An example interaction network combiner 3422 is an example structure that trains a neural network to capture the non-linear relationship between (a) the example operation latent representor 3416, (b) the example HW latent representor 3418, and (c) the example normalized dense feature representor 3402.

An example policy network outputer 3424 is an example structure that outputs the interaction network for policy networks and invokes the actor-critic reinforcement learning network. The policy network outputer 3424 learns probability distribution corresponding to the state of which it has to predict. In some examples, the policy network outputer 3424 can be referenced as forward pass or as an inference. In some examples, the policy network outputer 3424 will use the skilled agent to look at a certain piece of data and as a result of learning the probability distribution the policy network decides what kind of compression or pruning needs to take place. In some examples, the output corresponds to a compression decision. As shown in 30C, at each t=0 . . . t=n in the target network 3038, the policy network outputer 3424 in combination with the structures in FIG. 34 will be executed, and a decision will be obtained. Completion at t=n, results in a complete compression policy 3047. To implement this policy the quantization performer 3048 is used. The quantization performer 3048 is an example of the compression environment performer circuitry 3016 in FIG. 30A. The example quantization performer 3048 takes the compression policy and performs the compression (e.g., reduce the weights) on the target network and thus outputting the policy network 3424 using the policy network outputer 3424.

An example value network outputer 3426 is an example structure that outputs the interaction network for value networks and exhibits the actor-critic reinforcement learning network. In some examples, the value network is a neural network that maps a current state (e.g., output of the interaction network combiner 3422) and/or next action (output of the policy network outputer 3424) to a goodness metric.

The value network outputer 3426 predicts the value of the skilled agent when it is in a given state. In some examples the value network outputer 3426 predicts the value of the action the skilled agent can take. Predictions can be done to decide the state of the current prediction of the policy is. Predictions can be done to decide if it is advantageous to be in a certain state. The value network outputer 3426 can be reused due to no dimensionality changes in input and output of this network and thus the correlation of value of similar target networks under compression is carried over and retained to new tasks and/or projects.

FIG. 35 is an example of transfer learning techniques disclosed herein that reuse data corresponding to customers with different requirements to create a scalable model compression method for optimal platform specialization. As used herein, transfer learning of machine learning means a model developed for a task is reused as the starting point for a model on a second or subsequent task. Advantages to reusing the data and/or networks include allowing reuse with no dimensionality changes in input and output of this network. Hence, it does not have to be learned again for subsequent tasks and/or clients. Furthermore the correlation of value of similar target networks under compression is carried over and/or retained to new tasks and/or new clients.

FIG. 35 is the same diagram as FIG. 31, however, it demonstrates through the use of reuse 3510 and reuse 3512 that the skilled agent can be reused for future customers with different workloads, different hardware targets, and/or different goals. Generally, even with customers with widely different tasks there is still some value in each model and skilled agents that can be re-used. Accordingly, examples disclosed herein improve computational efficiency (e.g., time saving) in agent exploration activities.

An example reuse 3510 is an example illustration that shows how Agent B 3504 is able to reuse at least some data from agent A 3502. The meaning of reuse is (1) the embedding and networks (interaction, policy, value) are loaded with the pretrained version in previous tasks (2) and their respective parameters will be adjusted during the iterative cycles for the specific task at hand. This "adjustment" process can also be known as fine-tuning.

An example reuse 3512 is an example illustration that shows how where agent C 3506 is able to reuse at least some data from agent B 3504, which already has data from agent A 3502. The meaning of reuse is (1) the embedding and networks (interaction, policy, value) are loaded with the pretrained version in previous tasks (2) and their respective parameters during the iterative cycles for the specific task at hand. This adjustment process can also be known as fine-tuning.

Agent A 3502 is an example structure that is taken through a first reinforcement learning iterative cycles and converges (the model corresponding to VPU converges) on customer A 3202 objective(s). During subsequent iterations (e.g., $2^{nd}$, $3^{rd}$, $4^{th}$, etc.), the learned agent (e.g., agent A 3502 after the first iteration) is re-used as a starting point for any following tasks such as customer B 3204 and/or customer C 3206 during subsequent iterations.

FIG. 36 is an example of a framework to accumulate knowledge through a central database. Transfer learning in deep reinforcement learning can be limited by an overfit agent. During each instance of policy search, the model under compression is limited to a set of network operators. For example, recommendation models are likely to use fully connected layers and embeddings, but rarely with convolution. Hardware attributes and dense features are also localized to the intended platform. The lack of variety in experiences (per network operator, per hardware, per objectives) in the local experience replay buffer circuitry 3012 leads to an agent memorizing recent rewarding actions and forgetting prior learning. This happens because the agent update process only samples from the local replay buffer that does not contain memories of previous policy search. This is analogous to the prevalent issue of imbalance categories in classification problems where the model biases to a category with more samples. This issue precludes transferability, where a pretrained agent is likely to function on similar target models and similar hardware objectives.

New operators in neural network architectures and new platforms are inevitable. The one/multi-hot encoded (as described in FIG. 34) embedding design allows extension to the new operators and new platforms. In essence, a new operator or a new platform is an addition of a dimension and an entry (e.g., new/alternate vectors) in the embedding. Dimensions for existing operators can be annotated accordingly. Overall potential issues include (1) overfitting to recent tasks and goals and memorization of compression action and (2) generalization to new network operator and hardware platforms. These potential issues are solved through knowledge accumulation via a central experience database 3612 as shown of FIG. 36.

In the illustrated example of FIG. 36, an example agent 3604 is an example structure that has the same function as the agent 3504 which takes actions to learn and optimize a model compression method for optimal platform specialization. In some examples, the example agent 3604 is scalable when implemented in a generalized architecture FIG. 34. An example layer-wise mixed precision/sparsity policy predictor 3602 is an example structure that has the same function as the layer-wise mixed precision/sparsity policy predictor circuitry 3013 of FIG. 30A, which takes the prediction from the agent 3010 and checks for changes in delta (e.g., is the change increasing or decreasing) to decide (e.g., when to stop iterations when performance is no longer improving).

An example compression environment performer 3606 is an example structure that has the same function as the compression environment performer circuitry 3016 of FIG. 30A, which performs compression and evaluates post compression metrics such as accuracy and distortion to determine if further adjustments should be made. The output is fed back to the agent 3604 via experience replay buffer 3610 or central experience database 3612. An example accuracy/network states checker 3608 of 30A is an example structure that has the same function as the accuracy/network states checker circuitry 3014 of 30A, which checks for the accuracy and state of the neural network to determine if further adjustments should be made. The example accuracy/network states checker 3608 of 30A is an input to the dynamic observer FIG. 3412. An example experience replay buffer 3710 is an example structure that has the same function as the experience replay buffer circuitry 3012, which that contains data from previous iterations. The experience replay buffer 3610 contains a historical policy, reward, feedback from compression environment and hardware evaluator are saved to substantiate the training of the Agent 3604.

An example central experience database 3612 is an example structure that is a repository of historical experiences across most if not all prior learning. The notion of knowledge accumulation is that an agent trained with either online or offline methods have practiced, over time, incrementally, in the abundance of multi-objective, multi-target experiences. The example central experience database 3612 captures the explored compression policy, its corresponding embedding, dense features, observations, reward scores, hardware performance, etc. The key purpose of this database is to provide diversity of experiences during the agent 3604 training. Applying the central experience database 3612 to compression policies helps prevent overfitting of agent 3604 via methods discussed previously. This can be completed through the following example mechanisms/techniques.

Online experience augmentation is an example mechanism/technique that provides diversity of experience during the agent 3604 training. During each agent 3604 update (forward and backward pass), it is provided a mixture of experiences from local replay buffer and the central experience database by sampling proportionally to the coverage of network operator, hardware features, rewards. The increase in diversity and data size in general results in a robust network.

Offline agent fine-tuning is an example mechanism/technique that provides diversity of experience during the agent 3604 training. If the pretrained agent performs subpar, it can optionally fine tune the agent as if a supervised machine learning is using the central experience database 3612. An example hardware performance evaluator 3614 is an example structure that has the same function as the hardware performance evaluator circuitry 3024, which evaluates the performance of the agent 3010 predicted policy. An example hardware results sender 3616 is an example structure that has the same function as the hardware results sender circuitry 3020, which receives evaluations from the hardware performance evaluator circuitry 3024 and sends hardware metrics such as latency, throughput, and power to the agent 3010.

From the foregoing, it will be appreciated that example methods, systems, apparatus and articles of manufacture have been disclosed that improve the efficiency of using a computing device by automating convergence and with a shorter turnaround time to search the compression configuration optimized for a given neural network, target accuracy and performance. Additionally, examples disclosed herein allow users to scale faster and to dynamically convert their custom network topologies or variants to specialize across hardware platforms. Furthermore, there is a distinct advantage for projects that are constrained to running one job at any given time, as a shorter run-time would result in a more efficient and faster result. The disclosed methods, apparatus and articles of manufacture are accordingly directed to one or more improvement(s) in the functioning of a computer.

In some examples, the input receiver circuitry 3002 includes means for hardware target receiving, means for training dataset receiving and means for network definition receiving. Examples also include means for policy predicting, means for experience replay buffering, means for compression performing, means for state checking, means for network outputting, means for hardware performance evaluating and means for results sending. For example, the means for hardware target receiving may be implemented by the automation HW target receiver circuitry 3004, the means for training dataset receiving may be implemented by the training dataset receiver circuitry 3006, the means for network definition receiving may be implemented by trained network definition receiver circuitry 3008, the means for policy predicting may be implemented by the layer-wise mixed-precision/sparsity policy predictor circuitry 3013, the means for experience replay buffering may be implemented by the experience replay buffer circuitry 3012, the means for compression performing may be implemented by the compression environment performer circuitry 3016, the means for state checking may be implemented by the accuracy/network states checker circuitry 3014, the means for network outputting may be implemented by the network outputter circuitry 3022, the means for hardware performance evaluating may be implemented by the hardware performance evaluator circuitry 3024, and the means for results sending may be implemented by the hardware results sender circuitry 3020. In some examples, the aforementioned structure may be implemented by machine executable instructions disclosed herein and executed by processor circuitry, which may be implemented by the example processor circuitry 512 of FIG. 5 and/or example Field Programmable Gate Array (FPGA) circuitry, other hardware logic circuitry, hardware implemented state machines, and/or any other combination of hardware, software, and/or firmware. For example, the aforementioned structure may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Further variations of the above-identified disclosed examples are provided by the following examples.

Example methods, apparatus, systems, and articles of manufacture to optimize resources in Edge networks are disclosed herein. Further examples and combinations thereof include the following: Example 95 includes an apparatus comprising at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to calculate a first compression policy for a first model to execute on first hardware, the first compression policy including first compression predictions corresponding to respective layers of the first model, compare performance metrics of the first compression policy with first model parameters associated with the first model, release a first compressed model corresponding to the first compression policy when the performance metrics satisfy a performance threshold, and in response to retrieving a second model to execute on second hardware, calculate a second compression policy based on the first compression predictions corresponding to the respective layers of the first model.

Example 96 includes the apparatus as defined in example 95, wherein the processor circuitry is to apply at least one of a deep reinforcement learning algorithm, a Bayesian optimization algorithm, or an evolutionary algorithm.

Example 97 includes the apparatus as defined in example 95, wherein the processor circuitry is to iterate outputs of the first compression predictions with a reward function, the reward function based on the first model performance parameters.

Example 98 includes the apparatus as defined in example 95, wherein the first compression policy is based on at least one of pruning layers of the first model or quantizing the first model.

Example 99 includes the apparatus as defined in example 95, wherein the processor circuitry is to reduce a model compression optimization duration by executing an agent having model parameters corresponding to the first compressed model during an initial modeling iteration.

Example 100 includes the apparatus as defined in example 99, wherein the processor circuitry is to optimize based on at least one of a graphics processing unit target, a central processing unit target or a field programmable gate array target.

Example 101 includes At least one non-transitory computer readable storage medium comprising instructions that, when executed, cause at least one processor to at least calculate a first compression policy for a first model to execute on first hardware, the first compression policy including first compression predictions corresponding to respective layers of the first model, compare performance metrics of the first compression policy with first model parameters associated with the first model, release a first compressed model corresponding to the first compression policy when the performance metrics satisfy a performance threshold, and in response to retrieving a second model to execute on second hardware, calculate a second compression policy based on the first compression predictions corresponding to the respective layers of the first model.

Example 102 includes the at least one computer readable storage medium as defined in example 101, wherein the instructions, when executed, cause the at least one processor to apply at least one of a deep reinforcement learning algorithm, a Bayesian optimization algorithm, or an evolutionary algorithm.

Example 103 includes the at least one computer readable storage medium as defined in example 101, wherein the instructions, when executed, cause the at least one processor to iterate outputs of the first compression predictions with a reward function, the reward function based on the first model performance parameters.

Example 104 includes the at least one computer readable storage medium as defined in example 101, wherein the first compression policy is based on at least one of pruning layers of the first model or quantizing the first model.

Example 105 includes the at least one computer readable storage medium as defined in example 101, wherein the instructions, when executed, cause the at least one processor to reduce a model compression optimization duration by executing an agent having model parameters corresponding to the first compressed model during an initial modeling iteration.

Example 106 includes the at least one computer readable storage medium as defined in example 105, wherein the instructions, when executed, cause the at least one processor to optimize based on at least one of a graphics processing unit target, a central processing unit target or a field programmable gate array target.

Example 107 includes a method comprising calculating a first compression policy for a first model to execute on first hardware, the first compression policy including first compression predictions corresponding to respective layers of the first model, comparing performance metrics of the first compression policy with first model parameters associated with the first model, releasing a first compressed model corresponding to the first compression policy when the performance metrics satisfy a performance threshold, and in response to retrieving a second model to execute on second hardware, calculating a second compression policy based on the first compression predictions corresponding to the respective layers of the first model.

Example 108 includes the method as defined in example 107, wherein calculating the first compression policy includes applying at least one of a deep reinforcement learning algorithm, a Bayesian optimization algorithm, or an evolutionary algorithm.

Example 109 includes the method as defined in example 107, wherein calculating the first compression policy includes iterating outputs of the first compression predictions with a reward function, the reward function based on the first model performance parameters.

Example 110 includes the method as defined in example 107, wherein the first compression policy is based on at least one of pruning layers of the first model or quantizing the first model.

Example 111 includes the method as defined in example 107, wherein calculating the second compression policy includes reducing a model compression optimization duration by executing an agent having model parameters corresponding to the first compressed model during an initial modeling iteration.

Example 112 includes the method as defined in example 111, wherein the agent optimizes based on at least one of a graphics processing unit target, a central processing unit target or a field programmable gate array target.

Example 113 includes an apparatus comprising an agent to calculate a first compression policy for a first model to execute on first hardware, the first compression policy including first compression predictions corresponding to respective layers of the first model, compression environment performer circuitry to compare performance metrics of the first compression policy with first model parameters associated with the first model, and accuracy checker circuitry to release a first compressed model corresponding to the first compression policy when the performance metrics satisfy a performance threshold, the agent to in response to retrieving a second model to execute on second hardware, calculate a second compression policy based on the first compression predictions corresponding to the respective layers of the first model.

Example 114 includes the apparatus as defined in example 113, wherein the agent is to apply at least one of a deep reinforcement learning algorithm, a Bayesian optimization algorithm, or an evolutionary algorithm.

Example 115 includes the apparatus as defined in example 113, further including experience replay buffer circuitry to iterate outputs of the first compression predictions with a reward function, the reward function based on the first model performance parameters.

Example 116 includes the apparatus as defined in example 113, wherein the first compression policy is based on at least one of pruning layers of the first model or quantizing the first model.

Example 117 includes the apparatus as defined in example 113, wherein the agent is to reduce a model compression optimization duration by executing a previous version of the agent having model parameters corresponding to the first compressed model during an initial modeling iteration.

Example 118 includes the apparatus as defined in example 117, wherein the agent is to optimize based on at least one of a graphics processing unit target, a central processing unit target or a field programmable gate array target.

Generating and Providing Optimal Quantization Weights (ID7)

Quantization of deep learning models require deciding what operations to quantize and how to quantize them. Quantization for deep learning is the process of approximating a neural network that is initially structured to use a first bit width (e.g. floating-point numbers) with an alternate bit width representation that consumes a relatively lower bit width. This reduces both the memory requirement and computational cost of using neural networks. Additionally, this also causes improvements to power requirements, particularly in view of Edge devices and their various limitations.

Generally, particular operations to be quantized are decided and input by a user. However, this is time intensive for the user, and because user selection is driven by discretionary behaviors (e.g., "gut feel"), such selections lack an optimum efficiency. Some operations within a network are particularly suited for quantization efforts to yield varying degrees of success. Factors that affect a decision to quantize the particular operations include, but are not limited to an initial bit width, a type of operation, a type of instruction associated with the operation (e.g., a MatMul operation, a GatherNd operation), and/or an adjacency of the instructions proximate to other instructions. Examples disclosed herein apply reinforcement learning to decide whether to quantize operations in a neural network model, thereby eliminating erroneous user discretion and reducing model developing time.

Modern deep learning neural network models have many quantizable operations, which makes manual decision making of whether to quantize or not for each operation inefficient due to a large problem space. To identify particular models to quantize, to identify which operations to quantize, and/or to select alternate bit widths, human efforts can take, for example, approximately 4 weeks whereas examples disclosed herein take, for example, approximately 10 hours (or less). Training a neural network through human efforts takes more time because they need to evaluate operations for parameters and make decisions on whether the operation is quantizable or not. However, creating a framework to automate this process makes quantization of deep learning neural network models more efficient. Additionally, examples disclosed herein reduce and/or otherwise eliminate errors due to human discretionary choices. Furthermore, modern deep learning neural network models can be more difficult to solve with varying hardware resources (CPUs, GPUs, accelerators, etc.) where performance of quantizable operations differ.

In example methods disclosed herein, quantization is achieved using grouping where adjacent or similar operations with similar quantization operations can be grouped into a large block and can be quantized collectively.

Quantization is also used as neural networks move from servers (e.g., having relatively capable processing and/or power resources) to the Edge environment (e.g., having relatively less capable processing and/or power resources) because it is necessary to optimize speed and size due to hardware limitations (e.g., CPU vs. GPU). Quantization replaces floating points with integers inside the neural network. Replacing floating points (e.g., weights, optimization weights) with integers results in less memory consumption and faster calculations/operations.

FIG. 37 is an example schematic illustration of a framework 3700 for generating and providing optimal quantization weights to deep learning models. Examples disclosed herein can be located at and/or otherwise perform optimization tasks at any location of the example Edge cloud, such as the example Edge cloud 110 of FIGS. 1, 2 and 3. Additionally, examples disclosed herein may be located at and/or otherwise perform optimization tasks at any one or more of the multiple network layers (e.g., the endpoint layer 200, the Edge devices layer 210, the network access layer 220, the core network layer 230 and/or the cloud data layer 240. Example weights (e.g., quantization weights) disclosed herein include one or more values represented by alphanumeric characters. Such values may be stored in one or more data structures (e.g., data structure(s)), in which example data structures include integers, floating point representations and/or characters. Weights and corresponding values to represent such weights represent data stored in any manner. Such data may also propagate from a first data structure to a second or any number of subsequent data structures along a data path, such as a bus.

In the illustrated example of FIG. 37, the framework 3700 includes quantization controller circuitry 3702, quantized topology generator circuitry 3704, environment quantizer circuitry 3706, reward assigner circuitry 3708, and search space solver circuitry 3710. In operation and as discussed below, the example framework 3700 generates and/or otherwise provides improved quantization weights for deep learning models.

Some examples include means for quantization controlling, means for quantized topology generating, means for environment quantizing, means for reward assigning, and means for search space solving. For example, the means for means for quantization controlling may be implemented by the quantization controller circuitry 3702, the means for quantized topology generating may be implemented by the quantized topology generator circuitry 3704, the means for environment quantizing may be implemented by the environment quantizer circuitry 3706, the means for reward assigning may be implemented by the reward assigner circuitry 3708, the means for search space solving may be implemented by the search space solver circuitry 3710. In some examples, the aforementioned structure may be implemented by machine executable instructions disclosed herein and executed by processor circuitry, which may be implemented by the example processor circuitry 512 of FIG. 5 and/or example Field Programmable Gate Array (FPGA) circuitry, other hardware logic circuitry, hardware implemented state machines, and/or any other combination of hardware, software, and/or firmware. For example, the aforementioned structure may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example quantization controller circuitry 3702 is an example of a structure to decide what types of operations should be quantized and how to approach quantization decisions. Deep learning models (e.g., neural networks) are resource intensive algorithms that cause processing resources to incur significant computational costs and memory, which is why quantization is necessary. The quantization controller circuitry 3702 optimizes the training and inference of deep learning models to reduce (e.g., minimize) costs (e.g., memory costs, CPU costs, bandwidth consumption costs, accuracy tradeoff costs, storage space costs, etc.). When running on the example Edge cloud 110 of FIGS. 1, 2 and/or 3 there can be hardware limitations, which is at least one reason why quantization is attractive. Quantization replaces a first representation (e.g., floating points) with a second representation (e.g., integers) inside the network to consume less memory on certain hardware, thereby causing an increase in the speed of calculations.

The example quantization controller circuitry 3702 generates potential MatMul operation candidates. While examples disclosed herein refer to MatMul operations, such examples are discussed for convenience and not limitation. Example operations disclosed herein are not limited to MatMul operations, and may include convolutions, Relu, concat, Conv2D, Conv3D, transpose, GatherNd, etc. The MatMul operation is a common implementation of matrix operations in deep learning. The MatMul operation returns the matrix product of two arrays. The MatMul operation returns a normal product for 2-D arrays; however, if dimensions of either argument are greater than two then the MatMul operation is treated as a stack of matrices residing in the last two indexes. Furthermore, arrays with different shapes (e.g., two or more arrays of different sizes) can use broadcasting. Broadcasting provides a way of vectorizing array operations for looping. Once the example quantization controller circuitry 3702 decides what type of operation should be quantized, the quantization controller circuitry 3702 can use solutions from MatMul. The quantization controller circuitry 3702 initiates training to converge to an optimal solution. The optimal solution can be a value from a user, a user input, a particular convergence threshold value, and/or predetermined value in storage. Using solutions from MatMul operations, the quantization controller circuitry 3702 also determines which hardware would be optimal for the deep learning model and/or which optimal solution (e.g., optimal weight to integer conversion, optimal input to integer conversion, optimal weight) can be attained on a designated hardware model. In some examples, a CPU in a desktop machine executes float arithmetic as fast as integer arithmetic, therefore either float or integer values could be optimal. In some examples a GPU in a desktop machine is optimized towards single precision float calculations, therefore the hardware is optimized for single precision float calculations. In examples herein, the quantization controller circuitry 3702 calculates tradeoffs between accuracy and speed. When the quantization controller circuitry 3702 determines to use an approximation closer to the floating point, the result will be a decrease in performance (e.g., speed, power consumption, throughput), but this can result in increased accuracy. On the other hand, when the quantization controller circuitry 3702 determines to use an integer value, the result will be an increase in performance (e.g., speed, power consumption, throughput), but this can result in decreased accuracy. In view of target performance metrics (e.g., target FLOPS, target/desired cache storage, target/desired frequency, etc.), the example quantization controller circuitry 3702 calculates decisions for how to quantize and how to approach quantization. In some examples, a reward function (or cost function) is applied to identify metrics in view of a score.

In summary, the quantization controller circuitry 3702, during an initial iteration, generates baseline metrics corresponding to a model, identifies operations corresponding to the model, generates a search space corresponding to the model, the search space including respective ones of the operations that can be quantized, and generates a first quantization topology, the first quantization topology corresponding to a first search strategy.

The quantization controller circuitry 3702 includes the example quantized topology creator circuitry 3704, which is an example of structure to create quantized topologies. Using operations (e.g., MatMul operations), the quantized topology creator circuitry 3704 utilizes the outputted descision from the quantization controller circuitry 3702 to in a first iteration, generate a guess at an optimal solution (e.g., optimal weight to integer conversion, optimal input to integer conversion, optimal weight) and generates a candidate topology (e.g., interconnected nodes and layers). In the first iteration, the example quantized topology creator circuitry 3704 generates a guess at an optimal hardware configuration and generates a candidate topology. During subsequent iterations, the example quantized topology creator circuitry 3704 calculates decisions based on observations/rewards and generates additional candidate optimal topologies until the quantization controller circuitry 3702 converges on an optimal solution. An example optimal solution is reached when the observations/rewards reach a threshold value (e.g., greater than 80% accuracy, less than 30 seconds run time). However, any number and/or type of optimal solution may be defined with alternate metrics (e.g., power consumption metrics, storage size metrics, accuracy metrics, etc.) The quantized topology creator circuitry 3704 includes deciding and/or otherwise selecting factors that include, but are not limited to, an initial bit width, a type of operation, a type of instruction associated with the operation, and/or an adjacency of instructions proximate to other instructions. Then example environment quantizer circuitry 3706 is structure to carry out quantization, benchmarking, and testing the neural network. The example environment quantizer circuitry 3706 measures any number of factors. An example of some factors include, but are not limited to, accuracy, speed, size, and latency of the quantization. The environment quantizer circuitry 3706 carries out the action of quantization by deciding how to go from floating points to integers. The environment quantizer circuitry 3706 determines this through any number of factors (e.g., increase/decrease in accuracy, speed of quantization, size of topology, and/or user requirements, etc.) The environment quantizer circuitry 3706 carries out the action of benchmarking by comparing the performance of the neural network to other architectures (e.g., neural networks constructed with various combinations of the input layers (e.g., initial data for the neural network), hidden layers (e.g., intermediate layer between input and output layer and place where all the computation is done), and output layers (e.g., produce the result for given inputs)) using available benchmark data sets. Benchmarking can be accomplished using labeled data sets or through generated data sets. Labeled data sets are required to have large amounts of labeled data. Generated data sets have automatically labeled data and can show how a neural network excels at identifying slight errors. Generated data sets give a metric of the model's sensitivity and complexity. The example environment quantizer circuitry 3706 tests sensitivity in a generated data set by identifying errors and perturbations (e.g., "wildly incorrect" vs "incorrect" vs "mildly incorrect"). The more exact labels result in a neural network with higher sensitivity. The example environment quantizer circuitry 3706 tests complexity in a generated data set by increasing the number of objects (e.g., datasets, datapoints). The example environment quantizer circuitry 3706 tests the neural network for handling greater complexity. Using a labeled and/or generated dataset the environment quantizer circuitry 3706 executes benchmarking of a model (e.g., a NN of interest). The environment quantizer circuitry 3706 carries out the action of testing the neural network. In some examples, testing the neural network involves using a training dataset to determine if the neural network outputs the known optimal solution. Testing the neural network includes tuning the model's hyperparameters (e.g., the number of hidden units—layers and layer widths—in a neural network). In some examples, testing the neural network is used for regularization by early stopping (e.g., stopping training when the error on the dataset increases, which indicates overfitting to the training dataset). Thus, the example environment quantizer circuitry 3706 carries out the action of quantization, benchmarking, and testing the network.

The example environment quantizer circuitry 3706 includes the example reward assigner circuitry 3708, which is example structure for making observations and assigning rewards to actions (e.g., different permutations of quantization precisions, different combination groupings of operations, different permutations to "try," etc.). The reward assigner circuitry 3708 takes the output of the quantizer circuitry 3706 (e.g., accuracy, speed, size, and latency of the act of quantization) and determines the value of actions associated with the output of the quantizer circuitry 3706 (e.g., higher accuracy assigns a higher reward value, lower speed assigns a higher reward value, etc.). The environment quantizer circuitry 3706 outputs results but there is no feedback of positive or negative reinforcement. Assigning rewards in neural networks results in keeping track of rewards and the resulting state after taking actions (e.g., different permutations of quantization precisions, different combination groupings of operations). Thus, actions with higher amounts of rewards that had a positive outcome and should repeat similar actions to attain higher results. Assigning rewards is accomplished by adding a reward value to an action or metric that is predefined. The reward value can be predefined by a user, a user input, a predetermined value in storage, and/or other ways of storing or inputting reward values. In some examples, an action or metric that the user assigns is the accuracy and latency of a system. In some examples, an action or metric that the user assigns is performance and speed. Thus, the reward assigner circuitry 3708 makes observations and assigns rewards to actions.

In summary, the example environment quantizer circuitry 3706, performs quantization on the first quantization topology and compares quantization results of the first quantization topology to the baseline metrics, the quantization controller to update the first search strategy during a second iteration, the second search strategy corresponding to an updated version of the model, the updated version of the model having improved metrics compared to the baseline metrics.

The example environment quantizer circuitry 3706 includes the search space and strategy solver circuitry 3710, which is an example structure for defining the search space and calculating a search strategy for quantization. The search space is defined as families of models specialized to solve deep learning problems. In some examples, the search strategies are automated, and some examples search strategies include, but are not limited to reinforcement learning (e.g., policy gradient), evolutionary algorithms (e.g., genetic algorithms), and heuristic search (e.g., branch & bound). In reinforcement learning the neural network takes actions to maximize reward in a particular situation. The search space and strategy solver circuitry 3710 employs finding the best possible behavior or path that should be taken in a specific situation. In evolutionary algorithms the neural network implements bio-inspired operators such as mutation, crossover, and selection to generate a solution to an optimization and search problems. In heuristic search the neural network uses a search strategy that attempts to optimize a problem by iteratively improving the solution based on a given heuristic function or a cost measure. Thus, the search space and strategy solver circuitry 3710 uses one or more of the following or any other search space and strategy solver to define the search space and calculate and/or otherwise determine one or more search strategies for quantization.

The combination of the example quantization controller circuitry 3702, the example quantized topology creator circuitry 3704, the example environment quantizer circuitry 3706, the example reward assigner circuitry 3708, and the example search space solver circuitry 3710 in FIG. 37 is an example structure diagram for the schematic illustration of a framework (e.g., a system) for generating and providing optimal quantization weights to deep learning models. FIG. 38 illustrates example methods and structure that form a framework 3800 for the example quantization controller circuitry 3702 and the example environment quantizer circuitry 3706 similar to the example in FIG. 38. The example framework 3800, as described in further detail below, achieves generation and output of one or more optimized models 3820 for inferencing that is based on dynamic input data and/or conditions.

The example quantization controller circuitry 3702 from FIG. 37 initiates a method for deciding what types of operations should be quantized and how to approach quantization. This requires multiple steps performed by the example quantized topology generator circuitry 3704 and, in some examples, includes inputting a labeled training set 3804, determining a search space of model (A) 3806, and invoking a search strategy to generate an augmented model to try (A') 3808, as described in further detail below.

Example labeled training set(s) are received, retrieved and/or otherwise obtained from a user, or from a data source (e.g., historical data source) (3804). The example labeled training set(s) are samples that have been tagged with one or more labels.

The quantization controller circuitry 3702 also initiates and determines the search space of model (A) 3806, such as a model of interest that is to be optimized. In some examples, the model (A) is to be moved from a centralized server (e.g., operating on hardware with first computational capabilities) to one or more Edge devices (e.g., operating on hardware with second computational capabilities that are less than those of the centralized server) The search space of the model A' includes families of models and/or operations within such models that are capable of being quantized and/or otherwise specialized to solve deep learning problems. In some examples, this is performed by the example quantized topology creator circuitry 3704.

The quantization controller circuitry 3702 also initiates and invokes a search strategy to generate an augmented model (A') through the application of one or more search strategies on the example model (A) 3806. As discussed above, example search strategies include reinforcement learning (e.g., policy gradient), evolutionary algorithms (e.g., genetic algorithms), and heuristic search (e.g., branch & bound). This is executed by the example quantized topology creator circuitry 3704.

The quantization controller circuitry 3702 sends the example augmented model (A') to an example environment quantizer circuitry 3706.

The example environment quantizer circuitry 3706 (e.g., devices within an Edge network) executes and/or otherwise performs quantization, benchmarking, and testing of candidate augmented model(s) (A').

The example reward assigner circuitry 3708 evaluates the augmented model (A') 3814. and determines the performance of the quantization of the operation through observations and rewards. Additionally, the reward assigner circuitry 3708 facilitates the determination of the performance of the augmented model (A') on a type of hardware. Of course, this iterative process performs such evaluations on any number of different types of hardware to ascertain performance metrics of quantized augmented models (A'). Some examples of hardware include, but are not limited to, any combination of one or more of CPUs, GPUs, FPGAs, quantum devices and/or accelerators. Results of testing respective ones of the augmented model (A') (3818) are iteratively fed back to invoke one or more alternate search strategies and generate further different augmented models (A') to try. In response to an iteration threshold or one or more convergence metrics related to the performance of the augmented model (A'), the example environment quantizer circuitry 3706 outputs a model for inferencing based on the input training set 3820. The output (3820) is sent by the search space and strategy solver circuitry 3710. The output represents an example output model for inferencing based on the input training set 3820 after any number of iterations that result in an optimal solution (e.g., convergence).

As discussed above, the example environment quantizer circuitry 3706 outputs a performance estimate of each iteration of an augmented model (A') 3818. The performance estimate (e.g., performance data corresponding to latency metrics, accuracy metrics, etc.) of each augmented model (A') 3818 includes sending information corresponding to the performance estimate 3814 of the quantization (e.g., observations and rewards) as well as information corresponding to the performance of the quantization of the operation for a particular type of hardware implemented by an example target platform 3816.

The example target platform 3816 is a structure that includes any type of hardware that the quantization is executed on. Some examples include, but are not limited to, any one or more combination of CPU's, GPU's, FPGA's and/or accelerators.

The combination of the input a labeled training set 3804, the determine search space of model (A), the invoke search strategy to generate A', the A' (e.g., model (A)), the evaluate performance 3814, the output a model for inferencing based on input training set 3820, and the performance estimate of A' is a similar to FIG. 37 and uses the structures including quantization controller circuitry 3702, the quantized topology creator circuitry 3704, the environment quantizer circuitry 3706, reward assigner circuitry 3708, and the search space solver circuitry 3710 to generate and provide optimal quantization weights to deep learning models.

While an example manner of implementing the framework for generating and providing optimal quantization weights to deep learning models of FIG. 37 is illustrated in FIG. 38 and 39, 40, 41, and 42, one or more of the elements, processes and/or devices illustrated in FIG. 37 may be combined, divided, re-arranged, omitted, eliminated and/or implemented in any other way. Further, the example quantization controller circuitry 3702, the example quantizer topology generator circuitry 3704, the example environment quantizer circuitry 3706, the example reward assigner circuitry 3708 and/or, more generally, the example search space and strategy solver circuitry 3710 of FIG. 37 may be implemented by hardware, software, firmware and/or any combination of hardware, software and/or firmware. Thus, for example, any of the example quantization controller circuitry 3702, the example quantizer topology generator circuitry 3704, the example environment quantizer circuitry 3706, the example reward assigner circuitry 3708 and/or, more generally, the example search space and strategy solver circuitry 3710 of FIG. 37 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example quantization controller circuitry 3702, the example quantizer topology generator circuitry 3704, the example environment quantizer circuitry 3706, the example reward assigner circuitry 3708 and/or, more generally, the example search space and strategy solver circuitry 3710 of FIG. 37 is/are hereby expressly defined to include a non-transitory computer readable storage device or storage disk such as a memory, a digital versatile disk (DVD), a compact disk (CD), a Blu-ray disk, etc. including the software and/or firmware. Further still, the example quantization controller circuitry 3702, the example quantizer topology generator circuitry 3704, the example environment quantizer circuitry 3706, the example reward assigner circuitry 3708 and/or, more generally, the example search space and strategy solver circuitry 3710 of FIG. 37 of FIG. 37 may include one or more elements, processes and/or devices in addition to, or instead of, those illustrated in FIG. 37, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example quantization controller circuitry 3702, the example quantizer topology generator circuitry 3704, the example environment quantizer circuitry 3706, the example reward assigner circuitry 3708 and/or, more generally, the example search space and strategy solver circuitry 3710 of FIG. 37 of FIG. 37 are shown in FIGS. 38, 39 and 42. The machine readable instructions may be one or more executable programs or portion(s) of an executable program for execution by a computer processor and/or processor circuitry, such as the processor 1152 shown in the example processor platform 1100 discussed below in connection with FIG. 11. The program(s) may be embodied in software stored on a non-transitory computer readable storage medium such as a CD-ROM, a floppy disk, a hard drive, a DVD, a Blu-ray disk, or a memory associated with the processor 1152, but the entire program and/or parts thereof could alternatively be executed by a device other than the processor 1152 and/or embodied in firmware or dedicated hardware. Further, although the example program is described with reference to the flowcharts illustrated in FIG. 11, many other methods of implementing the example quantization controller circuitry 3702, the example quantizer topology generator circuitry 3704, the example environment quantizer circuitry 3706, the example reward assigner circuitry 3708 and/or, more generally, the example search space and strategy solver circuitry 3710 of FIG. 37 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 38, 39, 41, 42 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 39 is a flowchart representative of machine-readable instructions which may be executed to implement an apparatus and method for generating and providing optimal quantization weights to deep learning models. FIG. 39 is similar to FIG. 37 and FIG. 38 and shows another example representation of generating and providing optimal quantization weights to deep learning models. The illustrated example of FIG. 39 is implemented by the example structure of FIG. 37.

In the illustrated example of FIG. 39, the quantization controller circuitry 3702 retrieves a model (block 3902). The example quantization controller circuitry 3702 obtains a new model that is introduced to the (FIG. 37), which will go through pre-processing steps where it gathers the quantizable operations and quantizes the optimal weights. These pre-processing steps are pre-calculated so that they are not continuously repeated. In some examples, quantization occurs post-training where the deep learning model is trained using weights and inputs, then after training the weights are quantized. In some examples, quantization occurs during training where the gradients are calculated for the quantized weights. The example quantization controller circuitry 3702 retrieves and/or otherwise obtains a model (block 3902) (e.g., from a user, from a database of available models, etc.). However, in some instances the example quantization controller circuitry 3702 retrieves a model (block 3902) and obtains one or more models from any data source without user instruction. The example quantization controller circuitry ID7_102 retrieves a model 3702 and sends the model to establish a benchmark test (block 3904) and to parse a model to identify operations (block 3908).

The quantization controller circuitry 3702 executes the example process to establish benchmark test 3904. The benchmark test (block 3904) is an example of a process that obtains (e.g., automatically or in response to detecting the presence of one or more additional models) and/or retrieves a model (block 3902) and runs benchmark tests. Some example benchmark tests include but are not limited to latency and accuracy. After establishing benchmark test(s) (block 3904) the results of the benchmark test are stored in the example quantization controller circuitry 3702. These benchmark tests (block 3904) provide a baseline comparison so that during iterations of generating and providing optimal quantization weights the result will converge on a solution that results in better test results (e.g., higher accuracy) than the benchmark test (block 3904).

The quantization controller circuitry 3702 executes the example process to parse a model to identify operations (block 3908). The parse model to identify operations (block 3908) is an example of a process that automatically receives its input when it retrieves a model (block 3902) in addition to receiving all the operation configurations (e.g., MatMul, GatherNd). After parsing the model to identify operations (block 3907) the quantization controller circuitry 3702 automatically sends the results (e.g., MatMul, GatherNd) to the determine/create search space (block 3910) and the initialize hyperparams (block 3920). This is performed by the environment quantizer circuitry 3706. The parse model to identify operations (block 3908) provides the operation configuration, which groups models based on similar operation configurations and chooses similar quantization weights. After parsing the model to identify operations (block 3908) the quantization controller circuitry 3702 sends its output to initialize hyperparams (block 3920) described herein below.

The quantization controller circuitry 3702 executes the example process to initialize hyperparams (block 3920). The initialize hyperparams (block 3920) is an example of a process that automatically receives the parsed model that identifies operations (block 3908) and initializes the quantization parameters that were parsed. The quantization parameters are sent to the environment quantizer circuitry 3706. This provides the environment quantizer circuitry 3706 with the initialized hyperparams to quantize the selected operation(s) with when the quantizations parameters are sent to a quantize selected operation(s) (block 3926) described herein.

The example parse model to identify operations (block 3908) also sends its output parsed model to an example determine/create search space (block 3910). The quantization controller circuitry 3702 executes the example process to determine/create search space (block 3910). The determine/create search space (block 3910) is an example of a process that creates and/or otherwise builds a search space using the results from the example parse model to identify operations (block 3908) that were first calculated based on the example model retrieved initially (block 3902). The output of the determine/create search space (block 3910) is sent to a select operation combination (block 3912). At least one benefit of the determine/create search space (block 3910) is that human discretion is removed from the analysis process. Generally speaking, traditional techniques for determining how to quantize a model required human input and decisions of which layers/elements to quantize. However, such human input is subject to variation and error regarding candidate search spaces to be considered. Furthermore, a full and thorough exploitation of all possible permutations of search space is unrealistic if done by manual human efforts. Examples disclosed herein consider agent exploration efforts to identify candidate search spaces and generates resultant outputs. Such outputs are further examined for their corresponding effect on performance metrics such that the best quantization choices are implemented in one or more models.

The quantization controller circuitry 3702 executes the example process to select an operation combination (block 3912). The select operation combination is an example of a process that selects and sends the search space of quantizable operations built in the determine/create search space (block 3910) to the example generate quantization topology (block 3914). In some examples, the select operation combination (block 3912) chooses a random operation combination during a first iteration and in further iterations refine the operation combination to one that performs better than the baseline determined when the benchmark test was established (block 3904). In some examples the select operation combination (block 3912) uses grouping to decide which operation combination to select. Using grouping involves choosing an operation combination based on other models results that had similar operations (e.g., MatMul, GatherNd) and precision (e.g., int8, int16, bf16, etc.).

As described above, the example quantization controller circuitry 3702 illustrated in FIG. 37, receives, retrieves and/or otherwise obtains one or more models (block 3902), and establishes and/or otherwise initiates a benchmark test (block 3904). Additionally, the example quantization controller circuitry 3702 parses the retrieved one or more models to identify operations (block 3908), and determines/creates a search space based on, for example, particular operations that are capable of being quantized (block 3910).

The example quantized topology creator circuitry 3704 selects operation combinations (block 3912), and during respective iterations, the example quantization controller circuitry 3702 obtains the current state from the previous iteration and the performance metrics, such as accuracy, size, and latency, for the current state $s_t$. Using these inputs, the example quantization controller circuitry 3702 determines what operations are quantizable and how they should be quantized (e.g., grouping). The example quantization controller circuitry 3702 determines this through various convergence strategies including, but not limited to, reinforcement learning (e.g., policy gradient), evolutionary algorithms (e.g., genetic algorithms), and heuristic search (e.g., branch & bound). During the first few iterations, the example quantization controller circuitry 3702 will generate random quantization topologies, so that as the first few iterations execute, the example quantization controller circuitry 3702 is able to determine observations and rewards so the example quantization controller circuitry 3702 begins training with quantization topologies with optimal scored observations and rewards. The output of the example quantization controller circuitry 3702 is that action=next state $s_{t+1}$, which is arranged as a quantization topology for the environment quantizer circuitry 3706 input. The example quantization controller circuitry 3702 generates a quantization topology (block 3916) and sends the output (block 3916) to the environment quantizer circuitry 3706. The example quantization controller circuitry 3702 receives the result of the environment quantizer circuitry 3706 and updates the search strategy based on comparison (block 3918). The example quantization controller circuitry 3702, based on the results of the updated search strategy (block 3918) decides if the iterations should end or continue (block 3917). If the result of the updated search strategy (block 3918) reaches a criterion (e.g., significantly improves over the benchmark test, reaches a user designated optimal solution, etc.) the decision block 3917 can end the loop and output the resulting quantization and quantization weights. If the result of the updated search strategy (block 3918) does not reach a criterion (e.g., significantly improves over the benchmark test, reaches a user designated optimal solution, etc.) the decision block 3917 sends the updated search strategy (block 3918) to the generate quantization topology (block 3916) so a new iteration can begin.

The quantized topology creator circuitry 3704 within the quantization controller circuitry 3702 generates a quantization topology (block 3916) (e.g., based on inputs to the example quantization controller circuitry 3702). In some examples, the generated topology (block 3916) starts with a random topology if there is no prior data. Subsequent topologies are generated with guides from the process where the search strategy is updated based on comparison (block 3918) (e.g., agent). Once observations and rewards are recorded then the quantized topology creator circuitry 3704 generates a quantization topology (block 3916) based on optimal quantizations (e.g., quantization weights with relatively or comparatively high rewards recorded). In some examples the quantized topology creator circuitry 3704 will generate quantization topologies based on grouping where models with similar operations and precisions are quantized together or with similar weights. After the quantized topology creator circuitry 3704 generates the quantization topology (block 3916), the quantized topology creator circuitry 3704 sends its output to cause quantization of selected operations (block 3926), discussed in further detail below and forms a part of the example environment quantizer circuitry 3706.

As described above, the example environment quantizer circuitry 3706 carries out quantization tasks, benchmarking tasks, and/or testing as described in FIG. 37. The example environment quantizer circuitry 3706 receives inputs from the example quantization controller circuitry 3702 to generate quantization topologies (block 3916). The example environment quantizer circuitry 3706 quantizes selected operation(s) (block 3926), compares results to the benchmark (block 3928), and analyzes the performance of the quantization topology (3922). The performance results are sent (on an iterative basis) to the example controller circuitry 3702 to update search strategies based on comparisons (block 3918).

In some examples, the environment quantizer circuitry 3706 quantizes selected operation(s) based on any number of hyperparameters (block 3920). Using the selected operations (e.g., MatMul, GatherNd) and generated quantization topology the example environment quantizer circuitry 3706 quantizes selected operation(s) (block 3926) in view of such hyperparameters. This provides the resulting weighted quantization with the resulting metrics including accuracy, latency, and/or size.

The environment quantizer 3706 compares results to benchmark (block 3928). The example environment quantizer 3706 compares results to benchmark metrics (block 3928) determine benchmark metrics (e.g., throughput, accuracy, size, etc.) and the example reward assigner circuitry 3708 determines whether such metrics are an improvement over benchmark values evaluated in one or more prior iterations (block 3922).

The example reward assigner circuitry 3708 sends performance results to the example quantization controller circuitry 3702 to update a search strategy (e.g., of the current iteration) based on comparison (block 3918). An example of assigning rewards includes but is not limited to adding a reward value to an action or metric (e.g., an action or metric that the user predefined). An example of an action or metric that is assigned (e.g., by the user) is accuracy, latency, and/or size of a model. In some examples observing higher accuracy results in an incremental increase in weighted value. If higher accuracy is observed, then a relatively greater reward is assigned to the action or metric. In some examples observing a lower latency results in an incremental increase in weighted value. If lower latency is observed, then a relatively greater reward is assigned to the action or metric. In some examples, a smaller size of a model results in an incremental increase in weighted value. If a smaller size of a model is observed, then a relatively greater reward is assigned to the action or metric. The quantization controller circuitry 3702 executes the example process to update a current iteration of the search strategy based on comparison (block 3918). In some examples, updating the search strategy based on comparison(s) (block 3918) uses rewards and performance metrics to make decisions (e.g., make decision in block 3917 if the iterations should end or continue). Rewards and performance metrics from the example environment quantizer circuitry 3706 for corresponding actions are evaluated and sent to the update search strategy based on comparison (block 3918). Some examples of metrics for rewards include, but are not limited to accuracy, latency, and size. In some examples, accuracy is determined by quality metrics corresponding to a model with a relatively highest reward value. In some examples, latency is determined by assigning relatively higher rewards (e.g., relatively higher weight values) corresponding to relatively faster models. In some examples, size is determined by one or more reduced ratio metrics corresponding to an amount of memory and/or storage resources consumed by the model. In some examples, additional metrics such as memory bandwidth or power consumption are added from a hardware monitoring perspective and are added for better evaluation.

In response to the quantization controller circuitry 3702 completing updating the search strategy based on a comparison (block 3918), the quantization controller circuitry 3702 then determines whether the current iteration of the quantization strategy, current rewards and/or current performance results achieve a quantization topology that is improved (e.g., achieves an optimal solution (e.g., predefined optimal metrics) corresponding to performance thresholds (3917). In some examples, the quantization controller circuitry 3702 determines that iterations should end based on a particular quantity of attempted iterations and/or epochs (block 3917). Otherwise, if the update search strategy based on comparison results in a search strategy that does not achieve an optimal solution or a particular quantity of iterations (block 3917), then the process advances to generate (another iteration of) the quantization topology (block 3916) where it will then go through the cycle of quantizing selected operations (block 3926) and compare results to benchmark (block 3928) and use the analyze performance (block 3922) to update search strategy based on comparison (block 3918).

FIG. 40 is an example of candidate action spaces. In the illustrated example of FIG. 40, different candidate action spaces are selected for a quantization topology. The example quantization type corresponds to the type of quantization used in the iteration such as, but not limited to INT8, BF16, and FP16.

FIG. 41 illustrates an example process 4100 of how a pre-quantized model 4102 is analyzed by examples disclosed herein to generate a quantized model 4106. In the illustrated example of FIG. 41, the pre-quantized model 4102 is an example of a model that is input into the quantization controller circuitry 3702, which takes the output of the quantized topology generator circuitry 3704 and quantizes the corresponding operations in the model. Example environment quantizer circuitry 3706 applies a particular quantization type 4104, such as INT8 or BF16, to the pre-quantized model 4102. As a result of a particular selection of a quantization type 4104, the example quantized model 4106 is augmented accordingly. In some examples, if one or more operations are adjacent, then they are automatically grouped to form a larger quantize-dequantize block to increase speed and performance. In the illustrated example of FIG. 41, a first grouped block 4108 is an example of two operations that are quantized together because they have a similar operation (e.g., MatMul) and a similar precision (e.g., 1 (INT8)). Generally speaking, the example search space and strategy solver circuitry 3710 analyzes contents of the model of interest for particular operations and/or particular precisions. During any number of iterations, the search space and strategy solver circuitry 3710 creates and/or otherwise assigns different groups of operation(s) and corresponding precision values that, when performed in a particular grouping (e.g., two adjacent operations quantized together at a first precision, three adjacent operations quantized together at a second precision, etc.), result in different performance metrics (e.g., relatively faster quantization duration, relatively greater accuracy results, etc.). In some examples more permutations are searched and found or disregarded if they do not result in an optimal and/or otherwise improved solution. In some examples the operation(s) are different (e.g., MatMul vs. GatherNd), which leads to not quantizing the models together in a group. In some examples, the precision differs, which leads to not quantizing models together in a group (e.g., 2 (BF16) and 1(INT8)). Examples disclosed herein optionally expose one or more knobs to facilitate selection and/or adjustment of selectable options. Knobs may be selected by, for example, a user and/or an agent. Agent knob adjustment may occur in an automatic manner independent of the user in an effort to identify one or more particular optimized knob settings. In some examples, the example strategy solver circuitry 3710 stores identified groups of operations that cause an improvement in a metric of interest, such as efficiency, size, latency, etc. Such groups of operations may be stored in a database for future reference, such as during a runtime effort where operations can be looked up.

FIG. 42 is a flowchart representative of an example process 600 of providing quantization weights to deep learning models. This is another example representation of the structure diagram in FIG. 37 and the process diagrams in FIG. 38 and FIG. 39. The example process 600 includes receiving or obtaining a base neural network (block 604). A plurality of candidate operations is generated by the example quantization controller circuitry 3702 and are quantized from the base neural network (block 606). The candidate operations are then quantized by the example environment quantizer circuitry 3706 after generating a search space and selecting a strategy solver (block 608). Using the quantized candidate operations, a candidate quantized topology is generated (block 610) by the example quantized topology generator circuitry 3704. To quantize the candidate operations based on the candidate quantized topology an environment is generated (block 612) by the example environment quantizer circuitry 3706. The base neural network is then tested to determine benchmark metrics corresponding to performance of an underlying hardware platform (block 614) by the quantization controller circuitry 3702. Based on observations about the base neural network using metrics such as accuracy and latency rewards are assigned (block 616) by the example reward assigner circuitry 3708. Based on performance with the relatively highest reward values an optimal solution is converged on (block 618) by the example quantization controller circuitry 3702.

From the foregoing, it will be appreciated that example methods, apparatus, systems and articles of manufacture have been disclosed that improve quantization techniques of models. Disclosed methods, apparatus, systems and articles of manufacture improve the efficiency of using a computing device by creating a framework that automates the process of generating and providing optimal quantization weights to deep learning models. Furthermore, examples disclosed herein remove human discretion from the analysis process, which creates a more fast and efficient system and corresponding models that is/are not subject to variation and errors due to human involvement. Additionally, quantized models (e.g., the example quantized model 4106 of FIG. 41) are automatically grouped to form a larger quantize-dequantize block to increase speed and performance. Disclosed methods, apparatus, systems and articles of manufacture are accordingly directed to one or more improvement(s) in the functioning of a computer.

Further variations of examples disclosed herein are provided by the following examples.

Example methods, apparatus, systems, and articles of manufacture to optimize resources in Edge networks are disclosed herein. Further examples and combinations thereof include the following: Example 119 includes an apparatus comprising at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to generate baseline metrics corresponding to a model, identify operations corresponding to the model, generate a search space corresponding to the model, the search space including respective ones of the operations that can be quantized, generate a first quantization topology, the first quantization topology corresponding to a first search strategy, perform quantization on the first quantization topology, and compare quantization results of the first quantization topology to the baseline metrics, the quantization controller to update the first search strategy to a second search strategy during a second iteration, the second search strategy corresponding to an updated version of the model, the updated version of the model having improved metrics compared to the baseline metrics.

Example 120 includes the apparatus as defined in example 119, wherein the processor circuitry is to calculate the first factors of the first quantization topology, the first factors including adjacency information corresponding to the operations that can be quantized.

Example 121 includes the apparatus as defined in example 119, wherein the processor circuitry is to identify operation groups corresponding to the improved metrics.

Example 122 includes the apparatus as defined in example 119, wherein the processor circuitry is to perform a search strategy that includes at least one of reinforcement learning, evolutionary algorithms, or heuristic search.

Example 123 includes the apparatus as defined in example 119, wherein the processor circuitry is to calculate model metrics including at least one of throughput, accuracy, latency, or size.

Example 124 includes the apparatus as defined in example 119, wherein the processor circuitry is to calculate metrics for hardware including at least one of memory bandwidth, power consumption, or speed.

Example 125 includes the apparatus as defined in example 119, wherein the processor circuitry is to store operations that have been identified as candidate groups to improve efficiency.

Example 126 includes the apparatus as defined in example 119, wherein the processor circuitry is to retrieve one or more groups of operations from a storage device, the groups to be quantized together.

Example 127 includes At least one non-transitory computer readable storage medium comprising instructions that, when executed, cause at least one processor to at least generate baseline metrics corresponding to a model, identify operations corresponding to the model, generate a search space corresponding to the model, the search space including respective ones of the operations that can be quantized, generate a first quantization topology, the first quantization topology corresponding to a first search strategy, perform quantization on the first quantization topology, and compare quantization results of the first quantization topology to the baseline metrics, the quantization controller to update the first search strategy to a second search strategy during a second iteration, the second search strategy corresponding to an updated version of the model, the updated version of the model having improved metrics compared to the baseline metrics.

Example 128 includes the at least one computer readable storage medium as defined in example 127, wherein the instructions, when executed, cause the at least one processor to calculate the first factors of the first quantization topology, the first factors including adjacency information corresponding to the operations that can be quantized.

Example 129 includes the at least one computer readable storage medium as defined in example 127, wherein the instructions, when executed, cause the at least one processor to identify operation groups corresponding to the improved metrics.

Example 130 includes the at least one computer readable storage medium as defined in example 127, wherein the instructions, when executed, cause the at least one processor to perform a search strategy that includes at least one of reinforcement learning, evolutionary algorithms, or heuristic search.

Example 131 includes the at least one computer readable storage medium as defined in example 127, wherein the instructions, when executed, cause the at least one processor to calculate model metrics including at least one of throughput, accuracy, latency, or size.

Example 132 includes the at least one computer readable storage medium as defined in example 127, wherein the instructions, when executed, cause the at least one processor to calculate metrics for hardware including at least one of memory bandwidth, power consumption, or speed.

Example 133 includes a method comprising generating baseline metrics corresponding to a model, identifying operations corresponding to the model, generating a search space corresponding to the model, the search space including respective ones of the operations that can be quantized, generating a first quantization topology, the first quantization topology corresponding to a first search strategy, performing quantization on the first quantization topology, and comparing quantization results of the first quantization topology to the baseline metrics, the quantization controller to update the first search strategy to a second search strategy during a second iteration, the second search strategy corresponding to an updated version of the model, the updated version of the model having improved metrics compared to the baseline metrics.

Example 134 includes the method as defined in example 133, further including calculating the first factors of the first quantization topology, the first factors including adjacency information corresponding to the operations that can be quantized.

Example 135 includes the method as defined in example 133, further including identifying operation groups corresponding to the improved metrics.

Example 136 includes the method as defined in example 133, further including performing a search strategy that includes at least one of reinforcement learning, evolutionary algorithms, or heuristic search.

Example 137 includes the method as defined in example 133, further including calculating model metrics including at least one of throughput, accuracy, latency, or size.

Example 138 includes the method as defined in example 133, further including calculating metrics for hardware including at least one of memory bandwidth, power consumption, or speed.

Example 139 includes an apparatus to optimize a model, comprising a quantization controller to, during an initial iteration generate baseline metrics corresponding to a model, identify operations corresponding to the model, generate a search space corresponding to the model, the search space including respective ones of the operations that can be quantized, and generate a first quantization topology, the first quantization topology corresponding to a first search strategy, an environment quantizer to perform quantization on the first quantization topology, and compare quantization results of the first quantization topology to the baseline metrics, the quantization controller to update the first search strategy to a second search strategy during a second iteration, the second search strategy corresponding to an updated version of the model, the updated version of the model having improved metrics compared to the baseline metrics.

Example 140 includes the apparatus as defined in example 139, wherein the quantization controller is to calculate the first factors of the first quantization topology, the first factors including adjacency information corresponding to the operations that can be quantized.

Example 141 includes the apparatus as defined in example 139, wherein the environment quantizer is to identify operation groups corresponding to the improved metrics.

Example 142 includes the apparatus as defined in example 139, wherein the environment quantizer is to perform a search strategy that includes at least one of reinforcement learning, evolutionary algorithms, or heuristic search.

Example 143 includes the apparatus as defined in example 139, wherein the environment quantizer is to calculate model metrics including at least one of throughput, accuracy, latency, or size.

Example 144 includes the apparatus as defined in example 139, wherein the environment quantizer is to calculate metrics for hardware including at least one of memory bandwidth, power consumption, or speed.

Dynamic Pruning (ID11)

Examples disclosed herein are consistent with International Publication No. WO/2019/197855 (International Application No. PCT/IB2018/000513) filed on Apr. 9, 2018. International Publication No. WO/2019/000513 is incorporated by reference herein in its entirety.

Convolutional neural networks (CNNs) may be used in computer vision applications to support various tasks (e.g., object detection). The relatively large number of parameters and high computational cost of such networks, however, may render them difficult to use in power-constrained "Edge" devices such as smart cameras.

Conventional attempts to reduce the number parameters and/or complexity of CNNs may identify redundancies in the network during training and statically remove the redundancies to obtain a final network configuration. Such an approach may result in lower accuracy depending on the image context encountered after deployment of the network.

Turning now to FIG. 43A, a portion of a neural network 4300 is shown including an example first branch implementation controller 4301. The portion of the neural network 4300 includes a second network layer 4302 (4302a, 4302b, e.g., convolutional, rectified linear unit/ReLU, pooling, fully connected (FC) layer, etc.) coupled to an output of a first network layer 4304 (e.g., convolutional, ReLU, pooling FC layer, etc.). In one example, the input to the first network layer 4304 holds raw pixel values of an image, where the first network layer 4304 is a convolutional layer that extracts features (e.g., edges, curves, colors) from the image. The result may be an activation map 4306 that indicates which regions of the image are likely to contain the features that the first network layer 4304 is configured to extract. Configuring the first network layer 4304 to extract certain features may be done during a training procedure in which known input images are fed to a neural network including the portion of the neural network 4301, and filter weights of the first network layer 4304 are adjusted to achieve a targeted result. Because the convolution process may involve a relatively high number of multiplication operations (e.g., dot product calculations between image pixel values and filter weights), the first network layer 4304 may represent a correspondingly large portion of the computational cost/expense of the neural network including the portion of the neural network 4301. Similarly, the second network layer 4302 might have a high computational cost.

For example, the computational complexity of a convolution layer may be determined by:

$$\text{Num\_of\_input\_channels} \times \text{kernel\_width} \times \text{kernel\_height} \times \text{Num\_of\_output\_channels}$$

Although the ability to change the kernel size of the convolution operation may be limited, Num_of_input_channels and/or Num_of_output_channels may be manipulated to decrease computations during inferences.

As will be discussed in greater detail, the first branch implementation controller 4301 includes and/or implements a lightweight branch path 4308 located (e.g., positioned and/or connected) between the first network layer ID11_A104 and the second network layer 4302 may be used to prune unimportant channels (e.g., red channel, green channel, blue channel) from the activation map 4306. More particularly, the branch path 4308 and/or more generally the first branch implementation controller 4301, may include a context aggregation component 4310 that aggregates context information from the first network layer 4304. In one example, the context information includes channel values (e.g., red channel values, green channel values, blue channel values) associated with the first network layer 4304. Moreover, the context aggregation component 4310 may be a downsample (e.g., pooling) layer that averages channel values in the first network layer 4304. Additionally, the illustrated branch path 4308 includes a plurality of FC layers 4312 (4312a, 4312b), implemented and/or executed by the example first branch implementation controller 4301, that conduct an importance classification of the aggregated context information and selectively exclude one or more channels in the first network layer 4304 from consideration by the second network layer 4302 based on the importance classification. The FC layers may generally function as memory that documents/memorizes various input data that is fed to the network during training. In the illustrated example, an unimportant channel portion 4302b of the second network layer 4302 is excluded from consideration and an important channel portion 4302a is not excluded from consideration. As a result, the smaller second network layer 4302 may facilitate faster inferences without incurring a loss of accuracy.

Thus, if the first network layer 4304 has 256 output neurons, the context aggregation component 4310 might provide a "blob" of 256 values to a first FC layer 4312a, where the first FC layer 4312a generates a high-level feature vector having 4314 elements/output neurons (e.g., with the value of each output neuron indicating the likelihood of that neuron being activated). Additionally, a second FC layer 4312b may generate an importance score vector based on the high-level feature vector, where the importance score vector has 256 output neurons. The second FC layer 4312b may generally make higher level classifications than the first FC layer 4312a. The importance score vector may contain zero values for neurons in less important channels. Accordingly, passing the activation map 4306 and the importance score vector through a multiplier 4314 may selectively exclude all neurons in the less important channels. The FC layers 4312 may be considered "fully connected" to the extent that every neuron in the previous layer is connected to every layer in the next layer.

Of particular note is that the context aggregation component 4310, implemented by the example first branch implementation controller 4301, aggregates the context information in real-time (e.g., on-the-fly) and after the training of the neural network. Accordingly, accuracy may be increased while accelerating inferences, regardless of the image context encountered after deployment of the neural network. For example, if the neural network is deployed in an application that processes images lacking features that were present in the images used in training, the illustrated pruning approach is able to reduce processing time by eliminating the channels configured to extract the missing features. Moreover, the technology described herein may facilitate the discard of some insignificant features that may otherwise prevent the network from making an accurate decision. Accordingly, the branch path 4308 may be considered a regularization technique. As will be discussed in greater detail, the post-training pruning may use either a fixed pruning ratio constraint or an "adversarial" balance between a layer width loss and an accuracy constraint.

FIG. 44 illustrates an example second branch implementation controller 4315 to implement a branch path 4316 that uses a fixed pruning ratio constraint to accelerate neural network inferences. In some examples, the portion of the neural network 4300 of FIG. 43A includes the second branch implementation controller 4315 in place of the first branch implementation controller 4301. The fixed pruning ratio constraint may generally be a percentage of channels to be pruned. In the illustrated example, the second branch implementation controller 4315 implements a first FC layer 4318 that is coupled to a ReLU 4320 ("ReLU1") and introduces nonlinearity (e.g., clipping activation by a threshold of one) into the output (e.g., probability vector having 4314 output neurons) of the first FC layer 4318. The example second branch implementation controller 4315 implements a second FC layer 4322 that may be coupled to the ReLU 4320, where the output (e.g., probability vector having 256 output neurons) of the second FC layer 4322 may be processed by an adaptive bias component 4324 (e.g., layer). The example second branch implementation controller 4315 implements the adaptive bias component 4324. The adaptive bias component 4324 may calculate a bias that controls the ratio between positive and negative values in the probability vector from the second FC layer 4322, where the ratio may be set based on a fixed pruning ratio constraint (e.g., 80% important, 20% unimportant). Additionally, a threshold layer 4326, implemented by the example second branch implementation controller 4315, may set (e.g., truncate) all negative values in the output of the adaptive bias component 4324 to zero and set all positive values in the output of the adaptive bias component 4324 to one. Thus, passing an activation map (not shown) and the output of the threshold layer 4326 through a multiplier 4328 may selectively exclude all neurons in the less important channels, with importance being enforced via the pruning ratio constraint.

FIG. 43C illustrates an example third branch implementation controller 4330 to implement a branch path 4332 that uses an adversarial balance between a layer width loss 4334 of the first network layer and an accuracy loss 4336 (e.g., accuracy constraint) of the first network layer. In some examples, the portion of the neural network 4300 of FIG. 43A includes the third branch implementation controller 4330 in place of the first branch implementation controller 4300. In the illustrated example, the third branch implementation controller 4330 implements a first FC layer 4338 that is coupled to an ReLU 4340 and that introduces nonlinearity (e.g., clipping activation by a threshold of one) into the output (e.g., probability vector having 4314 output neurons) of the first FC layer 4338. The third branch implementation controller 4330 implements a second FC layer 4342. The second FC layer 4342 may be coupled to the ReLU 4340, where the output (e.g., probability vector having 256 output neurons) of the second FC layer 4342 may be processed by another instance of the ReLU 4344. The ReLU 4344, implemented by the example third branch implementation controller 4330, may set some values in the output vector to zero. Accordingly, a multiplier 4346, implemented by the example third branch implementation controller 4330, may selectively exclude all neurons in the less important channels, with importance being enforced via a pruning ratio constraint.

During the training of the neural network, the layer width loss 4334 may be provided to the ReLU 4344, while the accuracy loss 4336 (e.g., accuracy constraint) is provided to the multiplier 4346. The layer width loss 4334 may be determined based on the pruning ratio constraint. In one example, the layer width loss is determined by calculating the mean across all elements (e.g., output neurons) of the vector of multipliers and then computing the Euclidean norm (e.g., distance) between the mean and the pruning ratio constraint. Accordingly, the calculated loss may be considered to be a penalty for layer width. During the training of the neural network, the accuracy loss 4336 may be balanced against the layer width loss 4334. In one example, balancing determines the optimal tradeoff between channel reduction and accuracy. More particularly, during the training process, there may be an adversarial situation where compliance with the constraint imposed by the accuracy loss 4336 minimizes the error of the network, but the layer width loss 4334 minimizes the number of channels and results in a penalty if the number of channels does not comply with the pruning ratio constraint.

While an example manner of implementing the portion of the neural network 4300 of FIG. 43A is illustrated in FIGS. 43B and 43C, one or more of the elements, processes and/or devices illustrated in FIGS. 43B and 43C may be combined, divided, re-arranged, omitted, eliminated and/or implemented in any other way. Further, the example first branch implementation controller 4301, the example second branch implementation controller 4315, the example third branch implementation controller 4330, and/or, more generally, the example portion of the neural network 4300 of FIG. 43A may be implemented by hardware, software, firmware and/or any combination of hardware, software and/or firmware. Example hardware implementation include implementation on the example compute circuitry 402 (e.g., the example processor 404) of FIG. 4A, or on the example processor 452 of the example computing node 450 of FIG. 4B. Thus, for example, any of the example second branch implementation controller 4315, the example third branch implementation controller 4330, and/or, more generally, the example portion of the neural network 4300 of FIG. 43A could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example second branch implementation controller 4315, and/or the example third branch implementation controller 4330 is/are hereby expressly defined to include a non-transitory computer readable storage device or storage disk such as a memory, a digital versatile disk (DVD), a compact disk (CD), a Blu-ray disk, etc. including the software and/or firmware. Further still, the example portion of the neural network 4300 of FIG. 43A may include one or more elements, processes and/or devices in addition to, or instead of, those illustrated in FIGS. 43B and 43C, and/or may include more than one of any or all of the illustrated elements, processes and devices.

Flowcharts representative of example hardware logic, machine-readable instructions, hardware implemented state machines, and/or any combination thereof for implementing the portion of the neural network 4300 of FIG. 43A is shown in FIGS. 44 and 45. The machine-readable instructions may be one or more executable programs or portion(s) of an executable program for execution by a computer processor and/or processor circuitry, such as the processor 452 shown in the example processor platform 450 discussed above in connection with FIG. 4B. The programs may be embodied in software stored on a non-transitory computer readable storage medium such as a CD-ROM, a floppy disk, a hard drive, a DVD, a Blu-ray disk, or a memory associated with the processor 452, but the entire program and/or parts thereof could alternatively be executed by a device other than the processor 452 and/or embodied in firmware or dedicated hardware. Further, although the example programs are described with reference to the flowcharts illustrated in FIGS. 44 and 45, many other methods of implementing the example portion of the neural network 4300 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

As mentioned above, the example processes of FIGS. 44 and 45 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 44 shows a method 4400 of conducting pruning operations. The method 4400 may generally be implemented in a neural network including any one of the branch implementation controllers such as, for example, the first branch implementation controller 4301 executing the branch path 4308 (FIG. 43A), the second branch implementation controller ID11_B101 executing the branch path 4316 (FIG. 43B) and/or the third branch implementation controller ID11_C101 executing the branch path 4332 (FIG. 43C). More particularly, the method 4400 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 4400 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

At processing block 4402, the first branch implementation controller 4301, the second branch implementation controller 4315, and/or the third branch implementation controller 4330 provides for training a neural network having a second network layer coupled to an output of a first network layer. In an adversarial balancing architecture, at block 4402, the third branch implementation controller 4330 may determine a layer width loss of the first network layer based on a pruning ratio constraint and balancing, during the training of the neural network, an accuracy constraint of the first network layer against the layer width loss. At block 4402, the first branch implementation controller 4301, the second branch implementation controller 4315, and/or the third branch implementation controller 4330 may prune the portion of the neural network 4300 during the training of the neural network. The training stage pruning may include static techniques such as, for example, randomly removing neurons or groups of neurons from the network. The static techniques may also involve considering an absolute magnitude of weights and activations (e.g., importance of neurons) and removing the least of them in each network layer. In yet another example, the static techniques may consider an error of the network during the training time and attempt to learn parameters that represent the probability that a particular neuron or group of neurons may be dropped. The result of the training may be a final network configuration that may be pruned again dynamically after deployment as described herein.

The example first branch implementation controller 4301, the second branch implementation controller 4315, and/or the third branch implementation controller 4330 aggregates the context information at block 4404 from a first network layer in the neural network, where the context information is aggregated in real-time and after a training of the neural network. Thus, the context information may correspond to post deployment input data (e.g., inference images). In one example, block 4404 includes averaging, by a downsample (e.g., pooling) layer in a branch path located between the first network layer and the second network layer, channel values in the first network layer. The example first branch implementation controller 4301, the example second branch implementation controller 4315 and/or the example third branch implementation controller 4330 may utilize other approaches to aggregate the context information. At block 4406, the first branch implementation controller 4301, the second branch implementation controller 4315, and/or the third branch implementation controller 4330 may conduct an importance classification of the context information, where one or more channels in the first network layer may be excluded from consideration by the second network layer at block 4408 based on the importance classification. At block 4408, the example first branch implementation controller 4301, the second branch implementation controller 4315, and/or the third branch implementation controller 4330 select the one or more channels based on a pruning ratio constraint (e.g., percentage of channels to be pruned).

FIG. 45 shows a method 4500 of conducting importance classifications of aggregated context information. The method 4500 may readily substituted for block 4406 (FIG. 44), already discussed. More particularly, the method 4500 may be implemented by the example first branch implementation controller 4301, the second branch implementation controller 4315, and/or the third branch implementation controller 4330 as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

At processing block 4502, the example first branch implementation controller 4301, the second branch implementation controller 4315, and/or the third branch implementation controller 4330 generates, by a first FC layer in a branch path located between the first network layer and the second network layer, a high-level feature vector associated with the first network layer based on the aggregated context information. Additionally, at block 4504, the example first branch implementation controller 4301, the second branch implementation controller 4315, and/or the third branch implementation controller 4330 may generate, by a second FC layer in the branch path, an importance score vector based on the high-level feature vector, where the importance score vector contains zero values for less important channels. In such a case, at block 4408 (FIG. 44), the example first branch implementation controller 4301, the second branch implementation controller 4315, and/or the third branch implementation controller 4330 may multiply the output of the first network layer by the importance score vector.

Turning now to FIG. 46A, a computer vision system 4600 (e.g., computing system) is shown. The system 4600 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 4600 includes one or more processors 4602 (e.g., host processor(s), central processing unit(s)/CPU(s), vision processing units/VPU(s)) having one or more cores 4604 and an integrated memory controller (IMC) 4606 that is coupled to a system memory 4608.

The illustrated system 4600 also includes an input output (IO) module 4610 implemented together with the processor(s) 4602 on a semiconductor die 4612 as a system on chip (SoC), where the IO module 4610 functions as a host device and may communicate with, for example, a display 4614 (e.g., touch screen, liquid crystal display/LCD, light emitting diode/LED display), a network controller 4616 (e.g., wired and/or wireless), one or more cameras 4616, and mass storage 4618 (e.g., hard disk drive/HDD, optical disk, solid state drive/SSD, flash memory). The processor(s) 4602 may execute instructions 4620 (e.g., a specialized kernel inside a Math Kernel Library for Deep Learning Networks/MKL-DNN) retrieved from the system memory 4608 and/or the mass storage 4618 to perform one or more aspects of the method 4400 (FIG. 44) and/or the method 4500 (FIG. 45), already discussed.

Thus, execution of the instructions 4620 may cause the system 4600 to aggregate context information from a first network layer in a neural network having a second network layer coupled to an output of the first network layer, where the context information is aggregated in real-time and after a training of the neural network. The context information may be associated with image data (e.g., still images, video frames) captured by the camera(s) 4616. Additionally, execution of the instructions 4620 may cause the system 4600 to conduct an importance classification of the aggregated context information and selectively exclude one or more channels in the first network layer from consideration by the second network layer based on the importance classification.

FIG. 46 shows a semiconductor apparatus 4630 (e.g., chip, die, package). The illustrated apparatus 4630 includes one or more substrates 4632 (e.g., silicon, sapphire, gallium arsenide) and logic 4634 (e.g., transistor array and other integrated circuit/IC components) coupled to the substrate(s) 4632. The logic 4634 may implement one or more aspects of the method 4400 (FIG. 44) and/or the method 4500 (FIG. 45), already discussed. Thus, the logic 4634 may aggregate context information from a first network layer in a neural network having a second network layer coupled to an output of the first network layer, where the context information is aggregated in real-time and after a training of the neural network. The logic 4634 may also conduct an importance classification of the aggregated context information and selectively exclude one or more channels from consideration by the second network layer based on the importance classification. The logic 4634 may be implemented at least partly in configurable logic or fixed-functionality hardware logic. The logic 4634 may also include the neural network. In one example, the logic 4634 includes transistor channel regions that are positioned (e.g., embedded) within the substrate(s) 4632. Thus, the interface between the logic 4634 and the substrate(s) 4632 may not be an abrupt junction. The logic 4634 may also be considered to include an epitaxial layer that is grown on an initial wafer of the substrate(s) 4632.

FIG. 46C illustrates a processor core 4640 according to one embodiment. The processor core 4640 may be the core for any type of processor, such as a micro-processor, an embedded processor, a digital signal processor (DSP), a network processor, or other device to execute code. Although only one processor core 4640 is illustrated in FIG. 46C, a processing element may alternatively include more than one of the processor core 4640 illustrated in FIG. 46C. The processor core 4640 may be a single-threaded core or, for at least one embodiment, the processor core 4640 may be multithreaded in that it may include more than one hardware thread context (or "logical processor") per core.

FIG. 46C also illustrates a memory 4660 coupled to the processor core 4640. The memory 4660 may be any of a wide variety of memories (including various layers of memory hierarchy) as are known or otherwise available to those of skill in the art. The memory 4660 may include one or more code 4644 instruction(s) to be executed by the processor core 4640, where the code 4644 may implement the method 440 (FIG. 44) and/or the method 4500 (FIG. 45), already discussed. The processor core 4640 follows a program sequence of instructions indicated by the code 4644. Each instruction may enter a front end portion 4642 and be processed by one or more decoders 4646. The decoder 4646 may generate as its output a micro operation such as a fixed width micro operation in a predefined format, or may generate other instructions, microinstructions, or control signals which reflect the original code instruction. The illustrated front end portion 4642 also includes register renaming logic 4648 and scheduling logic 4650, which generally allocate resources and queue the operation corresponding to the convert instruction for execution.

The processor core 4640 is shown including execution logic 4654 having a set of execution units 4652a through 4652c. Some embodiments may include a number of execution units dedicated to specific functions or sets of functions. Other embodiments may include only one execution unit or one execution unit that can perform a particular function. The illustrated execution logic 4654 performs the operations specified by code instructions.

After completion of execution of the operations specified by the code instructions, back end logic 4654 retires the instructions of the code 4644. In one embodiment, the processor core 4640 allows out of order execution but requires in order retirement of instructions. Retirement logic 4658 may take a variety of forms as known to those of skill in the art (e.g., re-order buffers or the like). In this manner, the processor core 4640 is transformed during execution of the code 4644, at least in terms of the output generated by the decoder, the hardware registers and tables utilized by the register renaming logic 4648, and any registers (not shown) modified by the execution logic 4654.

Although not illustrated in FIG. 46C, a processing element may include other elements on chip with the processor core 4640. For example, a processing element may include memory control logic along with the processor core 4640. The processing element may include I/O control logic and/or may include I/O control logic integrated with memory control logic. The processing element may also include one or more caches.

Further variations of examples disclosed herein are provided by the following examples.

Example 1 is a system including a processor, and a memory coupled to the processor, the memory including executable computer program instructions, which when executed by the processor, cause the system to train a neural network comprising at least a first network layer and a second network layer, wherein the second network layer is coupled to an output of the first network layer, and wherein the first network layer has a plurality of channels, aggregate context information from the first network layer of the neural network, wherein the context information is to be aggregated in real-time and after a training of the neural network, and wherein the context information is to include channel values, generate a feature vector associated with the first network layer of the neural network based on the aggregated context information, generate an importance score vector based on the generated feature vector, wherein the importance score vector includes information indicating importance of corresponding channels of the first network layer, and selectively exclude one or more channels in the first network layer from consideration by the second network layer based on the importance score vector.

In Example 2, the subject matter of Example 1 optionally includes the instructions, when executed, cause the system to average the channel values to aggregate the context information from the first network layer of the neural network.

In Example 3, the subject matter of any one or more of Examples 1 through 2 optionally includes the importance score vector having zero values for neurons in less important channels of the first network layer.

In Example 4, the subject matter of Example 3 optionally includes the instructions, when executed, further cause the system to multiply the output of the first network layer by the importance score vector.

In Example 5, the subject matter of any one or more of Examples 1 through 4 optionally including the instructions, when executed, cause the system to select the one or more channels of the first network layer based on a pruning ratio constraint, wherein the pruning ratio constraint is a percentage of channels to be pruned.

In Example 6, the subject matter of any one or more of Examples 1 through 5 optionally including the instructions, when executed, cause the computing system to determine a layer width loss of the first network layer based on a pruning ratio constraint, wherein the pruning ratio constraint is a percentage of channels to be pruned, and balance, during the training of the neural network, an accuracy constraint of the first network layer against the layer width loss.

Neural Network Topology Optimization (ID14)

Convolutional neural networks (CNNs) are a class of deep neural networks (DNNs) that are typically employed to analyze visual images, as well as other types of patterned data. In some examples, CNNs can be trained to learn features and/or classify data. For example, a CNN can be trained to learn weights in filters (or kernels). As used herein, a kernel is a matrix of weights. In operation, one or more kernels may be multiplied with an input to extract feature information. As used herein, a filter is one or more kernels, and a convolution layer includes two or more filters. The trained model can be then used to identify or extract information such as edges, segments, etc., in an input image. Each convolutional kernel may be defined by a width and height (hyper parameters). Additionally, convolution layers typically convolve the inputs (e.g., input image, kernels, etc.) and pass the output to a next layer of the CNN. Example weights disclosed herein include one or more values represented by alphanumeric characters. Such values may be stored in one or more data structures (e.g., data structure(s)), in which example data structures include integers, floating point representations and/or characters. Weights and corresponding values to represent such weights represent data stored in any manner. Such data may also propagate from a first data structure to a second data structure or any number of subsequent data structures along a data path, such as a bus.

Currently, the computational power needed to train a CNN depends on the number of kernels trained as well as the sizes of the kernels (e.g., m×n) and the input images. Current (traditional) neural network approaches result in large neural network models having hundreds of kernels in many layers, which require memory resources. Such requirements strain the ability for devices at the Edge (Edge devices) to operate efficiently when such Edge devices are typically bound by limited memory, processing and/or memory capabilities. Additionally, efforts to increase a degree of accuracy of neural networks typically involves implementing additional layers. However, adding layer depth will also make such models more difficult to train.

Some examples disclosed herein include methods, systems, articles of manufacture and apparatus that reduce the number of kernels and/or the number of layers used to train a CNN. In some examples, a dynamic adaptive kernel is generated for each region of an input image by convolving each input region with multiple kernels to build a dynamic kernel specific for that input region. The generated kernel is then convolved with that same input region to generate a single pixel output. Thus, instead of multiple outputs associated with multiple kernels, a single output can be provided for all the multiple kernels. In this way, the total number of kernels trained in the CNN layer (and thus the overall computational power needed to train the CNN) can be reduced.

FIG. 47 is a conceptual illustration 4700 of an example convolution operation using a static kernel. As shown in FIG. 47, an input image 4710 includes 9×9 image pixels represented by a grid. In the illustrated example of FIG. 47, each cell in the grid of input image 4710 represents an image pixel value. Further, in the illustrated example of FIG. 47, an example kernel 4720 is represented as a 3×3 grid of weights. In some examples, the kernel 4720 is referred to as a mask, which is convolved with the input image 4710. The kernel 4720 is then applied (e.g., convolved) to portions of the input image 4710 to generate an example output image 4730. For example, during a first iteration (e.g., a first location of a sliding window positioned and/or otherwise applied through the input image) the mask 4720 is overlaid with the input image 4710 and every value in that particular portion (e.g., window) of the input image 4710 is multiplied with every value in the mask 4720. Subsequent iterations (e.g., slide positions of the window) continue mask multiplication as the mask 4720 is moved to adjacent positions of the input image 4710. In the illustrated example of FIG. 47, the output image 4730 is the result of each pixel of the input image 4710 being replaced with a weighted sum of itself and nearby pixels. The weights of the weighted sum are defined by the example kernel 4720.

In some examples, the same weights in kernel 4720 are applied across every 3×3 section of the example input image 4710 (e.g., as a sliding window, etc.) to compute the individual pixel values of the example output image 4730. Further, an example CNN training process could apply multiple kernels similar to the example kernel 4720 (but with different weight values) to obtain multiple output images similar to the output image 4730 in each layer of the CNN.

It is noted that the sizes of the input image 4710 and the kernel 4720, the weight values in the kernel 4720, and the pixel values in the image 4710 could vary and are only illustrated as shown for the sake of example. Other sizes, weight values, and pixel values are possible.

As noted above, the CNN training process described in connection with FIG. 47 may be associated with a relatively high computing power requirement depending on the number of kernels used, the number of CNN layers, window sizes, and/or the input image size. For each windowed operation, a single pixel output is calculated for the output image 4730. In the event two or more masks are to be applied to the input image 4710, then the windowed convolution operation must repeat across the entire input image 4710, thereby causing a substantial computational demand.

FIG. 48A is a conceptual illustration of an example convolution operation using a dynamic kernel 4800. As shown, an example input image 4810 is represented similarly to input image 4710 as a grid of pixel values. In the example convolution operation of FIG. 48A however, each section (e.g., section 4812, sometimes referred to as a window, a sliding window, or a kernel window) of the example input image 4810 is convolved with an example dynamic kernel 4820 that includes weight values adjusted according to the data in the image section 4812.

Specifically, multiple (static) kernels 4822, 4824, 4826, 4828, etc., are first individually convolved with image section 4812 (e.g., by computing a weighted sum of the center pixel and its adjacent pixels) to obtain a single output value. The illustrated example of FIG. 48A includes nine (9) different static kernels (filters), but examples disclosed herein are not limited thereto. The individual output values from the convolution computations performed using the different static kernels 4822, 4824, 4826, 4828, etc., and are then combined (as weight values) into a generated dynamic kernel 4820 having a same size as each of the individual kernels 4822, 4824, 4826, 4828, etc. Unlike traditional approaches to convolve a portion of an input pattern with multiple kernels, each of which produce a single pixel output, examples disclosed herein generate a weight for the generated dynamic kernel 4820.

Next, the generated dynamic kernel 4820 is convolved with the same image section 4812 to generate a single output pixel 4830. Thus, instead of generating an output pixel for each one of kernels 4822, 4824, 4826, 4828, etc., a single pixel output is obtained using a single dynamic kernel.

In line with the discussion above, the weights in dynamic kernel 4820 may vary depending on the data content of a respective image section 4812 convolved with the dynamic kernel 4820. This is unlike traditional approaches to convolution, in which the same variety of kernels (e.g., 4822, 4824, etc.) are applied for each window of the input pattern. That is, a different section of image 4810 (e.g., after a windowed portion moves to the right) may have a different pattern (i.e., different pixel values) and thus result in different weight values in its correspondingly generated dynamic kernel 4820. As such, each convolution performed during each windowed portion of the input image results in a unique and/or otherwise dynamic kernel 4820 that is multiplied with each section of the input image 4812.

At least one benefit of examples disclosed herein results in better filters (sometimes referred to as "descriptors") generated during image convolution. Briefly turning to FIG. 48B, the example input image 4810 is shown with eight (8)

example filters surrounding it. The illustrated example of FIG. 48B includes a first dynamic filter 4850, a second dynamic filter 4852, a third dynamic filter 4854, a fourth dynamic filter 4856, a fifth dynamic filter 4858, a sixth dynamic filter 4860, a seventh dynamic filter 4862 and an eighth dynamic filter 4864. Unlike traditional convolution techniques that apply the same filters in a manner independent of specific portions of the input image 4810, example dynamic filters disclosed herein are uniquely generated based on each portion of the input image 4810. In other words, the dynamic filters/kernels disclosed herein change their behavior based on the input image so that every portion of the input image is convolved with a different filter. As a result, a reduction of terms results because fewer kernels and layers are needed.

Generation of dynamic filters disclosed herein permits a more efficient extraction of information from input images. For example, the first filter 4850 corresponds to a portion of the input image 4810 that is homogenous (e.g., includes only a single color of pixels within the window of interest). The example first dynamic filter 4850 permits the convolution process to learn to ignore such portions of the input image that contain no information, thereby allowing such regions to be skipped and/or otherwise prevents further computational resources from being applied to the analysis of such portions.

Additionally, through this example process, the number of kernels (and thus hyper parameters) used in each layer of a CNN training model implemented according to the example illustrated in FIG. 48A can be less than a corresponding number of kernels (and thus hyper parameters) used in each layer of a traditional CNN training model implemented according to the example described in connection with FIG. 47. Accordingly, examples disclosed herein reduce memory requirements for CNN models and reduce computational resources needed for such CNN models. While both the traditional CNN technique and dynamic kernel techniques disclosed herein converge to a solution (e.g., a solution having a particular percent accuracy metric), examples disclosed herein converge using fewer weights and fewer epochs. Furthermore, because dynamic filters are applied for each portion of the input image, accuracy of extracted information is improved.

Generally speaking, as the accuracy of descriptors increases, the corresponding need for a particular quantity of kernels and/or neurons in subsequent layers decreases. Table 1 illustrates a typical LeNet CNN topology, and Table 2 illustrates an example adaptive kernel topology disclosed herein.

TABLE 1

| Layer | Units | Type |
|---|---|---|
| Layer 1 | 20 Kernels | Conv 5 × 5 |
| Layer 2 | 50 Kernels | Conv 5 × 5 |
| Layer 3 | 500 Neurons | FC |
| Layer 4 | 10 Neurons | FC |

TABLE 2

| Layer | Units | Type |
|---|---|---|
| Layer 1 | 5 Kernels | Adaptive Conv 5 × $5_{5\times5}$ |
| Layer 2 | 10 Kernels | Conv 5 × 5 |

TABLE 2-continued

| Layer | Units | Type |
|---|---|---|
| Layer 3 | 20 Neurons | FC |
| Layer 4 | 10 Neurons | FC |

As illustrated in example Table 1, a typical LeNet CNN topology includes a first layer with twenty kernels and a second layer with fifty kernels. However, examples disclosed herein that employ adaptive kernels (e.g., Table 2) enable a network topology where a first layer includes five kernels and a second layer with ten kernels. Furthermore, the example LeNet CNN topology requires 431,000 parameters to achieve greater than 99% accuracy, whereas example adaptive kernels disclosed herein require approximately 6500 parameters to achieve the same accuracy, thereby enabling substantially reduced memory requirements. Additionally, the commercially available LetNet5 model requires 60,000 parameters to achieve an accuracy greater than 99%, which is approximately nine times greater than the number of parameters required by examples disclosed herein to achieve a substantially similar (e.g., within 1-2%) accuracy. While the example "Best Practices" model by Patrice Y. Simard (2003) also achieves greater than 99% accuracy using four layers, that commercially available model requires over 132,000 parameters, which is twenty times greater than the quantity of parameters required by examples disclosed herein.

FIG. 49 is a block diagram of example machine learning trainer circuitry 4900 implemented in accordance with teachings of this disclosure for training an adaptive convolutional neural network. As shown, the example machine language trainer 4900 includes an example training data datastore 4905, example dynamic kernel convolver circuitry 4910, an example model data datastore 4915, and example model provider circuitry 4920. The example machine learning trainer 4900 of FIG. 49 is responsible for facilitating the examples disclosed in FIG. 48A.

In some examples, the machine learning trainer circuitry 4900 includes means for machine learning training, means for dynamic kernel convolving and means for model providing. For example, the means for machine learning training may be implemented by the machine learning trainer circuitry 4900, the means for dynamic kernel convolving may be implemented by the dynamic kernel convolver circuitry 4910, and the means for model providing may be implemented by the model provider circuitry 4920. In some examples, the aforementioned structure may be implemented by machine executable instructions disclosed herein and executed by processor circuitry, which may be implemented by the example processor circuitry 512 of FIG. 5 and/or example Field Programmable Gate Array (FPGA) circuitry, other hardware logic circuitry, hardware implemented state machines, and/or any other combination of hardware, software, and/or firmware. For example, the aforementioned structure may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example training data datastore 4905 of the illustrated example of FIG. 49 is implemented by any storage device (e.g., memory, structure, and/or storage disc for storing data such as, for example, flash memory, magnetic media, optical media, solid state memory, hard drive(s), thumb drive(s), etc). Furthermore, the data stored in the example training data datastore 4905 may be in any data format such as, for example, binary data, comma delimited data, tab delimited data, structured query language (SQL) structures, etc. In one example, the data stored in the example training data datastore 4905 may include image data (e.g., image files) that include training images representative of various patterns (e.g., edges, segments, etc.), similar to input image 4810, for example.

While in the illustrated example of FIG. 49 the training data datastore 4905 is illustrated as a single device, the example training data datastore 4905 and/or any other data storage devices described herein may be implemented by any number and/or type(s) of memories. The example training data datastore 4905 stores data that is used by the example dynamic kernel convolver circuitry 4910 to train a model.

The example dynamic kernel convolver circuitry 4910 of the illustrated example of FIG. 49 is implemented using a logic circuit such as, for example, a hardware processor. For example, the dynamic kernel convolver circuitry 4910 can be implemented using computer readable instructions that are executed by a processor to perform the functions of the dynamic kernel convolver circuitry 4910. Other types of circuitry may be additionally or alternatively used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc.

In operation, the example dynamic kernel convolver circuitry 4910 generates a dynamic kernel for each section of training data model (e.g., image) by convolving the data section with multiple different kernels and combining the outputs of the convolved kernels to generate a single dynamic kernel for convolving that data section, in a manner consistent with the discussion corresponding to FIG. 48A. Further, the example dynamic kernel convolver circuitry 4910 stores the results of the dynamic kernel convolution operation described above in the example model data datastore 4915.

The example model data datastore 4915 of the illustrated example of FIG. 49 is implemented by any storage device (e.g., memory, structure, and/or storage disc for storing data such as, for example, flash memory, magnetic media, optical media, solid state memory, hard drive(s), thumb drive(s)). Furthermore, the data stored in the example model data datastore 4915 may be in any data format such as, for example, binary data, comma delimited data, tab delimited data, structured query language (SQL) structures, etc. In one specific example, the data stored in the example model datastore 4915 includes kernels (e.g., weight filters) trained to identify and/or classify features in image data (e.g., segments, background).

While in the illustrated example of FIG. 49 the model data datastore 4915 is illustrated as a single device, the example model data datastore 4915 and/or any other data storage devices described herein may be implemented by any number and/or type(s) of memories. The example model data datastore 4915 stores information concerning a model trained by the root finder. Such information may include, for example, model hyperparameters, information concerning the architecture of the model, etc.

The example model provider circuitry 4920 of the illustrated example enables the example machine learning trainer 4900 to transmit and/or otherwise provide access to a model stored in the model data datastore 4915. In this manner, the model may be trained at the machine learning trainer 4900 (e.g., a first device), and be provided to another device (e.g., a second device) by the model provider circuitry 4920 via, for example, a network (e.g., the Internet) to allow the other device to utilize the model for inference.

While an example manner of implementing the machine learning trainer 4900 of 49 is illustrated in FIG. 50, one or more of the elements, processes and/or devices illustrated in FIG. 50 may be combined, divided, re-arranged, omitted, eliminated and/or implemented in any other way. Further, the example dynamic kernel convolver circuitry 4910, the example model provider 4915 and/or, more generally, the example machine learning trainer 4900 of FIG. 49 may be implemented by hardware, software, firmware and/or any combination of hardware, software and/or firmware. Example hardware implementation include implementation on the example compute circuitry 402 (e.g., the example processor 404) of FIG. 4A, or on the example processor 452 of the example computing node 450 of FIG. 4B. Thus, for example, any of the example dynamic kernel convolver circuitry 4910, the example model provider 4915 and/or, more generally, the example machine learning trainer 4900 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example dynamic kernel convolver circuitry 4910 and/or the example model provider 4915 is/are hereby expressly defined to include a non-transitory computer readable storage device or storage disk such as a memory, a digital versatile disk (DVD), a compact disk (CD), a Blu-ray disk, etc. including the software and/or firmware. Example storage devices and/or storage disks may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Further still, the example machine learning trainer 4900 of FIG. 49 may include one or more elements, processes and/or devices in addition to, or instead of, those illustrated in FIG. 50, and/or may include more than one of any or all of the illustrated elements, processes and devices. Examples disclosed herein optionally expose one or more knobs to facilitate selection and/or adjustment of selectable options. Knobs may be selected by, for example, a user and/or an agent. Agent knob adjustment may occur in an automatic manner independent of the user in an effort to identify one or more particular optimized knob settings.

A flowchart representative of example hardware logic, machine-readable instructions, hardware implemented state machines, and/or any combination thereof for implementing the machine learning trainer 4900 of FIG. 49 is shown in FIG. 450. The machine-readable instructions may be one or more executable programs or portion(s) of an executable program for execution by a computer processor and/or processor circuitry, such as the processor 452 shown in the example processor platform 450 discussed above in connection with FIG. 4B. The program may be embodied in software stored on a non-transitory computer readable storage medium such as a CD-ROM, a floppy disk, a hard drive, a DVD, a Blu-ray disk, or a memory associated with the processor 452, but the entire program and/or parts thereof could alternatively be executed by a device other than the processor 452 and/or embodied in firmware or dedicated hardware. Further, although the example program is described with reference to the flowchart illustrated in FIG. 50, many other methods of implementing the example machine learning trainer 4900 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 50 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 50 is a flowchart representative of example machine-readable instructions 5000 which may be executed to implement the example machine learning trainer 4900 to train a CNN using dynamic kernels.

At block 5002, the example machine learning trainer 4900 obtains data to be analyzed. For example, the data to be analyzed may include an image retrieved from an Edge device that has not been identified, such as an image of a pedestrian, a car or a traffic sign. In some examples, the data is obtained from a memory, a storage or one or more devices having sensors (e.g., cameras, microphones, gyroscopes, etc. In some examples, the data to be analyzed is vibrational information from a smartwatch, in which a gesture needs to be identified. In some examples, the data to be analyzed is audio information within which one or more commands is to be identified. The example dynamic kernel convolver circuitry 4910 obtains any number of kernels (block 5002), such as static kernels typically employed in neural networks. In some examples, the static kernels are initially populated with random values and, in traditional neural network implementations such static kernels are modified during a learning process. The plurality of kernels may be similar to kernels 4720, 4822, 4824, 4826, and/or 4828. In one example, the dynamic kernel convolver circuitry 4910 obtains the kernels from the example model data datastore 4915. For example, initial weight values in the kernels may be computed (at least partially) using another neural network training model based on the same training data datastore and stored in the model data datastore 4905. In another example, the initial weight values in the kernels could be randomly generated and then adjusted during the training process of the neural network. Other examples are possible.

As described above, while examples disclosed herein begin with any number of static kernels, such static kernels are not employed in the traditional manner by convolution with each selected window of the input image.

The example convolution window shift circuitry 4912 positions a convolution window on an unexamined portion of an input image (block 5006). Returning briefly to the illustrated example of FIG. 48A, the section 4812 represents a convolution window that is stepped through the input image 4810. The example dynamic kernel convolver circuitry 4910 multiplies (convolves) window image data corresponding to contents within the convolution window 4812 with a selected one of the static filters to generate a weight value for the example dynamic kernel (block 5008). Each generated/calculated output (e.g., pixel) may correspond to a weighted sum of the pixel values in the input image section 4812, where the weights are defined by the selected kernel. In the event the example dynamic kernel convolver circuitry 4910 determines that one or more additional static kernels has not yet been applied to the selected portion of the input image (block 5010), then the example dynamic kernel convolver circuitry 4910 selects a next available static kernel (block 5012) and control returns to block 5008.

On the other hand, in the event the dynamic kernel convolver circuitry 4910 determines that all static kernels have been applied to the selected portion of the input image (block 5010), the example model data datastore 4915 stores the dynamic kernel corresponding to the selected portion of the input image (block 5014). In some examples, the dynamic kernel convolver circuitry 4910 combines the output pixels to generate a dynamic kernel for the first section of the image. The example dynamic kernel convolver circuitry 4910 multiplies (convolves) the window image data from the input image with the dynamic kernel to generate a pixel output (block 5016). The example convolution window shift circuitry 4912 determines whether there are additional window positions within the input image that have not yet been convolved (block 5018). If so, control returns to block 5006, otherwise the example model provider circuitry 4920 saves the model to storage (block 5020).

From the foregoing, it will be appreciated that example methods, apparatus and articles of manufacture have been disclosed for adaptively training a convolutional neural network. The disclosed methods, apparatus and articles of manufacture improve the efficiency of using a computing device by reducing the number of kernels and/or layers used for training a convolutional neural network model. The disclosed methods, apparatus and articles of manufacture are accordingly directed to one or more improvement(s) in the functioning of a computer.

Further variation of examples disclosed above is provided by the following examples.

Example methods, apparatus, systems, and articles of manufacture to optimize resources in Edge networks are disclosed herein. Further examples and combinations thereof include the following: Example 145 includes an apparatus comprising at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to generate a first weight by convolving the portion of the input image with a first one of static kernels, generate a second weight by convolving the portion of the input image with a second one of the static kernels, in response to determining all available static kernels have been convolved with the portion of the input image, generate a dynamic kernel by combining the first weight with the second weight, generate an output pixel corresponding to the portion of the input image by convolving the portion of the input image with the dynamic kernel, and build a convolution model from respective ones of additional output pixels corresponding to respective ones of additional portions of the input image.

Example 146 includes the apparatus as defined in example 145, wherein the processor circuitry is to build the convolution model having a first layer depth value and a first quantity of parameters.

Example 147 includes the apparatus as defined in example 146, wherein the first layer depth of the convolution model is the same as a commercially available model, the first quantity of parameters of the convolution model lower than a second quantity of parameters of the commercially available model by a factor of at least nine.

Example 148 includes the apparatus as defined in example 146, wherein the processor circuitry is to build the convolution model with a first accuracy metric substantially equal to a second accuracy metric corresponding to a commercially available model.

Example 149 includes the apparatus as defined in example 145, wherein the processor circuitry is to access the input image with interface circuitry.

Example 150 includes At least one non-transitory computer readable storage medium comprising instructions that, when executed, cause at least one processor to at least generate a first weight by convolving the portion of the input image with a first one of static kernels, generate a second weight by convolving the portion of the input image with a second one of the static kernels, in response to determining all available static kernels have been convolved with the portion of the input image, generate a dynamic kernel by combining the first weight with the second weight, generate an output pixel corresponding to the portion of the input image by convolving the portion of the input image with the dynamic kernel, and build a convolution model from respective ones of additional output pixels corresponding to respective ones of additional portions of the input image.

Example 151 includes the computer readable storage medium as defined in example 150, wherein the instructions, when executed, cause the at least one processor to build the convolution model having a first layer depth value and a first quantity of parameters.

Example 152 includes the computer readable storage medium as defined in example 151, wherein the first layer depth of the convolution model is the same as a commercially available model, the first quantity of parameters of the convolution model lower than a second quantity of parameters of the commercially available model by a factor of at least nine.

Example 153 includes the computer readable storage medium as defined in example 152, wherein the instructions, when executed, cause the at least one processor to build the convolution model with a first accuracy metric substantially equal to a second accuracy metric corresponding to a commercially available model.

Example 154 includes the computer readable storage medium as defined in example 151, wherein the instructions, when executed, cause the at least one processor to access the input image with interface circuitry.

Example 155 includes a method comprising generating a first weight by convolving the portion of the input image with a first one of static kernels, generating a second weight by convolving the portion of the input image with a second one of the static kernels, in response to determining all available static kernels have been convolved with the portion of the input image, generating a dynamic kernel by combining the first weight with the second weight, generating an output pixel corresponding to the portion of the input image by convolving the portion of the input image with the dynamic kernel, and building a convolution model from respective ones of additional output pixels corresponding to respective ones of additional portions of the input image.

Example 156 includes the method as defined in example 155, further including building the convolution model having a first layer depth value and a first quantity of parameters.

Example 157 includes the method as defined in example 156, wherein the first layer depth of the convolution model is the same as a commercially available model, the first quantity of parameters of the convolution model lower than a second quantity of parameters of the commercially available model by a factor of at least nine.

Example 158 includes the method as defined in example 156, further including building the convolution model with a first accuracy metric substantially equal to a second accuracy metric corresponding to a commercially available model.

Example 159 includes the method as defined in example 156, further including accessing the input image via interface circuitry.

Example 160 includes an apparatus to generate a model comprising convolution window shift circuitry to position a kernel window to a portion of an input image, dynamic kernel convolver circuitry to generate a first weight by convolving the portion of the input image with a first one of static kernels, generate a second weight by convolving the portion of the input image with a second one of the static kernels, in response to determining all available static kernels have been convolved with the portion of the input image, generate a dynamic kernel by combining the first weight with the second weight, and generate an output pixel corresponding to the portion of the input image by convolving the portion of the input image with the dynamic kernel, and model provider circuitry to build a convolution model from respective ones of additional output pixels corresponding to respective ones of additional portions of the input image.

Example 161 includes the apparatus as defined in example 160, wherein the model provider circuitry is to build the convolution model having a first layer depth value and a first quantity of parameters.

Example 162 includes the apparatus as defined in example 161, wherein the first layer depth of the convolution model is the same as a commercially available model, the first quantity of parameters of the convolution model lower than a second quantity of parameters of the commercially available model by a factor of at least nine.

Example 163 includes the apparatus as defined in example 161, wherein the model provider circuitry is to build the convolution model with a first accuracy metric substantially equal to a second accuracy metric corresponding to a commercially available model.

Example 164 includes the apparatus as defined in example 160, further including interface circuitry to access the input image.

Methods and Apparatus for Second Order Bifurcating for Training of a Neural Network and Topology Optimization (ID15)

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Currently, the number of neurons or units in a Neural Network (NN) layer is manually defined by the network architect. Usually, this hyper parameter is based on the experience of the architect and following a trial-and-error process. Therefore, it is common to consider that the final NN topologies are somehow suboptimal.

The typical procedure is for the network architect to define the number of neurons manually, and to use a trial-and-error process with multiple trainings, until the user obtains a satisfactory balance between the number of neurons and the expected accuracy performance. Some existing techniques try to automatically tune the hyper parameters, performing multiple trainings through brute force, until the combination of hyper-parameters that yields the best performance is found.

Another technique is to use genetic algorithms. In this method, every model represents an element of the population and new models are generated combining the previous generations, and for each combination a new training is performed in order to identify the best topologies in the new population.

Any such existing technique uses multiple training iterations, which translates into high computational power expenditure over extended periods of time. Therefore, these methods suffer from low overall practical efficiency.

Example approaches disclosed herein utilize a second-order method to minimize the global loss error in a NN training, using fully connected layers, based on the usage of vertical and horizontal tangent parabolas. Example approaches disclosed herein expand the search area of zero-crossings in the error derivative function, quantifying the need for more or a smaller number of neurons in a fully connected layer in order to classify optimally the patterns in the training database.

In example approaches disclosed herein, the number of neurons converge to the number of roots of the derivative of the error function. As used herein, a root is defined as a numeric value corresponding to a zero crossing in a derivative of a function. In some examples, a function may have any number of roots. For example, a simple quadratic function may have a single root, whereas a more complex polynomial function might have multiple roots. That is, when two neurons converge to the same root, these will merge into a single neuron. Additionally, every neuron improves its position to better cover the training data distribution, or otherwise will split into two neurons, depending on its derivative function in each iteration.

Examples disclosed herein seek to minimize error of a NN model by relocating neurons in the fully connected layer to the roots of the derivative of the error (i.e. $E'(u)=dE(u)/du$). The local minima point of E is a root of E'. Such an approach does not require an initial definition of a search interval for the roots. Moreover, example approaches disclosed herein move neurons that are not in the minima neighborhood, reducing computational costs and therefore improving the model architecture. As a result, not only are weighting parameters of the NN trained, but at the same time the topology of the NN is improved, without the cost of having to train multiple topologies.

FIG. 51 includes graphs illustrating iterations of the example process for finding roots of a function. The illustrated example of FIG. 51 includes six graphs 5110, 5120, 5130, 5140, 5150, 5160. In each of the graphs 5110, 5120, 5130, 5140, 5150, 5160, a polynomial function 5105 is shown. In the illustrated example of FIG. 51, the polynomial function 5105 can be represented by Equation 51:

$$f(x)=5x^5+2x^4-15x^3+6x+1 \qquad \text{Equation ID15\_1}$$

Throughout the six graphs/iterations 5110, 5120, 5130, 5140, 5150, 5160, roots of the polynomial function 5105 are found (e.g., represented as $x_1, x_2, x_3, x_4, x_5, x_6$). In the illustrated example of FIG. 51, second order polynomial functions are added at tangent points of the polynomial function 5105. In an initial iteration, a starting point (e.g., $x_0$) is randomly selected. In the illustrated example of FIG. 51, the polynomials used at $x_0$, can be used to generate $x_1$ (a root) and $x_2$. For this case, $x_2$ is not a root but it helps to generate $x_3$, that for the next iteration it finds another root and also $x_4$, where $x_4$ helps to find the root $x_6$ and so on.

FIG. 52 represents values of seven iterations of the root finding process associated with the polynomial function 5105 of FIG. 51. In the illustrated example of FIG. 5102, seven iterations are illustrated representing a progression through the process of identifying roots. In the illustrated example of FIG. 52, a checkmark next to a value indicates that the value was identified as a root. Thus, in the illustrated example of FIG. 52, the five roots of the polynomial function 5105 of FIG. 51 were identified in seven iterations.

Contrast this identification of the roots of the polynomial with a brute force searching technique which might require hundreds or thousands of iterations. Moreover, common brute forcing techniques apply 'binning' where roots are searched for within particular zones of the polynomial (e.g., between integer values). Such techniques are typically limited to identification of a single root within each zone. Thus, if in the context of the polynomial function 5105 of FIG. 51, roots were search for between −2 and −1, −1 and 0, 0 and 1, 1 and 2, only four roots would have been identified, when there are in fact five roots.

FIG. 53 is a block diagram of an example neural network. The example neural network includes a radial basis function (RBF) based fully connected layer 5310. In the illustrated example of FIG. 53, a RBF NN is used, however any other type of network may additionally or alternatively be used. The illustrated example of FIG. 53 shows the basic architecture in which the number of neurons in the hidden layer is k. Example approaches disclosed herein will increase and decrease the number of neurons depending on the number of roots detected in the derivative of the error function. In the illustrated example of FIG. 53, μ represents a centroid of the hyper-spheroid (a gaussian for 2D), w represents the weights of the output layer, a represents the outputs from the Gaussian neurons and o is the output of the final layer.

During training of the neural network, the total error is given by:

$$E = \frac{1}{2}\sum_{i=1}^{N}(d_i - o_i)^2$$

Where $o_i$ is given by:

$$O_i = \sum_{j=1}^{k} w_j a_{ij}$$

And $a_{ij}$ is defined as:

$$a_{ij}=e^{-\Sigma_{l=1}^{D}(x_{il}-\mu_{jl})^2}$$

Then, the error E partial derivative is:

$$f(\mu_{il}) = \frac{\partial E}{\partial \mu_{jl}} = 2\sum_{i=1}^{N}(d_i - o_i)w_j a_{ij}(x_{il} - \mu_{jl})$$

Since we define our function as the derivative of the error:

$$f(\mu_{il}) = \frac{\partial E}{\partial \mu_{jl}}$$

Then, the derivative is denoted as:

$$f'(\mu_{jl}) = \sum_{i=1}^{N}\left(\frac{f(\mu_{jl})^2}{(d_i - o_i)^2} + 2p(x_{il} - \mu_{jl}) - \frac{f(\mu_{jl})}{x_{il} - \mu_{jl}}\right)$$

And:

$$f''(\mu_{jl}) = \frac{2f(\mu_{jl})f'(\mu_{jl})(d_i - o_i) + 4f(\mu_{jl})^2 w_j a_j(x_{il} - \mu_{jl})}{(d_i - o_i)^3} + s$$

Where S is:

$$s = \sum_{n=0}^{3}(x_{il} - \mu_{jl})^{(1-n)}V_n$$

And:

$$V=[2f(u_{jl}),-2f(u_{jl}),-f'(u_{jl}),-f(u_{jl})]$$

Now we can compute the ratios:

$$r_1 = \frac{f(a)}{f'(a)}, r_2 = \frac{f(a)}{f''(a)}, r_3 = \frac{f'(a)}{f''(a)}$$

The above ratios allow to the example root finder 54105410 of FIG. 54 to implement the process described below in connection with FIGS. 55 and 56 to find the roots of the derivative of the error function. The roots found are proportional to the number of neurons needed by the NN to solve the problem.

FIG. 54 is a block diagram of an example machine learning trainer 400 implemented in accordance with teachings of this disclosure to perform second order bifurcating for training of a machine learning model. The example machine learning trainer 400 includes a training data datastore 5405, a root finder 5410, a root tester 5412, a model data datastore 5415, and a model provider 5420.

The training data datastore 5405 of the illustrated example of FIG. 54 is implemented by any storage device (e.g., memory, structure, and/or storage disc for storing data such as, for example, flash memory, magnetic media, optical media, solid state memory, hard drive(s), thumb drive(s), etc.). Furthermore, the data stored in the example training data datastore 5405 may be in any data format such as, for example, binary data, comma delimited data, tab delimited data, structured query language (SQL) structures, etc. While, in the illustrated example, the training data datastore 5405 is illustrated as a single device, the example training data datastore 5405 and/or any other data storage devices described herein may be implemented by any number and/or type(s) of memories. The example training data datastore 5405 stores data that is used by the example root finder 5410 to train a model.

The example root finder 5410 of the illustrated example of FIG. 54 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. The example root finder 5410 of the illustrated example of FIG. 54 uses second order bifurcation to attempt to identify potential values of roots to be tested by the root tester 5412. As used herein, the roots of the function represent neurons of a neural network. In some examples, the root finder 5410 uses the identified roots to train a machine learning model. The example root finder 5410 stores the results of the machine learning model training in the example model data datastore 5415.

The example root tester 5412 of the illustrated example of FIG. 54 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. The example root tester 5412 of the illustrated example of FIG. 54 evaluates error values to determine whether a particular value (e.g., one or more input values to a function) identifies a root of a function.

The example model data datastore 5415 of the illustrated example of FIG. 54 is implemented by any storage device (e.g., memory, structure, and/or storage disc for storing data such as, for example, flash memory, magnetic media, optical media, solid state memory, hard drive(s), thumb drive(s), etc.). Furthermore, the data stored in the example model data datastore 5415 may be in any data format such as, for example, binary data, comma delimited data, tab delimited data, structured query language (SQL) structures, etc. While, in the illustrated example, the model data datastore 5415 is illustrated as a single device, the example model data datastore 5415 and/or any other data storage devices described herein may be implemented by any number and/or type(s) of memories. The example model data datastore 5415 stores information concerning a model trained by the root finder 5410. Such information may include, for example, model hyperparameters, information concerning the architecture of the model, etc.

The example model provider 5420 of the illustrated example enables the example machine learning trainer 5400 to transmit and/or otherwise provide access to a model stored in the model data datastore 5415. In this manner, the model may be trained at the machine learning trainer 5400 (e.g., a first device), and be provided to another device (e.g., a second device) by the model provider 5420 via, for example, a network (e.g., the Internet) to allow the other device to utilize the model for inference. In other words, the example machine learning trainer 5400 may be implemented to perform training at an edge device, an IoT device, a cloud server, or any other computing device capable of training a machine learning model.

While an example manner of implementing the machine learning trainer 5400 is illustrated in FIG. 54, one or more of the elements, processes and/or devices illustrated in FIG. 54 may be combined, divided, re-arranged, omitted, eliminated and/or implemented in any other way. Further, the example root finder 5410, the example root tester 5412, the example model provider 5420, and/or, more generally, the example machine learning trainer 5400 of FIG. 54 may be implemented by hardware, software, firmware and/or any combination of hardware, software and/or firmware. Thus, for example, any of the example root finder 5410, the example root tester 5412, the example model provider 5420, and/or, more generally, the example machine learning trainer 5400 of FIG. 54 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example root finder 5410, the example root tester 412, the example model provider 5420, and/or, more generally, the example machine learning trainer 5400 of FIG. 54 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machine learning trainer 5400 of FIG. 54 may include one or more elements, processes and/or devices in addition to, or instead of, those illustrated in FIG. 54, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the machine learning trainer 5400 of FIG. 54 are shown in FIGS. 55, 56, 57, and/or 58. The machine readable instructions may be one or more executable programs or portion(s) of an executable program for execution by a computer processor and/or processor circuitry, such as the processor 404 shown in the example compute node 400 discussed below in connection with FIGS. 4A and/or 4B. The program may be embodied in software stored on a non-transitory computer readable storage medium such as a CD-ROM, a floppy disk, a hard drive, a DVD, a Blu-ray disk, or a memory associated with the processor 404, but the entire program and/or parts thereof could alternatively be executed by a device other than the processor 404 and/or embodied in firmware or dedicated hardware. Further, although the example program is described with reference to the flowcharts illustrated in FIGS. 56, 55, 57, and/or 58, many other methods of implementing the example machine learning trainer 5400 of FIG. 54 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process(es) of FIGS. 56, 55, 57, and/or 58 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 55 is a flowchart representing example machine-readable instructions that may be executed to train a machine learning model using the roots identified by the root finder of FIG. 54. The example process of FIG. 56 begins when the root finder 5410 accesses training data for training of a machine learning model. (Block 5510). In examples disclosed herein, the training data is stored in the training data datastore 5405. In some examples, the training data is stored in the training data store 5405 in response to receipt of the training data from another node (e.g., another node in the edge computing network). The example root finder 5410 and/or the example root tester 5412 discover roots as a function of the training data, as described in the root finding process of FIGS. 56, 57, and/or 58, below. (Block 5520). The example root finder 5410 determines whether root discovery is to continue. (Block 5530). Such a determination may be made based on, for example, whether a threshold number of roots have been found, whether a threshold amount of time has been spent attempting to identify roots, whether a threshold number of iterations of the root discovery process have been executed, and/or any other features or combination(s) thereof. If root discovery is to continue (e.g., block 5530 returns a result of YES), control proceeds to block 5520 where execution of the root discovery process is continued.

If root discovery is complete (e.g., block 5530 returns a result of NO), the example root finder 5410 utilizes the discovered root(s) as neurons in the training of a machine learning model. (Block 5540). In this manner, additional extraneous neurons that would have otherwise been included in the trained machine learning model can be avoided by use of the discovered roots. The example root finder 5410 then stores the trained machine learning model in the model data datastore 5415. (Block 5550).

In the illustrated example of FIG. 55, the example model provider 5420 provides the stored machine learning model to other device(s) for execution. (Block 5560). In this manner, the model can be trained at a first location (e.g., a central node in an edge network), and be distributed to a second location(s) (e.g., edge nodes in the edge network) so that the machine learning model can be executed at those second location(s). However, in some examples, the model is trained and executed at the same node. Utilizing the training process based on root discovery disclosed herein enables more efficient discovery of nodes than previous techniques, thereby allowing training to potentially also be carried out at nodes with less compute resources (e.g., less memory, less processor resources, etc.). Such an approach enables models to be trained (e.g., re-trained, updated, etc.)

more frequently. The example process of FIG. 55 then terminates, but may be re-executed upon, for example, an indication that training is to occur, an indication that new training data is present, errors being detected in the trained model, a threshold amount of time elapsing since a prior training, etc.

FIG. 56 is a flowchart representing example machine-readable instructions that may be executed to cause the example root finder and/or root tester to find roots of a function. The illustrated example of FIG. 56 represents example operations performed by the machine learning trainer 400 of FIG. 54. In examples disclosed herein, the process illustrated in FIG. 56 is multithreaded, and uses at least an initial value for every weight to start the exploration of the derivative of the NN model error in order to find the roots of the function, and to move a neuron weight at each local minimum.

The example process 5600 of FIG. 56 begins when the example root finder 5410 selects a starting point for identification of roots of a function. (Block 5605). In examples disclosed herein, the starting point is initialized to a random value. However, any other value may additionally or alternatively be used. The example root finder 5410 identifies a potential value of a root that is to be analyzed (e.g., a value is selected for a determination of whether it is a root). (Block 5510). In an initial iteration, the potential value to be analyzed is the starting point selected at block 5505. In subsequent iterations, the potential value(s) to be analyzed may be based on stored values resulting from a prior iteration of analysis (e.g., as described in connection with block 5630, below). The root tester 5412 determines if a value of the function is less than an error threshold. (Block 5615). If so (e.g., block 5615 returns a result of YES), the example root tester 412 adds the identified tested value as a root. (Block 5620). The example root tester 5410 determines whether additional roots should be searched and/or tested. (Block 5622). If the search for additional roots is to continue (e.g., block 5622 returns a result of YES), control proceeds to block 5610. If no additional searching is to be performed (e.g., block 5622 returns a result of NO), the process 600 terminates (e.g., control returns to block 5520 of FIG. 55).

Returning to block 5615, if block 5615 returns a result of NO, the example root finder 5410 uses second order bifurcation to attempt to identify one or more potential locations of roots to be analyzed in a subsequent iteration. (Block 5630). In some examples, the root finder 5410 considers whether a potential value had previously been analyzed and, if so, avoids re-analysis of the potential value. The example process iteratively continues until the root discovery process is complete.

FIG. 57 is a flowchart representing example machine-readable instructions that may be executed to cause the example root finder 410 to find roots of a function. The illustrated example of FIG. 57 represents example operations performed by the machine learning trainer 5400 of FIG. 54. FIG. 58 is a flowchart representing example mathematical operations corresponding to the machine-readable instructions of FIG. 57. The illustrated example of FIG. 58 illustrates mathematical representations 5800 of those operations of FIG. 57. In examples disclosed herein, the process illustrated in FIG. 57 is multithreaded, and uses at least an initial value for every weight to start the exploration of the derivative of the NN model error in order to find the roots of the function, and to move a neuron weight at each local minimum. In general, the process is based in the derivative ratios $r_1$, $r_2$, $r_3$ generated by the derivatives of the function $f(x)$, defined as:

$$r_1 = \frac{f(a)}{f'(a)}, r_2 = \frac{f(a)}{f''(a)}, r_3 = \frac{f'(a)}{f''(a)}$$

Where $f(a)$ represents the derivative of the NN model error. Depending on the values of $f'(a)$ and $f''(a)$ there are four different scenarios as described in the flowchart of FIG. 57.

The example process 5700 of FIG. 57 begins when the example root finder 5410 selects a starting point for identification of roots of a function $f(a)$. (Block 5705). An example equation for implementing block 5705 of FIG. 57 is shown in block 5805 of FIG. 58. In examples disclosed herein, the starting point ($x_0$) is initialized to a random value. However, any other value may additionally or alternatively be used. The example root finder 5710 identifies an a potential value of a root that is to be analyzed (e.g., a value is selected for a determination of whether it is a root). (Block 5710). An example equation for implementing block 5710 of FIG. 57 is shown in block 5810 of FIG. 58.

In an initial iteration, the potential value to be analyzed is the starting point selected at block 5705. In subsequent iterations, the potential value(s) to be analyzed may be based on stored values resulting from a prior iteration of analysis (e.g., as described in connection with block 5750, below). The root tester 5412 determines if a value of the function is less than an error threshold. (Block 5715). An example equation for implementing block 5715 of FIG. 57 is shown in block 5815 of FIG. 58.

If the value of the function is less than the error threshold (e.g., block 5715 returns a result of YES), the example root finder 5410 adds the identified value of $x_0$ as a root. (Block 5720). The example root finder 5410 determines whether additional roots should be searched. (Block 5722). If the search for additional roots is to continue (e.g., block 5722 returns a result of YES), control proceeds to block 5710. If no additional searching is to be performed (e.g., block 5722 returns a result of NO), the process 5700 terminates.

Returning to block 5715, if block 5715 returns a result of NO, the example root finder 5410 determines whether the second derivative of the function (e.g., $f'(a)$) equals zero. (Block 5725). An example equation for implementing block 5725 of FIG. 57 is shown in block 5825 of FIG. 58.

If the second derivative of the function equals zero (Block 725 returns a result of YES), the example root finder 5410 determines whether the first derivative (e.g., $f'(a)$) equals zero. (Block 730). An example equation for implementing block 5730 of FIG. 57 is shown in block 5830 of FIG. 58.

If the first derivative does not equal zero (block 5730 returns a result of NO), the example root finder 5410 calculates the first derivative ratio (e.g., $r_1$) (Block 5735), and sets a first point ($x_1$) equal to the index (a) minus the first derivative ratio (e.g., $r_1$). (Block 5740). Example equations for implementing blocks 5735 and 5740 of FIG. 57 are shown in blocks 5835 and 5840 of FIG. 58, respectively.

If the first derivative equals zero (e.g., Block 5730 returns a result of SINGULAR or YES), the example root finder 5410 sets a first point and a second point ($x_{1,2}$) equal to a±1. (Block 5745). An example equation for implementing block 5745 of FIG. 57 is shown in block 5845 of FIG. 58. Control then proceeds from blocks 5740 or 745 to block 5750, where the example root finder 5410 stores the first point and/or the second point, thereby identifying subsequent points to be searched for roots. (Block 5750). In some examples, the first point is stored as L[n], and the second point (if set) is stored as L[n+1]. An example equation for implementing block 5750 of FIG. 57 is shown in block 5850 of FIG. 58.

Control then proceeds to block 5710, where the process is repeated. In such an example, multiple additional threads may be created as part of the subsequent searches. For example, if both a first and second point were identified (e.g., both L[n] and L[n+1] were stored), two additional threads might be created to facilitate the searching of the roots at those locations. In some alternative examples, the existing thread may be re-used for one of the additional searches, and a second (new) thread may be created. The subsequently searched values and/or the threads in which those subsequently searched values are searched may result in further locations to analyze to determine if a root has been found.

In some examples, when identifying a value to be analyzed to determine if the value is a root, the example root finder 5410 considers whether potential values had previously been tested. If a potential value (or a value within a threshold distance of the potential value) had previously been tested, not repeating the test of that value avoids the possibility of infinite loops being created. For example, in the illustrated example of FIG. 53, an initial value of −1.9 does not find a root, but results in potential values for roots at −1.849 and −1.41, which are analyzed in a first subsequent iteration. In the first subsequent iteration, the value −1.849 is confirmed as a root, and the value −1.41 is identified as not being a root. The testing of the value −1.41 results in potential values for roots at −2.02 and −0.93, which are analyzed in a second subsequent iteration. In the second subsequent iteration, the value −2.02 does not result in identification of a root, but does result in potential values for roots at −1.849 and 1.56. The value 1.56 is analyzed in a third subsequent iteration. However, as the value −1.849 was previously analyzed (regardless of the identification of the value −1.849 being identified as a root), the value −1.849 is not included in the third subsequent iteration. In this manner, previously analyzed values of potential roots do not result in additional threads being created.

Moreover, in some examples, had the root identifier 5410, after analysis of the value −2.02 in the second subsequent iteration, determined that the value −1.848 (as opposed to −1.849) should be tested, the root identifier 5410 may determine that the value −1.848 should not be tested, as it is within a threshold distance from a previously tested value. In some examples, using a different (e.g., larger) threshold distance may reduce computing time (and, as an extension, compute resource requirements of the machine learning trainer 5400), as additional similar values are not analyzed, at the expense of potentially missing identifications of roots that are close to each other. In contrast, using a smaller threshold distance may increase computing time (and, as an extension, compute resource requirements of the machine learning trainer 5400), as additional similar values are analyzed, thereby potentially identifying additional roots that might not have otherwise been discovered (resulting in a more accurate machine learning model than if those roots had not been discovered).

Returning to block 5725 of FIG. 57, if the second derivative (e.g., f'(a)) is not equal to zero (e.g., Block 5725 returns a result of NO), the example root finder 5410 calculates a third derivative ratio ($r_3$). (Block 5755). An example equation for implementing block 5755 of FIG. 57 is shown in block 5855 of FIG. 58. The example root finder 5410 determines if either the first derivative of the function (f'(a)) or the second derivative of the function (f'(a)) are less than the error threshold. (Block 5760). An example equation for implementing block 5760 of FIG. 57 is shown in block 5860 of FIG. 58.

If block 5760 returns a result of YES, the example root finder 410 sets the first point ($x_1$) based on the tested point (a) and half of the third derivative ration (e.g., equal to a+(½) $r_3$). (Block 5765). An example equation for implementing block 5765 of FIG. 57 is shown in block 5865 of FIG. 58. Control then proceeds to block 5750.

If block 5760 returns a result of NO, the example root finder 410 calculates a second derivative ratio ($r_2$). (Block 5770). The example root finder 5410 determines whether the square of the third derivative ratio (e.g., $r_3$ squared) is greater than or equal to twice the second derivative ratio e.g., $2r_2$). (Block 5775). An example equation for implementing block 5775 of FIG. 57 is shown in block 5875 of FIG. 58. If block 5775 evaluates to false (e.g., Block 5775 returns a result of NO), the example root finder 5410 sets the first point ($x_1$) based on the tested point (a) and the third derivative ratio (e.g., equal to a−r3). (Block 5780). An example equation for implementing block 5780 of FIG. 57 is shown in block 5880 of FIG. 58. Otherwise (e.g., if Block 5775 returns a result of YES), the root finder 5410 calculates the first and second points using the equation based on the tested point, the second derivative ratio, and the third derivative ratio (e.g., $x_{1,2}=a-r_3\pm\sqrt{r_3^2-2r_2}$). (Block 5785). An example equation for implementing block 5785 of FIG. 57 is shown in block 5885 of FIG. 58. Control then proceeds to block 5750. As noted above, at block 5750, the example root finder 5410 stores the first point $x_1$ as L[n], and the second point (if set) $x_2$ as L[n+1], thereby identifying subsequent points to be searched for roots. (Block 5750). Control then proceeds to block 5710, where the process is repeated. In such an example, multiple additional threads may be created as part of the subsequent searches. For example, if both L[n] and L[n+1] were stored, two additional threads might be created to facilitate the searching of the roots at those locations. In some alternative examples, the existing thread may be re-used for one of the additional searches, and a second (new) thread may be created.

The example process 5700 of FIG. 57 continues until the root discovery process is complete. The example process may be considered complete when, for example, all threads have resulted in identification of a root and no additional locations exist for testing to determine if the location represents a root. However, any other approach to determining when the root discovery process is considered complete may additionally or alternatively be used including, for example, when a threshold number of roots have been discovered (e.g., five roots, ten roots, twenty roots), when a threshold number of potential root locations have been tested (e.g., twenty potential root locations tested, one hundred potential root locations tested, one thousand potential root locations tested, etc.), a threshold amount of time has elapsed during the root discovery process, a threshold amount of compute resources have been used in the root discovery process, etc.

In further examples, any of the compute nodes or devices discussed with reference to the present edge computing systems and environment (e.g., the machine learning trainer 5400 of FIG. 54) may be fulfilled based on the components depicted in FIGS. 4A and 4B.

FIG. 59 represents an experiment to train a neural network to generate a particular output. The example images illustrated in FIG. 59 highlight the adaptation of the NN topology functionality, by reducing the number of neurons. The scenario displayed in FIG. 59 consists of features in a 2D space for visualization purposes. The number of randomly initialized neurons is set high for the task (initial 60 neurons that are more than needed to solve the problem).

In the illustrated example of FIG. 59, the NN is trained to classify between the red dots and the black dots (see plots below). White circles represent each 2D RBF neuron distribution. As can be seen in the sequence of plots of FIG. 59 including, in order, a first plot 5905, a second plot 5910, a third plot 5915, a fourth plot 5920, and a fifth plot 5925, the number of neurons decreases while the NN is being trained and the error decreases, based on merging the neurons on the same E' root. A final plot 5930 (black and yellow) shows the evaluation of the network pixel by pixel, illustrating a final optimized number of resources (9 neurons) for this problem.

From the foregoing, it will be appreciated that example methods, apparatus and articles of manufacture have been disclosed that enable training of a neural network by not only adjusting weights of the neural network, but also automatically adjusting the number of neurons inside a fully connected layer during the training process by introducing quadratic functions (i.e. the tangent vertical and Horizontal parabola).

By implementing this methodology, it is possible to converge faster and more robustly to the roots of the derivative of the error function. As a result, training of a neural network can be accomplished more efficiently on lower power devices, such as edge computing nodes, as opposed to high-powered centralized servers.

At each one of the roots found, a neuron is located, and when two neurons converge into the same root, these get merged to have only one neuron. This constitutes the base mechanism to optimize the number of neurons needed by the final NN topology. In the same fashion, if the algorithm detects that the presence of a larger number of roots, is possible to generate new neurons by splitting the existing ones in the layer (similar to the biological mitosis process). These two processes ensure an appropriate number of neurons will be obtained at the end of the training stage. Such an approach typically reduces the number of neurons needed for implementing a neural network. As a result, smaller neural network models are created. Using smaller neural network models enables inference using those models on lower power computing devices (e.g., edge nodes) as well as reduces communications requirements needed for providing those models to those lower power computing devices. As a result, examples disclosed herein help to find improved topologies of a NN model in order to save computing resources during training, and provide an expected performance when deployed in the inference.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to optimize resources in Edge networks are disclosed herein. Further examples and combinations thereof include the following:

Example 165 includes an apparatus to train a machine learning model, the apparatus including memory, instructions, and at least one processor to execute the instructions to cause the at least one processor to at least access training data for the training of the machine learning model, iterate over possible locations of roots using second order bifurcation to determine whether respective ones of the possible locations of the roots are roots of the training data, and create the machine learning model based on the respective ones of the possible locations of the roots that are determined to be roots of the training data.

Example 166 includes the apparatus of example 165, wherein the training data is represented by a function, and to determine whether a first location of the possible locations of the roots is a root, the at least one processor is to execute the instructions to cause the at least one processor to determine if a value of function at the first location is less than an error threshold, and in response to determining that the value of the function is less than the error threshold, record an indication that the first location is a first root.

Example 167 includes the apparatus of example 166, wherein the at least one processor is to execute the instructions to cause the at least one processor to, in response to the determination that the value of the function is not less than the error threshold, identify a second location, the second location to be used in a subsequent iteration to determine whether the second location is a second root.

Example 168 includes the apparatus of example 167, wherein the at least one processor is to execute the instructions to cause the at least one processor to not use the second location in the subsequent iteration if the second location is within a threshold distance of the first root.

Example 169 includes the apparatus of example 167, wherein the at least one processor is to execute the instructions to cause the at least one processor to, in response to the determination that the value of the function is not less than the error threshold, identify a third location, the third location to be used in the subsequent iteration to determine whether the third location is a third root.

Example 170 includes the apparatus of any one of examples 167-169, wherein the at least one processor is to execute the instructions to cause the at least one processor to identify the second location based on a first derivative of the function at the first location and a second derivative of the function at the first location.

Example 171 includes At least one computer readable storage medium comprising instructions that, when executed, cause at least one processor to at least access training data for the training of a machine learning model, iterate over possible locations of roots using second order bifurcation to determine whether respective ones of the possible locations of the roots are roots of the training data, and create the machine learning model based on the respective ones of the possible locations of the roots that are determined to be roots of the training data.

Example 172 includes the at least one computer readable storage medium of example 171, wherein the training data is represented by a function, and to determine whether a first location of the possible locations of the roots is a root, the instructions cause the at least one processor to determine if a value of function at the first location is less than an error threshold, and in response to determining that the value of the function is less than the error threshold, record an indication that the first location is a first root.

Example 173 includes the at least one computer readable storage medium of example 172, wherein the instructions cause the at least one processor to, in response to the determination that the value of the function is not less than the error threshold, identify a second location, the second location to be used in a subsequent iteration to determine whether the second location is a second root.

Example 174 includes the at least one computer readable storage medium of example 173, wherein the instructions cause the at least one processor to not use the second location in the subsequent iteration if the second location is within a threshold distance of the first root.

Example 175 includes the at least one computer readable storage medium of example 173, wherein the instructions cause the at least one processor to, in response to the determination that the value of the function is not less than the error threshold, identify a third location, the third location to be used in the subsequent iteration to determine whether the third location is a third root.

Example 176 includes the at least one computer readable storage medium of any one of examples 173-175, wherein the instructions cause the at least one processor to identify the second location based on a first derivative of the function at the first location and a second derivative of the function at the first location.

Example 177 includes a method of training a machine learning model, the method including accessing training data for the training of the machine learning model, iterating over possible locations of roots using second order bifurcation to determine whether respective ones of the possible locations of the roots are roots of the training data, and creating the machine learning model based on the respective ones of the possible locations of the roots that are determined to be roots of the training data.

Example 178 includes the method of example 177, wherein the training data is represented by a function, and the determining of whether a first location of the possible locations of the roots includes determining if a value of function at the first location is less than an error threshold, and in response to determining that the value of the function is less than the error threshold, recording an indication that the first location is a first root.

Example 179 includes the method of example 178, further including, in response to determining that the value of the function is not less than the error threshold, identifying a second location, the second location to be used in a subsequent iteration to determine whether the second location is a second root.

Example 180 includes the method of example 179, further including not using the second location in the subsequent iteration if the second location is within a threshold distance of the first root.

Example 181 includes the method of example 179, further including, in response to determining that the value of the function is not less than the error threshold, identifying a third location, the third location to be used in the subsequent iteration to determine whether the third location is a third root.

Example 182 includes the method of any one of examples 179-181, wherein the identification of the second location is based on a first derivative of the function at the first location and a second derivative of the function at the first location.

Example 183 includes an apparatus for training of a machine learning model, the apparatus including a root finder to iterate over possible locations of roots within training data stored in a training data datastore, the iteration performed using second order bifurcation to determine whether respective ones of the possible locations of the roots are roots of the training data, wherein the root finder is to create the machine learning model based on the respective ones of the possible locations of the roots that are determined to be roots of the training data, and a model data datastore to store the machine learning model created by the root finder.

Example 184 includes the apparatus of example 183, wherein the training data is represented by a function, and wherein to determine whether a first location of the possible locations of the roots, the root finder is to determine if a value of function at the first location is less than an error threshold, and in response to determining that the value of the function is less than the error threshold, record an indication that the first location is a first root.

Example 185 includes the apparatus of example 184, wherein the root finder is to, in response to the determination that the value of the function is not less than the error threshold, identify a second location, the second location to be used in a subsequent iteration to determine whether the second location is a second root.

Example 186 includes the apparatus of example 185, wherein the root finder is to not use the second location in the subsequent iteration if the second location is within a threshold distance of the first root.

Example 187 includes the apparatus of example 185, wherein the root finder is to, in response to the determination that the value of the function is not less than the error threshold, identify a third location, the third location to be used in the subsequent iteration to determine whether the third location is a third root.

Example 188 includes the apparatus of any one of examples 185-187, wherein the root finder is to identify the second location based on a first derivative of the function at the first location and a second derivative of the function at the first location.

Neural Network Precision Optimization (ID24/25)

Neural Network (NN) size is a limiting factor when deploying learning algorithms on edge devices that are strapped for power, memory, bandwidth handling and/or computing resources. Increasing sizes of NNs may improve certain aspects of task performance (e.g., image recognition) while hindering other aspects of task performance (e.g., latency). To achieve low latency and high throughput, NN sizes may be constrained using different techniques, such as reducing a number of non-zero weights (e.g., pruning, sparsification), lowering a bit-width of weights and activations, etc. In some examples, uniform symmetric or uniform asymmetric quantization techniques are applied to reduce NN sizes. Typically, uniform symmetric quantization techniques realize the largest benefit when specific hardware devices are used that can accommodate clean bit shift operations (e.g., AVX 512 x86 instruction set architecture (ISA)), but examples disclosed herein are not limited to any specific ISA and/or hardware. On the other hand, non uniform quantization utilizes a dictionary in which keys include relatively lower bit-width representations of values. Such dictionaries bode well for reducing size constraints, but require dictionary lookup overhead, and such dictionaries themselves can become large. Examples disclosed herein discover and accelerate inference of dictionary-based weighting with non-uniform quantized NNs.

Prior efforts to discover dictionaries rely on sequential search-and-replace decompression techniques and/or reconfigurable hardware. Some prior efforts involve complex initializing of prior mixtures of Gaussians and learning mixture parameters of both those Gaussians and network weights via maximum likelihood techniques. Further complex posterior associations are required with a Dirac distribution up to machine precision to reduce quantization error with post fine-tuning. Still other techniques take pre-trained networks and learn dictionary values by gradient propagation, but such techniques have a substantially limited centroid search space, rather than updating the weights themselves as disclosed herein. Further drawbacks to prior techniques include, but are not limited to requirement of highly specific FPGAs and/or ASICs, which accompany a relatively high engineering cost. Example weights disclosed herein include one or more values represented by alphanumeric characters. Such values may be stored in one or more data structures, in which example data structures include integers, floating point representations and/or characters. Weights and corresponding values to represent such weights represent data stored in any manner. Such data may also propagate from a first data structure to a second or any number of subsequent data structures along a data path, such as a bus.

Unlike performance issues of prior techniques, examples disclosed herein achieve desired accuracy with two epochs rather than a typical 100 (or more) epochs. Examples disclosed herein achieve reduced bit-precision inferences, thereby reducing memory bandwidth bottleneck constraints. Generally speaking, dictionary-based weight sharing is a superset of all quantization techniques, such as power-of-two methods, uniform symmetric methods, and uniform asymmetric. Such techniques are computing device agnostic.

FIG. 61A illustrates an example matrix compression framework 6150. In the illustrated example of FIG. 61A, a first tensor 6152, a second tensor 6154, a third tensor 6156 and a fourth tensor 6158 each include four values. While the illustrated example of FIG. 61A includes values as INT8, examples disclosed herein are not limited thereto. The example first tensor 6152 and the example second tensor 6154 include four separate unique values, some of which are repeated in different cells. A similar example circumstance occurs with regard to the example third tensor 6156 and the example fourth tensor 6158. As disclosed in further detail below, one or more dictionaries are generated for any number of tensors (e.g., a matrix of weight values). Absent any effort to compress the example tensors, their combined representation consumes 16 bytes of memory.

In view of the example first tensor 6152 and the example second tensor 6154 exhibiting a common set of four unique weight values (e.g., determined via one or more clustering techniques/algorithms), a first dictionary 6160 is generated. In particular, each unique weight value is associated with a particular binary representation, referred to herein as a key. Because there are four (4) unique weight values in the aforementioned example first and second tensors, two bits are able to fully represent each key in the combination of all weight values. Accordingly, representations of each tensor occur by way of substituted key values to generate a respective compressed tensor. In the illustrated example of FIG. 61A, a first compressed tensor 6162, a second compressed tensor 6164, a third compressed tensor 6166 and a fourth compressed tensor 6168 are represented with 2-bit values rather than INT8 values, thereby conserving an amount of memory required for representation/storage. Accordingly, the representation of all four example tensors now consumes 12 bytes of memory (rather than 16 bytes in their uncompressed representation).

FIG. 61B illustrates example matrix progressions 6100 to generate a NN dictionary. In the illustrated example of FIG. 61B, the matrix progressions 6100 include a weight matrix 6102 (e.g., a tensor), a cluster index (centroids) 6104, an approximated weight matrix 6106, and a compressed matrix 6108 (e.g., a compressed tensor). In some examples the weight matrix 6102 is referred to as a tensor or a tensor matrix. In operation, a particular weight matrix 6102 includes a variety of values in which each value consumes a particular amount of memory based on a value type (e.g., floating point values (FP32, FP16), integer values (INT16, INT8), etc.). As disclosed in further detail below, a clustering algorithm is applied to the example weight matrix 6102 to identify a cluster index (centroids) ID24_B204. In some examples, clusters are discretized values based on an average (e.g., (−0.5+−0.7)/2=−0.6). Each centroid is associated with a bit representation 6110, and the example approximated weight matrix 6106 is populated with the nearest centroid values. Finally, the centroid values are replaced with the previously identified bit (e.g., binary) representations 6108, which consumes a substantially lower amount of memory for each value (e.g., a 2-bit binary representation per value versus a FP32 value representation).

Traditional approaches to developing dictionaries and/or determining tensor/matrix representations having a memory/storage requirement less than corresponding original tensor/matrix representations involved identifying optimized centroid values. For instance, prior techniques identify centroids as a grouping of unique values, which defines a search space (Rc), where c represents a number of identified centroids. Within this limited search space Rc, traditional techniques adjust centroid representations in connection with a loss function in view of centroid weight values. As a result, updated centroid values are determined by traditional techniques to reduce (e.g., minimize) loss, but the weight values themselves never change. In other words, because Rc is a confined search space defined by the number of centroids, merely adjusting those centroids offers a lost opportunity when compressing tensors/matrices. Examples disclosed herein are not limited to the confined search space RC, but instead update tensor weights themselves.

FIG. 60A illustrates an example optimizer circuit 6002 to generate and/or otherwise invoke NN dictionaries. In the illustrated example of FIG. 60A, the optimizer circuit 6002 includes an example matrix retriever 6004, an example cluster engine 6006, an example loss calculator circuit 6008, an example gradient calculator 6010, an example dictionary builder circuit 6012, and an example matrix decompressor circuit 6014. In operation, the example matrix retriever 6004 retrieves, receives and/or otherwise obtains a weight matrix (e.g., a tensor), such as the example weight matrix 6102 of FIG. 61B. The example optimizer circuit 6002 performs dictionary discovery in an iterative manner consistent with an example first tuning methodology 6016 and/or an example second tuning methodology 6018.

In view of the example first tuning methodology 6016, the example cluster engine 6006 performs one or more clustering techniques (e.g., k-means clustering algorithm) to identify, define and/or otherwise learn of unique cluster values of the weight matrix 6102. In view of identified clusters, the cluster engine 6006 calculates corresponding weights to best fit those centroid(s). Such calculations include a degree of error (loss). Accordingly, the example loss calculator circuit 6008 performs a forward pass and calculates loss values corresponding to the calculated weights of the weight matrix. As the model (e.g., a neural network) learns, an error value between the original weights (W) and clustered weights ($W'_C$) becomes smaller (e.g., converges). In particular, during the weight update operation an assumption is made that the forward pass occurs with the original weights rather than the clustered weights in a manner consistent with example Representation ID24_1.

$W'$=cluster($W$)          Representation ID24_1.

The example gradient calculator 6010 calculates gradient value(s) (e.g., approximations) for each unique weight in a backward pass in a manner consistent with example Representation 2.

$$\frac{\partial L}{\partial W'_C}.\qquad\text{Representation 2}$$

Because the assumed identity associates a derivative of clustered weights with respect to initial weights, in some examples the derivative of the clustered weights need not be calculated. In other examples, the example optimizer circuit 6002 calculates the derivative of the clustered weights with respect to the initial weights, and associates the derivative with an identity function. Rather than merely update centroid values, as in prior techniques, examples disclosed herein iterate to re-learn both the centroids and the weights at every step in a manner consistent with Representation 3.

$$W' = W - \eta\frac{\delta L}{\delta W_C}.\qquad\text{Representation 3}$$

In the illustrated example of Representation 3, n represents a learning weight (e.g., a scalar). For instance, initial iterations of example Representation 3 cause initial changes (e.g., swings) having a magnitude relatively greater than subsequent iterations in the effort to converge. As such, some approaches to set the learning weight (n) to a relatively lower value after a threshold number of iterations facilitates the ability to continue to converge with improved granularity and reduce overshoot. Additionally, example Representation 3 enables examples disclosed herein to avoid constraining and/or otherwise limiting the search space to only those finite centroids and, instead, enable the weights to be modified in the effort to minimize loss and converge. The approximation lies in the stability of the clustering algorithm used, and the gradient backpropagation is performed in a manner consistent with example Representation 4.

$$\frac{\delta L}{\delta W_C} \cong \sum \frac{\partial L}{\partial W_{Cij}}\frac{\partial W_{Cij}}{\partial W_{ij}}\qquad\text{Representation 4}$$

$$\text{where } \frac{\partial W_{Cij}}{\partial W_{ij}} == I_{identity}.$$

In particular, the difference between the clustered weight and the original weight becomes an identity and it is assumed that the gradients are the same. The assumption is that there is no real delta when advancing from the clustered weights to the non-clustered weights. As training continues with a network, this assumption gains validity.

In addition to the example first tuning methodology 6016 of FIG. 60B, examples disclosed herein also facilitate the example second tuning methodology 6018. In the illustrated example of FIG. 60B, a network is defined (Net). The defined network (Net) includes two arguments (1) an input (x) and (2) parameters (W). In some examples, the input is an image, and the parameters define the weight values. A backup of the original weights is generated as W' and replaces W with W' during a restoration operation. Additionally, in the illustrated example second tuning methodology 6018, the forward pass occurs with W'(c) by using Net(x; W'c). Thereafter, gradients are calculated and weights are restored after the gradient calculation, which aligns with an identity derivative between clustered and original weights. In view of the order of the example second tuning methodology, improved accuracy is at least one beneficial result, particularly with low bit-width quantizations.

The example dictionary builder circuit 6012 associates each value with a bit representation and replaces weights in the original weight matrix with the closest unique values, thereby generating an augmented weight matrix. The example dictionary builder circuit 6012 also replaces unique values with their corresponding bit representations, and the example optimizer circuit 6002 applies one or more minimal description length assignments. Accordingly, compressed weights and/or weight matrices are of a size relatively smaller than their original configuration and consume less storage space and require less bandwidth when transmitting models (e.g., to other devices, such as Edge devices having constrained memory, power and/or communication capabilities). In some non-limiting examples, the optimizer circuit 6002 determines whether histogram buckets may have exceeded a threshold and, if so, the loss function is modified to be proportional to the variance of a Gaussian fitting the histogram points. For instance, in the event a variable length compression is to be performed to gain further space savings, loss functions are created to increase frequency of some centroids to allow for greater variable length compression. In other examples, the clustering algorithm is changed to increase a number of weights, which facilitate greater variable length compression. Examples disclosed herein optionally expose one or more knobs to facilitate selection and/or adjustment of selectable options. Knobs may be selected by, for example, a user and/or an agent. Agent knob adjustment may occur in an automatic manner independent of the user in an effort to identify one or more particular optimized knob settings. In some examples, knobs are used to control a level of a fixed length compression (dictionary size) that is required, which comes at the expense of a degree of accuracy. In other examples, one or more weight restrictions are imposed/set to facilitate greater variable length compression to enable better overall model compression. One such example includes an L1 loss to increase model sparsity, which allows for greater compression of the network for communication purposes.

FIG. 62 illustrates an example compression process 6200. In the illustrated example of FIG. 62, an INT8 to INT4 compression process is illustrated with an assumption that 16 unique values occur at the compression stage. Two INT8 values are packed into a single INT8 value using INT4 keys. In some examples, the dictionary builder circuit 6012 interleaves the compressed tensor to avoid and/or otherwise reduce overhead at the subsequent decompression. For instance, particular hardware and associated instruction set architectures (ISAs) may benefit from interleaving, such as the example AVX 512 ISA. In some examples, interleaving is not performed (e.g., to avoid any need for additional bit shift operations during decompression).

Figure 63:
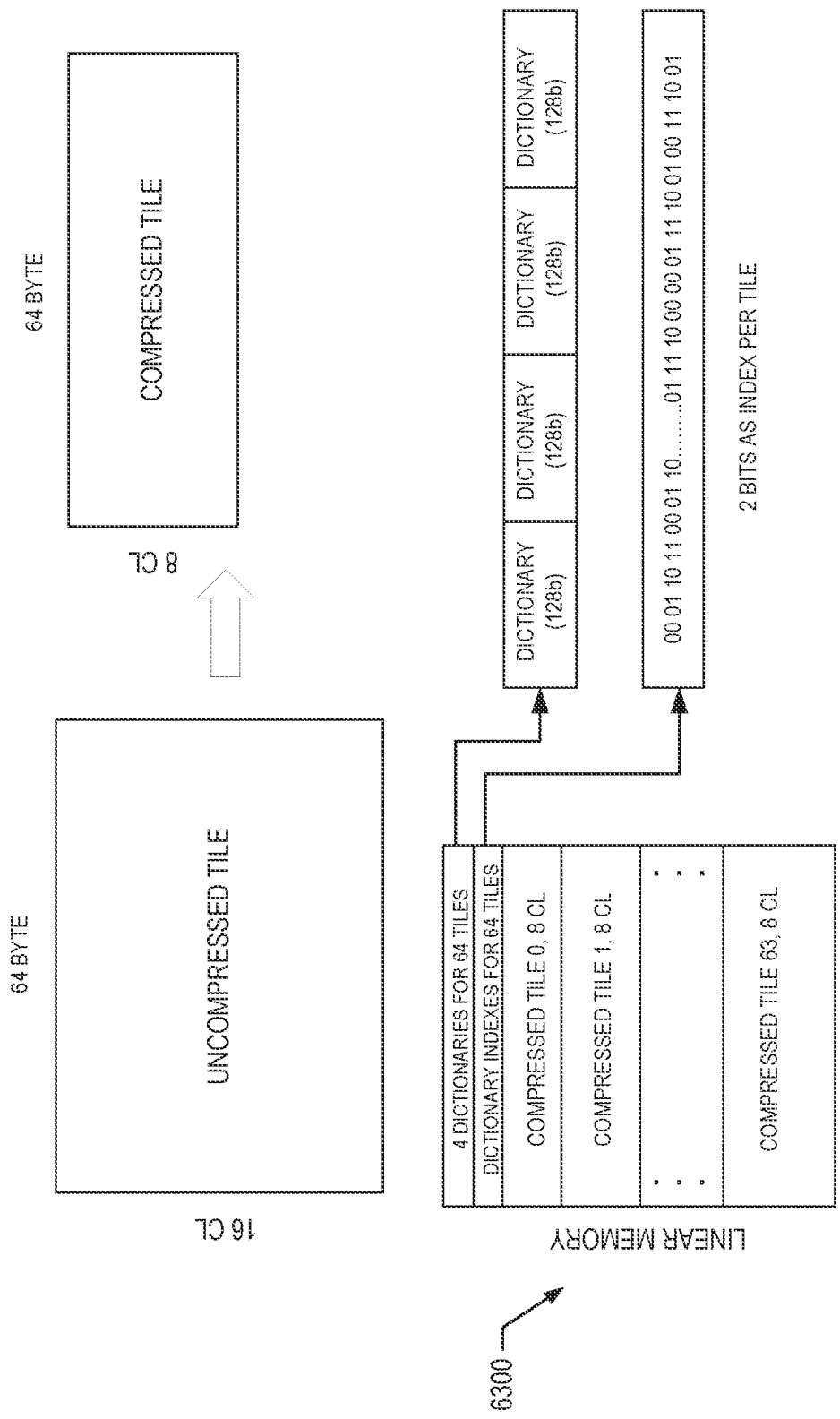

FIG. 63 illustrates example dictionaries in linear memory 6300 available for inference. In the illustrated example of FIG. 63, the linear memory 6300 includes four dictionaries and four corresponding indexes but examples disclosed herein are not limited thereto. Additionally, the illustrated example of FIG. 63 includes dictionaries that are 128 bits in length, but examples disclosed herein are not limited thereto and such lengths may dynamically change in view of the number of unique values discovered. As such, in the event a relatively fewer number of unique values is identified for a particular NN, decompression overhead is reduced with a correspondingly shorter bit length. Particular selection of dictionaries is accomplished with a 2-bit index per tile, which accommodates identification of four separate dictionaries. While the illustrated example of FIG. 63 includes four dictionaries with a 2-bit index, examples disclosed herein are not limited thereto.

Figure 64:
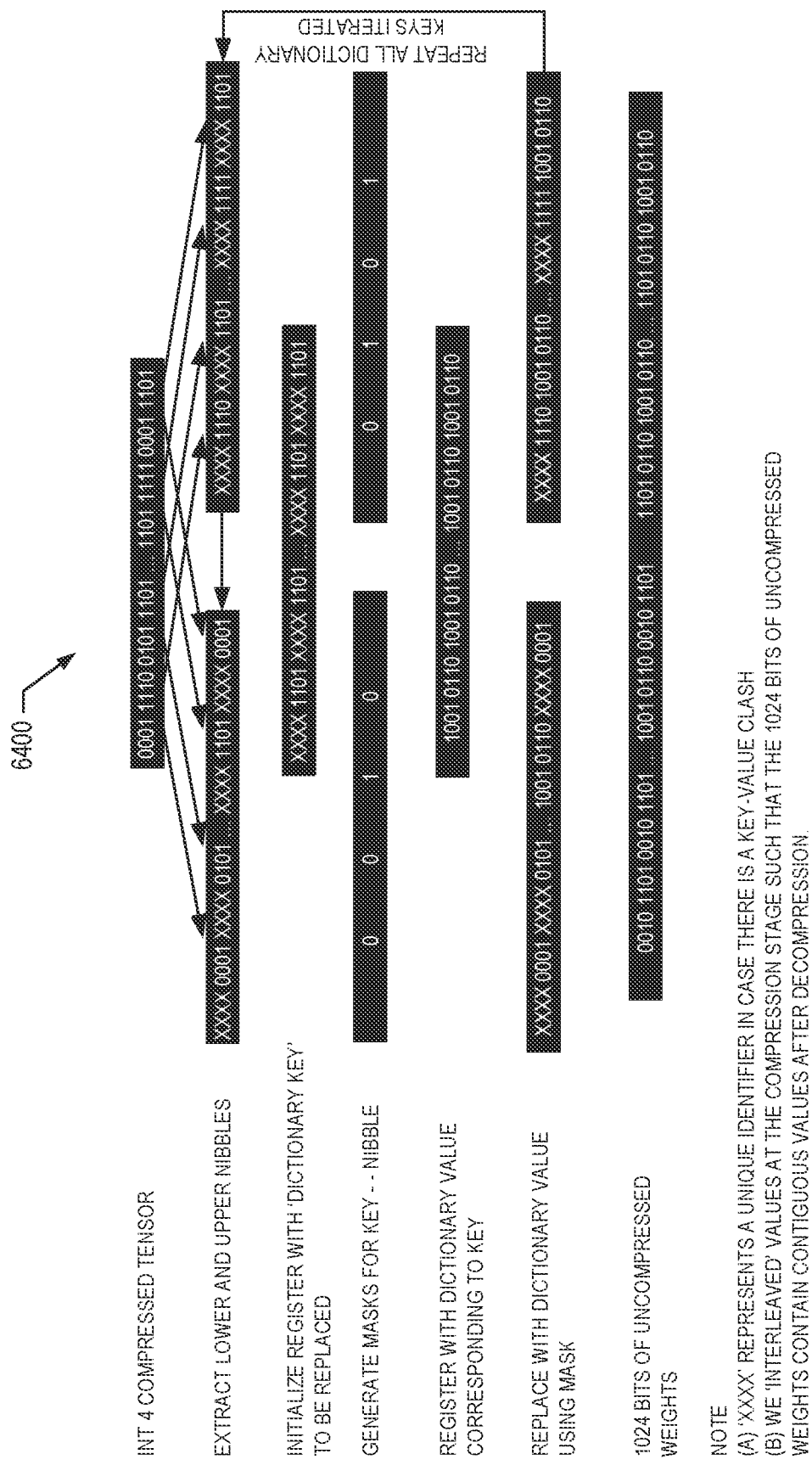

FIG. 64 illustrates example matrix/tensor decompression 6400 during inference time. In other words, replacing an INT4 key with a corresponding INT8 value. In operation, the example matrix decompressor circuit 6014 receives, retrieves and/or otherwise obtains a compressed matrix/tensor (e.g., INT4) and extracts lower and upper nibbles in two separate registers because the amount of information is being doubled from INT4 to INT8. For the sake of this example, the compressed tensor is 512 bits wide and will be decompressed to 1024 bits wide. The example matrix decompressor circuit 6014 initializes a register with a dictionary key that is to be replaced. For the sake of this example, assume that the key 1101 is to be replaced with a corresponding decompressed value. The example matrix decompressor circuit 6014 generates a mask for the key and the corresponding nibble, which is performed for each of the two registers above. As such, the masks identify where replacement is to occur, which is repeated for each key to generate the decompressed matrix.

Worth noting is that any decompression process is typically processor intensive. In circumstances where the number of bits increases by 1, the computational cost increases exponentially. Accordingly, reducing the dictionary bit width as disclosed above has a substantial effect on device efficiency during inference. This is particularly helpful at Edge locations with computing devices having fewer resources, such as IoT devices and/or mobile devices with limited computing power, bandwidth capabilities and/or on-board energy resources (e.g., battery).

While an example manner of implementing the optimizer circuit 6002 of FIG. 60A is illustrated in FIG. 60A, one or more of the elements, processes and/or devices illustrated in FIG. 60B may be combined, divided, re-arranged, omitted, eliminated and/or implemented in any other way. Further, the example matrix retriever 6004, the example cluster engine 6006, the example loss calculator circuit 6008, the example gradient calculator 6010, the example dictionary builder circuit 6012, the example matrix decompressor circuit 6014 and/or, more generally, the example optimizer circuit 6002 of FIG. 60A may be implemented by hardware, software, firmware and/or any combination of hardware, software and/or firmware. Example hardware implementation include implementation on the example compute circuitry 402 (e.g., the example processor 404) of FIG. 4A, or on the example processor 452 of the example computing node 450 of FIG. 4B. Thus, for example, any of the example matrix retriever 6004, the example cluster engine 6006, the example loss calculator circuit 6008, the example gradient calculator 6010, the example dictionary builder circuit 6012, the example matrix decompressor circuit 6014 and/or, more generally, the example optimizer circuit 6002 of FIG. 60A could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example matrix retriever 6004, the example cluster engine 6006, the example loss calculator circuit 6008, the example gradient calculator 6010, the example dictionary builder circuit 6012, the example matrix decompressor circuit 6014 and/or, more generally, the example optimizer circuit 6002 of FIG. 60A is/are hereby expressly defined to include a non-transitory computer readable storage device or storage disk such as a memory, a digital versatile disk (DVD), a compact disk (CD), a Blu-ray disk, etc. including the software and/or firmware. Example storage devices and/or storage disks may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Further still, the example optimizer circuit 6002 of FIG. 60A may include one or more elements, processes and/or devices in addition to, or instead of, those illustrated in FIG. 60A, and/or may include more than one of any or all of the illustrated elements, processes and devices.

Flowcharts representative of example hardware logic, machine-readable instructions, hardware implemented state machines, and/or any combination thereof for implementing the optimizer circuit 6002 of FIG. 60A is shown in FIGS. 65 through 68. The machine-readable instructions may be one or more executable programs or portion(s) of an executable program for execution by a computer processor and/or processor circuitry, such as the processor 452 shown in the example processor platform 450 discussed above in connection with FIG. 4B. The program may be embodied in software stored on a non-transitory computer readable storage medium such as a CD-ROM, a floppy disk, a hard drive, a DVD, a Blu-ray disk, or a memory associated with the processor 452, but the entire program and/or parts thereof could alternatively be executed by a device other than the processor 452 and/or embodied in firmware or dedicated hardware. Further, although the example program is described with reference to the flowcharts illustrated in FIGS. 65 through 68, many other methods of implementing the example optimizer circuit 6002 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

As mentioned above, the example processes of FIGS. 25 through 28 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 65:
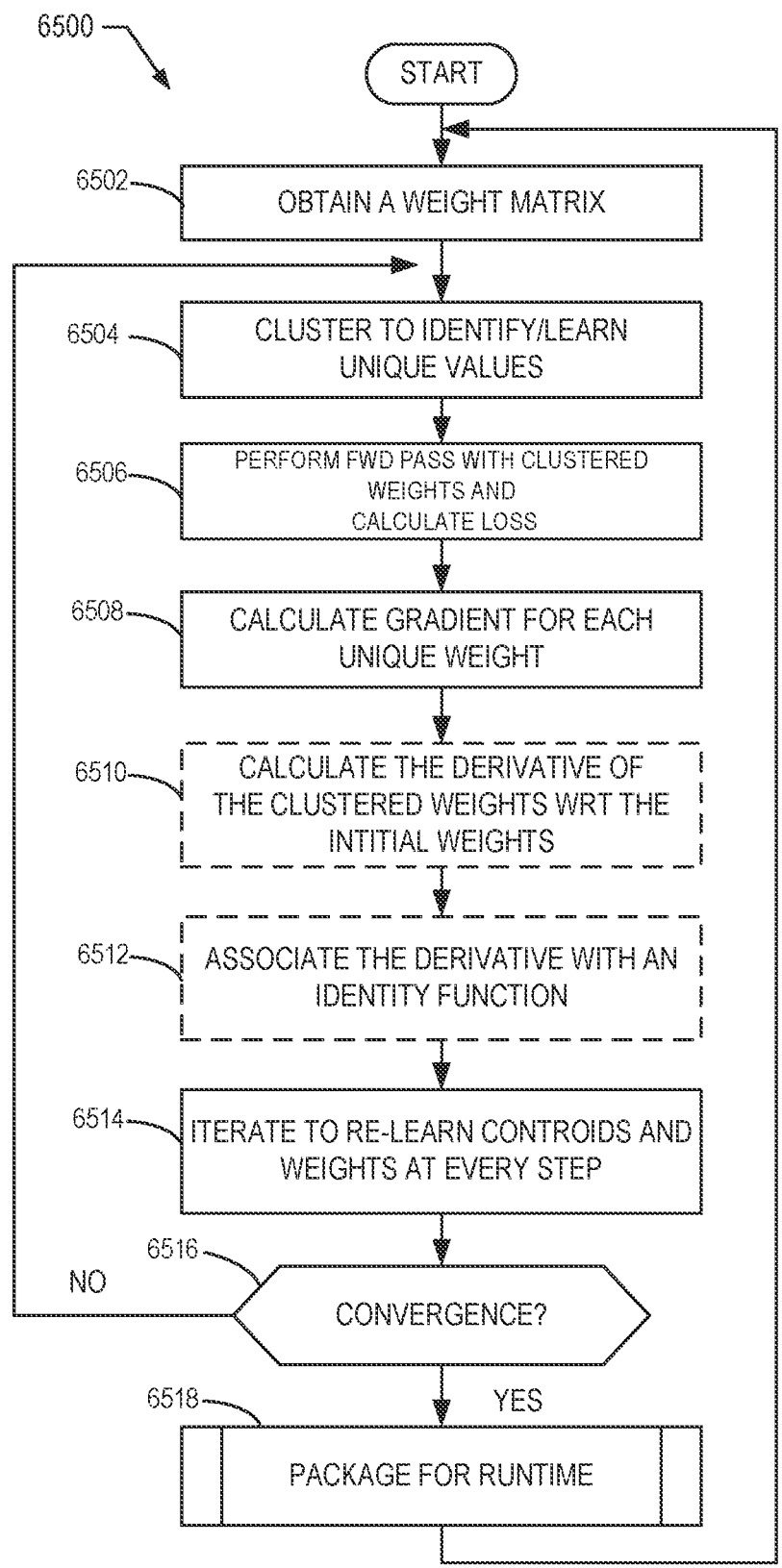

The program 6500 of FIG. 65 includes block 6502, where the example matrix retriever 6004 retrieves, receives and/or otherwise obtains a weight matrix, such as the example weight matrix 6102 of FIG. 61B. The example cluster engine 6006 performs a clustering technique to identify and/or otherwise learn of unique cluster values of the weight matrix 6102 (block 6504), and the example loss calculator circuit 6008 performs a forward pass with clustered weights and calculates loss values corresponding to the weight matrix (block 6506). The example gradient calculator 6010 calculates gradients for each unique weight in a backward pass (block 6508), and the example optimizer circuit 6002 calculates the derivative of the clustered weights with respect to the initial weights (block 6510), associates the derivative with an identity function (6012), and iterates to re-learn both the centroids and the weights at every step (block 6514). However, in some examples blocks 6510 and 6512 need not be performed and, instead, weight restoration may occur after re-learning centroids (block 6514).

Figure 66:
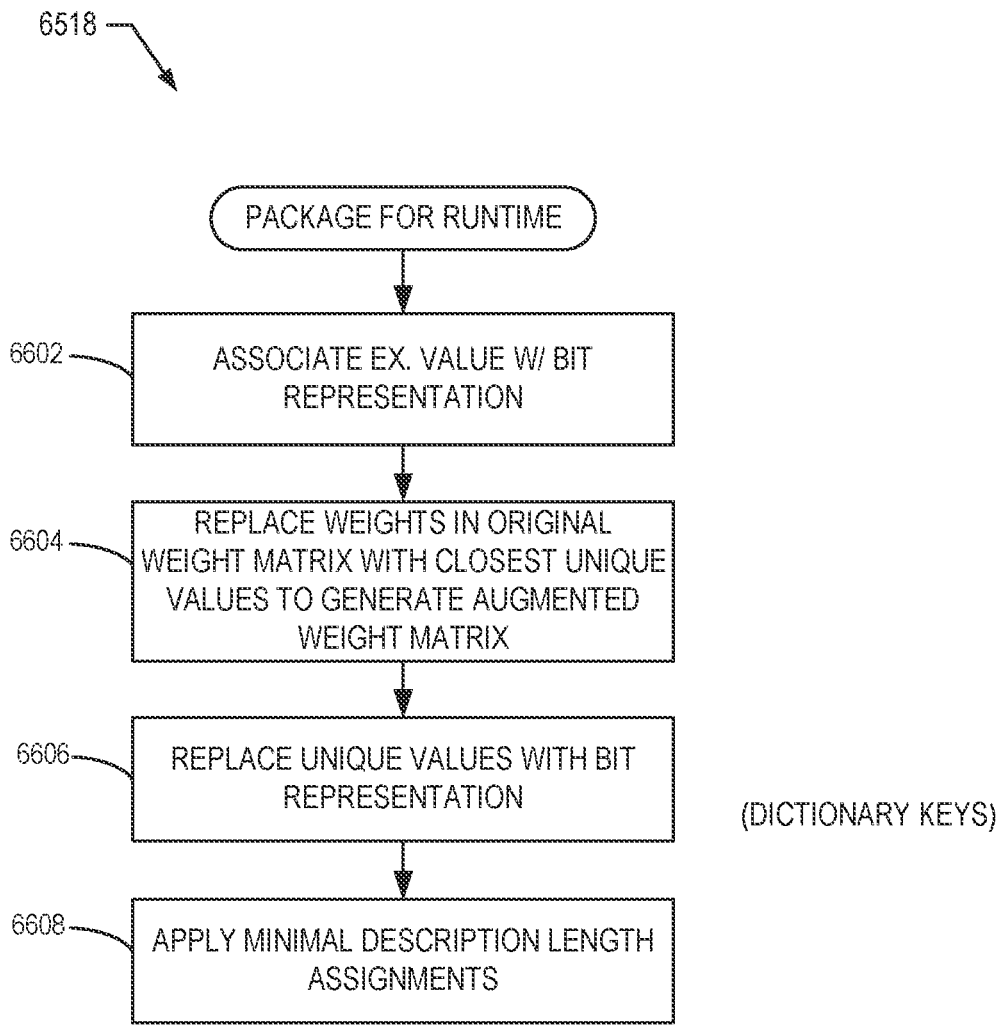

If convergence has not yet occurred (block 6016), control returns to block 6004, otherwise the example dictionary builder circuit 6012 packages the built dictionaries for runtime (block 6018). Turning to FIG. 66, the example dictionary builder circuit 6012 (see FIG. 60A) associates each value with a particular bit representation (block 6602) and replaces weights from the original weight matrix with the closest unique values to generate an augmented weight matrix (block 6604). The example dictionary builder circuit 6012 replaces unique values with a bit representation as dictionary keys, and the example optimizer circuit 6002 applies one or more types of minimal description length assignment (block 6608).

Figure 67:
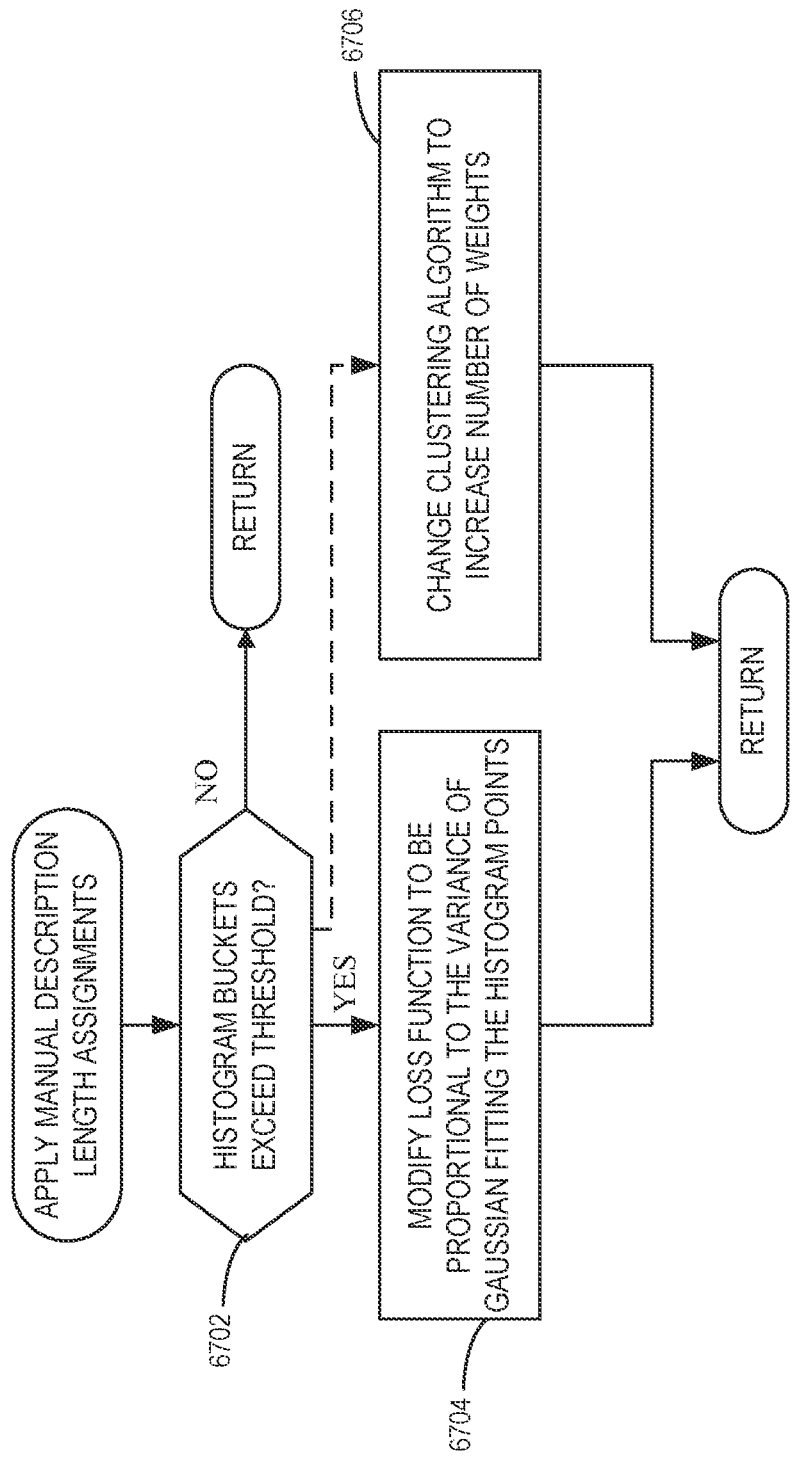

Turning to FIG. 67, the example optimizer circuit 6002 determines whether histogram buckets exceed a threshold value (block 6702). In some examples, if the threshold(s) has/have been exceeded (block 67002), then the example optimizer 6002 modifies the loss function to be proportional to the variance of the Gaussian fitting the histogram points (block 6704). In other examples, the optimizer circuit 6002 optionally changes a clustering algorithm during a next iteration to increase a number of weights (block 6706).

Figure 68:
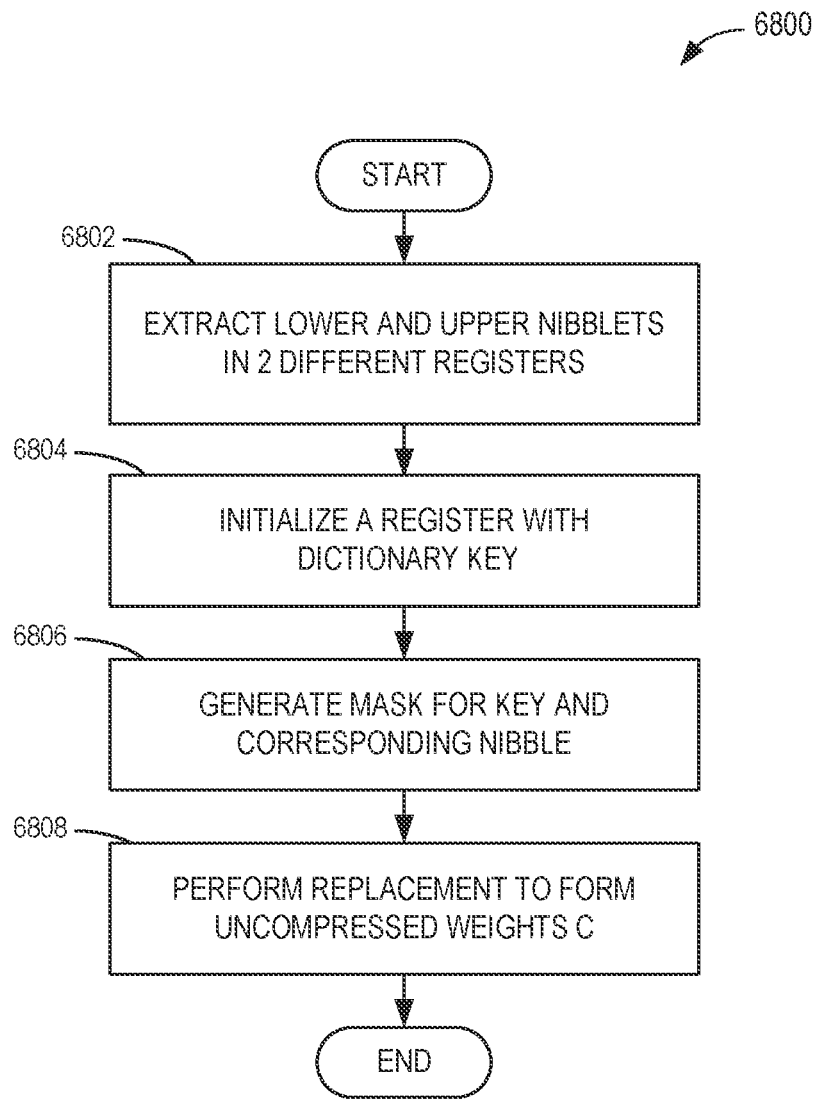

FIG. 68 illustrates example matrix/tensor decompression during inference time. In the illustrated example of FIG. 68, the matrix decompressor circuit 6014 extracts lower and upper nibbles in two separate registers (block 6802) because the amount of information is being doubled from INT4 to INT8. The example matrix decompressor circuit 6014 initializes a register with a dictionary key that is to be replaced (block 6802). The example matrix decompressor circuit 6014 generates a mask for the key and the corresponding nibble, which is performed for each of the two registers above (block 6806). The masks identify where replacement is to occur, which is repeated for each key to generate the decompressed matrix (block 6808).

Example methods, apparatus, systems, and articles of manufacture to optimize resources in Edge networks are disclosed herein. Further examples and combinations thereof include the following:

Example 189 includes an apparatus comprising at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to calculate clusters corresponding to original weight values of a weight matrix, calculate first clustered weight values, initiate a forward pass to calculate loss values based on the clustered weight values, calculate gradients corresponding to the clustered weight values, and calculate second clustered weight values based on a difference between the original weight values and the gradients.

Example 190 includes the apparatus as defined in example 189, wherein the processor circuitry is to modify the gradients with a learning weight.

Example 191 includes the apparatus as defined in example 190, wherein the processor circuitry is to modify the learning weight based on a threshold number of iterations.

Example 192 includes the apparatus as defined in example 189, wherein the processor circuitry is to obtain the weight matrix from a model, the model to be compressed prior to execution on a network device.

Example 193 includes the apparatus as defined in example 189, wherein the processor circuitry is to associate the second clustered weight values with key values, and replace the original weight values of the weight matrix with the key values corresponding to the second clustered weight values.

Example 194 includes the apparatus as defined in example 189, wherein the processor circuitry is to iteratively calculate the second clustered weight values until a threshold convergence value is satisfied.

Example 195 includes the apparatus as defined in example 189, wherein the processor circuitry is to invoke a k-means clustering algorithm to calculate the clusters.

Example 196 includes At least one non-transitory computer readable storage medium comprising instructions that, when executed, cause at least one processor to at least calculate clusters corresponding to original weight values of a weight matrix, calculate first clustered weight values, initiate a forward pass to calculate loss values based on the clustered weight values, calculate gradients corresponding to the clustered weight values, and calculate second clustered weight values based on a difference between the original weight values and the gradients.

Example 197 includes the computer readable storage medium as defined in example 196, wherein the instructions, when executed, cause the at least one processor to modify the gradients with a learning weight.

Example 198 includes the computer readable storage medium as defined in example 197, wherein the instructions, when executed, cause the at least one processor to modify the learning weight based on a threshold number of iterations.

Example 199 includes the computer readable storage medium as defined in example 196, wherein the instructions, when executed, cause the at least one processor to obtain the weight matrix from a model, the model to be compressed prior to execution on a network device.

Example 200 includes the computer readable storage medium as defined in example 197, wherein the instructions, when executed, cause the at least one processor to associate the second clustered weight values with key values, and replace the original weight values of the weight matrix with the key values corresponding to the second clustered weight values.

Example 201 includes the computer readable storage medium as defined in example 197, wherein the instructions, when executed, cause the at least one processor to iteratively calculate the second clustered weight values until a threshold convergence value is satisfied.

Example 202 includes the computer readable storage medium as defined in example 197, wherein the instructions, when executed, cause the at least one processor to invoke a k-means clustering algorithm to calculate the clusters.

Example 203 includes a method comprising calculating clusters corresponding to original weight values of a weight matrix, calculating first clustered weight values, initiating a forward pass to calculate loss values based on the clustered weight values, calculating gradients corresponding to the clustered weight values, and calculating second clustered weight values based on a difference between the original weight values and the gradients.

Example 204 includes the method as defined in example 203, further including modifying the gradients with a learning weight.

Example 205 includes the method as defined in example 204, further including modifying the learning weight based on a threshold number of iterations.

Example 206 includes the method as defined in example 203, further including obtaining the weight matrix from a model, the model to be compressed prior to execution on a network device.

Example 207 includes the method as defined in example 203, further including associating the second clustered weight values with key values, and replacing the original weight values of the weight matrix with the key values corresponding to the second clustered weight values.

Example 208 includes the method as defined in example 203, further including iteratively calculating the second clustered weight values until a threshold convergence value is satisfied.

Example 209 includes the method as defined in example 203, further including invoking a k-means clustering algorithm to calculate the clusters.

Example 210 includes an apparatus to generate dictionary weights, the apparatus comprising a cluster engine to calculate clusters corresponding to original weight values of a weight matrix, and calculate first clustered weight values, a loss calculator to initiate a forward pass to calculate loss values based on the clustered weight values, a gradient calculator to calculate gradients corresponding to the clustered weight values, and an optimizer to calculate second clustered weight values based on a difference between the original weight values and the gradients.

Example 211 includes the apparatus as defined in example 210, wherein the optimizer is to modify the gradients with a learning weight.

Example 212 includes the apparatus as defined in example 211, wherein the optimizer is to modify the learning weight based on a threshold number of iterations.

Example 213 includes the apparatus as defined in example 210, further including a matrix retriever to obtain the weight matrix from a model, the model to be compressed prior to execution on a network device.

Example 214 includes the apparatus as defined in example 210, wherein the optimizer is to associate the second clustered weight values with key values, and replace the original weight values of the weight matrix with the key values corresponding to the second clustered weight values.

Example 215 includes the apparatus as defined in example 210, wherein the optimizer is to iteratively calculate the second clustered weight values until a threshold convergence value is satisfied.

Example 216 includes the apparatus as defined in example 210, wherein the clustering engine is to invoke a k-means clustering algorithm to calculate the clusters.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. At least one non-transitory computer readable storage medium comprising instructions that, when executed, cause at least one processor to at least:
   invoke an exploration agent to identify platform resource devices;
   select a first one of the identified platform resource devices;
   generate first optimization metrics for the workload corresponding to the first one of the identified platform resource devices, the first optimization metrics corresponding to a first path;
   embed first semantic information to the workload, the first semantic information including optimized graph information and platform structure information corresponding to the first one of the identified platform resource devices;
   select a second one of the identified platform resource devices;
   generate second optimization metrics for the workload corresponding to the second one of the identified platform resource devices, the second optimization metrics corresponding to a second path;
   embed second semantic information to the workload, the second semantic information including optimized graph information and platform structure information corresponding to the second one of the identified platform resource devices; and
   select the first path or the second path during runtime based on (a) service level agreement (SLA) information and (b) utilization information corresponding to the first and second identified platform resource devices.

2. The at least one computer readable storage medium as defined in claim 1, wherein the instructions, when executed, cause the at least one processor to determine a quantity of tenants participating with the identified platform resource devices when generating the first optimization metrics and the second optimization metrics.

3. The at least one computer readable storage medium as defined in claim 2, wherein the instructions, when executed, cause the at least one processor to embed information corresponding to the quantity of tenants with the first and second semantic information.

4. The at least one computer readable storage medium as defined in claim 1, wherein the instructions, when executed, cause the at least one processor to:
   determine a utilization deviation corresponding to the first and second ones of the platform resource devices;
   compare the utilization deviation with the SLA information; and migrate the workload to one of the first path or the second path to satisfy at least one threshold of the SLA information.

5. The at least one computer readable storage medium as defined in claim 1, wherein the SLA information includes at least one of latency metrics, power consumption metrics, resource cost metrics, or accuracy metrics.

6. The at least one computer readable storage medium as defined in claim 1, wherein the instructions, when executed, cause the at least one processor to provide micropayments to a tenant in response to insufficient SLA criteria.

7. A method to optimize a workload, the method comprising:
invoking an exploration agent to identify platform resource devices;
selecting a first one of the identified platform resource devices;
generating first optimization metrics for the workload corresponding to the first one of the identified platform resource devices, the first optimization metrics corresponding to a first path;
embedding first semantic information to the workload, the first semantic information including optimized graph information and platform structure information corresponding to the first one of the identified platform resource devices;
selecting a second one of the identified platform resource devices;
generating second optimization metrics for the workload corresponding to the second one of the identified platform resource devices, the second optimization metrics corresponding to a second path;
embedding second semantic information to the workload, the second semantic information including optimized graph information and platform structure information corresponding to the second one of the identified platform resource devices; and
selecting the first path or the second path during runtime based on (a) service level agreement (SLA) information and (b) utilization information corresponding to the first and second identified platform resource devices.

8. The method as defined in claim 7, wherein generating the first optimization metrics and the second optimization metrics further includes determining a quantity of tenants participating with the identified platform resource devices.

9. The method as defined in claim 8, further including embedding information corresponding to the quantity of tenants with the first and second semantic information.

10. The method as defined in claim 7, further including:
determining a utilization deviation corresponding to the first and second ones of the platform resource devices;
comparing the utilization deviation with the SLA information; and
migrating the workload to one of the first path or the second path to satisfy at least one threshold of the SLA information.

11. The method as defined in claim 7, wherein the SLA information includes at least one of latency metrics, power consumption metrics, resource cost metrics, or accuracy metrics.

12. The method as defined in claim 7, further including providing micropayments to a tenant in response to detecting insufficient SLA parameters.

13. An apparatus comprising:
agent managing circuitry to:
invoke an exploration agent to identify platform resource devices;
select a first one of the identified platform resource devices;
generate first optimization metrics for the workload corresponding to the first one of the identified platform resource devices, the first optimization metrics corresponding to a first path; and
select a second one of the identified platform resource devices; and
generate second optimization metrics for the workload corresponding to the second one of the identified platform resource devices, the second optimization metrics corresponding to a second path;
benchmark managing circuitry to embed second semantic information to the workload, the second semantic information including optimized graph information and platform structure information corresponding to the second one of the identified platform resource devices; and
reconfiguration managing circuitry to select the first path or the second path during runtime based on (a) service level agreement (SLA) information and (b) utilization information corresponding to the first and second identified platform resource devices.

14. The apparatus as defined in claim 13, wherein generating the first optimization metrics and the second optimization metrics further includes determining a quantity of tenants participating with the identified platform resource devices.

15. The apparatus as defined in claim 14, wherein the benchmark managing circuitry is to embed information corresponding to the quantity of tenants with the first and second semantic information.

16. The apparatus as defined in claim 13, wherein the reconfiguration managing circuitry is to:
determine a utilization deviation corresponding to the first and second ones of the platform resource devices;
compare the utilization deviation with the SLA information; and
migrate the workload to one of the first path or the second path to satisfy at least one threshold of the SLA information.

17. The apparatus as defined in claim 13, wherein the SLA information includes at least one of latency metrics, power consumption metrics, resource cost metrics, or accuracy metrics.

* * * * *